US012650250B2

(12) United States Patent
Ikemiya et al.

(10) Patent No.: US 12,650,250 B2
(45) Date of Patent: Jun. 9, 2026

(54) INSIDE AIR-CONDITIONING DEVICE

(71) Applicant: DAIKIN INDUSTRIES, LTD., Osaka (JP)

(72) Inventors: Makoto Ikemiya, Osaka (JP); Shinichi Fujinaka, Osaka (JP); Masaru Tanaka, Osaka (JP); Shun Ohkubo, Osaka (JP); Yuuki Yotsumoto, Osaka (JP); Mitsushi Itano, Osaka (JP); Akihito Mizuno, Osaka (JP); Tomoyuki Gotou, Osaka (JP); Yasufu Yamada, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 280 days.

(21) Appl. No.: 17/426,903

(22) PCT Filed: Jan. 28, 2020

(86) PCT No.: PCT/JP2020/002974
§ 371 (c)(1),
(2) Date: Jul. 29, 2021

(87) PCT Pub. No.: WO2020/158731
PCT Pub. Date: Aug. 6, 2020

(65) Prior Publication Data

US 2022/0120476 A1 Apr. 21, 2022

(30) Foreign Application Priority Data

Jan. 30, 2019 (JP) ................................ 2019-013979
Feb. 6, 2019 (JP) ................................ 2019-019701
(Continued)

(51) Int. Cl.
*F25B 1/00* (2006.01)
*C09K 5/04* (2006.01)
(Continued)

(52) U.S. Cl.
CPC .............. *F25B 9/006* (2013.01); *C09K 5/045* (2013.01); *C10M 105/40* (2013.01);
(Continued)

(58) Field of Classification Search
CPC .............. C09K 5/045; C09K 2205/126; C09K 2205/22; C09K 2205/43; C09K 2205/47;
(Continued)

(56) References Cited

U.S. PATENT DOCUMENTS 2,309,224 A 1/1943 Terry et al.
6,054,064 A 4/2000 D'Aubarede
(Continued)

FOREIGN PATENT DOCUMENTS

CA 3 015 523 9/2017
CN 1757979 4/2006
(Continued)

OTHER PUBLICATIONS

Trane Air Conditioning Manual, Chapter X, The Air Conditioning System, pp. 303-359, 1996.
(Continued)

*Primary Examiner* — Davis D Hwu
(74) *Attorney, Agent, or Firm* — Wenderoth, Lind & Ponack, L.L.P.

(57) ABSTRACT

An inside air-conditioning device includes a refrigerant circuit (50) and a refrigerant that is sealed in the refrigerant circuit (50). The refrigerant circuit (50) includes a compressor (10), a condenser (25), an electronic expansion valve (13), and an evaporator (17). The refrigerant contains at least 1,2-difluoroethylene.

21 Claims, 9 Drawing Sheets

(30) Foreign Application Priority Data

Jun. 17, 2019 (JP) ................................ 2019-112406
Jun. 21, 2019 (JP) ................................ 2019-115584
Jan. 17, 2020 (JP) ................................ 2020-005787

(51) Int. Cl.
*C10M 105/40* (2006.01)
*C10M 107/24* (2006.01)
*C10M 107/34* (2006.01)
*F25B 9/00* (2006.01)
*C10N 40/30* (2006.01)

(52) U.S. Cl.
CPC ........ *C10M 107/24* (2013.01); *C10M 107/34* (2013.01); *C09K 2205/126* (2013.01); *C09K 2205/22* (2013.01); *C09K 2205/43* (2013.01); *C09K 2205/47* (2013.01); *C10M 2207/2835* (2013.01); *C10M 2209/043* (2013.01); *C10M 2209/1033* (2013.01); *C10N 2040/30* (2013.01)

(58) Field of Classification Search
CPC .............. C10M 105/40; C10M 107/24; C10M 107/34; C10M 2207/2835; C10M 2209/043; C10M 2209/1033
USPC ........................................................... 62/502
See application file for complete search history.

(56) References Cited

U.S. PATENT DOCUMENTS

| | | | |
|---|---|---|---|
| 6,658,882 | B2 | 12/2003 | Ohama et al. |
| 8,168,077 | B2 | 5/2012 | Spatz |
| 8,961,811 | B2 | 2/2015 | Minor et al. |
| 9,309,450 | B2 | 4/2016 | Low |
| 10,088,206 | B2 | 10/2018 | Sakai et al. |
| 10,131,827 | B2 | 11/2018 | Fukushima et al. |
| 11,365,335 | B2 | 6/2022 | Itano et al. |
| 11,441,819 | B2 | 9/2022 | Itano et al. |
| 11,447,613 | B2 | 9/2022 | Fabian et al. |
| 11,773,307 | B2 | 10/2023 | Itano et al. |
| 11,920,077 | B2 * | 3/2024 | Kumakura et al. ..... F25B 13/00 |
| 2006/0243945 | A1 | 11/2006 | Minor |
| 2010/0122545 | A1 | 5/2010 | Minor et al. |
| 2010/0319378 | A1 | 12/2010 | Chikami et al. |
| 2011/0243710 | A1 | 10/2011 | Kurihara et al. |
| 2011/0252801 | A1 | 10/2011 | Minor et al. |
| 2011/0253927 | A1 | 10/2011 | Minor et al. |
| 2011/0258146 | A1 | 10/2011 | Low |
| 2012/0216551 | A1 | 8/2012 | Minor et al. |
| 2013/0193368 | A1 | 8/2013 | Low |
| 2014/0077123 | A1 | 3/2014 | Fukushima |
| 2014/0291411 | A1 | 10/2014 | Tamaki et al. |
| 2015/0008358 | A1 | 1/2015 | Okido et al. |
| 2015/0027156 | A1 | 1/2015 | Bellamy, Jr. |
| 2015/0051426 | A1 | 2/2015 | Fukushima et al. |
| 2015/0322232 | A1 | 11/2015 | Hong et al. |
| 2015/0322321 | A1 | 11/2015 | Deur-Bert et al. |
| 2015/0330673 | A1 | 11/2015 | Honda et al. |
| 2015/0376486 | A1 | 12/2015 | Hashimoto et al. |
| 2016/0002518 | A1 | 1/2016 | Taniguchi et al. |
| 2016/0075927 | A1 | 3/2016 | Fukushima |
| 2016/0097569 | A1 | 4/2016 | Matsunaga |
| 2016/0333241 | A1 * | 11/2016 | Fukushima .......... C10M 107/24 |
| 2016/0333243 | A1 | 11/2016 | Fukushima et al. |
| 2016/0333244 | A1 | 11/2016 | Fukushima |
| 2016/0340565 | A1 | 11/2016 | Tasaka et al. |
| 2016/0347980 | A1 | 12/2016 | Okamoto |
| 2016/0355717 | A1 | 12/2016 | Fukushima et al. |
| 2016/0369146 | A1 | 12/2016 | Ueno et al. |
| 2017/0002245 | A1 | 1/2017 | Fukushima |
| 2017/0058171 | A1 | 3/2017 | Fukushima et al. |
| 2017/0058172 | A1 | 3/2017 | Fukushima et al. |
| 2017/0058173 | A1 | 3/2017 | Fukushima |
| 2017/0058174 | A1 | 3/2017 | Fukushima et al. |
| 2017/0138642 | A1 | 5/2017 | Ueno et al. |
| 2017/0146284 | A1 | 5/2017 | Matsunaga et al. |
| 2017/0218241 | A1 | 8/2017 | Deur-Bert et al. |
| 2018/0002586 | A1 | 1/2018 | Low |
| 2018/0051198 | A1 | 2/2018 | Okamoto et al. |
| 2018/0057724 | A1 | 3/2018 | Fukushima |
| 2018/0079941 | A1 | 3/2018 | Ueno et al. |
| 2018/0320942 | A1 | 11/2018 | Hayamizu et al. |
| 2020/0041174 | A1 | 2/2020 | Wakabayashi et al. |
| 2020/0048520 | A1 | 2/2020 | Fukushima |
| 2020/0079986 | A1 | 3/2020 | Fukushima |
| 2020/0317975 | A1 | 10/2020 | Itano et al. |
| 2020/0326100 | A1 | 10/2020 | Ukibune et al. |
| 2020/0326103 | A1 | 10/2020 | Kumakura et al. |
| 2020/0326109 | A1 | 10/2020 | Kumakura et al. |
| 2020/0385622 | A1 | 12/2020 | Itano et al. |
| 2020/0393178 | A1 | 12/2020 | Kumakura et al. |
| 2021/0080152 | A1 | 3/2021 | Itano et al. |
| 2021/0189208 | A1 | 6/2021 | Itano et al. |
| 2021/0198549 | A1 | 7/2021 | Fukushima |
| 2022/0089928 | A1 | 3/2022 | Fukushima |
| 2022/0389299 | A1 | 12/2022 | Itano et al. |
| 2022/0404070 | A1 | 12/2022 | Ohtsuka et al. |
| 2023/0002659 | A1 | 1/2023 | Itano et al. |

FOREIGN PATENT DOCUMENTS

| | | |
|---|---|---|
| CN | 102207094 | 10/2011 |
| CN | 102245731 | 11/2011 |
| CN | 102686957 | 9/2012 |
| CN | 102933924 | 2/2013 |
| CN | 104837951 | 8/2015 |
| CN | 104838218 | 8/2015 |
| CN | 105164227 | 12/2015 |
| CN | 204923442 | 12/2015 |
| CN | 105452417 | 3/2016 |
| CN | 106029821 | 10/2016 |
| CN | 106029823 | 10/2016 |
| CN | 106166110 | 11/2016 |
| CN | 106414654 | 2/2017 |
| CN | 106414682 | 2/2017 |
| CN | 107614651 | 1/2018 |
| CN | 107614652 | 1/2018 |
| CN | 108699428 | 10/2018 |
| CN | 111032817 | 4/2020 |
| CN | 111479894 | 7/2020 |
| EP | 0 811 670 | 12/1997 |
| EP | 2 600 081 | 6/2013 |
| EP | 2 693 623 | 2/2014 |
| EP | 2 770 277 | 8/2014 |
| EP | 3 012 556 | 4/2016 |
| EP | 3 101 082 | 12/2016 |
| EP | 3 109 292 | 12/2016 |
| EP | 3 121 242 | 1/2017 |
| EP | 3 153 559 | 4/2017 |
| EP | 3 153 567 | 4/2017 |
| EP | 3 305 869 | 4/2018 |
| EP | 3 423 541 | 1/2019 |
| EP | 3 666 848 | 6/2020 |
| EP | 3 739 018 | 11/2020 |
| EP | 3 825 382 | 5/2021 |
| EP | 3 919 843 | 12/2021 |
| FR | 3 000 095 | 6/2014 |
| GB | 2530915 | 4/2016 |
| GB | 2566809 | 3/2019 |
| JP | 7-190528 | 7/1995 |
| JP | 9-30238 | 2/1997 |
| JP | 9-196489 | 7/1997 |
| JP | 9-324175 | 12/1997 |
| JP | 2000-356420 | 12/2000 |
| JP | 2022-233165 | 8/2002 |
| JP | 2004-144378 | 5/2004 |
| JP | 2014-109404 | 6/2004 |
| JP | 2004-225926 | 8/2004 |
| JP | 2006-153307 | 6/2006 |
| JP | 2009-216383 | 9/2009 |
| JP | 2009-219267 | 9/2009 |
| JP | 2009-276050 | 11/2009 |
| JP | 2011-045218 | 3/2011 |

(56) References Cited

FOREIGN PATENT DOCUMENTS

| | | | | |
|---|---|---|---|---|
| JP | 2011-163617 | | | 8/2011 |
| JP | 2011-202936 | | | 10/2011 |
| JP | 2012-67986 | | | 4/2012 |
| JP | 2012-510550 | | | 5/2012 |
| JP | 2012-145302 | | | 8/2012 |
| JP | 2012-151967 | | | 8/2012 |
| JP | 2012-235633 | | | 11/2012 |
| JP | 2013-75630 | | | 4/2013 |
| JP | 2013-167395 | | | 8/2013 |
| JP | 2013-170791 | | | 9/2013 |
| JP | 2013-203221 | | | 10/2013 |
| JP | 2013-245874 | | | 12/2013 |
| JP | 2014-79034 | | | 5/2014 |
| JP | 2014-145500 | | | 8/2014 |
| JP | WO2014/203353 | | | 12/2014 |
| JP | WO2014203353 | A1 | * | 12/2014 |
| JP | 5689068 | | | 3/2015 |
| JP | 2015-75321 | | | 4/2015 |
| JP | 2015-78800 | | | 4/2015 |
| JP | 2015-137778 | | | 7/2015 |
| JP | WO2015/136977 | | | 9/2015 |
| JP | WO2015136977 | A1 | * | 9/2015 |
| JP | 2015-195640 | | | 11/2015 |
| JP | 2015-214927 | | | 12/2015 |
| JP | 2015-229767 | | | 12/2015 |
| JP | 2015-229768 | | | 12/2015 |
| JP | 2015229767 | A | * | 12/2015 |
| JP | WO2015/186558 | | | 12/2015 |
| JP | 2016-11423 | | | 1/2016 |
| JP | 2016-501978 | | | 1/2016 |
| JP | 2016-028119 | | | 2/2016 |
| JP | 2016-56340 | | | 4/2016 |
| JP | 2013-529703 | | | 7/2016 |
| JP | 2016-171680 | | | 9/2016 |
| JP | 2016-539208 | | | 12/2016 |
| JP | 6105511 | | | 3/2017 |
| JP | 2017-145380 | | | 8/2017 |
| JP | 2018-104565 | | | 7/2018 |
| JP | 2018-104566 | | | 7/2018 |
| JP | 2018-91502 | | | 8/2018 |
| JP | 2018-177966 | | | 11/2018 |
| JP | 2018-177967 | | | 11/2018 |
| JP | 2018-177968 | | | 11/2018 |
| JP | 2018-177969 | | | 11/2018 |
| JP | 2018-179404 | | | 11/2018 |
| JP | 2018-184597 | | | 11/2018 |
| JP | 2019-34972 | | | 3/2019 |
| JP | 2019-034983 | | | 3/2019 |
| JP | 2019-512031 | | | 5/2019 |
| JP | 2019-207054 | | | 12/2019 |
| KR | 19990078295 | A | * | 10/1999 |
| KR | 19990078295A TR | | * | 10/1999 |
| KR | 10-2011-0099253 | | | 9/2011 |
| KR | 10-2015-0099530 | | | 8/2015 |
| KR | 10-2018-0118174 | | | 10/2018 |
| MX | 2018010417 | | | 11/2018 |
| WO | 2005/105947 | | | 11/2005 |
| WO | 2009/036537 | | | 3/2009 |
| WO | 2010/059677 | | | 5/2010 |
| WO | 2010/064011 | | | 6/2010 |
| WO | 2011/163117 | | | 12/2011 |
| WO | 2012/014306 | | | 2/2012 |
| WO | 2012/165425 | | | 12/2012 |
| WO | 2013/062058 | | | 5/2013 |
| WO | 2013/084301 | | | 6/2013 |
| WO | 2014/085973 | | | 6/2014 |
| WO | 2014/102477 | | | 7/2014 |
| WO | 2014/178352 | | | 11/2014 |
| WO | 2014/203356 | | | 12/2014 |
| WO | 2015/015881 | | | 2/2015 |
| WO | 2015/054110 | | | 4/2015 |
| WO | 2015/111379 | | | 7/2015 |
| WO | 2015/115252 | | | 8/2015 |
| WO | 2015/125874 | | | 8/2015 |
| WO | 2015/125885 | | | 8/2015 |
| WO | 2015/141678 | | | 9/2015 |
| WO | 2015/186557 | | | 12/2015 |
| WO | 2015/186670 | | | 12/2015 |
| WO | 2015/186671 | | | 12/2015 |
| WO | 2016/075541 | | | 5/2016 |
| WO | 2016/092655 | | | 6/2016 |
| WO | 2016/139734 | | | 9/2016 |
| WO | 2016/182030 | | | 11/2016 |
| WO | 2016/190177 | | | 12/2016 |
| WO | 2016/194847 | | | 12/2016 |
| WO | 2017/038227 | | | 3/2017 |
| WO | 2017/122517 | | | 7/2017 |
| WO | WO2017199516 | A1 | * | 11/2017 |
| WO | WO2017199516A1 TR | | * | 11/2017 |
| WO | 2018/043430 | | | 3/2018 |
| WO | 2018/073853 | | | 4/2018 |
| WO | 2018/193974 | | | 10/2018 |
| WO | 2019/030508 | | | 2/2019 |
| WO | 2019/123782 | | | 6/2019 |
| WO | 2019/123806 | | | 6/2019 |
| WO | 2019/124396 | | | 6/2019 |
| WO | 2019/124398 | | | 6/2019 |
| WO | 2019/124399 | | | 6/2019 |
| WO | 2019/172008 | | | 9/2019 |
| WO | 2020/017520 | | | 1/2020 |
| WO | 2020/017521 | | | 1/2020 |
| WO | 2020/017522 | | | 1/2020 |
| WO | 2020/071380 | | | 4/2020 |
| WO | 2020/256129 | | | 12/2020 |
| WO | 2020/256131 | | | 12/2020 |
| WO | 2020/256134 | | | 12/2020 |

OTHER PUBLICATIONS

International Preliminary Report on Patentability issued Jan. 19, 2021 in International (PCT) Application No. PCT/JP2019/027989.

International Search Report issued Sep. 10, 2019 in International (PCT) Application No. PCT/JP2019/027989.

International Preliminary Report on Patentability issued Jan. 19, 2021 in International (PCT) Application No. PCT/JP2019/027988.

International Search Report issued Sep. 10, 2019 in International (PCT) Application No. PCT/JP2019/027988.

International Preliminary Report on Patentability issued Jan. 19, 2021 in International (PCT) Application No. PCT/JP2019/027990.

International Search Report issued Oct. 21, 2019 in International (PCT) Application No. PCT/JP2019/027990.

International Preliminary Report on Patentability issued Jul. 27, 2021 in International (PCT) Application No. PCT/JP2020/002974.

International Search Report issued Apr. 14, 2020 in International (PCT) Application No. PCT/JP2020/002974.

International Search Report issued Sep. 3, 2019 in International (PCT) Application No. PCT/JP2019/027031.

International Search Report issued Jan. 28, 2020 in International (PCT) Application No. PCT/JP2019/047097.

International Search Report issued Mar. 31, 2020 in International (PCT) Application No. PCT/JP2019/050501.

Extended European Search Report issued Apr. 21, 2021 in European Patent Application No. 19912660.8.

Takahashi et al., "Construction of Comprehensive Reaction Model for Predicting Tetrafluoroethylene Explosion by High-Pressure Shock Tube", (https://kaken.nii.ac.jp/), Research Result Report of Grants-in-Aid for Scientific Research, 2018, 4 pages, Abstract.

Otsuka et el., "Development of control method of HFO-1123 disproportionation and investigation of probability of HFO-1123 disproportionation", AGC Research Report, 2018, No. 68, pp. 29-33, Abstract.

International Search Report issued Mar. 31, 2020 in International (PCT) Application No. PCT/JP2020/003943.

International Search Report issued Mar. 31, 2020 in International (PCT) Application No. PCT/JP2020/003990.

International Search Report issued Jul. 21, 2020 in International (PCT) Application No. PCT/JP2020/016787.

International Search Report issued Jul. 28, 2020 in International (PCT) Application No. PCT/JP2020/17777.

(56) References Cited

OTHER PUBLICATIONS

Fei Qian, Chief Editor, Marine Auxiliary Engine, 3rd Ed., p. 224-225, Dalian Maritime University Press, Feb. 2008, with English translation.
"Commercial $CO_2$ Refrigeration Systems", Emerson Climate Technologies, Inc. 2014, Section 2, Properties of R744, 44 pages.
"Carbon Dioxide ($CO_2$ ) in Air-Conditioning Systems (RAC)", Association of European Refrigeration Component Manufactures, Nov. 2018, 2 pages.
Belman-Flores et al., "General aspects of carbon dioxide as a refrigerent", Journal of Energy Africa, May 2014, vol. 25, No. 2, pp. 96-106.
"Carbon Dioxide as refrigerant", UNILAB S.r.i., Italy, Oct. 2016, 3 pages.
Shah, "Automotive Air-Conditioning Systems-Historical Developments, the State of Technology, and Future Trends", Heat Transfer Engineering, 2009, vol. 30, No. 9, pp. 720-735.
Cao Linjiao, "Automotive Electrical Systems: Structure and Maintenance", June 2015, Shanghai Jiao Tong University Press, pp. 135-136, with English machine translation.
Extended European Search Report issued Feb. 13, 2026 in European Application No. 25216175.7.

* cited by examiner

INSIDE AIR-CONDITIONING DEVICE

TECHNICAL FIELD

The present disclosure relates to an inside air-conditioning device.

BACKGROUND ART

Hitherto, in a heat cycle system of a refrigeration inside air-conditioning device or a freezing inside air-conditioning device, R134a, which is a single refrigerant, has been frequently used as a refrigerant. In addition, in the inside air-conditioning device, the use of R404 as a refrigerant may be considered. R404 is a three-component mixed refrigerant containing R125, R134a, and R143a, and is a pseudo-azeotropic composition.

However, the global warming potential (GWP) of R134a is 1430, and the global warming potential (GWP) of R404A is 3920. In recent years, since there has been a growing concern about global warming, other refrigerants having a low GWP are being used.

For example, Patent Literature 1 (International Publication No. 2005/105947) proposes mixed refrigerants having a low GWP that can be used as alternatives to R134a; and Patent Literature 2 (Japanese Unexamined Patent Application Publication No. 2018-184597) proposes mixed refrigerants having a low GWP that can be used as alternatives to R404A.

SUMMARY OF INVENTION

Technical Problem

So far, no studies have been made regarding what kinds of refrigerants should be used among refrigerants having a low GWP in an inside air-conditioning device.

Solution to Problem

An inside air-conditioning device according to a first aspect includes a refrigerant circuit and a refrigerant that is sealed in the refrigerant circuit. The refrigerant circuit includes a compressor, a condenser, a decompressor, and an evaporator. The refrigerant contains at least 1,2-difluoroethylene.

An inside air-conditioning device according to a second aspect is the inside air-conditioning device according to the first aspect, wherein the refrigerant contains cis-1,2-difluoroethylene (HFO-1132(Z)).

An inside air-conditioning device according to a third aspect is the inside air-conditioning device according to the second aspect, wherein the refrigerant contains cis-1,2-difluoroethylene (HFO-1132(Z)) and 2,3,3,3-tetrafluoropropene (HFO-1234yf). A content of HFO-1132(Z) is 53.0 to 59.5% by mass and a content of HFO-1234yf is 47.0 to 40.5% by mass, based on a total mass of HFO-1132(Z) and HFO-1234yf.

An inside air-conditioning device according to a fourth aspect is the inside air-conditioning device according to the third aspect, wherein the refrigerant is used for operating a refrigeration cycle in which an evaporating temperature is −60 to 20° C.

An inside air-conditioning device according to a fifth aspect is the inside air-conditioning device according to the third aspect or the fourth aspect, wherein the refrigerant consists only of HFO-1132(Z) and HFO-1234yf.

An inside air-conditioning device according to a sixth aspect is the inside air-conditioning device according to the second aspect, wherein the refrigerant contains cis-1,2-difluoroethylene (HFO-1132(Z)) and 2,3,3,3-tetrafluoropropene (HFO-1234yf). A content of HFO-1132(Z) is 41.0 to 49.2% by mass and a content of HFO-1234yf is 59.0 to 50.8% by mass, based on a total mass of HFO-1132(Z) and HFO-1234yf.

An inside air-conditioning device according to a seventh aspect is the inside air-conditioning device according to the sixth aspect, wherein the refrigerant is used for operating a refrigeration cycle in which an evaporating temperature is −60 to 20° C.

An inside air-conditioning device according to a eighth aspect is the inside air-conditioning device according to the sixth aspect or the seventh aspect, wherein the refrigerant consists only of HFO-1132(Z) and HFO-1234yf.

An inside air-conditioning device according to a ninth aspect is the inside air-conditioning device according to any one of the third aspect to the eighth aspect, wherein the refrigerant is used as an alternative refrigerant to R134a, R22, R12, R404A, R407A, R407C, R407F, R407H, R410A, R413A, R417A, R422A, R422B, R422C, R422D, R423A, R424A, R426A, R427A, R428A, R430A, R434A, R437A, R438A, R448A, R449A, R449B, R449C, R450A, R452A, R452B, R454A, R452B, R454C, R455A, R465A, R502, R507, R513A, R513B, R515A, or R515B.

An inside air-conditioning device according to a tenth aspect is the inside air-conditioning device according to any one of the third aspect to the ninth aspect, wherein the refrigerant contains at least one substance selected from the group consisting of water, a tracer, an ultraviolet fluorescent dye, a stabilizer, and a polymerization inhibitor.

An inside air-conditioning device according to a eleventh aspect is the inside air-conditioning device according to any one of the third aspect to the tenth aspect, wherein the refrigerant further contains a refrigerator oil and used as a working fluid for a refrigeration apparatus.

An inside air-conditioning device according to a twelfth aspect is the inside air-conditioning device according to the eleventh aspect, wherein the refrigerator oil contains at least one polymer selected from the group consisting of a polyalkylene glycol (PAG), a polyol ester (POE), and a polyvinyl ether (PVE).

An inside air-conditioning device according to a thirteenth aspect is the inside air-conditioning device according to the first aspect, wherein the refrigerant contains trans-1,2-difluoroethylene (HFO-1132(E)).

An inside air-conditioning device according to a fourteenth aspect is the inside air-conditioning device according to the thirteenth aspect, wherein the refrigerant contains trans-1,2-difluoroethylene (HFO-1132(E)) and 2,3,3,3-tetrafluoropropene (HFO-1234yf). A content rate of HFO-1132(E) is 35.0 to 65.0 mass % and a content rate of HFO-1234yf is 65.0 to 35.0 mass %, based on a total mass of HFO-1132(E) and HFO-1234yf. The refrigerant is used for operating a refrigeration cycle in which an evaporating temperature is −75 to −5° C.

An inside air-conditioning device according to a fifteenth aspect is the inside air-conditioning device according to the fourteenth aspect, wherein wherein a content rate of HFO-1132(E) is 41.3 to 53.5 mass % and a content rate of HFO-1234yf is 58.7 to 46.5 mass %, based on a total mass of HFO-1132(E) and HFO-1234yf.

An inside air-conditioning device according to a sixteenth aspect is the inside air-conditioning device according to the fourteenth aspect or the fifteenth aspect, wherein the refrigerant consists only of HFO-1132(E) and HFO-1234yf.

An inside air-conditioning device according to a seventeenth aspect is the inside air-conditioning device according to the thirteenth aspect, wherein the refrigerant contains trans-1,2-difluoroethylene (HFO-1132(E)) and 2,3,3,3-tetrafluoropropene (HFO-1234yf). A content rate of HFO-1132 (E) is 40.5 to 49.2 mass % and a content rate of HFO-1234yf is 59.5 to 50.8 mass %, based on a total mass of HFO-1132 (E) and HFO-1234yf.

An inside air-conditioning device according to a eighteenth aspect is the inside air-conditioning device according to the seventeenth aspect, wherein the refrigerant consists only of HFO-1132(E) and HFO-1234yf.

An inside air-conditioning device according to a nineteenth aspect is the inside air-conditioning device according to the seventeenth aspect or the eighteenth aspect, wherein the refrigerant is used for operating a refrigeration cycle in which an evaporating temperature is −75 to 15° C.

An inside air-conditioning device according to a twentieth aspect is the inside air-conditioning device according to any one of the fourteenth aspect to the nineteenth aspect, wherein the refrigerant is used as an alternative refrigerant to R12, R22, R134a, R404A, R407A, R407C, R407F, R407H, R410A, R413A, R417A, R422A, R422B, R422C, R422D, R423A, R424A, R426A, R427A, R430A, R434A, R437A, R438A, R448A, R449A, R449B, R449C, R452A, R452B, R454A, R454B, R454C, R455A, R465A, R502, R507 or R513A.

An inside air-conditioning device according to a twenty-first aspect is the inside air-conditioning device according to the thirteenth aspect, wherein the refrigerant contains trans-1,2-difluoroethylene (HFO-1132(E)) and 2,3,3,3-tetrafluoropropene (HFO-1234yf). A content rate of HFO-1132(E) is 31.1 to 39.8 mass % and a content rate of HFO-1234yf is 68.9 to 60.2 mass %, based on a total mass of HFO-1132(E) and HFO-1234yf.

An inside air-conditioning device according to a twenty-second aspect is the inside air-conditioning device according to the twenty-first aspect, wherein a content rate of HFO-1132(E) is 31.1 to 37.9 mass % and a content rate of HFO-1234yf is 68.9 to 62.1 mass %, based on a total mass of HFO-1132(E) and HFO-1234yf.

An inside air-conditioning device according to a twenty-third aspect is the inside air-conditioning device according to the twenty-first aspect or the twenty-second aspect, wherein the refrigerant consists only of HFO-1132(E) and HFO-1234yf.

An inside air-conditioning device according to a twenty-fourth aspect is the inside air-conditioning device according to any one of the twenty-first aspect to the twenty-third aspect, wherein the refrigerant is used for operating a refrigeration cycle in which an evaporating temperature is −75 to 15° C.

An inside air-conditioning device according to a twenty-fifth aspect is the inside air-conditioning device according to any one of the twenty-first aspect to the twenty-fourth aspect, wherein the refrigerant is used as an alternative refrigerant to R134a, R1234yf or $CO_2$.

An inside air-conditioning device according to a twenty-sixth aspect is the inside air-conditioning device according to the thirteenth aspect, wherein the refrigerant contains trans-1,2-difluoroethylene (HFO-1132(E)) and 2,3,3,3-tetrafluoropropene (HFO-1234yf). A content rate of HFO-1132 (E) is 21.0 to 28.4 mass % and a content rate of HFO-1234yf is 79.0 to 71.6 mass %, based on a total mass of HFO-1132 (E) and HFO-1234yf.

An inside air-conditioning device according to a twenty-seventh aspect is the inside air-conditioning device according to the twenty-sixth aspect, wherein the refrigerant consists only of HFO-1132(E) and HFO-1234yf.

An inside air-conditioning device according to a twenty-eighth aspect is the inside air-conditioning device according to the twenty-sixth aspect or the twenty-seventh aspect, wherein the refrigerant is used as an alternative refrigerant to R12, R22, R134a, R404A, R407A, R407C, R407F, R407H, R410A, R413A, R417A, R422A, R422B, R422C, R422D, R423A, R424A, R426A, R427A, R430A, R434A, R437A, R438A, R448A, R449A, R449B, R449C, R452A, R452B, R454A, R454B, R454C, R455A, R465A, R502, R507, R513A, R1234yf or R1234ze.

An inside air-conditioning device according to a twenty-ninth aspect is the inside air-conditioning device according to the thirteenth aspect, wherein the refrigerant contains trans-1,2-difluoroethylene (HFO-1132(E)) and 2,3,3,3-tetrafluoropropene (HFO-1234yf). A content rate of HFO-1132 (E) is 12.1 to 72.0 mass % and a content rate of HFO-1234yf is 87.9 to 28.0 mass %, based on a total mass of HFO-1132 (E) and HFO-1234yf.

An inside air-conditioning device according to a thirtieth aspect is the inside air-conditioning device according to the twenty-ninth aspect, wherein the refrigerant consists only of HFO-1132(E) and HFO-1234yf.

An inside air-conditioning device according to a thirty-first aspect is the inside air-conditioning device according to the twenty-ninth aspect or the thirtieth aspect, wherein the refrigerant is used as an alternative refrigerant to R12, R134a or R1234yf.

An inside air-conditioning device according to a thirty-second aspect is the inside air-conditioning device according to any one of the fourteenth aspect to the thirty-first aspect, wherein the refrigerant contains at least one substance selected from the group consisting of water, a tracer, an ultraviolet fluorescent dye, a stabilizer, and a polymerization inhibitor.

An inside air-conditioning device according to a thirty-third aspect is the inside air-conditioning device according to any one of the fourteenth aspect to the thirty-second aspect, wherein the refrigerant contains a refrigerator oil and used as a working fluid for a refrigeration apparatus.

An inside air-conditioning device according to a thirty-fourth aspect is the inside air-conditioning device according to the thirty-third aspect, wherein the refrigerator oil contains at least one polymer selected from the group consisting of a polyalkylene glycol (PAG), a polyol ester (POE), and a polyvinyl ether (PVE).

Advantageous Effects of Invention

A composition that contains a refrigerant that is used in the inside air-conditioning device has the characteristic of having a coefficient of performance (COP) and a refrigerating capacity that are greater than or equal to those of R134a and having a GWP that is sufficiently small, or has the characteristic of having a coefficient of performance (COP) and a refrigerating capacity that are greater than or equal to those of R404A and having a GWP that is sufficiently small.

DESCRIPTION OF EMBODIMENTS

(1)

(1-1) Definition of Terms

Figure 1:
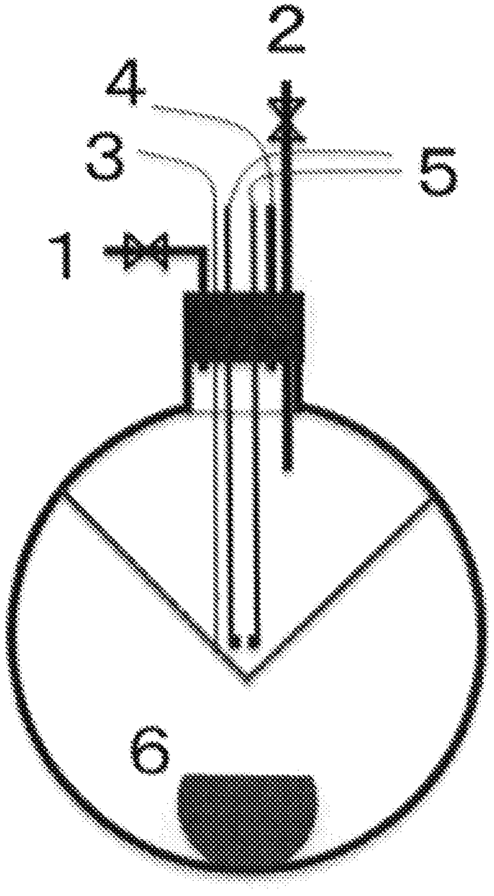
FIG. 1 is a schematic view of an experimental device for determining combustibility (flammability or nonflammability).

As used herein, a numerical value range represented using "to" represents the range including the numerical values set forth before and after the "to" as the minimum value and the maximum value, respectively.

As used herein, the term "contain" and the term "comprise" are used to intend the concepts of the term "consist essentially of" and the term "consist of".

The term "refrigerant" herein includes at least any compound prescribed in ISO817 (International Organization for Standardization) and marked by a refrigerant number (ASHRAE number) representing the type of a refrigerant with R at the beginning, and further includes one having properties equivalent to those of such a refrigerant even if such one is not marked by any refrigerant number. Refrigerants are roughly classified to "fluorocarbon-based compounds" and "non-fluorocarbon-based compounds" in terms of the structure of such compounds. Such "fluorocarbon-based compounds" include chlorofluorocarbon (CFC), hydrochlorofluorocarbon (HCFC) and hydrofluorocarbon (HFC). Such "non-fluorocarbon-based compounds" include propane (R290), propylene (R1270), butane (R600), isobutene (R600a), carbon dioxide (R744) and ammonia (R717).

The term "composition including a refrigerant" herein includes at least (1) a refrigerant itself (including a mixture of refrigerants), (2) a composition that further includes other component and that can be mixed with at least a refrigerator oil and thus used to obtain a working fluid for a refrigerator, and (3) a working fluid for a refrigerator, containing a refrigerator oil. The composition (2) among such three aspects is herein designated as a "refrigerant composition" so as to be distinguished from the refrigerant itself (including a mixture of refrigerants). The working fluid (3) for a refrigerator is designated as a "refrigerator oil-containing working fluid" so as to be distinguished from the "refrigerant composition".

A first type of the term "alternative" herein means that, in a case where the term is used in the context indicating that a second refrigerant corresponds to an "alternative" of a first refrigerant, the second refrigerant can be used for operating under optimal conditions, if necessary, by undergoing only the change of a few parts (at least one of a refrigerator oil, a gasket, a packing, an expansion valve, a dryer and other parts) in any equipment designed for operating with the first refrigerant, and adjustment of the equipment. That is, this type means that the same equipment is operated with such an "alternative" of the refrigerant. An aspect of the "alternative" in this type can be any of "drop in alternative", "nearly drop in alternative" and "retrofit", in which the degree of the change or the adjustment necessary for replacement with the second refrigerant is lower in the listed order.

A second type of the term "alternative" includes use of any equipment designed for operating with the second refrigerant, in which the second refrigerant is mounted, for the same application as the existing application of the first refrigerant. This type means that the same application, with such an "alternative" of the refrigerant, is provided.

As used herein, the term "refrigeration apparatus", in a broad sense, refers to an apparatus in general that takes the heat of an object or space away to set the temperature lower than that of the ambient outside air, and maintains this low temperature. In other words, in a broad sense, the refrigeration apparatus refers to a conversion apparatus that obtains energy from the outside, works, and converts the energy in order to transfer heat from where the temperature is lower to where the temperature is higher. In the present disclosure, in a broad sense, the refrigeration apparatus is synonymous with a heat pump.

In the present disclosure, in a narrow sense, the refrigeration apparatus is distinguished from a heat pump, depending on the difference in the applied temperature range and the operating temperature. In this case, an apparatus in which a low temperature heat source is placed in a temperature range lower than the air temperature is referred to as a refrigeration apparatus, while an apparatus in which a low temperature heat source is placed around air temperature to use the heat-release action caused by driving a refrigeration cycle may be sometimes referred to as a heat pump. There is also an apparatus having both the functions of a refrigeration apparatus in a narrow sense and a heat pump in a narrow sense, although it is the same equipment, like an air conditioner having a "cooling mode", a "heating mode", and the like. As used herein, the terms "refrigeration apparatus" and "heat pump" are all used in the broad sense unless otherwise noted.

The "temperature glide" can be herein restated as the absolute value of the difference between the start temperature and the end temperature in the course of phase transition of the composition including a refrigerant of the present disclosure, in any constituent element in a heat cycle system.

The "in-car air conditioning equipment" herein means one refrigerating apparatus for use in cars such as a gasoline-fueled car, a hybrid car, an electric car and a hydrogen-fueled car. The in-car air conditioning equipment refers to a refrigerating apparatus including a refrigeration cycle that allows a liquid refrigerant to perform heat exchange in an evaporator, allows a compressor to suction a refrigerant gas evaporated, allows a refrigerant gas adiabatically compressed to be cooled and liquefied by a condenser, furthermore allows the resultant to pass through an expansion valve and to be adiabatically expanded, and then anew feeds the resultant as a liquid refrigerant to an evaporating machine.

The "turbo refrigerator" herein means one large-sized chiller-refrigerator. The turbo refrigerator refers to a refrigerating apparatus including a refrigeration cycle that allows a liquid refrigerant to perform heat exchange in an evaporator, allows a centrifugal compressor to suction a refrigerant gas evaporated, allows a refrigerant gas adiabatically compressed to be cooled and liquefied by a condenser, furthermore allows the resultant to pass through an expansion valve and to be adiabatically expanded, and then anew feeds the resultant as a liquid refrigerant to an evaporating machine. The "large-sized chiller-refrigerator" is one of chillers and refers to a large-sized air conditioner for air conditioning in building units.

The "saturation pressure" herein means the pressure of saturated vapor. The "saturation temperature" herein means the temperature of saturated vapor.

As used herein, an evaporating temperature in a refrigeration cycle means a temperature when a refrigerant liquid absorbs heat and turns into a vapor in the evaporating step of a refrigeration cycle. The evaporating temperature in the refrigeration cycle can be determined by measuring the temperature of the evaporator inlet and/or the evaporator outlet. In the case of a single refrigerant and an azeotropic refrigerant, the evaporating temperature is constant, but in the case of a non-azeotropic refrigerant, the evaporating temperature is the average value of the temperature of the evaporator inlet and the dew point temperature. In other words, in the case of a non-azeotropic refrigerant, the evaporating temperature can be calculated as "evaporating temperature=(evaporator inlet temperature+dew point temperature)/2".

The "discharge temperature" herein means the temperature of a mixed refrigerant at a discharge port in a compressor.

The "evaporating pressure" herein means the saturation pressure at an evaporating temperature.

The "condensation pressure" herein means the saturation pressure at an condensation temperature.

Technical definitions of "non-flammability" and "lower flammability" are follows.

Any refrigerant having "non-flammability" in the present disclosure means that the WCF composition (Worst case of formulation for flammability), as a composition exhibiting most flammability, among acceptable concentrations of the refrigerant is rated as "Class 1" in US ANSI/ASHRAE Standard 34-2013.

Any refrigerant having "lower flammability" herein means that the WCF composition is rated as "Class 2L" in US ANSI/ASHRAE Standard 34-2013.

Any refrigerant having "low flammability" herein means that the WCF composition is rated as "Class 2" in US ANSI/ASHRAE Standard 34-2013.

The GWP herein means the value based on the fourth report of IPCC (Intergovernmental Panel on Climate Change).

(1-2) Refrigerant

Although the details thereof are described later, any one of the refrigerants 11, 12, 1, 2, 3, 4 and 5 according to the present disclosure (sometimes referred to as "the refrigerant according to the present disclosure") can be used as a refrigerant.

(1-3) Refrigerant Composition

The refrigerant composition according to the present disclosure comprises at least the refrigerant according to the present disclosure, and can be used for the same use as the refrigerant according to the present disclosure. Moreover, the refrigerant composition according to the present disclosure can be further mixed with at least a refrigeration oil to thereby obtain a working fluid for a refrigerating machine.

The refrigerant composition according to the present disclosure further comprises at least one other component in addition to the refrigerant according to the present disclosure. The refrigerant composition according to the present disclosure may comprise at least one of the following other components, if necessary. As described above, when the refrigerant composition according to the present disclosure is used as a working fluid in a refrigerating machine, it is generally used as a mixture with at least a refrigeration oil.

It is preferable that the refrigerant composition according to the present disclosure does not substantially comprise a refrigeration oil. Specifically, in the refrigerant composition according to the present disclosure, the content of the refrigeration oil based on the entire refrigerant composition is preferably 0 to 0.25 mass %, and more preferably 0 to 0.1 mass %.

(1-3-1) Water

The refrigerant composition according to the present disclosure may contain a small amount of water.

The water content of the refrigerant composition is preferably 0 to 0.1 mass % based on the entire refrigerant, more preferably 0 to 0.075 mass %, more preferably 0 to 0.05 mass %, and more preferably 0 to 0.025 mass %.

A small amount of water contained in the refrigerant composition stabilizes double bonds in the molecules of unsaturated fluorocarbon compounds that can be present in the refrigerant, and makes it less likely that the unsaturated fluorocarbon compounds will be oxidized, thus increasing the stability of the refrigerant composition. From the viewpoint od obtaining the above effect by containing water, the lower limit of the water content is about 0.001 mass %. For example, the water content can be adjusted in the range of 0.001 to 0.1 mass %, 0.001 to 0.075 mass %, and 0.001 to 0.025 mass %.

(1-3-2) Tracer

A tracer is added to the refrigerant composition according to the present disclosure at a detectable concentration such that when the refrigerant composition has been diluted, contaminated, or undergone other changes, the tracer can trace the changes.

The refrigerant composition according to the present disclosure may comprise a single tracer, or two or more tracers.

The tracer is not limited, and can be suitably selected from commonly used tracers.

Examples of tracers include hydrofluorocarbons, hydrochlorofluorocarbons, chlorofluorocarbons, hydrochlorocarbons, fluorocarbons, deuterated hydrocarbons, deuterated hydrofluorocarbons, perfluorocarbons, fluoroethers, brominated compounds, iodinated compounds, alcohols, aldehydes, ketones, and nitrous oxide (N2O). The tracer is preferably a hydrofluorocarbon, a hydrochlorofluorocarbon, a chlorofluorocarbon, a hydrochlorocarbon, a fluorocarbon, or a fluoroether.

The following compounds (hereinafter, also referred to as a tracer compound) are preferable as the tracer.

HCC-40 (chloromethane $CH_3Cl$)
HFC-41 (fluoromethane, $CH_3Cl$)
HFC-161 (fluoroethane, $CH_3CH_2F$)
HFC-245fa (1,1,1,3,3-pentafluoropropane, $CF_3CH_2CHF_2$)
HFC-236fa (1,1,1,3,3,3-hexafluoropropane, $CF_3CH_2CF_3$)
HFC-236ea (1,1,1,2,3,3-hexafluoropropane, $CF_3CHFCHF_2$)
HCFC-22 (chlorodifluoromethane, $CHClF_2$)

CFC-1113 (chlorotrifluoroethylene, $CF_2{=}CClF$)
HFE-125 (trifluoromethyl-difluoromethyl ether, $CF_3OCHF_2$)
HFE-134a (trifluoromethyl-fluoromethyl ether, $CF_3OCH_2F$)
HFE-143a (trifluromethyl-methyl ether, $CF_3OCH_3$)
HFE-227ea (trifluoromethyl-tetrafluoroethyl ether, $CF_3OCHFCF_3$)
HFE-236fa (trifluoromethyl-trifluoroethyl ether $CF_3OCH_2CF_3$)

The refrigerant composition according to the present disclosure may contain one or more tracers at a total concentration of about 10 parts per million by weight (ppm) to about 1000 ppm, based on the entire refrigerant composition. The refrigerant composition may preferably contain one or more tracers at a total concentration of about 30 ppm to about 500 ppm, more preferably about 50 ppm to about 300 ppm, more preferably about 75 ppm to about 250 ppm, and more preferably about 100 ppm to about 200 ppm, based on the entire refrigerant composition.

(1-3-3) Ultraviolet Fluorescent Dye

The refrigerant composition according to the present disclosure may comprise a single ultraviolet fluorescent dye, or two or more ultraviolet fluorescent dyes.

The ultraviolet fluorescent dye is not limited, and can be suitably selected from commonly used ultraviolet fluorescent dyes.

Examples of ultraviolet fluorescent dyes include naphthalimide, coumarin, anthracene, phenanthrene, xanthene, thioxanthene, naphthoxanthene, fluorescein, and derivatives thereof. The ultraviolet fluorescent dye is particularly preferably naphthalimide and coumarin.

The content ratio of the ultraviolet fluorescent dye is not particularly limited. The content ratio of the ultraviolet fluorescent dye is usually 0.01 to 5 mass %, more preferably 0.05 to 3 mass %, more preferably 0.1 to 2 mass %, and more preferably 0.5 to 1 mass %.

(1-3-4) Stabilizer

The refrigerant composition according to the present disclosure may comprise a single stabilizer, or two or more stabilizers.

The stabilizer is not limited, and can be suitably selected from commonly used stabilizers.

Examples of stabilizers include nitro compounds, ethers, and amines.

Examples of nitro compounds include aliphatic nitro compounds, such as nitromethane and nitroethane; and aromatic nitro compounds, such as nitro benzene and nitro styrene.

Examples of ethers include 1,4-dioxane.

Examples of amines include 2,2,3,3,3-pentafluoropropylamine and diphenylamine.

Examples of stabilizers also include butylhydroxyxylene and benzotriazole in addition to the above nitro compounds, ethers, and amines.

The content of the stabilizer is not limited. Generally, the content of the stabilizer is 0.01 to 5 mass %, more preferably 0.05 to 3 mass %, more preferably 0.1 to 2 mass %, more preferably 0.25 to 1.5 mass %, and more preferably 0.5 to 1 mass %, based on the entire refrigerant.

The method for evaluating the stability of the refrigerant composition of the present disclosure is not limited, and the stability can be evaluated by a generally used method. One example of such a method includes a method of evaluating according to ASHRAE Standard 97-2007 using the amount of free fluorine ions as an indicator. Another example includes a method of evaluating using a total acid number as an indicator. This method can be performed, for example, according to ASTM D 974-06.

(1-3-5) Polymerization Inhibitor

The refrigerant composition according to the present disclosure may comprise a single polymerization inhibitor, or two or more polymerization inhibitors.

The polymerization inhibitor is not limited, and can be suitably selected from commonly used polymerization inhibitors.

Examples of polymerization inhibitors include 4-methoxy-1-naphthol, hydroquinone, hydroquinone methyl ether, dimethyl-t-butylphenol, 2,6-di-tert-butyl-p-cresol, and benzotriazole.

The content of the above polymerization inhibitor is not limited and is usually 0.01 to 5% by mass, preferably 0.05 to 3% by mass, more preferably 0.1 to 2% by mass, further preferably 0.25 to 1.5% by mass, and particularly preferably 0.5 to 1a by mass based on the entire refrigerant.

(1-3-6) Other Components that can be Contained in Refrigerant Composition

In the refrigerant composition of the present disclosure, examples of a component that can be contained also include the following components.

For example, the refrigerant composition of the present disclosure can contain a fluorinated hydrocarbon which are different from the above-described refrigerant. The fluorinated hydrocarbon as another component is not limited, and examples thereof include at least one fluorinated hydrocarbon selected from the group consisting of HCFC-1122 and HCFC-124 and CFC-1113.

As the other components, the refrigerant composition of the present disclosure can contain at least one halogenated organic compound, for example, represented by formula (A): $C_mH_nX_p$ wherein X each independently represents a fluorine atom, a chlorine atom, or a bromine atom, m is 1 or 2, $2m+2 \geq n+p$, and $p \geq 1$. The above halogenated organic compound is not limited, and, for example, difluorochloromethane, chloromethane, 2-chloro-1,1,1,2,2-pentafluoroethane, 2-chloro-1,1,1,2-tetrafluoroethane, 2-chloro-1,1-difluoroethylene, and trifluoroethylene are preferred.

As the other component, the refrigerant composition of the present disclosure can contain at least one organic compound, for example, represented by formula (B): $C_mH_nX_p$ wherein X each independently represent an atom that is not a halogen atom, m is 1 or 2, $2m+2 \geq n+p$, and $p \geq 1$. The above organic compound is not limited, and, for example, propane and isobutane are preferred.

The content of the fluorinated hydrocarbon, halogenated organic compound represented by the above formula (A), and organic compound represented by the above formula (B) is not limited, but the total amount of these is preferably 0.5% by mass or less, more preferably 0.3% by mass or less, and particularly preferably 0.1% by mass or less based on the total amount of the refrigerant composition.

(1-4) Refrigerator Oil-Containing Working Fluid

The refrigerator oil-containing working fluid of the present disclosure comprises at least the refrigerant or refrigerant composition of the present disclosure and a refrigerator oil and is used as a working fluid in a refrigeration apparatus. Specifically, the refrigerator oil-containing working fluid of the present disclosure is obtained by the mixing of a refrigerator oil used in the compressor of a refrigeration apparatus and the refrigerant or the refrigerant composition with each other.

The content of the above refrigerator oil is not limited and is usually 10 to 50% by mass, preferably 12.5 to 45% by mass, more preferably 15 to 40% by mass, further preferably 17.5 to 35% by mass, and particularly preferably 20 to 30% by mass based on the entire refrigerator oil-containing working fluid.

(1-4-1) Refrigeration Oil

The composition according to the present disclosure may comprise a single refrigeration oil, or two or more refrigeration oils.

The refrigeration oil is not limited, and can be suitably selected from commonly used refrigeration oils. In this case, refrigeration oils that are superior in the action of increasing the miscibility with the mixture and the stability of the mixture, for example, are suitably selected as necessary.

The base oil of the refrigeration oil is preferably, for example, at least one member selected from the group consisting of polyalkylene glycols (PAG), polyol esters (POE), and polyvinyl ethers (PVE).

The refrigeration oil may further contain additives in addition to the base oil. The additive may be at least one member selected from the group consisting of antioxidants, extreme-pressure agents, acid scavengers, oxygen scavengers, copper deactivators, rust inhibitors, oil agents, and antifoaming agents.

A refrigeration oil with a kinematic viscosity of 5 to 400 cSt at 40° C. is preferable from the standpoint of lubrication.

The refrigeration oil-containing working fluid according to the present disclosure may further optionally contain at least one additive. Examples of additives include compatibilizing agents described below.

(1-4-2) Compatibilizing Agent

The refrigeration oil-containing working fluid according to the present disclosure may comprise a single compatibilizing agent, or two or more compatibilizing agents.

The compatibilizing agent is not limited, and can be suitably selected from commonly used compatibilizing agents.

Examples of compatibilizing agents include polyoxyalkylene glycol ethers, amides, nitriles, ketones, chlorocarbons, esters, lactones, aryl ethers, fluoroethers, and 1,1,1-trifluoroalkanes. The compatibilizing agent is particularly preferably a polyoxyalkylene glycol ether.

(1-5) Refrigerant 11 and Refrigerant 12

The refrigerant composition according to the present disclosure comprises at least the refrigerant. The refrigerant 11, 12 can be used as a refrigerant. Hereinafter, the refrigerant 11 and the refrigerant 12 will be described respectively.

(1-5-1) Refrigerant 11

The refrigerant contained in the composition of the present disclosure contains HFO-1132(Z) and HFO-1234yf in one embodiment. This refrigerant may be sometimes referred to as "refrigerant 11".

In refrigerant 11, the content of HFO-1132(Z) is 53.0 to 59.5% by mass, and the content of HFO-1234yf is 47.0 to 40.5% by mass, based on the total mass of HFO-1132(Z) and HFO-1234yf.

Refrigerant 11 has such a configuration and thus refrigerant 11 has the following desired properties as an R134a alternative refrigerant: (1) having a sufficiently small GWP (100 or less), (2) having a COP equivalent to or more than that of R134a, (3) having a refrigerating capacity equivalent to or more than that of R134a, and (4) having a lower flammability (Class 2L) in the ASHRAE standard.

In the present items, the phrase "having a sufficiently small GWP" means to have a GWP of usually 100 or less, preferably 75 or less, more preferably 50 or less, and further preferably 25 or less.

When the content of HFO-1132(Z) based on the total mass of HFO-1132(Z) and HFO-1234yf is more than 59.5%, by mass in refrigerant 11, a problem arises in that refrigerant 11 becomes weakly flammable.

Refrigerant 11 has a refrigerating capacity of usually 95% or more, preferably 98% or more, more preferably 99% or more, further preferably 100% or more, and particularly preferably 100.5% or more with respect to R134a, from the viewpoint of enabling reduction of power consumption during operation in comparison with a commercial R134a refrigeration apparatus.

Refrigerant 11 has a GWP of 100 or less and thus can significantly suppress the environmental load compared with other general-purpose refrigerants from the viewpoint of global warming.

Refrigerant 11 has a ratio between the power consumed in a refrigeration cycle and refrigerating capacity (coefficient of performance (COP)) of 100% or more with respect to R134a, and therefore refrigerant 11 can be applied to a commercial R134a refrigeration apparatus without a large design change.

Preferably, refrigerant 11 has a higher ratio between power consumed in a refrigeration cycle and refrigerating capacity (coefficient of performance (COP)) with respect to R134a in terms of energy consumption efficiency. Specifically, the COP with respect to R134a is preferably 98% or more, more preferably 99% or more, further preferably 100% or more, and particularly preferably 101% or more.

In refrigerant 11, it is preferred that the content of HFO-1132(Z) be 53.0 to 59.0% by mass, and the content of HFO-1234yf be 47.0 to 41.0% by mass, based on the total mass of HFO-1132(Z) and HFO-1234yf.

In refrigerant 11, it is more preferred that the content of HFO-1132(Z) be 54.0 to 59.0% by mass, and the content of HFO-1234yf be 46.0 to 41.0% by mass, based on the total mass of HFO-1132(Z) and HFO-1234yf.

In refrigerant 11, it is further preferred that the content of HFO-1132(Z) be 55.0 to 59.0% by mass, and the content of HFO-1234yf be 45.0 to 41.0% by mass, based on the total mass of HFO-1132(Z) and HFO-1234yf.

In refrigerant 11, it is particularly preferred that the content of HFO-1132(Z) be 56.0 to 59.0% by mass, and the content of HFO-1234yf be 44.0 to 41.0% by mass, based on the total mass of HFO-1132(Z) and HFO-1234yf.

Refrigerant 11 may usually contain 99.5% by mass or more of HFO-1132(Z) and HFO-1234yf in terms of the sum of the concentrations of these. In the present disclosure, the total amount of HFO-1132(Z) and HFO-1234yf in the entire refrigerant 11 is preferably 99.7% by mass or more, more preferably 99.8% by mass or more, and further preferably 99.9% by mass or more.

Refrigerant 11 can further contain other refrigerants in addition to HFO-1132(Z) and HFO-1234yf within a range in which other refrigerants do not impair the above properties. In this case, the content of other refrigerants in the entire refrigerant 11 is preferably 0.5% by mass or less, more preferably 0.3% by mass or less, further preferably 0.2% by mass or less, and particularly preferably 0.1% by mass or less. Other refrigerants are not limited and can be widely selected from known refrigerants which are widely used in this field. Refrigerant 11 may comprise one other refrigerant alone or may comprise two or more other refrigerants.

In the present disclosure, refrigerant 11 is preferably used for operating a refrigeration cycle in which the evaporating temperature is −60 to 20° C., from the viewpoint of sufficiently cooling the interior of a room, and an object to be cooled.

In the refrigeration cycle in which refrigerant 11 is used, the evaporating temperature is more preferably 15° C. or lower, even more preferably 10° C. or lower, further preferably 5° C. or lower, and particularly preferably lower than 0° C. from the viewpoint of sufficiently cooling the interior of a room, and an object to be cooled.

In the refrigeration cycle in which refrigerant 11 is used, the evaporating temperature is preferably −55° C. or higher, more preferably −50° C. or higher, further preferably −45° C. or higher, and particularly preferably −40° C. or higher from the viewpoint of setting the evaporating pressure to 0.02 MPa or higher.

In the refrigeration cycle in which refrigerant 11 is used, the evaporating temperature is more preferably −55° C. or higher and 15° C. or lower, even more preferably −50° C. or higher and 10° C. or lower, further preferably −45° C. or higher and 5° C. or lower, and particularly preferably −40° C. or higher and lower than 0° C.

It is particularly preferred that refrigerant 11 consist of HFO-1132(Z) and HFO-1234yf. In other words, it is particularly preferred for refrigerant 11 that the total concentration of HFO-1132(Z) and HFO-1234yf in the entire refrigerant 11 be 100% by mass.

When refrigerant 11 consists of HFO-1132(Z) and HFO-1234yf, it is preferred that the content of HFO-1132(Z) be 53.0 to 59.5% by mass, and the content of HFO-1234yf be 47.0 to 40.5% by mass, based on the total mass of HFO-1132(Z) and HFO-1234yf.

When refrigerant 11 consists of HFO-1132(Z) and HFO-1234yf, it is even more preferred that the content of HFO-1132(Z) be 54.0 to 59.0% by mass, and the content of HFO-1234yf be 46.0 to 41.0% by mass, based on the total mass of HFO-1132(Z) and HFO-1234yf.

When refrigerant 11 consists of HFO-1132(Z) and HFO-1234yf, it is further preferred that the content of HFO-1132 (Z) be 55.0 to 59.0% by mass, and the content of HFO-1234yf be 45.0 to 41.0% by mass, based on the total mass of HFO-1132(Z) and HFO-1234yf.

When refrigerant 11 consists of HFO-1132(Z) and HFO-1234yf, it is particularly preferred that the content of HFO-1132(Z) be 56.0 to 59.0% by mass, and the content of HFO-1234yf be 44.0 to 41.0% by mass, based on the total mass of HFO-1132(Z) and HFO-1234yf.

When refrigerant 11 consists of HFO-1132(Z) and HFO-1234yf, it is preferred that the content of HFO-1132(Z) be 53.0 to 59.5% by mass, and the content of HFO-1234yf be 47.0 to 40.5% by mass, based on the total mass of HFO-1132(Z) and HFO-1234yf, and refrigerant 11 be used for operating a refrigeration cycle in which the evaporating temperature is −55° C. to 15° C.

When refrigerant 11 consists of HFO-1132(Z) and HFO-1234yf, it is more preferred that the content of HFO-1132(Z) be 54.0 to 59.0% by mass, and the content of HFO-1234yf be 46.0 to 41.0% by mass, based on the total mass of HFO-1132(Z) and HFO-1234yf, and refrigerant 11 be used for operating a refrigeration cycle in which the evaporating temperature is −50° C. to 10° C.

When refrigerant 11 consists of HFO-1132(Z) and HFO-1234yf, it is further preferred that the content of HFO-1132 (Z) be 55.0 to 59.0% by mass, and the content of HFO-1234yf be 45.0 to 41.0% by mass, based on the total mass of HFO-1132(Z) and HFO-1234yf, and refrigerant 11 be used for operating a refrigeration cycle in which the evaporating temperature is −45° C. to 5° C.

When refrigerant 11 consists of HFO-1132(Z) and HFO-1234yf, it is particularly preferred that the content of HFO-1132(Z) be 56.0 to 59.0% by mass, and the content of HFO-1234yf be 44.0 to 41.0% by mass, based on the total mass of HFO-1132(Z) and HFO-1234yf, and refrigerant 11 be used for operating a refrigeration cycle in which the evaporating temperature is −40° C. or higher and less than 0° C.

(1-5-2) Refrigerant 12

In one embodiment, the refrigerant contained in the composition of the present disclosure contains HFO-1132 (Z) and HFO-1234yf, and the content of HFO-1132(Z) is 41.0 to 49.2% by mass, and the content of HFO-1234yf is 59.0 to 50.8% by mass, based on the total mass of HFO-1132(Z) and HFO-1234yf. This refrigerant is sometimes referred to as the "refrigerant 12".

Refrigerant 12 has such a configuration and thus has the following desired properties as an R134a alternative refrigerant: (1) having a sufficiently small GWP (100 or less), (2) having a COP equivalent to or more than that of R134a, (3) having a refrigerating capacity equivalent to or more than that of R134a, and (4) having a lower flammability (Class 2L) in the ASHRAE standard.

In the present items, the phrase "having a sufficiently small GWP" means to have a GWP of usually 100 or less, preferably 75 or less, more preferably 50 or less, and further preferably 25 or less.

Refrigerant 12 has a GWP of 100 or less and thus can significantly suppress the environmental load compared with other general-purpose refrigerants from the viewpoint of global warming.

Refrigerant 12 has a refrigerating capacity of usually 95% or more, preferably 98% or more, more preferably 99% or more, further preferably 100% or more, and particularly preferably 101% or more with respect to R134a, from the viewpoint of enabling reduction of power consumption during operation in comparison a commercial R134a refrigeration apparatus.

Refrigerant 12 has a ratio between power consumed in a refrigeration cycle and refrigerating capacity (coefficient of performance (COP)) of 100% or more with respect to R134a, and therefore refrigerant 12 can be applied to a commercial R134a refrigeration apparatus without a large design change.

Preferably, refrigerant 12 has a higher ratio between power consumed in a refrigeration cycle and refrigerating capacity (coefficient of performance (COP)) with respect to R134a in terms of energy consumption efficiency. Specifically, the COP with respect to R134a is preferably 98% or more, more preferably 99% or more, further preferably 100% or more, and particularly preferably 101% or more.

In refrigerant 12, it is preferred that the content of HFO-1132(Z) be 42.0 to 49.2% by mass, and the content of HFO-1234yf be 58.0 to 50.8% by mass, based on the total mass of HFO-1132(Z) and HFO-1234yf.

In refrigerant 12, it is more preferred that the content of HFO-1132(Z) be 43.0 to 49.2% by mass, and the content of HFO-1234yf be 57.0 to 50.8% by mass, based on the total mass of HFO-1132(Z) and HFO-1234yf.

In refrigerant 12, it is further preferred that the content of HFO-1132(Z) be 44.0 to 49.0% by mass, and the content of HFO-1234yf be 56.0 to 51.0% by mass, based on the total mass of HFO-1132(Z) and HFO-1234yf.

Refrigerant 12 may usually contain 99.5% by mass or more of HFO-1132(Z) and HFO-1234yf in terms of the sum of the concentrations of these. In the present disclosure, the total amount of HFO-1132(Z) and HFO-1234yf in the entire refrigerant 12 is preferably 99.7% by mass or more, more preferably 99.8% by mass or more, and further preferably 99.9% by mass or more.

Refrigerant 12 can further contain other refrigerants in addition to HFO-1132(Z) and HFO-1234yf within a range in which other refrigerants do not impair the above properties. In this case, the content of other refrigerants in the entire refrigerant 12 is preferably 0.5% by mass or less, more preferably 0.3% by mass or less, further preferably 0.2% by mass or less, and particularly preferably 0.1% by mass or less. Other refrigerants are not limited and can be widely selected from known refrigerants which are widely used in this field. Refrigerant 12 may comprise one other refrigerant alone or may comprise two or more other refrigerants.

In the present disclosure, refrigerant 12 is preferably used for operating a refrigeration cycle in which the evaporating temperature is −60 to 20° C., from the viewpoint of sufficiently cooling the interior of a room, and an object to be cooled.

In the refrigeration cycle in which refrigerant 12 is used, the evaporating temperature is more preferably 15° C. or lower, even more preferably 10° C. or lower, further preferably 5° C. or lower, and particularly preferably lower than 0° C. from the viewpoint of sufficiently cooling the interior of a room, and an object to be cooled.

In the refrigeration cycle in which refrigerant 12 is used, the evaporating temperature is preferably −55° C. or higher, more preferably −50° C. or higher, further preferably −45° C. or higher, and particularly preferably −40° C. or higher from the viewpoint of setting the evaporating pressure to 0.02 MPa or higher.

In the refrigeration cycle in which refrigerant 12 is used, the evaporating temperature is more preferably −55° C. or higher and 15° C. or lower, even more preferably −50° C. or higher and 10° C. or lower, further preferably −45° C. or higher and 5° C. or lower, and particularly preferably −40° C. or higher and lower than 0° C.

It is particularly preferred that refrigerant 12 consist of HFO-1132(Z) and HFO-1234yf. In other words, it is particularly preferred for refrigerant 12 that the total concentration of HFO-1132(Z) and HFO-1234yf in the entire refrigerant 12 be 100% by mass.

When refrigerant 12 consists of HFO-1132(Z) and HFO-1234yf, it is preferred that the content of HFO-1132(Z) be 41.0 to 49.2% by mass, and the content of HFO-1234yf be 59.0 to 50.8% by mass, based on the total mass of HFO-1132(Z) and HFO-1234yf.

When refrigerant 12 consists of HFO-1132(Z) and HFO-1234yf, it is more preferred that the content of HFO-1132(Z) is 42.0 to 49.2% by mass, and the content of HFO-1234yf is 58.0 to 50.8% by mass, based on the total mass of HFO-1132(Z) and HFO-1234yf.

When refrigerant 12 consists of HFO-1132(Z) and HFO-1234yf, it is further preferred that the content of HFO-1132 (Z) be 43.0 to 49.2% by mass, and the content of HFO-1234yf be 57.0 to 50.8% by mass, based on the total mass of HFO-1132(Z) and HFO-1234yf.

When refrigerant 12 consists of HFO-1132(Z) and HFO-1234yf, it is particularly preferred that the content of HFO-1132(Z) be 44.0 to 49.0% by mass, and the content of HFO-1234yf be 56.0 to 51.0% by mass, based on the total mass of HFO-1132(Z) and HFO-1234yf.

When refrigerant 12 consists of HFO-1132(Z) and HFO-1234yf, it is preferred that the content of HFO-1132(Z) be 41.0 to 49.2% by mass, and the content of HFO-1234yf be 59.0 to 50.8% by mass, based on the total mass of HFO-1132(Z) and HFO-1234yf, and refrigerant 12 is used for operating a refrigeration cycle in which the evaporating temperature is −55° C. to 15° C.

When refrigerant 12 consists of HFO-1132(Z) and HFO-1234yf, it is more preferred that the content of HFO-1132(Z) be 42.0 to 49.2% by mass, and the content of HFO-1234yf be 58.0 to 50.8% by mass, based on the total mass of HFO-1132(Z) and HFO-1234yf, and refrigerant 12 be used for operating a refrigeration cycle in which the evaporating temperature is −50° C. to 10° C.

When refrigerant 12 consists of HFO-1132(Z) and HFO-1234yf, it is further preferred that the content of HFO-1132 (Z) is 43.0 to 49.2% by mass, and the content of HFO-1234yf is 57.0 to 50.8% by mass, based on the total mass of HFO-1132(Z) and HFO-1234yf, and refrigerant 12 be used for operating a refrigeration cycle in which the evaporating temperature is −45° C. to 5° C.

When refrigerant 12 consists of HFO-1132(Z) and HFO-1234yf, it is particularly preferred that the content of HFO-1132(Z) be 44.0 to 49.0% by mass, and the content of HFO-1234yf be 56.0 to 51.0% by mass, based on the total mass of HFO-1132(Z) and HFO-1234yf, and refrigerant 12 be used for operating a refrigeration cycle in which the evaporating temperature is −40° C. or higher and less than 0° C.

(1-5-3) Applications

The composition containing a refrigerant according to the present disclosure can be widely used as a working fluid in existing applications of a refrigerant in 1) a refrigeration method comprising the step of operating a refrigeration cycle, 2) a method for operating a refrigeration apparatus operating a refrigeration cycle, and the like.

Here, the above-mentioned refrigeration cycle means circulating a refrigerant (refrigerant 11 and refrigerant 12 of the present disclosure) via a compressor through the interior of a refrigeration apparatus in a state of only the refrigerant or in a state of a refrigerant composition or a refrigerator oil-containing working fluid described below to convert energy.

The present disclosure also encompasses the use of the refrigerants (or compositions comprising them) of the present disclosure in a refrigeration method, the use of the refrigerants (or compositions comprising them) of the present disclosure in a method for operating a refrigeration apparatus or the like, and further refrigeration apparatuses having the refrigerants (or compositions comprising them) of the present disclosure, and the like.

The composition containing refrigerant 11 according to the present disclosure is preferably used for operating a refrigeration cycle in which the evaporating temperature is −60 to 20° C., from the viewpoint of sufficiently cooling the interior of a room, and an object to be cooled. In addition, by using the composition containing refrigerant 11 according to the present disclosure for operating the refrigeration cycle in which the evaporating temperature is −60 to 20° C., the COP during operation increases in comparison with a commercial R134a refrigeration apparatus, and therefore the power consumption can be reduced.

In the refrigeration cycle in which the composition containing refrigerant 11 is used, the evaporating temperature is more preferably 15° C. or lower, even more preferably 10° C. or lower, further preferably 5° C. or lower, and particularly preferably lower than 0° C. from the viewpoint of sufficiently cooling the interior of a room, and an object to be cooled.

In the refrigeration cycle in which the composition containing refrigerant 11 is used, the evaporating temperature is preferably −55° C. or higher, more preferably −50° C. or higher, further preferably −45° C. or higher, and particularly preferably −40° C. or higher from the viewpoint of setting the evaporating pressure to 0.02 MPa or higher.

In the refrigeration cycle in which the composition containing refrigerant 11 is used, the evaporating temperature is more preferably −55° C. or higher and 15° C. or lower, even more preferably −50° C. or higher and 10° C. or lower, further preferably −45° C. or higher and 5° C. or lower, and particularly preferably −40° C. or higher and lower than 0° C.

The composition containing refrigerant 11 is preferably used for operating a refrigeration cycle in which the condensation temperature is 0 to 70° C.

In the refrigeration cycle in which the composition containing refrigerant 11 is used, the condensation temperature is preferably 70° C. or lower, more preferably 60° C. or lower, further preferably 55° C. or lower, and particularly preferably 50° C. or lower from the viewpoint of extending the life of a refrigeration apparatus.

In the refrigeration cycle in which the composition containing refrigerant 11 is used, the condensation temperature is preferably 0° C. or higher, more preferably 5° C. or higher, further preferably 10° C. or higher, and particularly preferably 15° C. or higher from the viewpoint of preventing dew condensation on an outdoor unit.

The present disclosure can provide an apparatus constituting a refrigeration cycle in which the composition containing refrigerant 11 is circulated via a compressor.

The composition containing refrigerant 12 is preferably used for operating a refrigeration cycle in which the evaporating temperature is −60 to 20° C., from the viewpoint of sufficiently cooling the interior of a room, and an object to be cooled.

In the refrigeration cycle in which the composition containing refrigerant 12 is used, the evaporating temperature is more preferably 15° C. or lower, even more preferably 10° C. or lower, further preferably 5° C. or lower, and particularly preferably lower than 0° C. from the viewpoint of sufficiently cooling the interior of a room, and an object to be cooled.

In the refrigeration cycle in which the composition containing refrigerant 12 is used, the evaporating temperature is preferably −55° C. or higher, more preferably −50° C. or higher, further preferably −45° C. or higher, and particularly preferably −40° C. or higher from the viewpoint of setting the evaporating pressure to 0.02 MPa or higher.

In the refrigeration cycle in which the composition containing refrigerant 12 is used, the evaporating temperature is more preferably −55° C. or higher and 15° C. or lower, even more preferably −50° C. or higher and 10° C. or lower, further preferably −45° C. or higher and 5° C. or lower, and particularly preferably −40° C. or higher and lower than 0° C.

The composition containing refrigerant 12 is preferably used for operating a refrigeration cycle in which the condensation temperature is 0 to 70° C.

In the refrigeration cycle in which the composition containing refrigerant 12 is used, the condensation temperature is preferably 70° C. or lower, more preferably 60° C. or lower, further preferably 55° C. or lower, and particularly preferably 50° C. or lower from the viewpoint of extending the life of a refrigeration apparatus.

In the refrigeration cycle in which the composition containing refrigerant 12 is used, the condensation temperature is preferably 0° C. or higher, more preferably 5° C. or higher, further preferably 10° C. or higher, and particularly preferably 15° C. or higher from the viewpoint of preventing dew condensation on an outdoor unit.

The present disclosure can provide an apparatus constituting a refrigeration cycle in which the composition containing refrigerant 12 is circulated via a compressor.

Preferred examples of the refrigeration apparatus to which refrigerant 11 and refrigerant 12 (or compositions comprising them) of the present disclosure can be applied include at least one selected from the group consisting of air conditioning equipment, a cold storage chamber, a refrigeration chamber, a water cooler, an ice maker, a cold storage showcase, a refrigeration showcase, a refrigeration and cold storage unit, a refrigerator for a refrigeration and cold storage warehouse, in-car air conditioning equipment, a turbo refrigerator, and a screw refrigerator.

The composition of the present disclosure is suitable for use as an alternative refrigerant to R134a, R22, R12, R404A, R407A, R407C, R407F, R407H, R410A, R413A, R417A, R422A, R422B, R422C, R422D, R423A, R424A, R426A, R427A, R428A, R430A, R434A, R437A, R438A, R448A, R449A, R449B, R450A, R454A, R454C, R455A, R465A, R502, R507, R513A, R513B, R515A, or R515B. Among these, the composition of the present disclosure is particularly suitable for use as an alternative refrigerant to R134a because the composition of the present disclosure has the properties of having a coefficient of performance (COP) and a Capacity equivalent to or higher than those of R134a and having a sufficiently small GWP.

EXAMPLES

The present disclosure will be described in more detail below by giving Examples of the refrigerant 11 and the refrigerant 12. However, the present disclosure is not limited to these Examples.

Test Example 1-1

The GWPs of the mixed refrigerants shown in Examples 1-1 to 1-3, Comparative Examples 1-1 to 1-6, and Reference Example 1-1 (R134a) were evaluated based on the values stated in the IPCC Fourth Report.

The COPs, refrigerating capacities, discharge temperatures, saturation pressures at a saturation temperature of 40° C., condensation pressures, and evaporating pressures of these mixed refrigerants were obtained by carrying out the theoretical refrigeration cycle calculations for the mixed refrigerants under the following conditions using National Institute of Science and Technology (NIST) Reference Fluid Thermodynamic and Transport Properties Database (Refprop 9.0).

| <Air Conditioning Conditions> | |
|---|---|
| Evaporating temperature | 10° C. |
| Condensation temperature | 40° C. |
| Superheating temperature | 20 K |
| Subcooling temperature | 0 K |
| Compressor efficiency | 70% |

The term "Evaporating temperature 10° C." means that the evaporating temperature of each mixed refrigerant in an evaporator provided in a refrigeration apparatus is 10° C. The term "Condensation temperature 40° C." means that the condensation temperature of each mixed refrigerant in a condenser provided in a refrigeration apparatus is 40° C.

The results of Test Example 1-1 are shown in Table 1. Table 1 shows Examples and Comparative Examples of refrigerant 11 of the present disclosure. In Table 1, "COP ratio" and "Refrigerating capacity ratio" represent proportions (%) with respect to R134a. In Table 1, the term "Saturation pressure (40° C.)" represents saturation pressure at a saturation temperature of 40° C. In Table 1, the term "Discharge temperature (° C.)" represents the highest temperature during the refrigeration cycle in the above theoretical refrigeration cycle calculations of the mixed refrigerants.

The coefficient of performance (COP) was obtained by the following formula.

COP=(refrigerating capacity or heating capacity)/power consumption

The compression ratio was obtained by the following formula.

Compression ratio=condensation pressure (Mpa)/evaporating pressure (Mpa)

The flammability of each mixed refrigerant was determined by considering the mixing composition of the mixed refrigerant as the WCF concentration and measuring the combustion rate according to the ANSI/ASHRAE 34-2013 standard. The flammability of R134a was determined by considering the composition of R134a as the WCF concentration and measuring the combustion rate according to the ANSI/ASHRAE 34-2013 standard.

A mixed refrigerant having a combustion rate of 0 cm/s to 10 cm/s was considered to be "Class 2L (slightly flammable)", and a mixed refrigerant having a combustion rate of more than 10 cm/s was considered to be "Class 2 (weakly flammable)". For R134a, no flame propagation occurred, and therefore R134a was considered to be "Class 1 (nonflammable)". In Table 1, "ASHRAE flammability classification" represents a result based on these determination criteria.

The combustion rate test was performed as follows. First, the mixed refrigerant used had a purity of 99.5% or more and was degassed by repeating the cycle of freezing, pumping, and thawing until no trace of air was observed on a vacuum gauge. The combustion rate was measured by a closed method. The initial temperature was ambient temperature. The ignition was performed by producing an electric spark between the electrodes at the center of a sample cell. The duration of the discharge was 1.0 to 9.9 ms, and the ignition energy was typically about 0.1 to 1.0 J. The spread of the flame was visualized using a schlieren photograph. A cylindrical container (inner diameter: 155 mm, length: 198 mm) equipped with two acrylic windows that transmitted light was used as the sample cell, and as the light source, a xenon lamp was used. A schlieren image of the flame was recorded at a framing rate of 600 fps by a high speed digital video camera and stored in a PC.

The flammable range of each mixed refrigerant was measured using a measuring apparatus based on ASTM E681-09 (see FIG. 1).

Specifically, a spherical glass flask having an internal volume of 12 L was used so that the state of combustion could be visually observed and video-recorded, and the glass flask was adapted so that gas could be released from the upper lid when excessive pressure was generated by combustion. For the ignition method, a spark was generated by discharge from electrodes held at a height of ⅓ from the bottom.

<Test Conditions>

Test container: 280 mm ϕ spherical shape (internal volume: 12 L)

Test temperature: 60° C.±3° C.

Pressure: 101.3 kPa±0.7 kPa

Water: 0.0088 g±0.0005 g per g of dry air (the amount of water at a relative humidity of 50% at 23° C.) Refrigerant composition/air mixing ratio: 1 vol. % increments±0.2 vol. %

Refrigerant composition mixture: ±0.1% by mass

Ignition method: alternating current discharge, voltage 15 kV, current 30 mA, neon transformer Electrode spacing: 6.4 mm (¼ inch)

Spark: 0.4 s±0.05 s

Determination criteria:

When the flame extended at an angle of 900 or more from the ignition point, it was evaluated as having flame propagation (flammable)

When the flame extended at an angle of 900 or less from the ignition point, it was evaluated as having no flame propagation (nonflammable)

TABLE 1

| Item | | Unit | Reference Example 1-1 (R134a) | Comparative Example 1-1 | Comparative Example 1-2 | Comparative Example 1-3 | Example 1-1 |
|---|---|---|---|---|---|---|---|
| Composition ratio | HFO-1132(Z) | % by mass | 0 | 30.0 | 40.0 | 51.0 | 53.0 |
| | HFO-1234yf | % by mass | 0 | 70.0 | 60.0 | 49.0 | 47.0 |
| | HFC-134a | % by mass | 100 | 0 | 0 | 0 | 0 |
| GWP(AR4) | | — | 1430 | 6 | 6 | 7 | 7 |
| Discharge temperature | | ° C. | 70.7 | 70.7 | 73.4 | 76.3 | 76.9 |
| Saturation pressure (40° C.) | | MPa | 1.017 | 1.004 | 0.998 | 0.991 | 0.990 |
| Evaporating pressure | | MPa | 0.415 | 0.427 | 0.422 | 0.418 | 0.417 |
| Compression ratio | | — | 2.5 | 2.4 | 2.4 | 2.4 | 2.4 |
| COP ratio (to R134a) | | % | 100.0 | 100.0 | 100.2 | 100.3 | 100.4 |

TABLE 1-continued

| | | | | | | |
|---|---|---|---|---|---|---|
| Refrigerating capacity ratio (to R134a) | % | 100.0 | 98.0 | 98.1 | 98.3 | 98.3 |
| ASHRAE flammability classification | — | Class 1 | Class 2L | Class 2L | Class 2L | Class 2L |

| Item | | Example 1-2 | Example 1-3 | Comparative Example 1-4 | Comparative Example 1-5 | Comparative Example 1-6 |
|---|---|---|---|---|---|---|
| Composition ratio | HFO-1132(Z) | 56.0 | 59.0 | 60.0 | 70.0 | 100 |
| | HFO-1234yf | 44.0 | 41.0 | 40.0 | 30.0 | 0 |
| | HFC-134a | 0 | 0 | 0 | 0 | 0 |
| GWP(AR4) | | 7 | 8 | 8 | 8 | 10 |
| Discharge temperature | | 77.7 | 78.5 | 78.8 | 81.6 | 90.3 |
| Saturation pressure (40° C.) | | 0.988 | 0.987 | 0.986 | 0.981 | 0.968 |
| Evaporating pressure | | 0.416 | 0.415 | 0.415 | 0.411 | 0.402 |
| Compression ratio | | 2.4 | 2.4 | 2.4 | 2.4 | 2.4 |
| COP ratio (to R134a) | | 100.4 | 100.4 | 100.4 | 100.5 | 100.4 |
| Refrigerating capacity ratio (to R134a) | | 98.3 | 98.3 | 98.3 | 98.4 | 98.5 |
| ASHRAE flammability classification | | Class 2L | Class 2L | Class 2 | Class 2 | Class 2 |

Test Example 1-2

The GWPs of the mixed refrigerants shown in Examples 1-4 to 1-6, Comparative Examples 1-7 to 1-12, and Reference Example 1-2 (R134a) were evaluated based on the values stated in the IPCC Fourth Report.

The COPs, refrigerating capacities, discharge temperatures, saturation pressures at a saturation temperature of 45° C., condensation pressures, and evaporating pressures of these mixed refrigerants were obtained by carrying out the theoretical refrigeration cycle calculations for the mixed refrigerants under the following conditions using NIST Refprop 9.0.

| <Air Conditioning Conditions> | |
|---|---|
| Evaporating temperature | 5° C. |
| Condensation temperature | 45° C. |
| Superheating temperature | 5 K |
| Subcooling temperature | 5 K |
| Compressor efficiency | 70% |

The meanings of the above terms are the same as in Test Example 1-1.

The results of Test Example 1-2 are shown in Table 2. Table 2 shows Examples and Comparative Examples of refrigerant 11 of the present disclosure. In Table 2, the meanings of the terms are the same as in Test Example 1-1.

The coefficient of performance (COP) and the compression ratio were obtained in the same manner as in Test Example 1-1.

The flammability of each mixed refrigerant was determined in the same manner as in Test Example 1-1. The combustion rate test was performed in the same manner as in Test Example 1-1.

The flammable range of each mixed refrigerant was measured with the same method and test conditions as in Test Example 1-1 using a measuring apparatus based on ASTM E681-09 (see FIG. 1).

TABLE 2

| Item | | Unit | Reference Example 1-2 (R134a) | Comparative Example 1-7 | Comparative Example 1-8 | Comparative Example 1-9 | Example 1-4 |
|---|---|---|---|---|---|---|---|
| Composition ratio | HFO-1132(Z) | % by mass | 0 | 30.0 | 40.0 | 51.0 | 53.0 |
| | HFO-1234yf | % by mass | 0 | 70.0 | 60.0 | 49.0 | 47.0 |
| | HFC-134a | % by mass | 100 | 0 | 0 | 0 | 0 |
| GWP(AR4) | | — | 1430 | 6 | 6 | 7 | 7 |
| Discharge temperature | | ° C. | 63.8 | 63.9 | 67.3 | 71.2 | 71.9 |
| Saturation pressure (45° C.) | | MPa | 1.160 | 1.139 | 1.133 | 1.126 | 1.125 |
| Evaporating pressure | | MPa | 0.350 | 0.363 | 0.359 | 0.355 | 0.354 |
| Compression ratio | | — | 3.3 | 3.1 | 3.2 | 3.2 | 3.2 |
| COP ratio (to R134a) | | % | 100.0 | 100.0 | 100.7 | 101.4 | 101.5 |
| Refrigerating capacity ratio (to R134a) | | % | 100.0 | 98.8 | 99.7 | 100.5 | 100.6 |
| ASHRAE flammability classification | | — | Class 1 | Class 2L | Class 2L | Class 2L | Class 2L |

| Item | | Example 1-5 | Example 1-6 | Comparative Example 1-10 | Comparative Example 1-11 | Comparative Example 1-12 |
|---|---|---|---|---|---|---|
| Composition ratio | HFO-1132(Z) | 56.0 | 59.0 | 60.0 | 70.0 | 100 |
| | HFO-1234yf | 44.0 | 41.0 | 40.0 | 30.0 | 0 |
| | HFC-134a | 0 | 0 | 0 | 0 | 0 |
| GWP(AR4) | | 7 | 8 | 8 | 8 | 10 |
| Discharge temperature | | 72.9 | 74.0 | 74.4 | 78.0 | 89.4 |
| Saturation pressure (45° C.) | | 1.123 | 1.121 | 1.121 | 1.115 | 1.101 |
| Evaporating pressure | | 0.363 | 0.352 | 0.362 | 0.349 | 0.340 |
| Compression ratio | | 3.2 | 3.2 | 3.2 | 3.2 | 3.2 |
| COP ratio (to R134a) | | 101.6 | 101.8 | 101.8 | 102.2 | 102.7 |
| Refrigerating capacity ratio (to R134a) | | 100.8 | 101.0 | 101.1 | 101.6 | 102.8 |
| ASHRAE flammability classification | | Class 2L | Class 2L | Class 2 | Class 2 | Class 2 |

Test Example 1-3

The GWPs of the mixed refrigerants shown in Examples 1-7 to 1-9, Comparative Examples 1-13 to 1-18, and Reference Example 1-3 (R134a) were evaluated based on the values in the IPCC Fourth Report.

The COPs, refrigerating capacities, discharge temperatures, saturation pressures at a saturation temperature of 40° C., condensation pressures, and evaporating pressures of these mixed refrigerants were obtained by carrying out the theoretical refrigeration cycle calculations for the mixed refrigerants under the following conditions using NIST Refprop 9.0.

| <Air Conditioning Conditions> | |
|---|---|
| Evaporating temperature | −10° C. |
| Condensation temperature | 40° C. |
| Superheating temperature | 20 K |
| Subcooling temperature | 0 K |
| Compressor efficiency | 70% |

The meanings of the above terms are the same as in Test Example 1-1.

The results of Test Example 1-3 are shown in Table 3. Table 3 shows Examples and Comparative Examples of refrigerant 11 of the present disclosure. In Table 3, the meanings of the terms are the same as in Test Example 1-1.

The coefficient of performance (COP) and the compression ratio were obtained in the same manner as in Test Example 1-1.

The flammability of each mixed refrigerant was determined in the same manner as in Test Example 1-1. The combustion rate test was performed in the same manner as in Test Example 1-1.

The flammable range of each mixed refrigerant was measured with the same method and test conditions as in Test Example 1-1 using a measuring apparatus based on ASTM E681-09 (see FIG. 1).

TABLE 3

| Item | | Unit | Reference Example 1-3 (R134a) | Comparative Example 1-13 | Comparative Example 1-14 | Comparative Example 1-15 | Example 1-7 |
|---|---|---|---|---|---|---|---|
| Composition ratio | HFO-1132(Z) | % by mass | 0 | 30.0 | 40.0 | 51.0 | 53.0 |
| | HFO-1234yf | % by mass | 0 | 70.0 | 60.0 | 49.0 | 47.0 |
| | HFC-134a | % by mass | 100 | 0 | 0 | 0 | 0 |
| GWP(AR4) | | — | 1430 | 6 | 6 | 7 | 7 |
| Discharge temperature | | ° C. | 80.8 | 80.7 | 85.5 | 90.8 | 91.8 |
| Saturation pressure (40° C.) | | MPa | 1.017 | 1.004 | 0.998 | 0.991 | 0.990 |
| Evaporating pressure | | MPa | 0.201 | 0.215 | 0.212 | 0.209 | 0.208 |
| Compression ratio | | — | 5.1 | 4.7 | 4.7 | 4.7 | 4.7 |
| COP ratio (to R134a) | | % | 100.0 | 100.2 | 100.9 | 101.5 | 101.6 |
| Refrigerating capacity ratio (to R134a) | | % | 100.0 | 101.6 | 102.4 | 103.0 | 103.1 |
| ASHRAE flammability classification | | — | Class 1 | Class 2L | Class 2L | Class 2L | Class 2L |

| Item | | Example 1-8 | Example 1-9 | Comparative Example 1-16 | Comparative Example 1-17 | Comparative Example 1-18 |
|---|---|---|---|---|---|---|
| Composition ratio | HFO-1132(Z) | 56.0 | 59.0 | 60.0 | 70.0 | 100 |
| | HFO-1234yf | 44.0 | 41.0 | 40.0 | 30.0 | 0 |
| | HFC-134a | 0 | 0 | 0 | 0 | 0 |
| GWP(AR4) | | 7 | 8 | 8 | 8 | 10 |
| Discharge temperature | | 93.3 | 94.8 | 95.3 | 100.3 | 115.9 |
| Saturation pressure (40° C.) | | 0.988 | 0.987 | 0.986 | 0.981 | 0.968 |
| Evaporating pressure | | 0.208 | 0.207 | 0.207 | 0.204 | 0.198 |
| Compression ratio | | 4.8 | 4.8 | 4.8 | 4.8 | 4.9 |
| COP ratio (to R134a) | | 101.7 | 101.8 | 101.8 | 102.0 | 102.4 |
| Refrigerating capacity ratio (to R134a) | | 103.2 | 103.3 | 103.4 | 103.6 | 104.4 |
| ASHRAE flammability classification | | Class 2L | Class 2L | Class 2 | Class 2 | Class 2 |

Test Example 1-4

The GWPs of the mixed refrigerants shown in Examples 1-10 to 1-12, Comparative Examples 1-19 to 1-24, and Reference Example 1-4 (R134a) were evaluated based on the values in the IPCC Fourth Report.

The COPs, refrigerating capacities, discharge temperatures, saturation pressures at a saturation temperature of 40° C., condensation pressures, and evaporating pressures of these mixed refrigerants were obtained by carrying out the theoretical refrigeration cycle calculations for the mixed refrigerants under the following conditions using NIST Refprop 9.0.

| <Air Conditioning Conditions> | |
|---|---|
| Evaporating temperature | −35° C. |
| Condensation temperature | 40° C. |
| Superheating temperature | 20 K |
| Subcooling temperature | 0 K |
| Compressor efficiency | 70% |

The meanings of the above terms are the same as in Test Example 1-1.

The results of Test Example 1-4 are shown in Table 4. Table 4 shows Examples and Comparative Examples of refrigerant 11 of the present disclosure. In Table 4, the meanings of the terms are the same as in Test Example 1-1.

The coefficient of performance (COP) and the compression ratio were obtained in the same manner as in Test Example 1-1.

The flammability of each mixed refrigerant was determined in the same manner as in Test Example 1-1. The combustion rate test was performed in the same manner as in Test Example 1-1.

The flammable range of each mixed refrigerant was measured with the same method and test conditions as in Test Example 1-1 using a measuring apparatus based on ASTM E681-09 (see FIG. 1).

these mixed refrigerants were obtained by carrying out the theoretical refrigeration cycle calculations for the mixed refrigerants under the following conditions using NIST Refprop 9.0.

| <Air Conditioning Conditions> | |
|---|---|
| Evaporating temperature | −50° C. |
| Condensation temperature | 40° C. |
| Superheating temperature | 20 K |
| Subcooling temperature | 0 K |
| Compressor efficiency | 70% |

The meanings of the above terms are the same as in Test Example 1-1.

The results of Test Example 1-5 are shown in Table 5. Table 5 shows Examples and Comparative Examples of refrigerant 11 of the present disclosure. In Table 5, the meanings of the terms are the same as in Test Example 1-1.

The coefficient of performance (COP) and the compression ratio were obtained in the same manner as in Test Example 1-1.

TABLE 4

| Item | | Unit | Reference Example 1-4 (R134a) | Comparative Example 1-19 | Comparative Example 1-20 | Comparative Example 1-21 | Example 1-10 |
|---|---|---|---|---|---|---|---|
| Composition | HFO-1132(Z) | % by mass | 0 | 30.0 | 40.0 | 51.0 | 53.0 |
| ratio | HFO-1234yf | % by mass | 0 | 70.0 | 60.0 | 49.0 | 47.0 |
| | HFC-134a | % by mass | 100 | 0 | 0 | 0 | 0 |
| GWP(AR4) | | — | 1430 | 6 | 6 | 7 | 7 |
| Discharge temperature | | ° C. | 99.1 | 98.5 | 106.5 | 115.5 | 117.2 |
| Saturation pressure (40° C.) | | MPa | 1.017 | 1.004 | 0.998 | 0.991 | 0.990 |
| Evaporating pressure | | MPa | 0.066 | 0.076 | 0.075 | 0.073 | 0.073 |
| Compression ratio | | — | 15.4 | 13.2 | 13.4 | 13.6 | 13.6 |
| COP ratio (to R134a) | | % | 100.0 | 100.7 | 102.2 | 100.2 | 100.4 |
| Refrigerating capacity ratio (to R134a) | | % | 100.0 | 108.8 | 110.4 | 100.2 | 100.4 |
| ASHRAE flammability classification | | — | Class 1 | Class 2L | Class 2L | Class 2L | Class 2L |

| Item | | Example 1-11 | Example 1-12 | Comparative Example 1-22 | Comparative Example 1-23 | Comparative Example 1-24 |
|---|---|---|---|---|---|---|
| Composition | HFO-1132(Z) | 56.0 | 59.0 | 60.0 | 70.0 | 100 |
| ratio | HFO-1234yf | 44.0 | 41.0 | 40.0 | 30.0 | 0.0 |
| | HFC-134a | 0 | 0 | 0 | 0 | 0 |
| GWP(AR4) | | 7 | 8 | 8 | 8 | 10 |
| Discharge temperature | | 119.7 | 122.2 | 123.1 | 131.5 | 157.8 |
| Saturation pressure (40° C.) | | 0.988 | 0.987 | 0.986 | 0.981 | 0.968 |
| Evaporating pressure | | 0.073 | 0.072 | 0.072 | 0.071 | 0.068 |
| Compression ratio | | 13.6 | 13.7 | 13.7 | 13.8 | 14.2 |
| COP ratio (to R134a) | | 100.6 | 100.8 | 100.9 | 100.0 | 100.7 |
| Refrigerating capacity ratio (to R134a) | | 100.6 | 100.9 | 100.9 | 100.0 | 101.3 |
| ASHRAE flammability classification | | Class 2L | Class 2L | Class 2 | Class 2 | Class 2 |

Test Example 1-5

The GWPs of the mixed refrigerants shown in Examples 1-13 to 1-15, Comparative Examples 1-25 to 1-30, and Reference Example 1-5 (R134a) were evaluated based on the values in the IPCC Fourth Report.

The COPs, refrigerating capacities, discharge temperatures, saturation pressures at a saturation temperature of 40° C., condensation pressures, and evaporating pressures of The flammability of each mixed refrigerant was determined in the same manner as in Test Example 1-1. The combustion rate test was performed in the same manner as in Test Example 1-1.

The flammable range of each mixed refrigerant was measured with the same method and test conditions as in Test Example 1-1 using a measuring apparatus based on ASTM E681-09 (see FIG. 1).

TABLE 5

| Item | | Unit | Reference Example 1-5 (R134a) | Comparative Exampie 1-25 | Comparative Example 1-26 | Comparative Example 1-27 | Example 1-13 |
|---|---|---|---|---|---|---|---|
| Composition | HFO-1132(Z) | % by mass | 0 | 30.0 | 40.0 | 51.0 | 53.0 |
| ratio | HFO-1234yf | % by mass | 0 | 70.0 | 60.0 | 49.0 | 47.0 |
| | HFC-134a | % by mass | 100 | 0 | 0 | 0 | 0 |
| GWP(AR4) | | — | 1430 | 6 | 6 | 7 | 7 |
| Discharge temperature | | ° C. | 114.6 | 113.5 | 123.8 | 135.6 | 137.7 |
| Saturation pressure (40° C.) | | MPa | 1.017 | 1.004 | 0.998 | 0.991 | 0.990 |
| Evaporating pressure | | MPa | 0.029 | 0.036 | 0.035 | 0.034 | 0.034 |
| Compression ratio | | — | 34.5 | 28.1 | 28.5 | 29.0 | 29.0 |
| COP ratio (to R134a) | | % | 100.0 | 101.2 | 103.2 | 100.3 | 100.5 |
| Refrigerating capacity ratio (to R134a) | | % | 100.0 | 115.2 | 117.5 | 100.2 | 100.5 |
| ASHRAE flammability classification | | — | Class 1 | Class 2L | Class 2L | Class 2L | Class 2L |

| Item | | Example 1-14 | Example 1-15 | Comparative Example 1-28 | Comparative Example 1-29 | Comparative Example 1-30 |
|---|---|---|---|---|---|---|
| Composition | HFO-1132(Z) | 56.0 | 59.0 | 60.0 | 70.0 | 100 |
| ratio | HFO-1234yf | 44.0 | 41.0 | 40.0 | 30.0 | 0.0 |
| | HFC-134a | 0 | 0 | 0 | 0 | 0 |
| GWP(AR4) | | 7 | 8 | 8 | 8 | 10 |
| Discharge temperature | | 141.0 | 144.2 | 145.3 | 156.4 | 190.6 |
| Saturation pressure (40° C.) | | 0.988 | 0.987 | 0.986 | 0.981 | 0.968 |
| Evaporating pressure | | 0.034 | 0.034 | 0.034 | 0.033 | 0.031 |
| Compression ratio | | 29.2 | 29.3 | 29.3 | 29.7 | 30.9 |
| COP ratio (to R134a) | | 100.8 | 101.1 | 101.2 | 100.0 | 101.0 |
| Refrigerating capacity ratio (to R134a) | | 100.8 | 101.1 | 101.2 | 100.0 | 101.6 |
| ASHRAE flammability classification | | Class 2L | Class 2L | Class 2 | Class 2 | Class 2 |

Test Example 1-6

The GWPs of the mixed refrigerants shown in Examples 1-16 to 1-18, Comparative Examples 1-31 to 1-36, and Reference Example 1-6 (R134a) were evaluated based on the values in the IPCC Fourth Report.

The COPs, refrigerating capacities, discharge temperatures, saturation pressures at a saturation temperature of 40° C., condensation pressures, and evaporating pressures of these mixed refrigerants were obtained by carrying out the theoretical refrigeration cycle calculations for the mixed refrigerants under the following conditions using NIST Refprop 9.0.

| <Air Conditioning Conditions> | |
|---|---|
| Evaporating temperature | −65° C. |
| Condensation temperature | 40° C. |
| Superheating temperature | 20 K |

-continued

| <Air Conditioning Conditions> | |
|---|---|
| Subcooling temperature | 0 K |
| Compressor efficiency | 70% |

The meanings of the above terms are the same as in Test Example 1-1.

The results of Test Example 1-6 are shown in Table 6. Table 6 shows Examples and Comparative Examples of refrigerant 11 of the present disclosure. In Table 6, the meanings of the terms are the same as in Test Example 1-1.

The coefficient of performance (COP) and the compression ratio were obtained in the same manner as in Test Example 1-1.

The flammability of each mixed refrigerant was determined in the same manner as in Test Example 1-1. The combustion rate test was performed in the same manner as in Test Example 1-1.

The flammable range of each mixed refrigerant was measured with the same method and test conditions as in Test Example 1-1 using a measuring apparatus based on ASTM E681-09 (see FIG. 1).

TABLE 6

| Item | | Unit | Reference Example 1-6 (R134a) | Comparative Example 1-31 | Comparative Example 1-32 | Comparative Example 1-33 | Example 1-16 |
|---|---|---|---|---|---|---|---|
| Composition | HFO-1132(Z) | % by mass | 0 | 30.0 | 40.0 | 51.0 | 53.0 |
| ratio | HFO-1234yf | % by mass | 0 | 70.0 | 60.0 | 49.0 | 47.0 |
| | HFC-134a | % by mass | 100 | 0 | 0 | 0 | 0 |
| GWP(AR4) | | — | 1430 | 6 | 6 | 7 | 7 |
| Discharge temperature | | ° C. | 134.8 | 132.8 | 146.1 | 161.0 | 163.8 |
| Saturation pressure (40° C.) | | MPa | 1.017 | 1.004 | 0.998 | 0.991 | 0.990 |
| Evaporating pressure | | MPa | 0.011 | 0.015 | 0.015 | 0.014 | 0.014 |
| Compression ratio | | — | 89.3 | 67.4 | 68.7 | 70.1 | 70.4 |
| COP ratio (to R134a) | | % | 100.0 | 101.9 | 104.5 | 106.6 | 106.9 |
| Refrigerating capacity ratio (to R134a) | | % | 100.0 | 124.4 | 127.4 | 129.9 | 130.3 |
| ASHRAE flammability classification | | — | Class 1 | Class 2L | Class 2L | Class 2L | Class 2L |

TABLE 6-continued

| Item | | Example 1-17 | Example 1-18 | Comparative Example 1-34 | Comparative Example 1-35 | Comparative Example 1-36 |
|---|---|---|---|---|---|---|
| Composition ratio | HFO-1132(Z) | 56.0 | 59.0 | 60.0 | 70.0 | 100 |
| | HFO-1234yf | 44.0 | 41.0 | 40.0 | 30.0 | 0.0 |
| | HFC-134a | 0 | 0 | 0 | 0 | 0 |
| GWP(AR4) | | 7 | 8 | 8 | 8 | 10 |
| Discharge temperature | | 168.0 | 172.1 | 173.5 | 187.7 | 231.5 |
| Saturation pressure (40° C.) | | 0.988 | 0.987 | 0.986 | 0.981 | 0.968 |
| Evaporating pressure | | 0.014 | 0.014 | 0.014 | 0.014 | 0.013 |
| Compression ratio | | 70.8 | 71.2 | 71.3 | 72.6 | 76.3 |
| COP ratio (to R134a) | | 107.4 | 107.8 | 107.9 | 108.9 | 110.2 |
| Refrigerating capacity ratio (to R134a) | | 130.8 | 131.3 | 131.4 | 132.7 | 134.9 |
| ASHRAE flammability classification | | Class 2L | Class 2L | Class 2 | Class 2 | Class 2 |

Test Example 2-1

The GWPs of the mixed refrigerants shown in Examples 2-1 to 2-4, Comparative Examples 2-1 to 2-6, and Reference Example 2-1 (R134a) were evaluated based on the values stated in the IPCC Fourth Report.

The COPs, refrigerating capacities, discharge temperatures, saturation pressures at a saturation temperature of 40° C., condensation pressures, and evaporating pressures of these mixed refrigerants were obtained by carrying out the theoretical refrigeration cycle calculations for the mixed refrigerants under the following conditions using National Institute of Science and Technology (NIST) Reference Fluid Thermodynamic and Transport Properties Database (Refprop 9.0).

| <Air Conditioning Conditions> | |
|---|---|
| Evaporating temperature | 10° C. |
| Condensation temperature | 40° C. |
| Superheating temperature | 20 K |
| Subcooling temperature | 0 K |
| Compressor efficiency | 70% |

The term “Evaporating temperature 10° C.” means that the evaporating temperature of each mixed refrigerant in an evaporator provided in a refrigeration apparatus is 10° C. The term “Condensation temperature 40° C.” means that the condensation temperature of each mixed refrigerant in a condenser provided in a refrigeration apparatus is 40° C.

The results of Test Example 2-1 are shown in Table 7. Table 7 shows Examples and Comparative Examples of refrigerant 12 of the present disclosure. In Table 7, the terms “COP ratio” and “refrigerating capacity ratio” represent proportions (%) with respect to R134a. In Table 7, The term “Saturation pressure (40° C.)” represents saturation pressure at a saturation temperature of 40° C. In Table 7, the terms “Discharge temperature (° C.)” represents the highest temperature during the refrigeration cycle in the above refrigeration cycle theoretical calculation of the mixed refrigerants.

The coefficient of performance (COP) was obtained by the following formula.

COP=(refrigerating capacity or heating capacity)/power consumption

The compression ratio was obtained by the following formula.

Compression ratio=condensation pressure (Mpa)/evaporating pressure (Mpa)

The flammability of each mixed refrigerant was determined by considering the mixing composition of the mixed refrigerant as the WCF concentration and measuring the combustion rate according to the ANSI/ASHRAE 34-2013 standard. The flammability of R134a was determined by considering the composition of R134a as the WCF concentration and measuring the combustion rate according to the ANSI/ASHRAE 34-2013 standard.

A mixed refrigerant having a combustion rate of 0 cm/s to 10 cm/s was considered to be “Class 2L (slightly flammable)”, and a mixed refrigerant having a combustion rate of more than 10 cm/s was considered to be “Class 2 (weakly flammable)”. For R134a, no flame propagation occurred, and therefore R134a was considered to be “Class 1 (nonflammable)”. In Table 7, “ASHRAE flammability classification” represents a result based on these determination criteria.

The combustion rate test was performed as follows. First, the mixed refrigerant used had a purity of 99.5% or more and was degassed by repeating the cycle of freezing, pumping, and thawing until no trace of air was observed on a vacuum gauge. The combustion rate was measured by a closed method. The initial temperature was ambient temperature. The ignition was performed by producing an electric spark between electrodes at the center of a sample cell. The duration of the discharge was 1.0 to 9.9 ms, and the ignition energy was typically about 0.1 to 1.0 J. The spread of the flame was visualized using a schlieren photograph. A cylindrical container (inner diameter: 155 mm, length: 198 mm) equipped with two acrylic windows that transmitted light was used as the sample cell, and as the light source, a xenon lamp was used. A schlieren image of the flame was recorded at a framing rate of 600 fps by a high speed digital video camera and stored in a PC.

The flammable range of each mixed refrigerant was measured using a measuring apparatus based on ASTM E681-09 (see FIG. 1).

Specifically, a spherical glass flask having an internal volume of 12 L was used so that the state of combustion could be visually observed and video-recorded, and the glass flask was adapted so that gas could be released from the upper lid when excessive pressure was generated by combustion. For the ignition method, a spark was generated by discharge from electrodes held at a height of ⅓ from the bottom.

<Test Conditions>

Test container: 280 mm ϕ spherical shape (internal volume: 12 L)

Test temperature: 60° C.±3° C.

Pressure: 101.3 kPa±0.7 kPa

Water: 0.0088 g±0.0005 g per g of dry air (the amount of water at a relative humidity of 50% at 23° C.) Refrigerant composition/air mixing ratio: 1 vol. % increments±0.2 vol. %

Refrigerant composition mixture: ±0.1% by mass

Ignition method: alternating current discharge, voltage 15 kV, current 30 mA, neon transformer Electrode spacing: 6.4 mm (¼ inch)

Spark: 0.4 s±0.05 s

Determination criteria:

When the flame extended at an angle of 90° or more from the ignition point, it was evaluated as having flame propagation (flammable)

When the flame extended at an angle of 90° or less from the ignition point, it was evaluated as having no flame propagation (nonflammable)

-continued

| <Air Conditioning Conditions> | |
|---|---|
| Superheating temperature | 5 K |
| Subcooling temperature | 5 K |
| Compressor efficiency | 70% |

The meanings of the above terms are the same as in Test Example 2-1.

TABLE 1

| Item | | Unit | Reference Example 2-1 (R134a) | Comparative Example 2-1 | Comparative Example 2-2 | Example 2-1 | Example 2-2 | Example 2-3 |
|---|---|---|---|---|---|---|---|---|
| Composition | HFO-1132(Z) | % by mass | 0 | 30.0 | 40.0 | 41.0 | 44.0 | 47.0 |
| ratio | HFO-1234yf | % by mass | 0 | 70.0 | 60.0 | 59.0 | 56.0 | 53.0 |
| | HFC-134a | % by mass | 100 | 0 | 0 | 0 | 0 | 0 |
| GWP(AR4) | | — | 1430 | 6 | 6 | 6 | 7 | 7 |
| Discharge temperature | | ° C. | 70.7 | 70.7 | 73.4 | 73.6 | 74.4 | 75.3 |
| Saturation pressure (40° C.) | | MPa | 1.017 | 1.004 | 0.998 | 0.997 | 0.995 | 0.994 |
| Evaporating pressure | | MPa | 0.415 | 0.427 | 0.422 | 0.422 | 0.421 | 0.420 |
| Compression ratio | | — | 2.5 | 2.4 | 2.4 | 2.4 | 2.4 | 2.4 |
| COP ratio (to R134a) | | % | 100.0 | 100.0 | 100.2 | 100.2 | 100.2 | 100.3 |
| Refrigerating capacity ratio (to R134a) | | % | 100.0 | 98.0 | 98.1 | 98.2 | 98.2 | 98.2 |
| ASHRAE flammability classification | | — | Class 1 | Class 2L | Class 2L | Class 2L | Class 2L | Class 2L |

| Item | | Example 2-4 | Comparative Example 2-3 | Comparative Example 2-4 | Comparative Example 2-5 | Comparative Example 2-6 |
|---|---|---|---|---|---|---|
| Composition | HFO-1132(Z) | 49.0 | 51.0 | 60.0 | 70.0 | 100 |
| ratio | HFO-1234yf | 51.0 | 49.0 | 40.0 | 30.0 | 0 |
| | HFC-134a | 0 | 0 | 0 | 0 | 0 |
| GWP(AR4) | | 7 | 7 | 8 | 8 | 10 |
| Discharge temperature | | 75.8 | 76.3 | 78.8 | 81.6 | 90.3 |
| Saturation pressure (40° C.) | | 0.992 | 0.991 | 0.986 | 0.981 | 0.968 |
| Evaporating pressure | | 0.419 | 0.418 | 0.415 | 0.411 | 0.402 |
| Compression ratio | | 2.4 | 2.4 | 2.4 | 2.4 | 2.4 |
| COP ratio (to R134a) | | 100.3 | 100.3 | 100.4 | 100.5 | 100.4 |
| Refrigerating capacity ratio (to R134a) | | 98.2 | 98.3 | 98.3 | 98.4 | 98.5 |
| ASHRAE flammability classification | | Class 2L | Class 2L | Class 2 | Class 2 | Class 2 |

Test Example 2-2

The GWPs of the mixed refrigerants shown in Examples 2-5 to 2-8, Comparative Examples 2-7 to 2-12, and Reference Example 2-2 (R134a) were evaluated based on the values stated in the IPCC Fourth Report.

The COPs, refrigerating capacities, discharge temperatures, saturation pressures at a saturation temperature of 45° C., condensation pressures, and evaporating pressures of these mixed refrigerants were obtained by carrying out the theoretical refrigeration cycle calculations for the mixed refrigerants under the following conditions using NIST Refprop 9.0.

| <Air Conditioning Conditions> | |
|---|---|
| Evaporating temperature | 5° C. |
| Condensation temperature | 45° C. |

The results of Test Example 2-2 are shown in Table 8. Table 8 shows Examples and Comparative Examples of refrigerant 12 of the present disclosure. In Table 8, the meanings of the terms are the same as in Test Example 2-1.

The coefficient of performance (COP) and the compression ratio were obtained in the same manner as in Test Example 2-1.

The flammability of each mixed refrigerant was determined in the same manner as in Test Example 2-1. The combustion rate test was performed in the same manner as in Test Example 2-1.

The flammable range of each mixed refrigerant was measured with the same method and test conditions as in Test Example 2-1 using a measuring apparatus based on ASTM E681-09 (see FIG. 1).

TABLE 8

| Item | | Unit. | Reference Example 2-2 (R134a) | Comparative Example 2-7 | Comparative Example 2-8 | Example 2-5 | Example 2-6 | Example 2-7 |
|---|---|---|---|---|---|---|---|---|
| Composition | HFO-1132(Z) | % by mass | 0 | 30.0 | 40.0 | 41.0 | 44.0 | 47.0 |
| ratio | HFO-1234yf | % by mass | 0 | 70.0 | 60.0 | 59.0 | 56.0 | 53.0 |
| | HFC-134a | % by mass | 100 | 0 | 0 | 0 | 0 | 0 |
| GWP(AR4) | | — | 1430 | 6 | 6 | 6 | 7 | 7 |
| Discharge temperature | | ° C. | 63.8 | 63.9 | 67.3 | 67.7 | 68.7 | 69.7 |
| Saturation pressure (45° C.) | | MPa | 1.160 | 1.139 | 1.133 | 1.132 | 1.130 | 1.129 |
| Evaporating pressure | | MPa | 0.350 | 0.363 | 0.359 | 0.359 | 0.358 | 0.357 |
| Compression ratio | | — | 3.3 | 3.1 | 3.2 | 3.2 | 3.2 | 3.2 |
| COP ratio (to R134a) | | % | 100.0 | 100.0 | 100.7 | 100.8 | 101.0 | 101.2 |
| Refrigerating capacity ratio (to R134a) | | % | 100.0 | 98.8 | 99.7 | 99.8 | 100.0 | 100.2 |
| ASHRAE flammability classification | | — | Class 1 | Class 2L | Class 2L | Class 2L | Class 2L | Class 2L |

| Item | | Example 2-8 | Comparative Example 2-9 | Comparative Example 2-10 | Comparative Example 2-11 | Comparative Example 2-12 |
|---|---|---|---|---|---|---|
| Composition | HFO-1132(Z) | 49.0 | 51.0 | 60.0 | 70.0 | 100 |
| ratio | HFO-1234yf | 51.0 | 49.0 | 40.0 | 30.0 | 0 |
| | HFC-134a | 0 | 0 | 0 | 0 | 0 |
| GWP(AR4) | | 7 | 7 | 8 | 8 | 10 |
| Discharge temperature | | 70.4 | 71.2 | 74.4 | 78.0 | 89.4 |
| Saturation pressure (45° C.) | | 1.127 | 1.126 | 1.121 | 1.115 | 1.101 |
| Evaporating pressure | | 0.356 | 0.355 | 0.352 | 0.349 | 0.340 |
| Compression ratio | | 3.2 | 3.2 | 3.2 | 3.2 | 3.2 |
| COP ratio (to R134a) | | 101.3 | 101.4 | 101.8 | 102.2 | 102.7 |
| Refrigerating capacity ratio (to R134a) | | 100.4 | 100.5 | 101.1 | 101.6 | 102.8 |
| ASHRAE flammability classification | | Class 2L | Class 2L | Class 2 | Class 2 | Class 2 |

Test Example 2-3

The GWPs of the mixed refrigerants shown in Examples 2-9 to 2-12, Comparative Examples 2-13 to 2-18, and Reference Example 2-3 (R134a) were evaluated based on the values stated in the IPCC Fourth Report.

The COPs, refrigerating capacities, discharge temperatures, saturation pressures at a saturation temperature of 40° C., condensation pressures, and evaporating pressures of these mixed refrigerants were obtained by carrying out the theoretical refrigeration cycle calculations for the mixed refrigerants under the following conditions using NIST Refprop 9.0.

| <Air Conditioning Conditions> | |
|---|---|
| Evaporating temperature | −10° C. |
| Condensation temperature | 40° C. |
| Superheating temperature | 20 K |
| Subcooling temperature | 0 K |
| Compressor efficiency | 70% |

The meanings of the above terms are the same as in Test Example 2-1.

The results of Test Example 2-3 are shown in Table 9. Table 9 shows Examples and Comparative Examples of refrigerant 12 of the present disclosure. In Table 9, the meanings of the terms are the same as in Test Example 2-1.

The coefficient of performance (COP) and the compression ratio were obtained in the same manner as in Test Example 2-1.

The flammability of each mixed refrigerant was determined in the same manner as in Test Example 2-1. The combustion rate test was performed in the same manner as in Test Example 2-1.

The flammable range of each mixed refrigerant was measured with the same method and test conditions as in Test Example 2-1 using a measuring apparatus based on ASTM E681-09 (see FIG. 1).

TABLE 9

| Item | | Unit | Reference Example 2-3 (R134a) | Comparative Example 2-13 | Comparative Example 2-14 | Example 2-9 | Example 2-10 | Example 2-11 |
|---|---|---|---|---|---|---|---|---|
| Composition | HFO-1132(Z) | % by mass | 0 | 30.0 | 40.0 | 41.0 | 44.0 | 47.0 |
| ratio | HFO-1234yf | % by mass | 0 | 70.0 | 60.0 | 59.0 | 56.0 | 53.0 |
| | HFC-134a | % by mass | 100 | 0 | 0 | 0 | 0 | 0 |
| GWP(AR4) | | — | 1430 | 6 | 6 | 6 | 7 | 7 |
| Discharge temperature | | ° C. | 80.8 | 80.7 | 85.5 | 85.9 | 87.4 | 88.8 |
| Saturation pressure (40° C.) | | MPa | 1.017 | 1.004 | 0.998 | 0.997 | 0.995 | 0.994 |
| Evaporating pressure | | MPa | 0.201 | 0.215 | 0.212 | 0.212 | 0.211 | 0.210 |
| Compression ratio | | — | 5.1 | 4.7 | 4.7 | 4.7 | 4.7 | 4.7 |
| COP ratio (to R134a) | | % | 100.0 | 100.2 | 100.9 | 101.0 | 101.1 | 101.3 |
| Refrigerating capacity ratio (to R134a) | | % | 100.0 | 101.6 | 102.4 | 102.4 | 102.6 | 102.3 |
| ASHRAE flammability classification | | — | Class 1 | Class 2L | Class 2L | Class 2L | Class 2L | Class 2L |

TABLE 9-continued

| Item | | Example 2-12 | Comparative Example 2-15 | Comparative Example 2-16 | Comparative Example 2-17 | Comparative Example 2-18 |
|---|---|---|---|---|---|---|
| Composition ratio | HFO-1132(Z) | 49.0 | 51.0 | 60.0 | 70.0 | 100 |
| | HFO-1234yf | 51.0 | 49.0 | 40.0 | 30.0 | 0 |
| | HFC-134a | 0 | 0 | 0 | 0 | 0 |
| GWP(AR4) | | 7 | 7 | 8 | 8 | 10 |
| Discharge temperature | | 89.8 | 90.8 | 95.3 | 100.3 | 115.9 |
| Saturation pressure (40° C.) | | 0.992 | 0.991 | 0.986 | 0.981 | 0.968 |
| Evaporating pressure | | 0.209 | 0.209 | 0.207 | 0.204 | 0.198 |
| Compression ratio | | 4.7 | 4.7 | 4.8 | 4.8 | 4.9 |
| COP ratio (to R134a) | | 101.4 | 101.5 | 101.8 | 102.0 | 102.4 |
| Refrigerating capacity ratio (to R134a) | | 102.9 | 103.0 | 103.4 | 103.6 | 104.4 |
| ASHRAE flammability classification | | Class 2L | Class 2L | Class 2 | Class 2 | Class 2 |

Test Example 2-4

The GWPs of the mixed refrigerants shown in Examples 2-13 to 2-16, Comparative Examples 2-19 to 2-24, and Reference Example 2-4 (R134a) were evaluated based on the values in the IPCC Fourth Report.

The COPs, refrigerating capacities, discharge temperatures, saturation pressures at a saturation temperature of 40° C., condensation pressures, and evaporating pressures of these mixed refrigerants were obtained by carrying out the theoretical refrigeration cycle calculations for the mixed refrigerants under the following conditions using NIST Refprop 9.0.

| <Air Conditioning Conditions> | |
|---|---|
| Evaporating temperature | −35° C. |
| Condensation temperature | 40° C. |
| Superheating temperature | 20 K |

-continued

| <Air Conditioning Conditions> | |
|---|---|
| Subcooling temperature | 0 K |
| Compressor efficiency | 70% |

The meanings of the above terms are the same as in Test Example 2-1.

The results of Test Example 2-4 are shown in Table 10. Table 10 shows Examples and Comparative Examples of refrigerant 12 of the present disclosure. In Table 10, the meanings of the terms are the same as in Test Example 2-1.

The coefficient of performance (COP) and the compression ratio were obtained in the same manner as in Test Example 2-1.

The flammability of each mixed refrigerant was determined in the same manner as in Test Example 2-1. The combustion rate test was performed in the same manner as in Test Example 2-1.

The flammable range of each mixed refrigerant was measured with the same method and test conditions as in Test Example 2-1 using a measuring apparatus based on ASTM E681-09 (see FIG. 1).

TABLE 10

| Item | | Unit | Reference Example 2-4 (R134a) | Comparative Example 2-19 | Comparative Example 2-20 | Example 2-13 | Example 2-14 | Example 2-15 |
|---|---|---|---|---|---|---|---|---|
| Composition ratio | HFO-1132(Z) | % by mass | 0 | 30.0 | 40.0 | 41.0 | 44.0 | 47.0 |
| | HFO-1234yf | % by mass | 0 | 70.0 | 60.0 | 59.0 | 56.0 | 53.0 |
| | HFC-134a | % by mass | 100 | 0 | 0 | 0 | 0 | 0 |
| GWP(AR4) | | — | 1430 | 6 | 6 | 6 | 7 | 7 |
| Discharge temperature | | ° C. | 99.1 | 98.5 | 106.5 | 107.3 | 109.8 | 112.2 |
| Saturation pressure (40° C.) | | MPa | 1.017 | 1.004 | 0.998 | 0.997 | 0.995 | 0.994 |
| Evaporating pressure | | MPa | 0.066 | 0.076 | 0.075 | 0.074 | 0.074 | 0.074 |
| Compression ratio | | — | 15.4 | 13.2 | 13.4 | 13.4 | 13.5 | 13.5 |
| COP ratio (to R134a) | | % | 100.0 | 100.7 | 102.2 | 102.3 | 102.7 | 103.0 |
| Refrigerating capacity ratio (to R134a) | | % | 100.0 | 108.8 | 110.4 | 110.5 | 110.9 | 111.3 |
| ASHRAE damn lability classification | | — | Class 1 | Class 2L | Class 2L | Class 2L | Class 2L | Class 2L |

| Item | | Example 2-16 | Comparative Example 2-21 | Comparative Example 2-22 | Comparative Example 2-23 | Comparative Example 2-24 |
|---|---|---|---|---|---|---|
| Composition ratio | HFO-1132(Z) | 49.0 | 51.0 | 60.0 | 70.0 | 100 |
| | HFO-1234yf | 51.0 | 49.0 | 40.0 | 30.0 | 0.0 |
| | HFC-134a | 0 | 0 | 0 | 0 | 0 |
| GWP(AR4) | | 7 | 7 | 8 | 8 | 10 |
| Discharge temperature | | 113.9 | 115.5 | 123.1 | 131.5 | 157.8 |
| Saturation pressure (40° C.) | | 0.992 | 0.991 | 0.986 | 0.981 | 0.968 |
| Evaporating pressure | | 0.073 | 0.073 | 0.072 | 0.071 | 0.068 |
| Compression ratio | | 13.5 | 13.6 | 13.7 | 13.8 | 14.2 |
| COP ratio (to R134a) | | 100.0 | 100.2 | 100.9 | 100.0 | 100.7 |
| Refrigerating capacity ratio (to R134a) | | 100.0 | 100.2 | 100.9 | 100.0 | 101.3 |
| ASHRAE damn lability classification | | Class 2L | Class 2L | Class 2 | Class 2 | Class 2 |

Test Example 2-5

The GWPs of the mixed refrigerants shown in Examples 2-17 to 2-20, Comparative Examples 2-25 to 2-30, and Reference Example 2-5 (R134a) were evaluated based on the values in the IPCC Fourth Report.

The COPs, refrigerating capacities, discharge temperatures, saturation pressures at a saturation temperature of 40° C., condensation pressures, and evaporating pressures of these mixed refrigerants were obtained by carrying out the theoretical refrigeration cycle calculations for the mixed refrigerants under the following conditions using NIST Refprop 9.0.

| <Air Conditioning Conditions> | |
|---|---|
| Evaporating temperature | −50° C. |
| Condensation temperature | 40° C. |
| Superheating temperature | 20 K |

-continued

| <Air Conditioning Conditions> | |
|---|---|
| Subcooling temperature | 0 K |
| Compressor efficiency | 70% |

The meanings of the above terms are the same as in Test Example 2-1.

The results of Test Example 2-5 are shown in Table 11. Table 11 shows Examples and Comparative Examples of refrigerant 12 of the present disclosure. In Table 11, the meanings of the terms are the same as in Test Example 2-1.

The coefficient of performance (COP) and the compression ratio were obtained in the same manner as in Test Example 2-1.

The flammability of each mixed refrigerant was determined in the same manner as in Test Example 2-1. The combustion rate test was performed in the same manner as in Test Example 2-1.

The flammable range of each mixed refrigerant was measured with the same method and test conditions as in Test Example 2-1 using a measuring apparatus based on ASTM E681-09 (see FIG. 1).

TABLE 11

| Item | | Unit | Reference Example 2-5 (R134a) | Comparative Example 2-25 | Comparative Example 2-26 | Example 2-17 | Example 2-18 | Example 2-19 |
|---|---|---|---|---|---|---|---|---|
| Composition | HFO-1132(Z) | % by mass | 0 | 30.0 | 40.0 | 41.0 | 44.0 | 47.0 |
| ratio | HFO-1234yf | % by mass | 0 | 70.0 | 60.0 | 59.0 | 56.0 | 53.0 |
| | HFC-134a | % by mass | 100 | 0 | 0 | 0 | 0 | 0 |
| GWP(AR4) | | — | 1430 | 6 | 6 | 6 | 7 | 7 |
| Discharge temperature | | ° C. | 114.6 | 113.5 | 123.8 | 124.9 | 128.1 | 131.3 |
| Saturation pressure (40° C.) | | MPa | 1.017 | 1.004 | 0.998 | 0.997 | 0.995 | 0.994 |
| Evaporating pressure | | MPa | 0.029 | 0.036 | 0.035 | 0.035 | 0.035 | 0.035 |
| Compression ratio | | — | 34.5 | 28.1 | 28.5 | 28.5 | 28.7 | 28.8 |
| COP ratio (to R134a) | | % | 100.0 | 101.2 | 103.2 | 103.4 | 103.9 | 104.3 |
| Refrigerating capacity ratio (to R134a) | | % | 100.0 | 115.2 | 117.5 | 117.7 | 118.2 | 118.7 |
| ASHRAE flammability classification | | — | Class 1 | Class 2L | Class 2L | Class 2L | Class 2L | Class 2L |

| Item | | Example 2-20 | Comparative Example 2-27 | Comparative Example 2-28 | Comparative Example 2-29 | Comparative Example 2-30 |
|---|---|---|---|---|---|---|
| Composition | HFO-1132(Z) | 49.0 | 51.0 | 60.0 | 70.0 | 100 |
| ratio | HFO-1234yf | 51.0 | 49.0 | 40.0 | 30.0 | 0.0 |
| | HFC-134a | 0 | 0 | 0 | 0 | 0 |
| GWP(AR4) | | 7 | 7 | 8 | 8 | 10 |
| Discharge temperature | | 133.4 | 135.6 | 145.3 | 156.4 | 190.6 |
| Saturation pressure (40° C.) | | 0.992 | 0.991 | 0.986 | 0.981 | 0.968 |
| Evaporating pressure | | 0.034 | 0.034 | 0.034 | 0.033 | 0.031 |
| Compression ratio | | 28.9 | 29.0 | 29.3 | 29.7 | 30.9 |
| COP ratio (to R134a) | | 100.0 | 100.3 | 101.2 | 100.0 | 101.0 |
| Refrigerating capacity ratio (to R134a) | | 100.0 | 100.2 | 101.2 | 100.0 | 101.6 |
| ASHRAE flammability classification | | Class 2L | Class 2L | Class 2 | Class 2 | Class 2 |

Test Example 2-6

The GWPs of the mixed refrigerants shown in Examples 2-21 to 2-24, Comparative Examples 2-31 to 2-36, and Reference Example 2-6 (R134a) were evaluated based on the values in the IPCC Fourth Report.

The COPs, refrigerating capacities, discharge temperatures, saturation pressures at a saturation temperature of 40° C., condensation pressures, and evaporating pressures of these mixed refrigerants were obtained by carrying out the theoretical refrigeration cycle calculations for the mixed refrigerants under the following conditions using NIST Refprop 9.0.

| <Air Conditioning Conditions> | |
|---|---|
| Evaporating temperature | −65° C. |
| Condensation temperature | 40° C. |
| Superheating temperature | 20 K |
| Subcooling temperature | 0 K |
| Compressor efficiency | 70% |

The meanings of the above terms are the same as in Test Example 2-1.

The results of Test Example 2-6 are shown in Table 12. Table 12 shows Examples and Comparative Examples of refrigerant 12 of the present disclosure. In Table 12, the meanings of the terms are the same as in Test Example 2-1.

The coefficient of performance (COP) and the compression ratio were obtained in the same manner as in Test Example 2-1.

The flammability of each mixed refrigerant was determined in the same manner as in Test Example 2-1. The combustion rate test was performed in the same manner as in Test Example 2-1.

The flammable range of each mixed refrigerant was measured with the same method and test conditions as in Test Example 2-1 using a measuring apparatus based on ASTM E681-09 (see FIG. 1).

(1-6-1) Refrigerant 1

The refrigerant included in the composition of the present disclosure includes, in one aspect, HFO-1132(E) and HFO-1234yf, and the content rate of HFO-1132(E) is 35.0 to 65.0 mass % and the content rate of HFO-1234yf is 65.0 to 35.0 mass % based on the total mass of HFO-1132(E) and HFO-1234yf. The refrigerant is sometimes referred to as "refrigerant 1".

The refrigerant 1 is used for operating a refrigeration cycle in which an evaporating temperature is −75 to −5° C.

The refrigerant 1, which has such a configuration, thus has various characteristics of (1) a sufficiently low GWP (100 or less), (2) a COP equivalent to or more than that of R404A, and (3) a refrigerating capacity equivalent to or more than that of R404A.

The content rate of HFO-1132(E) is 35.0 mass % or more based on the total mass of HFO-1132(E) and HFO-1234yf in the refrigerant 1, thereby allowing the refrigerating capacity equivalent to or more than that of R404A to be obtained.

The content rate of HFO-1132(E) is 65.0 mass % or less based on the total mass of HFO-1132(E) and HFO-1234yf in the refrigerant 1, thereby enabling the saturation pressure at a saturation temperature of 40° C., in the refrigeration cycle of the refrigerant 1, to be kept in a suitable range (in particular, 2.10 Mpa or less).

TABLE 12

| Item | | Unit | Reterence Example 2-6 (R134a) | Comparative Example 2-31 | Comparative Example 2-32 | Example 2-21 | Example 2-22 | Example 2-23 |
|---|---|---|---|---|---|---|---|---|
| Composition | HFO-1132(Z) | % by mass | 0 | 30.0 | 40.0 | 41.0 | 44.0 | 47.0 |
| ratio | HFO-1234yf | % by mass | 0 | 70.0 | 60.0 | 59.0 | 56.0 | 53.0 |
| | HFC-134a | % by mass | 100 | 0 | 0 | 0 | 0 | 0 |
| GWP(AR4) | | — | 1430 | 6 | 6 | 6 | 7 | 7 |
| Discharge temperature | | ° C. | 134.8 | 132.8 | 146.1 | 147.4 | 151.5 | 155.6 |
| Saturation pressure (40° C.) | | MPa | 1.017 | 1.004 | 0.998 | 0.997 | 0.995 | 0.994 |
| Evaporating pressure | | MPa | 0.011 | 0.015 | 0.015 | 0.014 | 0.014 | 0.014 |
| Compression ratio | | — | 89.3 | 67.4 | 68.7 | 68.8 | 69.2 | 69.6 |
| COP ratio (to R134a) | | % | 100.0 | 101.9 | 104.5 | 104.7 | 105.3 | 105.9 |
| Refrigerating capacity ratio (to R134a) | | % | 100.0 | 124.4 | 127.4 | 127.7 | 128.4 | 129.1 |
| ASHRAE flammability classification | | — | Class 1 | Class 2L | Class 2L | Class 2L | Class 2L | Class 2L |

| Item | | Example 2-24 | Comparative Example 2-33 | Comparative Example 2-34 | Comparative Example 2-35 | Comparative Example 2-36 |
|---|---|---|---|---|---|---|
| Composition | HFO-1132(Z) | 49.0 | 51.0 | 60.0 | 70.0 | 100 |
| ratio | HFO-1234yf | 51.0 | 49.0 | 40.0 | 30.0 | 0.0 |
| | HFC-134a | 0 | 0 | 0 | 0 | 0 |
| GWP(AR4) | | 7 | 7 | 8 | 8 | 10 |
| Discharge temperature | | 158.3 | 161.0 | 173.5 | 187.7 | 231.5 |
| Saturation pressure (40° C.) | | 0.992 | 0.991 | 0.986 | 0.981 | 0.968 |
| Evaporating pressure | | 0.014 | 0.014 | 0.014 | 0.014 | 0.013 |
| Compression ratio | | 69.9 | 70.1 | 71.3 | 72.6 | 76.3 |
| COP ratio (to R134a) | | 106.3 | 106.6 | 107.9 | 108.9 | 110.2 |
| Refrigerating capacity ratio (to R134a) | | 129.5 | 129.9 | 131.4 | 132.7 | 134.9 |
| ASHRAE flammability classification | | Class 2L | Class 2L | Class 2 | Class 2 | Class 2 |

(1-6) Refrigerant 1, Refrigerant 2, Refrigerant 3, Refrigerant 4 and Refrigerant 5

The refrigerant composition according to the present disclosure comprises at least the refrigerant. The refrigerant 11, the refrigerant 12, the refrigerant 13, the refrigerant 14, and the refrigerant 15 can be used as the refrigerant. Hereinafter, the refrigerant 11, the refrigerant 12, the refrigerant 13, the refrigerant 14, and the refrigerant 15 will be described respectively.

The refrigerating capacity relative to that of R404A, of the refrigerant 1, may be 95% or more, and is preferably 98% or more, more preferably 100% or more, further preferably 101% or more, particularly preferably 102% or more.

The refrigerant 1 has a GWP of 100 or less, and thus can remarkably suppress the environmental load from the viewpoint of global warming as compared with other general-purpose refrigerants.

The refrigerant 1 is preferably high in ratio of the driving force consumed in the refrigeration cycle and the refrigerating capacity (coefficient of performance (COP)), relative to that of R404A, from the viewpoint of energy consumption efficiency, and specifically, the COP relative to that of R404A is preferably 98% or more, more preferably 100, or more, particularly preferably 102% or more.

Preferably, the content rate of HFO-1132(E) is 40.5 to 59.0 mass % and the content rate of HFO-1234yf is 59.5 to 41.0 mass % based on the total mass of HFO-1132(E) and HFO-1234yf in the refrigerant 1. In such a case, the refrigerant 1 has a GWP of 100 or less, a COP relative to that of R404A of 101% or more, and a refrigerating capacity relative to that of R404A of 99% or more. Furthermore, in such a case, the refrigerant 1 has a saturation pressure at a saturation temperature of 40° C., of 1.75 MPa or more and 2.00 MPa or less, and can be applied to a commercially available refrigerating apparatus for R404A without any significant change in design.

More preferably, the content rate of HFO-1132(E) is 41.3 to 59.0 mass % and the content rate of HFO-1234yf is 58.7 to 41.0 mass % based on the total mass of HFO-1132(E) and HFO-1234yf in the refrigerant 1. In such a case, the refrigerant 1 has a GWP of 100 or less, a COP relative to that of R404A of 101% or more, and a refrigerating capacity relative to that of R404A of 99.5% or more. Furthermore, in such a case, the refrigerant 1 has a saturation pressure at a saturation temperature of 40° C., of 1.76 MPa or more and 2.00 MPa or less, and can be applied to a commercially available refrigerating apparatus for R404A without any significant change in design.

Further preferably, the content rate of HFO-1132(E) is 41.3 to 55.0 mass % and the content rate of HFO-1234yf is 58.7 to 45.0 mass % based on the total mass of HFO-1132(E) and HFO-1234yf in the refrigerant 1. In such a case, the refrigerant 1 has a GWP of 100 or less, a COP relative to that of R404A of 101% or more, and a refrigerating capacity relative to that of R404A of 99.5% or more. Furthermore, in such a case, the refrigerant 1 has a saturation pressure at a saturation temperature of 40° C., of 1.76 MPa or more and 1.95 MPa or less, and can be applied to a commercially available refrigerating apparatus for R404A without any significant change in design.

Particularly preferably, the content rate of HFO-1132(E) is 41.3 to 53.5 mass % and the content rate of HFO-1234yf is 58.7 to 46.5 mass % based on the total mass of HFO-1132(E) and HFO-1234yf in the refrigerant 1. In such a case, the refrigerant 1 has various characteristics of a GWP of 100 or less, a COP relative to that of R404A of 102% or more and a refrigerating capacity relative to that of R404A of 99.5% or more, and lower flammability (Class 2L) according to ASHRAE Standard. Furthermore, in such a case, the refrigerant 1 has a saturation pressure at a saturation temperature of 40° C., of 1.76 MPa or more and 1.94 MPa or less, and can be applied to a commercially available refrigerating apparatus for R404A without any significant change in design.

Extremely preferably, the content rate of HFO-1132(E) is 41.3 to 51.0 mass % and the content rate of HFO-1234yf is 58.7 to 49.0 mass based on the total mass of HFO-1132(E) and HFO-1234yf in the refrigerant 1. In such a case, the refrigerant 1 has various characteristics of a GWP of 100 or less, a COP relative to that of R404A of 102% or more and a refrigerating capacity relative to that of R404A of 99% or more, and lower flammability (Class 2L) according to ASHRAE Standard. Furthermore, in such a case, the refrigerant 1 has a saturation pressure at a saturation temperature of 40° C., of 1.76 MPa or more and 1.90 MPa or less, and can be applied to a commercially available refrigerating apparatus for R404A without any significant change in design.

Most preferably, the content rate of HFO-1132(E) is 41.3 to 49.2 mass % and the content rate of HFO-1234yf is 58.7 to 50.8 mass % based on the total mass of HFO-1132(E) and HFO-1234yf in the refrigerant 1. In such a case, the refrigerant 1 has various characteristics of a GWP of 100 or less, a COP relative to that of R404A of 102% or more and a refrigerating capacity relative to that of R404A of 99.5% or more, and lower flammability (Class 2L) according to ASHRAE Standard. Furthermore, in such a case, the refrigerant 1 has a saturation pressure at a saturation temperature of 40° C., of 1.76 MPa or more and 1.88 MPa or less, and can be applied to a commercially available refrigerating apparatus for R404A without any significant change in design.

The refrigerant 1 usually has a saturation pressure at a saturation temperature of 40° C., of 2.10 MPa or less, preferably 2.00 MPa or less, more preferably 1.95 MPa or less, further preferably 1.90 MPa or less, particularly preferably 1.88 MPa or less. The refrigerant 1, which has a saturation pressure at a saturation temperature of 40° C. within such a range, thus can be applied to a commercially available refrigerating apparatus for R404A without any significant change in design.

The refrigerant 1 usually has a saturation pressure at a saturation temperature of 40° C., of 1.70 MPa or more, preferably 1.73 MPa or more, more preferably 1.74 MPa or more, further preferably 1.75 MPa or more, particularly preferably 1.76 MPa or more. The refrigerant 1, which has a saturation pressure at a saturation temperature of 40° C. within such a range, thus can be applied to a commercially available refrigerating apparatus for R404A without any significant change in design.

In a case where the refrigerant 1 is used for operating the refrigeration cycle, in the present disclosure, the discharge temperature is preferably 150° C. or less, more preferably 140° C. or less, further preferably 130° C. or less, particularly preferably 120° C. or less from the viewpoint that the life of any member of a commercially available refrigerating apparatus for R404A is extended.

The refrigerant 1 is used for operating a refrigeration cycle at an evaporating temperature of −75 to −5° C., and thus, an advantage is that the refrigerating capacity equivalent to or more than that of R404A is obtained.

In a case where the evaporating temperature is more than −5° C. in the refrigeration cycle where the refrigerant 1 of the present disclosure is used, the compression ratio is less than 2.5 to cause the efficiency of the refrigeration cycle to be deteriorated. In a case where the evaporating temperature is less than −75° C. in the refrigeration cycle where the refrigerant 1 of the present disclosure is used, the evaporating pressure is less than 0.02 MPa to cause suction of the refrigerant into a compressor to be difficult. The compression ratio can be determined by the following expression.

Compression ratio=Condensation pressure (Mpa)/Evaporating pressure (Mpa)

The evaporating temperature in the refrigeration cycle where the refrigerant 1 of the present disclosure is used is preferably −7.5° C. or less, more preferably −10° C. or less, further preferably −35° C. or less.

The evaporating temperature in the refrigeration cycle where the refrigerant 1 of the present disclosure is used is preferably −65° C. or more, more preferably −60° C. or more, further preferably −55° C. or more, particularly preferably −50° C. or more.

The evaporating temperature in the refrigeration cycle where the refrigerant 1 of the present disclosure is used is preferably −65° C. or more and −5° C. or less, more preferably −60° C. or more and −5° C. or less, further preferably −55° C. or more and −7.5° C. or less, particularly preferably −50° C. or more and −10° C. or less.

The evaporating pressure in the refrigeration cycle where the refrigerant 1 of the present disclosure is used is preferably 0.02 MPa or more, more preferably 0.03 MPa or more, further preferably 0.04 MPa or more, particularly preferably 0.05 MPa or more, from the viewpoint that suction of the refrigerant into a compressor is enhanced.

The compression ratio in the refrigeration cycle where the refrigerant 1 of the present disclosure is used is preferably 2.5 or more, more preferably 3.0 or more, further preferably 3.5 or more, particularly preferably 4.0 or more, from the viewpoint that the efficiency of the refrigeration cycle is enhanced. The compression ratio in the refrigeration cycle where the refrigerant 1 of the present disclosure is used is preferably 200 or less, more preferably 150 or less, further preferably 100 or less, particularly preferably 50 or less, from the viewpoint that the efficiency of the refrigeration cycle is enhanced.

The refrigerant 1 may usually include 99.5 mass, or more of HFO-1132(E) and HFO-1234yf in terms of the sum of the concentrations of these components. In the present disclosure, the total amount of HFO-1132(E) and HFO-1234yf in the entire refrigerant 1 is preferably 99.7 mass % or more, more preferably 99.8 mass % or more, further preferably 99.9 mass % or more.

The refrigerant 1 can further include other refrigerant, in addition to HFO-1132(E) and HFO-1234yf, as long as the above characteristics are not impaired. In such a case, the content rate of such other refrigerant in the entire refrigerant 1 is preferably 0.5 mass % or less, more preferably 0.3 mass % or less, further preferably 0.2 mass % or less, particularly preferably 0.1 mass % or less. Such other refrigerant is not limited, and can be selected from a wide range of known refrigerants widely used in the art. Such other refrigerant may be included singly or in combinations of two or more kinds thereof in the refrigerant 1.

The refrigerant 1 particularly preferably consists only of HFO-1132(E) and HFO-1234yf. In other words, the refrigerant 1 particularly preferably includes HFO-1132(E) and HFO-1234yf at a total concentration of 100 mass % in the entire refrigerant 1.

In a case where the refrigerant 1 consists only of HFO-1132(E) and HFO-1234yf, the content rate of HFO-1132(E) is usually 35.0 to 65.0 mass % and the content rate of HFO-1234yf is usually 65.0 to 35.0 mass % based on the total mass of HFO-1132(E) and HFO-1234yf. The refrigerant 1, which has such a configuration, thus has various characteristics of (1) a sufficiently low GWP (100 or less), (2) a COP equivalent to or more than that of R404A, and (3) a refrigerating capacity equivalent to or more than that of R404A.

In a case where the refrigerant 1 consists only of HFO-1132(E) and HFO-1234yf, preferably, the content rate of HFO-1132(E) is 40.5 to 59.0 mass % and the content rate of HFO-1234yf is 59.5 to 41.0 mass % based on the total mass of HFO-1132(E) and HFO-1234yf. In such a case, the refrigerant 1 has a GWP of 100 or less, a COP relative to that of R404A of 101% or more, and a refrigerating capacity relative to that of R404A of 99% or more.

Furthermore, in such a case, the refrigerant 1 has a saturation pressure at a saturation temperature of 40° C., of 1.75 MPa or more and 2.00 MPa or less, and can be applied to a commercially available refrigerating apparatus for R404A without any significant change in design.

In a case where the refrigerant 1 consists only of HFO-1132(E) and HFO-1234yf, more preferably, the content rate of HFO-1132(E) is 41.3 to 59.0 mass % and the content rate of HFO-1234yf is 58.7 to 41.0 mass % based on the total mass of HFO-1132(E) and HFO-1234yf. In such a case, the refrigerant 1 has a GWP of 100 or less, a COP relative to that of R404A of 101% or more, and a refrigerating capacity relative to that of R404A of 99.5% or more. Furthermore, in such a case, the refrigerant 1 has a saturation pressure at a saturation temperature of 40° C., of 1.76 MPa or more and 2.00 MPa or less, and can be applied to a commercially available refrigerating apparatus for R404A without any significant change in design.

In a case where the refrigerant 1 consists only of HFO-1132(E) and HFO-1234yf, further preferably, the content rate of HFO-1132(E) is 41.3 to 55.0 mass % and the content rate of HFO-1234yf is 58.7 to 45.0 mass % based on the total mass of HFO-1132(E) and HFO-1234yf. In such a case, the refrigerant 1 has a GWP of 100 or less, a COP relative to that of R404A of 101% or more, and a refrigerating capacity relative to that of R404A of 99.5% or more. Furthermore, in such a case, the refrigerant 1 has a saturation pressure at a saturation temperature of 40° C., of 1.76 MPa or more and 1.95 MPa or less, and can be applied to a commercially available refrigerating apparatus for R404A without any significant change in design.

In a case where the refrigerant 1 consists only of HFO-1132(E) and HFO-1234yf, particularly preferably, the content rate of HFO-1132(E) is 41.3 to 53.5 mass % and the content rate of HFO-1234yf is 58.7 to 46.5 mass % based on the total mass of HFO-1132(E) and HFO-1234yf. In such a case, the refrigerant 1 has various characteristics of a GWP of 100 or less, a COP relative to that of R404A of 102% or more and a refrigerating capacity relative to that of R404A of 99.5% or more, and lower flammability (Class 2L) according to ASHRAE Standard. Furthermore, in such a case, the refrigerant 1 has a saturation pressure at a saturation temperature of 40° C., of 1.76 MPa or more and 1.94 MPa or less, and can be applied to a commercially available refrigerating apparatus for R404A without any significant change in design.

In a case where the refrigerant 1 consists only of HFO-1132(E) and HFO-1234yf, extremely preferably, the content rate of HFO-1132(E) is 41.3 to 51.0 mass % and the content rate of HFO-1234yf is 58.7 to 49.0 mass % based on the total mass of HFO-1132(E) and HFO-1234yf. In such a case, the refrigerant 1 has various characteristics of a GWP of 100 or less, a COP relative to that of R404A of 102% or more and a refrigerating capacity relative to that of R404A of 99% or more, and lower flammability (Class 2L) according to ASHRAE Standard. Furthermore, in such a case, the refrigerant 1 has a saturation pressure at a saturation temperature of 40° C., of 1.76 MPa or more and 1.90 MPa or less, and can be applied to a commercially available refrigerating apparatus for R404A without any significant change in design.

In a case where the refrigerant 1 consists only of HFO-1132(E) and HFO-1234yf, most preferably, the content rate of HFO-1132(E) is 41.3 to 49.2 mass % and the content rate of HFO-1234yf is 58.7 to 50.8 mass % based on the total mass of HFO-1132(E) and HFO-1234yf. In such a case, the refrigerant 1 has various characteristics of a GWP of 100 or less, a COP relative to that of R404A of 102% or more and a refrigerating capacity relative to that of R404A of 99.5 or more, and lower flammability (Class 2L) according to ASHRAE Standard. Furthermore, in such a case, the refrigerant 1 has a saturation pressure at a saturation temperature of 40° C., of 1.76 MPa or more and 1.88 MPa or less, and can be applied to a commercially available refrigerating apparatus for R404A without any significant change in design.

(1-6-2) Refrigerant 2

The refrigerant included in the composition of the present disclosure includes, in one aspect, HFO-1132(E) and HFO-1234yf, and the content rate of HFO-1132(E) is 40.5 to 49.2 mass and the content rate of HFO-1234yf is 59.5 to 50.8 mass % based on the total mass of HFO-1132(E) and HFO-1234yf. The refrigerant is sometimes referred to as "refrigerant 2".

The refrigerant 2, which has such a configuration, thus has various characteristics of (1) a sufficiently low GWP (100 or less), (2) a COP equivalent to or more than that of R404A, (3) a refrigerating capacity equivalent to or more than that of R404A, and (4) lower flammability (Class 2L) according to ASHRAE Standard. Furthermore, in such a case, the refrigerant 2 has a saturation pressure at a saturation temperature of 40° C., of 1.75 MPa or more and 1.88 MPa or less, and can be applied to a commercially available refrigerating apparatus for R404A without any significant change in design.

The content rate of HFO-1132(E) is 40.5 mass % or more based on the total mass of HFO-1132(E) and HFO-1234yf in the refrigerant 2, thereby allowing the refrigerating capacity equivalent to or more than that of R404A to be obtained.

The content rate of HFO-1132(E) is 49.2 mass % or less based on the total mass of HFO-1132(E) and HFO-1234yf in the refrigerant 2, thereby enabling the saturation pressure at a saturation temperature of 40° C., in the refrigeration cycle of the refrigerant 2, to be kept in a suitable range (in particular, 2.10 Mpa or less).

The refrigerating capacity relative to that of R404A, of the refrigerant 2, may be 99% or more, and is preferably 100% or more, more preferably 101% or more, further preferably 102% or more, particularly preferably 103% or more.

The refrigerant 2 has a GWP of 100 or less, and thus can remarkably suppress the environmental load from the viewpoint of global warming as compared with other general-purpose refrigerants.

The refrigerant 2 is preferably high in ratio of the driving force consumed in the refrigeration cycle and the refrigerating capacity (coefficient of performance (COP)), relative to that of R404A, from the viewpoint of energy consumption efficiency, and specifically, the COP relative to that of R404A is preferably 98% or more, more preferably 100% or more, further preferably 101% or more, particularly preferably 102% or more.

Preferably, the content rate of HFO-1132(E) is 41.3 to 49.2 mass % and the content rate of HFO-1234yf is 58.7 to 50.8 mass % based on the total mass of HFO-1132(E) and HFO-1234yf in the refrigerant 2. In such a case, the refrigerant 2 has various characteristics of a GWP of 100 or less, a COP relative to that of R404A of 102% or more, a refrigerating capacity relative to that of R404A of 99.5% or more, and lower flammability (Class 2L) according to ASHRAE Standard. Furthermore, in such a case, the refrigerant 2 has a saturation pressure at a saturation temperature of 40° C., of 1.76 MPa or more and 1.88 MPa or less, and can be applied to a commercially available refrigerating apparatus for R404A without any significant change in design.

More preferably, the content rate of HFO-1132(E) is 43.0 to 49.2 mass % and the content rate of HFO-1234yf is 57.0 to 50.8 mass % based on the total mass of HFO-1132(E) and HFO-1234yf in the refrigerant 2. In such a case, the refrigerant 2 has various characteristics of a GWP of 100 or less, a COP relative to that of R404A of 102% or more, a refrigerating capacity relative to that of R404A of 101% or more, and lower flammability (Class 2L) according to ASHRAE Standard. Furthermore, in such a case, the refrigerant 2 has a saturation pressure at a saturation temperature of 40° C., of 1.78 MPa or more and 1.88 MPa or less, and can be applied to a commercially available refrigerating apparatus for R404A without any significant change in design.

Further preferably, the content rate of HFO-1132(E) is 44.0 to 49.2 mass % and the content rate of HFO-1234yf is 56.0 to 50.8 mass % based on the total mass of HFO-1132(E) and HFO-1234yf in the refrigerant 2. In such a case, the refrigerant 2 has various characteristics of a GWP of 100 or less, a COP relative to that of R404A of 102% or more, a refrigerating capacity relative to that of R404A of 101% or more, and lower flammability (Class 2L) according to ASHRAE Standard. Furthermore, in such a case, the refrigerant 2 has a saturation pressure at a saturation temperature of 40° C., of 1.80 MPa or more and 1.88 MPa or less, and can be applied to a commercially available refrigerating apparatus for R404A without any significant change in design.

Particularly preferably, the content rate of HFO-1132(E) is 45.0 to 49.2 mass % and the content rate of HFO-1234yf is 55.0 to 50.8 mass % based on the total mass of HFO-1132(E) and HFO-1234yf in the refrigerant 2. In such a case, the refrigerant 2 has various characteristics of a GWP of 100 or less, a COP relative to that of R404A of 102% or more, a refrigerating capacity relative to that of R404A of 102% or more, and lower flammability (Class 2L) according to ASHRAE Standard. Furthermore, in such a case, the refrigerant 2 has a saturation pressure at a saturation temperature of 40° C., of 1.81 MPa or more and 1.88 MPa or less, and can be applied to a commercially available refrigerating apparatus for R404A without any significant change in design.

Extremely preferably, the content rate of HFO-1132(E) is 45.0 to 48.0 mass % and the content rate of HFO-1234yf is 55.0 to 52.0 mass % based on the total mass of HFO-1132(E) and HFO-1234yf in the refrigerant 2. In such a case, the refrigerant 2 has various characteristics of a GWP of 100 or less, a COP relative to that of R404A of 102.5% or more, a refrigerating capacity relative to that of R404A of 102.5% or more, and lower flammability (Class 2L) according to ASHRAE Standard. Furthermore, in such a case, the refrigerant 2 has a saturation pressure at a saturation temperature of 40° C., of 1.81 MPa or more and 1.87 MPa or less, and can be applied to a commercially available refrigerating apparatus for R404A without any significant change in design.

Most preferably, the content rate of HFO-1132(E) is 45.0 to 47.0 mass % and the content rate of HFO-1234yf is 55.0 to 53.0 mass % based on the total mass of HFO-1132(E) and HFO-1234yf in the refrigerant 2. In such a case, the refrigerant 2 has various characteristics of a GWP of 100 or less, a COP relative to that of R404A of 102.5% or more, a refrigerating capacity relative to that of R404A of 102.5% or more, and lower flammability (Class 2L) according to ASHRAE Standard. Furthermore, in such a case, the refrigerant 2 has a saturation pressure at a saturation temperature of 40° C., of 1.81 MPa or more and 1.85 MPa or less, and can be applied to a commercially available refrigerating apparatus for R404A without any significant change in design.

The refrigerant 2 usually has a saturation pressure at a saturation temperature of 40° C., of 2.10 MPa or less, preferably 2.00 MPa or less, more preferably 1.95 MPa or less, further preferably 1.90 MPa or less, particularly preferably 1.88 MPa or less. The refrigerant 2, which has a saturation pressure at a saturation temperature of 40° C. within such a range, thus can be applied to a commercially available refrigerating apparatus for R404A without any significant change in design.

The refrigerant 2 usually has a saturation pressure at a saturation temperature of 40° C., of 1.70 MPa or more, preferably 1.73 MPa or more, more preferably 1.74 MPa or more, further preferably 1.75 MPa or more, particularly preferably 1.76 MPa or more. The refrigerant 2, which has a saturation pressure at a saturation temperature of 40° C. within such a range, thus can be applied to a commercially available refrigerating apparatus for R404A without any significant change in design.

In a case where the refrigerant 2 is used for operating the refrigeration cycle, in the present disclosure, the discharge temperature is preferably 150° C. or less, more preferably 140° C. or less, further preferably 130° C. or less, particularly preferably 120° C. or less from the viewpoint that the life of any member of a commercially available refrigerating apparatus for R404A is extended.

The refrigerant 2 is preferably used for operating a refrigeration cycle at an evaporating temperature of −75 to 15° C. in the present disclosure, from the viewpoint that the refrigerating capacity equivalent to or more than that of R404A is obtained.

The evaporating temperature in the refrigeration cycle where the refrigerant 2 of the present disclosure is used is preferably 15° C. or less, more preferably 5° C. or less, further preferably 0° C. or less, particularly preferably −5° C. or less.

The evaporating temperature in the refrigeration cycle where the refrigerant 2 of the present disclosure is used is preferably −65° C. or more, more preferably −60° C. or more, further preferably −55° C. or more, particularly preferably −50° C. or more.

The evaporating temperature in the refrigeration cycle where the refrigerant 2 of the present disclosure is used is preferably −65° C. or more and 15° C. or less, more preferably −60° C. or more and 5° C. or less, further preferably −55° C. or more and 0° C. or less, particularly preferably −50° C. or more and −5° C. or less.

The evaporating pressure in the refrigeration cycle where the refrigerant 2 of the present disclosure is used is preferably 0.02 MPa or more, more preferably 0.03 MPa or more, further preferably 0.04 MPa or more, particularly preferably 0.05 MPa or more, from the viewpoint that suction of the refrigerant into a compressor is enhanced.

The compression ratio in the refrigeration cycle where the refrigerant 2 of the present disclosure is used is preferably 2.5 or more, more preferably 3.0 or more, further preferably 3.5 or more, particularly preferably 4.0 or more, from the viewpoint that the efficiency of the refrigeration cycle is enhanced.

The refrigerant 2 may usually include 99.5 mass % or more of HFO-1132(E) and HFO-1234yf in terms of the sum of the concentrations of these components. In the present disclosure, the total amount of HFO-1132(E) and HFO-1234yf in the entire refrigerant 2 is preferably 99.7 mass, or more, more preferably 99.8 mass % or more, further preferably 99.9 mass % or more.

The refrigerant 2 can further include other refrigerant, in addition to HFO-1132(E) and HFO-1234yf, as long as the above characteristics are not impaired. In such a case, the content rate of such other refrigerant in the entire refrigerant 2 is preferably 0.5 mass % or less, more preferably 0.3 mass % or less, further preferably 0.2 mass % or less, particularly preferably 0.1 mass % or less. Such other refrigerant is not limited, and can be selected from a wide range of known refrigerants widely used in the art. Such other refrigerant may be included singly or in combinations of two or more kinds thereof in the refrigerant 2.

The refrigerant 2 particularly preferably consists only of HFO-1132(E) and HFO-1234yf. In other words, the refrigerant 2 particularly preferably includes HFO-1132(E) and HFO-1234yf at a total concentration of 100 mass % in the entire refrigerant 2.

In a case where the refrigerant 2 consists only of HFO-1132(E) and HFO-1234yf, the content rate of HFO-1132(E) is usually 40.5 to 49.2 mass % and the content rate of HFO-1234yf is usually 59.5 to 50.8 mass % based on the total mass of HFO-1132(E) and HFO-1234yf. The refrigerant 2, which has such a configuration, thus has various characteristics of (1) a sufficiently low GWP (100 or less), (2) a COP equivalent to or more than that of R404A, (3) a refrigerating capacity equivalent to or more than that of R404A, and (4) lower flammability (Class 2L) according to ASHRAE Standard. Furthermore, in such a case, the refrigerant 2 has a saturation pressure at a saturation temperature of 40° C., of 1.75 MPa or more and 1.88 MPa or less, and can be applied to a commercially available refrigerating apparatus for R404A without any significant change in design.

In a case where the refrigerant 2 consists only of HFO-1132(E) and HFO-1234yf, preferably, the content rate of HFO-1132(E) is 41.3 to 49.2 mass % and the content rate of HFO-1234yf is 58.7 to 50.8 mass, based on the total mass of HFO-1132(E) and HFO-1234yf. In such a case, the refrigerant 2 has various characteristics of a GWP of 100 or less, a COP relative to that of R404A of 102% or more, a refrigerating capacity relative to that of R404A of 99.5% or more, and lower flammability (Class 2L) according to ASHRAE Standard.

Furthermore, in such a case, the refrigerant 2 has a saturation pressure at a saturation temperature of 40° C., of 1.76 MPa or more and 1.88 MPa or less, and can be applied to a commercially available refrigerating apparatus for R404A without any significant change in design.

In a case where the refrigerant 2 consists only of HFO-1132(E) and HFO-1234yf, more preferably, the content rate of HFO-1132(E) is 43.0 to 49.2 mass % and the content rate of HFO-1234yf is 57.0 to 50.8 mass % based on the total mass of HFO-1132(E) and HFO-1234yf. In such a case, the refrigerant 2 has various characteristics of a GWP of 100 or less, a COP relative to that of R404A of 102% or more, a refrigerating capacity relative to that of R404A of 101% or more, and lower flammability (Class 2L) according to ASHRAE Standard. Furthermore, in such a case, the refrigerant 2 has a saturation pressure at a saturation temperature of 40° C., of 1.78 MPa or more and 1.88 MPa or less, and can be applied to a commercially available refrigerating apparatus for R404A without any significant change in design.

In a case where the refrigerant 2 consists only of HFO-1132(E) and HFO-1234yf, further preferably, the content rate of HFO-1132(E) is 44.0 to 49.2 mass and the content rate of HFO-1234yf is 56.0 to 50.8 mass % based on the total mass of HFO-1132(E) and HFO-1234yf. In such a case, the refrigerant 2 has various characteristics of a GWP of 100 or less, a COP relative to that of R404A of 102% or more, a refrigerating capacity relative to that of R404A of 101% or more, and lower flammability (Class 2L) according to ASHRAE Standard. Furthermore, in such a case, the refrigerant 2 has a saturation pressure at a saturation temperature of 40° C., of 1.80 MPa or more and 1.88 MPa or less, and can be applied to a commercially available refrigerating apparatus for R404A without any significant change in design.

In a case where the refrigerant 2 consists only of HFO-1132(E) and HFO-1234yf, particularly preferably, the content rate of HFO-1132(E) is 45.0 to 49.2 mass % and the content rate of HFO-1234yf is 55.0 to 50.8 mass % based on the total mass of HFO-1132(E) and HFO-1234yf. In such a case, the refrigerant 2 has various characteristics of a GWP of 100 or less, a COP relative to that of R404A of 102% or more, a refrigerating capacity relative to that of R404A of 102% or more, and lower flammability (Class 2L) according to ASHRAE Standard. Furthermore, in such a case, the refrigerant 2 has a saturation pressure at a saturation temperature of 40° C., of 1.81 MPa or more and 1.88 MPa or less, and can be applied to a commercially available refrigerating apparatus for R404A without any significant change in design.

In a case where the refrigerant 2 consists only of HFO-1132(E) and HFO-1234yf, extremely preferably, the content rate of HFO-1132(E) is 45.0 to 48.0 mass % and the content rate of HFO-1234yf is 55.0 to 52.0 mass % based on the total mass of HFO-1132(E) and HFO-1234yf. In such a case, the refrigerant 2 has various characteristics of a GWP of 100 or less, a COP relative to that of R404A of 102.5% or more, a refrigerating capacity relative to that of R404A of 102.5% or more, and lower flammability (Class 2L) according to ASHRAE Standard. Furthermore, in such a case, the refrigerant 2 has a saturation pressure at a saturation temperature of 40° C., of 1.81 MPa or more and 1.87 MPa or less, and can be applied to a commercially available refrigerating apparatus for R404A without any significant change in design.

(1-6-3) Refrigerant 3

The refrigerant included in the composition of the present disclosure includes, in one aspect, HFO-1132(E) and HFO-1234yf, and the content rate of HFO-1132(E) is 31.1 to 39.8 mass %, and the content rate of HFO-1234yf is 68.9 to 60.2 mass % based on the total mass of HFO-1132(E) and HFO-1234yf. The refrigerant is sometimes referred to as "refrigerant 3".

The refrigerant 3, which has such a configuration, thus has various characteristics of (1) a sufficiently low GWP (100 or less), (2) a COP comparable with that of R134a, (3) a refrigerating capacity relative to that of R134a of 150% or more, and (4) a discharge temperature of 90° C. or less.

The content rate of HFO-1132(E) is 31.1 mass or more based on the total amount of HFO-1132(E) and HFO-1234yf in the refrigerant 3, thereby allowing a refrigerating capacity relative to that of R134a of 150% or more to be obtained.

The content rate of HFO-1132(E) is 39.8 mass % or less based on the total amount of HFO-1132(E) and HFO-1234yf in the refrigerant 3, thereby enabling the discharge temperature in the refrigeration cycle of the refrigerant 3 to be kept at 90° C. or less, and enabling the life of any member of a refrigerating apparatus for R134a to be kept long.

The refrigerating capacity relative to that of R134a, of the refrigerant 3, may be 150% or more, and is preferably 151% or more, more preferably 152% or more, further preferably 153% or more, particularly preferably 154% or more.

The refrigerant 3 preferably has a discharge temperature in the refrigeration cycle of 90.0° C. or less, more preferably 89.7° C. or less, further preferably 89.4° C. or less, particularly preferably 89.0° C. or less.

The refrigerant 3 has a GWP of 100 or less, and thus can remarkably suppress the environmental load from the viewpoint of global warming as compared with other general-purpose refrigerants.

The refrigerant 3 is preferably high in ratio of the driving force consumed in the refrigeration cycle and the refrigerating capacity (coefficient of performance (COP)), relative to that of R134a, from the viewpoint of energy consumption efficiency, and specifically, the COP relative to that of R134a is preferably 90% or more, more preferably 91% or more, further preferably 91.5% or more, particularly preferably 92% or more.

The content rate of HFO-1132(E) is usually 31.1 to 39.8 mass % and the content rate of HFO-1234yf is usually 68.9 to 60.2 mass % based on the total mass of HFO-1132(E) and HFO-1234yf in the refrigerant 3.

The refrigerant 3, which has such a configuration, thus has various characteristics of (1) a sufficiently low GWP (100 or less), (2) a COP comparable with that of R134a, (3) a refrigerating capacity relative to that of R134a of 150% or more, and (4) a discharge temperature of 90.0° C. or less.

Preferably, the content rate of HFO-1132(E) is 31.1 to 37.9 mass % and the content rate of HFO-1234yf is 68.9 to 62.1 mass % based on the total mass of HFO-1132(E) and HFO-1234yf in the refrigerant 3. In such a case, the refrigerant 3, which has such a configuration, thus has various characteristics of (1) a sufficiently low GWP (100 or less), (2) a COP relative to that of R134a of 92% or more, (3) a refrigerating capacity relative to that of R134a of 150% or more, (4) a discharge temperature of 90.0° C. or less, and (5) a critical temperature of 81° C. or more.

More preferably, the content rate of HFO-1132(E) is 32.0 to 37.9 mass and the content rate of HFO-1234yf is 68.0 to 62.1 mass % based on the total mass of HFO-1132(E) and HFO-1234yf in the refrigerant 3. In such a case, the refrigerant 3, which has such a configuration, thus has various characteristics of (1) a sufficiently low GWP (100 or less), (2) a COP relative to that of R134a of 92% or more, (3) a refrigerating capacity relative to that of R134a of 151% or more, (4) a discharge temperature of 90.0° C. or less, and (5) a critical temperature of 81° C. or more.

Still more preferably, the content rate of HFO-1132(E) is 33.0 to 37.9 mass % and the content rate of HFO-1234yf is 67.0 to 62.1 mass % based on the total mass of HFO-1132(E) and HFO-1234yf in the refrigerant 3. In such a case, the refrigerant 3, which has such a configuration, thus has various characteristics of (1) a sufficiently low GWP (100 or less), (2) a COP relative to that of R134a of 92% or more, (3) a refrigerating capacity relative to that of R134a of 152% or more, (4) a discharge temperature of 90.0° C. or less, and (5) a critical temperature of 81° C. or more.

Further preferably, the content rate of HFO-1132(E) is 34.0 to 37.9 mass % and the content rate of HFO-1234yf is 66.0 to 62.1 mass % based on the total mass of HFO-1132(E) and HFO-1234yf in the refrigerant 3. In such a case, the refrigerant 3, which has such a configuration, thus has various characteristics of (1) a sufficiently low GWP (100 or less), (2) a COP relative to that of R134a of 92% or more, (3) a refrigerating capacity relative to that of R134a of 153% or more, (4) a discharge temperature of 90.0° C. or less, and (5) a critical temperature of 81° C. or more.

Particularly preferably, the content rate of HFO-1132(E) is 35.0 to 37.9 mass % and the content rate of HFO-1234yf is 65.0 to 62.1 mass % based on the total mass of HFO-1132(E) and HFO-1234yf in the refrigerant 3. In such a case, the refrigerant 3, which has such a configuration, thus has various characteristics of (1) a sufficiently low GWP (100 or less), (2) a COP relative to that of R134a of 92% or more, (3) a refrigerating capacity relative to that of R134a of 155% or more, (4) a discharge temperature of 90.0° C. or less, and (5) a critical temperature of 81° C. or more.

In a case where the refrigerant 3 is used for operating the refrigeration cycle, in the present disclosure, the discharge temperature is preferably 90.0° C. or less, more preferably 89.7° C. or less, further preferably 89.4° C. or less, particularly preferably 89.0° C. or less, from the viewpoint that the life of any member of a commercially available refrigerating apparatus for R134a is extended.

In a case where the refrigerant 3 is used for operating the refrigeration cycle, in the present disclosure, a process of liquefaction (condensation) of the refrigerant is required in the refrigeration cycle, and thus the critical temperature is required to be remarkably higher than the temperature of cooling water or cooling air for liquefying the refrigerant. The critical temperature in the refrigeration cycle where the refrigerant 3 of the present disclosure is used is preferably 80° C. or more, more preferably 81° C. or more, further preferably 81.5° C. or more, in particular, 82° C. or more, from such a viewpoint.

The refrigerant 3 is usually used for operating a refrigeration cycle at an evaporating temperature of −75 to 15° C. in the present disclosure, from the viewpoint that a refrigerating capacity relative to that of R134a of 150% or more is obtained.

The evaporating temperature in the refrigeration cycle where the refrigerant 3 of the present disclosure is used is preferably 15° C. or less, more preferably 5° C. or less, further preferably 0° C. or less, particularly preferably −5° C. or less.

The evaporating temperature in the refrigeration cycle where the refrigerant 3 of the present disclosure is used is preferably −65° C. or more, more preferably −60° C. or more, further preferably −55° C. or more, particularly preferably −50° C. or more.

The evaporating temperature in the refrigeration cycle where the refrigerant 3 of the present disclosure is used is preferably −65° C. or more and 15° C. or less, more preferably −60° C. or more and 5° C. or less, further preferably −55° C. or more and 0° C. or less, particularly preferably −50° C. or more and −5° C. or less.

The critical temperature of the refrigerant in the refrigeration cycle where the refrigerant 3 of the present disclosure is used is preferably 80° C. or more, more preferably 81° C. or more, further preferably 81.5° C. or more, particularly preferably 82° C. or more, from the viewpoint of an enhancement in performance.

The refrigerant 3 may usually include 99.5 mass % or more of HFO-1132(E) and HFO-1234yf in terms of the sum of the concentrations of these components. In the present disclosure, the total amount of HFO-1132(E) and HFO-1234yf in the entire refrigerant 3 is preferably 99.7 mass, or more, more preferably 99.8 mass % or more, further preferably 99.9 mass % or more.

The refrigerant 3 can further include other refrigerant, in addition to HFO-1132(E) and HFO-1234yf, as long as the above characteristics are not impaired. In such a case, the content rate of such other refrigerant in the entire refrigerant 3 is preferably 0.5 mass % or less, more preferably 0.3 mass % or less, further preferably 0.2 mass % or less, particularly preferably 0.1 mass % or less. Such other refrigerant is not limited, and can be selected from a wide range of known refrigerants widely used in the art. Such other refrigerant may be included singly or in combinations of two or more kinds thereof in the refrigerant 3.

The refrigerant 3 particularly preferably consists only of HFO-1132(E) and HFO-1234yf. In other words, the refrigerant 3 particularly preferably includes HFO-1132(E) and HFO-1234yf at a total concentration of 100 mass % in the entire refrigerant 3.

In a case where the refrigerant 3 consists only of HFO-1132(E) and HFO-1234yf, the content rate of HFO-1132(E) is usually 31.1 to 39.8 mass % and the content rate of HFO-1234yf is usually 68.9 to 60.2 mass based on the total mass of HFO-1132(E) and HFO-1234yf. The refrigerant 3, which has such a configuration, thus has various characteristics of (1) a sufficiently low GWP (100 or less), (2) a COP comparable with that of R134a, (3) a refrigerating capacity relative to that of R134a of 150% or more, and (4) a discharge temperature of 90° C. or less.

In a case where the refrigerant 3 consists only of HFO-1132(E) and HFO-1234yf, preferably, the content rate of HFO-1132(E) is 31.1 to 37.9 mass % and the content rate of HFO-1234yf is 68.9 to 62.1 mass % based on the total mass of HFO-1132(E) and HFO-1234yf. In such a case, the refrigerant 3, which has such a configuration, thus has various characteristics of (1) a sufficiently low GWP (100 or less), (2) a COP relative to that of R134a of 92% or more, (3) a refrigerating capacity relative to that of R134a of 150% or more, (4) a discharge temperature of 90.0° C. or less, and (5) a critical temperature of 81° C. or more.

In a case where the refrigerant 3 consists only of HFO-1132(E) and HFO-1234yf, more preferably, the content rate of HFO-1132(E) is 32.0 to 37.9 mass % and the content rate of HFO-1234yf is 68.0 to 62.1 mass % based on the total mass of HFO-1132(E) and HFO-1234yf. In such a case, the refrigerant 3, which has such a configuration, thus has various characteristics of (1) a sufficiently low GWP (100 or less), (2) a COP relative to that of R134a of 92% or more, (3) a refrigerating capacity relative to that of R134a of 151% or more, (4) a discharge temperature of 90.0° C. or less, and (5) a critical temperature of 81° C. or more.

In a case where the refrigerant 3 consists only of HFO-1132(E) and HFO-1234yf, further preferably, the content rate of HFO-1132(E) is 33.0 to 37.9 mass % and the content rate of HFO-1234yf is 67.0 to 62.1 mass % based on the total mass of HFO-1132(E) and HFO-1234yf. In such a case, the refrigerant 3, which has such a configuration, thus has various characteristics of (1) a sufficiently low GWP (100 or less), (2) a COP relative to that of R134a of 92% or more, (3) a refrigerating capacity relative to that of R134a of 152% or more, (4) a discharge temperature of 90.0° C. or less, and (5) a critical temperature of 81° C. or more.

In a case where the refrigerant 3 consists only of HFO-1132(E) and HFO-1234yf, further preferably, the content rate of HFO-1132(E) is 34.0 to 37.9 mass % and the content rate of HFO-1234yf is 66.0 to 62.1 mass % based on the total mass of HFO-1132(E) and HFO-1234yf. In such a case, the refrigerant 3, which has such a configuration, thus has various characteristics of (1) a sufficiently low GWP (100 or less), (2) a COP relative to that of R134a of 92% or more, (3) a refrigerating capacity relative to that of R134a of 153% or more, (4) a discharge temperature of 90.0° C. or less, and (5) a critical temperature of 81° C. or more.

In a case where the refrigerant 3 consists only of HFO-1132(E) and HFO-1234yf, further preferably, the content rate of HFO-1132(E) is 35.0 to 37.9 mass % and the content rate of HFO-1234yf is 65.0 to 62.1 mass % based on the total mass of HFO-1132(E) and HFO-1234yf. In such a case, the refrigerant 3, which has such a configuration, thus has various characteristics of (1) a sufficiently low GWP (100 or less), (2) a COP relative to that of R134a of 92% or more, (3) a refrigerating capacity relative to that of R134a of 155% or more, (4) a discharge temperature of 90.0° C. or less, and (5) a critical temperature of 81° C. or more.

(1-6-4) Refrigerant 4

The refrigerant included in the composition of the present disclosure includes, in one aspect, HFO-1132(E) and HFO-1234yf, and the content rate of HFO-1132(E) is 21.0 to 28.4 mass % and the content rate of HFO-1234yf is 79.0 to 71.6 mass % based on the total mass of HFO-1132(E) and HFO-1234yf. The refrigerant is sometimes referred to as "refrigerant 4".

The refrigerant 4, which has such a configuration, thus has various characteristics of (1) a sufficiently low GWP (100 or less), (2) a COP comparable with that of R1234yf, and (3) a refrigerating capacity relative to that of R1234yf of 140% or more, and (4) lower flammability (Class 2L) according to ASHRAE Standard. Furthermore, in such a case, the refrigerant 4 has a saturation pressure at a saturation temperature of −10° C., of 0.380 MPa or more and 0.420 MPa or less, and can be applied to a commercially available refrigerating apparatus for R1234yf without any significant change in design.

The content rate of HFO-1132(E) is 21.0 mass or more based on the total mass of HFO-1132(E) and HFO-1234yf in the refrigerant 4, thereby allowing a refrigerating capacity relative to that of R1234yf of 140% or more to be obtained. The content rate of HFO-1132(E) is 28.4 mass % or less based on the total mass of HFO-1132(E) and HFO-1234yf in the refrigerant 4, thereby allowing a critical temperature of 83.5° C. or more to be easily ensured.

The refrigerating capacity relative to that of R1234yf in the refrigerant 4 may be 140% or more, and is preferably 142, or more, more preferably 143% or more, further preferably 145% or more, particularly preferably 146% or more.

The refrigerant 4 has a GWP of 100 or less, and thus can remarkably suppress the environmental load from the viewpoint of global warming as compared with other general-purpose refrigerants.

The refrigerant 4 is preferably high in ratio of the driving force consumed in the refrigeration cycle and the refrigerating capacity (coefficient of performance (COP)), relative to that of R1234yf, from the viewpoint of energy consumption efficiency, and specifically, the COP relative to that of R1234yf is preferably 95% or more, more preferably 96% or more, further preferably 97% or more, particularly preferably 98% or more.

The content rate of HFO-1132(E) is preferably 21.5 to 28.0 mass % and the content rate of HFO-1234yf is preferably 78.5 to 72.0 mass % based on the total mass of HFO-1132(E) and HFO-1234yf in the refrigerant 4. In such a case, the refrigerant 4 has various characteristics of a GWP of 100 or less, a COP relative to that of R1234yf of 98% or more, a refrigerating capacity relative to that of R1234yf of 140% or more, lower flammability (Class 2L) according to ASHRAE Standard, a discharge temperature of 65.0° C. or less, and a critical temperature of 83.5° C. or more. Furthermore, in such a case, the refrigerant 4 has a saturation pressure at a saturation temperature of −10° C., of 0.383 MPa or more and 0.418 MPa or less, and can be applied to a commercially available refrigerating apparatus for R1234yf without any significant change in design.

The content rate of HFO-1132(E) is more preferably 22.0 to 27.7 mass % and the content rate of HFO-1234yf is more preferably 78.0 to 72.3 mass % based on the total mass of HFO-1132(E) and HFO-1234yf in the refrigerant 4. In such a case, the refrigerant 4 has various characteristics of a GWP of 100 or less, a COP relative to that of R1234yf of 98% or more, a refrigerating capacity relative to that of R1234yf of 140% or more, lower flammability (Class 2L) according to ASHRAE Standard, a discharge temperature of 65.0° C. or less, and a critical temperature of 83.5° C. or more. Furthermore, in such a case, the refrigerant 4 has a saturation pressure at a saturation temperature of −10° C., of 0.385 MPa or more and 0.417 MPa or less, and can be applied to a commercially available refrigerating apparatus for R1234yf without any significant change in design.

The content rate of HFO-1132(E) is further preferably 22.5 to 27.5 mass % and the content rate of HFO-1234yf is further preferably 77.5 to 72.5 mass % based on the total mass of HFO-1132(E) and HFO-1234yf in the refrigerant 4. In such a case, the refrigerant 4 has various characteristics of a GWP of 100 or less, a COP relative to that of R1234yf of 98% or more, a refrigerating capacity relative to that of R1234yf of 140% or more, lower flammability (Class 2L) according to ASHRAE Standard, a discharge temperature of 64.8° C. or less, and a critical temperature of 83.8° C. or more. Furthermore, in such a case, the refrigerant 4 has a saturation pressure at a saturation temperature of −10° C., of 0.388 MPa or more and 0.414 MPa or less, and can be applied to a commercially available refrigerating apparatus for R1234yf without any significant change in design.

The content rate of HFO-1132(E) is particularly preferably 23.0 to 27.2 mass % and the content rate of HFO-1234yf is particularly preferably 77.0 to 72.8 mass % based on the total mass of HFO-1132(E) and HFO-1234yf in the refrigerant 4. In such a case, the refrigerant 4 has various characteristics of a GWP of 100 or less, a COP relative to that of R1234yf of 98% or more, a refrigerating capacity relative to that of R1234yf of 141% or more, lower flammability (Class 2L) according to ASHRAE Standard, a discharge temperature of 64.8° C. or less, and a critical temperature of 83.8° C. or more. Furthermore, in such a case, the refrigerant 4 has a saturation pressure at a saturation temperature of −10° C., of 0.390 MPa or more and 0.414 MPa or less, and can be applied to a commercially available refrigerating apparatus for R1234yf without any significant change in design.

The content rate of HFO-1132(E) is extremely preferably 23.5 to 27.0 mass % and the content rate of HFO-1234yf is extremely preferably 76.5 to 73.0 mass % based on the total mass of HFO-1132(E) and HFO-1234yf in the refrigerant 4. In such a case, the refrigerant 4 has various characteristics of a GWP of 100 or less, a COP relative to that of R1234yf of 98% or more, a refrigerating capacity relative to that of R1234yf of 142% or more, lower flammability (Class 2L) according to ASHRAE Standard, a discharge temperature of 64.8° C. or less, and a critical temperature of 83.8° C. or more. Furthermore, in such a case, the refrigerant 4 has a saturation pressure at a saturation temperature of −10° C., of 0.390 MPa or more and 0.414 MPa or less, and can be applied to a commercially available refrigerating apparatus for R1234yf without any significant change in design.

The content rate of HFO-1132(E) is most preferably 24.0 to 26.7 mass % and the content rate of HFO-1234yf is most preferably 76.0 to 73.3 mass % based on the total mass of HFO-1132(E) and HFO-1234yf in the refrigerant 4. In such a case, the refrigerant 4 has various characteristics of a GWP of 100 or less, a COP relative to that of R1234yf of 98 or more, a refrigerating capacity relative to that of R1234yf of 144% or more, lower flammability (Class 2L) according to ASHRAE Standard, a discharge temperature of 64.6° C. or less, and a critical temperature of 84.0° C. or more. Furthermore, in such a case, the refrigerant 4 has a saturation pressure at a saturation temperature of −10° C., of 0.396 MPa or more and 0.411 MPa or less, and can be applied to a commercially available refrigerating apparatus for R1234yf without any significant change in design.

The refrigerant 4 usually has a saturation pressure at a saturation temperature of −10° C., of 0.420 MPa or less, preferably 0.418 MPa or less, more preferably 0.417 MPa or less, further preferably 0.415 MPa or less, particularly preferably 0.413 MPa or less. Such a range enables the refrigerant 4 to be applied to a commercially available refrigerating apparatus for R1234yf without any significant change in design.

The refrigerant 4 usually has a saturation pressure at a saturation temperature of −10° C., of 0.380 MPa or more, preferably 0.385 MPa or more, more preferably 0.390 MPa or more, further preferably 0.400 MPa or more, particularly preferably 0.410 MPa or more. In such a case, the refrigerant 4 can be applied to a commercially available refrigerating apparatus for R1234yf without any significant change in design.

In a case where the refrigerant 4 is used for operating the refrigeration cycle, in the present disclosure, the discharge temperature is preferably 65° C. or less, more preferably 64.8° C. or less, further preferably 64.7° C. or less, particularly preferably 64.5° C. or less from the viewpoint that the life of any member of a commercially available refrigerating apparatus for R1234yf is extended.

The refrigerant 4 is preferably used for operating a refrigeration cycle at an evaporating temperature of −75 to 5° C. in the present disclosure, from the viewpoint that a refrigerating capacity relative to that of R1234yf of 140% or more is obtained.

The evaporating temperature in the refrigeration cycle where the refrigerant 4 of the present disclosure is used is preferably 5° C. or less, more preferably 0° C. or less, further preferably −5° C. or less, particularly preferably −10° C. or less, from the viewpoint that a refrigerating capacity relative to that of R1234yf of 140% or more is obtained.

The evaporating temperature in the refrigeration cycle where the refrigerant 4 of the present disclosure is used is preferably −75° C. or more, more preferably −60° C. or more, further preferably −55° C. or more, particularly preferably −50° C. or more, from the viewpoint that a refrigerating capacity relative to that of R1234yf of 140% or more is obtained.

The evaporating temperature in the refrigeration cycle where the refrigerant 4 of the present disclosure is used is preferably −65° C. or more and 0° C. or less, more preferably −60° C. or more and −5° C. or less, further preferably −55° C. or more and −7.5° C. or less, particularly preferably −50° C. or more and −10° C. or less, from the viewpoint that a refrigerating capacity relative to that of R1234yf of 140% or more is obtained.

The discharge temperature in the refrigeration cycle where the refrigerant 4 of the present disclosure is used is preferably 65.0° C. or less, more preferably 64.9° C. or less, further preferably 64.8° C. or less, particularly preferably 64.7° C. or less, from the viewpoint that the life of any member of a commercially available refrigerating apparatus for R1234yf is extended.

In a case where the refrigerant 4 is used for operating the refrigeration cycle, in the present disclosure, a process of liquefaction (condensation) of the refrigerant is required in the refrigeration cycle, and thus the critical temperature is required to be remarkably higher than the temperature of cooling water or cooling air for liquefying the refrigerant. The critical temperature in the refrigeration cycle where the refrigerant 4 of the present disclosure is used is preferably 83.5° C. or more, more preferably 83.8° C. or more, further preferably 84.0° C. or more, particularly preferably 84.5° C. or more, from such a viewpoint.

The refrigerant 4 can further include other refrigerant, in addition to HFO-1132(E) and HFO-1234yf, as long as the above characteristics are not impaired. In such a case, the content rate of such other refrigerant in the entire refrigerant 4 is preferably 0.5 mass % or less, more preferably 0.3 mass % or less, further preferably 0.2 mass % or less, particularly preferably 0.1 mass % or less. Such other refrigerant is not limited, and can be selected from a wide range of known refrigerants widely used in the art. Such other refrigerant may be included singly or in combinations of two or more kinds thereof in the refrigerant 4.

The refrigerant 4 particularly preferably consists only of HFO-1132(E) and HFO-1234yf. In other words, the refrigerant 4 particularly preferably includes HFO-1132(E) and HFO-1234yf at a total concentration of 100 mass % in the entire refrigerant 4.

In a case where the refrigerant 4 consists only of HFO-1132(E) and HFO-1234yf, the content rate of HFO-1132(E) is usually 21.0 to 28.4 mass % and the content rate of HFO-1234yf is usually 79.0 to 71.6 mass % based on the total mass of HFO-1132(E) and HFO-1234yf. The refrigerant 4, which has such a configuration, thus has various characteristics of (1) a sufficiently low GWP (100 or less), (2) a COP comparable with that of R1234yf and (3) a refrigerating capacity relative to that of R1234yf of 140% or more, and (4) lower flammability (Class 2L) according to ASHRAE Standard. Furthermore, in such a case, the refrigerant 4 has a saturation pressure at a saturation temperature of −10° C., of 0.380 MPa or more and 0.420 MPa or less, and can be applied to a commercially available refrigerating apparatus for R1234yf without any significant change in design.

In a case where the refrigerant 4 consists only of HFO-1132(E) and HFO-1234yf, the content rate of HFO-1132(E) is preferably 21.5 to 28.0 mass % and the content rate of HFO-1234yf is preferably 78.5 to 72.0 mass %, based on the total mass of HFO-1132(E) and HFO-1234yf. In such a case, the refrigerant 4 has various characteristics of a GWP of 100 or less, a COP relative to that of R1234yf of 98% or more, a refrigerating capacity relative to that of R1234yf of 140% or more, lower flammability (Class 2L) according to ASHRAE Standard, a discharge temperature of 65.0° C. or less, and a critical temperature of 83.5° C. or more. Furthermore, in such a case, the refrigerant 4 has a saturation pressure at a saturation temperature of −10° C., of 0.383 MPa or more and 0.418 MPa or less, and can be applied to a commercially available refrigerating apparatus for R1234yf without any significant change in design.

In a case where the refrigerant 4 consists only of HFO-1132(E) and HFO-1234yf, the content rate of HFO-1132(E) is more preferably 22.0 to 27.7 mass % and the content rate of HFO-1234yf is more preferably 78.0 to 72.3 mass % based on the total mass of HFO-1132(E) and HFO-1234yf. In such a case, the refrigerant 4 has various characteristics of a GWP of 100 or less, a COP relative to that of R1234yf of 98 or more, a refrigerating capacity relative to that of R1234yf of 140% or more, lower flammability (Class 2L) according to ASHRAE Standard, a discharge temperature of 65.0° C. or less, and a critical temperature of 83.5° C. or more. Furthermore, in such a case, the refrigerant 4 has a saturation pressure at a saturation temperature of −10° C., of 0.385 MPa or more and 0.417 MPa or less, and can be applied to a commercially available refrigerating apparatus for R1234yf without any significant change in design.

In a case where the refrigerant 4 consists only of HFO-1132(E) and HFO-1234yf, the content rate of HFO-1132(E) is further preferably 22.5 to 27.5 mass % and the content rate of HFO-1234yf is further preferably 77.5 to 72.5 mass % based on the total mass of HFO-1132(E) and HFO-1234yf. In such a case, the refrigerant 4 has various characteristics of a GWP of 100 or less, a COP relative to that of R1234yf of 98% or more, a refrigerating capacity relative to that of R1234yf of 140% or more, lower flammability (Class 2L) according to ASHRAE Standard, a discharge temperature of 64.8° C. or less, and a critical temperature of 83.8° C. or more. Furthermore, in such a case, the refrigerant 4 has a saturation pressure at a saturation temperature of −10° C., of 0.388 MPa or more and 0.414 MPa or less, and can be applied to a commercially available refrigerating apparatus for R1234yf without any significant change in design.

In a case where the refrigerant 4 consists only of HFO-1132(E) and HFO-1234yf, the content rate of HFO-1132(E) is particularly preferably 23.0 to 27.2 mass % and the content rate of HFO-1234yf is particularly preferably 77.0 to 72.8 mass % based on the total mass of HFO-1132(E) and HFO-1234yf. In such a case, the refrigerant 4 has various characteristics of a GWP of 100 or less, a COP relative to that of R1234yf of 98% or more, a refrigerating capacity relative to that of R1234yf of 141% or more, lower flammability (Class 2L) according to ASHRAE Standard, a discharge temperature of 64.8° C. or less, and a critical temperature of 83.8° C. or more. Furthermore, in such a case, the refrigerant 4 has a saturation pressure at a saturation temperature of −10° C., of 0.390 MPa or more and 0.414 MPa or less, and can be applied to a commercially available refrigerating apparatus for R1234yf without any significant change in design.

In a case where the refrigerant 4 consists only of HFO-1132(E) and HFO-1234yf, the content rate of HFO-1132(E) is extremely preferably 23.5 to 27.0 mass % and the content rate of HFO-1234yf is extremely preferably 76.5 to 73.0 mass % based on the total mass of HFO-1132(E) and HFO-1234yf. In such a case, the refrigerant 4 has various characteristics of a GWP of 100 or less, a COP relative to that of R1234yf of 98% or more, a refrigerating capacity relative to that of R1234yf of 142% or more, lower flammability (Class 2L) according to ASHRAE Standard, a discharge temperature of 64.8° C. or less, and a critical temperature of 83.8° C. or more. Furthermore, in such a case, the refrigerant 4 has a saturation pressure at a saturation temperature of −10° C., of 0.390 MPa or more and 0.414 MPa or less, and can be applied to a commercially available refrigerating apparatus for R1234yf without any significant change in design.

In a case where the refrigerant 4 consists only of HFO-1132(E) and HFO-1234yf, the content rate of HFO-1132(E) is most preferably 24.0 to 26.7 mass % and the content rate of HFO-1234yf is most preferably 76.0 to 73.3 mass % based on the total mass of HFO-1132(E) and HFO-1234yf. In such a case, the refrigerant 4 has various characteristics of a GWP of 100 or less, a COP relative to that of R1234yf of 98% or more, a refrigerating capacity relative to that of R1234yf of 144% or more, lower flammability (Class 2L) according to ASHRAE Standard, a discharge temperature of 64.6° C. or less, and a critical temperature of 84.0° C. or more. Furthermore, in such a case, the refrigerant 4 has a saturation pressure at a saturation temperature of −10° C., of 0.396 MPa or more and 0.411 MPa or less, and can be applied to a commercially available refrigerating apparatus for R1234yf without any significant change in design.

(1-6-5) Refrigerant 5

The refrigerant included in the composition of the present disclosure includes, in one aspect, HFO-1132(E) and HFO-1234yf, and the content rate of HFO-1132(E) is 12.1 to 72.0 mass and the content rate of HFO-1234yf is 87.9 to 28.0 mass % based on the total mass of HFO-1132(E) and HFO-1234yf. The refrigerant is sometimes referred to as "refrigerant 5".

In the present disclosure, the refrigerant 5 is used for in-car air conditioning equipment.

The refrigerant 5, which has such a configuration, thus has various characteristics of (1) a sufficiently low GWP (100 or less), (2) a COP comparable with that of R1234yf, (3) a refrigerating capacity relative to that of R1234yf of 128% or more, and (4) a flame velocity of less than 10.0 cm/s.

The content rate of HFO-1132(E) is 12.1 mass % or more based on the total mass of HFO-1132(E) and HFO-1234yf in the refrigerant 5, and thus a boiling point of −40° C. or less can be ensured which is favorable in a case where heating is made by using a heat pump in an electric car. Herein, a boiling point of −40° C. or less means that the saturation pressure at −40° C. is equal to or more than atmospheric pressure, and such a lower boiling point of −40° C. or less is preferable in the above applications. The content rate of HFO-1132(E) is 72.0 mass % or less based on the total mass of HFO-1132(E) and HFO-1234yf in the refrigerant 5, and thus a flame velocity of less than 10.0 cm/s can be ensured which contributes to safety in the case of use in in-car air conditioning equipment.

The refrigerating capacity relative to that of R1234yf in the refrigerant 5 may be 128% or more, and is preferably 130% or more, more preferably 140% or more, further preferably 150% or more, particularly preferably 160% or more.

The refrigerant 5 has a GWP of 5 or more and 100 or less, and thus can remarkably suppress the environmental load from the viewpoint of global warming as compared with other general-purpose refrigerants.

The ratio of the driving force consumed in the refrigeration cycle and the refrigerating capacity (coefficient of performance (COP)), relative to that of R1234yf, in the refrigerant 5 may be 100% or more from the viewpoint of energy consumption efficiency.

The refrigerant 5 is used in in-car air conditioning equipment, and thus an advantage is that heating can be made by a heat pump lower in consumption power as compared with an electric heater.

The air conditioning equipment with the refrigerant 5 is preferably for a gasoline-fueled car, a hybrid car, an electric car or a hydrogen-fueled car. In particular, the air conditioning equipment with the refrigerant 5 is particularly preferably for an electric car, from the viewpoint that not only heating in a vehicle interior is made by a heat pump, but also the travel distance of such a car is enhanced. That is, the refrigerant 5 is particularly preferably used in an electric car, in the present disclosure.

The refrigerant 5 is used in in-car air conditioning equipment, in the present disclosure. The refrigerant 5 is preferably used in air conditioning equipment of a gasoline-fueled car, air conditioning equipment of a hybrid car, air conditioning equipment of an electric car or air conditioning equipment of a hydrogen-fueled car, in the present disclosure. The refrigerant 5 is particularly preferably used in air conditioning equipment of an electric car, in the present disclosure.

Since a pressure equal to or more than atmospheric pressure at −40° C. is required in heating of a vehicle interior by a heat pump, the refrigerant 5 preferably has a boiling point of −51.2 to −40.0° C., more preferably −50.0 to −42.0° C., further preferably −48.0 to −44.0° C., in the present disclosure.

The content rate of HFO-1132(E) is preferably 15.0 to 65.0 mass % and the content rate of HFO-1234yf is preferably 85.0 to 35.0 mass % based on the total mass of HFO-1132(E) and HFO-1234yf in the refrigerant 5.

The content rate of HFO-1132(E) is more preferably 20.0 to 55.0 mass % and the content rate of HFO-1234yf is more preferably 80.0 to 45.0 mass % based on the total mass of HFO-1132(E) and HFO-1234yf in the refrigerant 5.

The content rate of HFO-1132(E) is further preferably 25.0 to 50.0 mass % and the content rate of HFO-1234yf is further preferably 75.0 to 50.0 mass % based on the total mass of HFO-1132(E) and HFO-1234yf in the refrigerant 5.

The content rate of HFO-1132(E) is particularly preferably 30.0 to 45.0 mass % and the content rate of HFO-1234yf is particularly preferably 70.0 to 55.0 mass % based on the total mass of HFO-1132(E) and HFO-1234yf in the refrigerant 5.

The content rate of HFO-1132(E) is most preferably 35.0 to 40.0 mass % and the content rate of HFO-1234yf is most preferably 65.0 to 60.0 mass % based on the total mass of HFO-1132(E) and HFO-1234yf in the refrigerant 5.

The refrigerant 5 preferably has a flame velocity of less than 10.0 cm/s, more preferably less than 5.0 cm/s, further preferably less than 3.0 cm/s, particularly preferably 2.0 cm/s, in the present disclosure.

The refrigerant 5 is preferably used for operating a refrigeration cycle at an evaporating temperature of −40 to 10° C. in the present disclosure, from the viewpoint that a refrigerating capacity equivalent to or more than that of R1234yf is obtained.

In a case where the refrigerant 5 is used for operating the refrigeration cycle, in the present disclosure, the discharge temperature is preferably 79° C. or less, more preferably 75° C. or less, further preferably 70° C. or less, particularly preferably 67° C. or less.

The refrigerant 5 may usually include 99.5 mass % or more of HFO-1132(E) and HFO-1234yf in terms of the sum of the concentrations of these components. In the present disclosure, the total amount of HFO-1132(E) and HFO-1234yf in the entire refrigerant 5 is preferably 99.7 mass % or more, more preferably 99.8 mass % or more, further preferably 99.9 mass % or more.

The refrigerant 5 can further include other refrigerant, in addition to HFO-1132(E) and HFO-1234yf, as long as the above characteristics are not impaired. In such a case, the content rate of such other refrigerant in the entire refrigerant 5 is preferably 0.5 mass % or less, more preferably 0.3 mass % or less, further preferably 0.2 mass % or less, particularly preferably 0.1 mass % or less. Such other refrigerant is not limited, and can be selected from a wide range of known refrigerants widely used in the art. Such other refrigerant may be included singly or in combinations of two or more kinds thereof in the refrigerant 5.

The refrigerant 5 particularly preferably consists only of HFO-1132(E) and HFO-1234yf. In other words, the refrigerant 5 particularly preferably includes HFO-1132(E) and HFO-1234yf at a total concentration of 100 mass % in the entire refrigerant 5.

In a case where the refrigerant 5 consists only of HFO-1132(E) and HFO-1234yf, the content rate of HFO-1132(E) is usually 12.1 to 72.0 mass % and the content rate of HFO-1234yf is usually 87.9 to 28.0 mass % based on the total mass of HFO-1132(E) and HFO-1234yf.

In a case where the refrigerant 5 consists only of HFO-1132(E) and HFO-1234yf, the content rate of HFO-1132(E) is preferably 15.0 to 65.0 mass % and the content rate of HFO-1234yf is preferably 85.0 to 35.0 mass % based on the total mass of HFO-1132(E) and HFO-1234yf.

In a case where the refrigerant 5 consists only of HFO-1132(E) and HFO-1234yf, the content rate of HFO-1132(E) is more preferably 20.0 to 55.0 mass % and the content rate of HFO-1234yf is more preferably 80.0 to 45.0 mass % based on the total mass of HFO-1132(E) and HFO-1234yf.

In a case where the refrigerant 5 consists only of HFO-1132(E) and HFO-1234yf, the content rate of HFO-1132(E) is further preferably 25.0 to 50.0 mass % and the content rate of HFO-1234yf is further preferably 75.0 to 50.0 mass % based on the total mass of HFO-1132(E) and HFO-1234yf.

In a case where the refrigerant 5 consists only of HFO-1132(E) and HFO-1234yf, the content rate of HFO-1132(E) is particularly preferably 30.0 to 45.0 mass % and the content rate of HFO-1234yf is particularly preferably 70.0 to 55.0 mass % based on the total mass of HFO-1132(E) and HFO-1234yf.

In a case where the refrigerant 5 consists only of HFO-1132(E) and HFO-1234yf, the content rate of HFO-1132(E) is most preferably 35.0 to 40.0 mass % and the content rate of HFO-1234yf is most preferably 65.0 to 60.0 mass % based on the total mass of HFO-1132(E) and HFO-1234yf.

(1-6-6) Use

As a working fluid, a composition that contains any of the refrigerants of the present disclosure can be widely used for the use of an existing refrigerant in, for example, 1) a refrigeration method including the step of operating a refrigeration cycle and 2) a method of operating a refrigeration apparatus that operates the refrigeration cycle.

Here, the refrigeration cycle above means energy conversion by causing the refrigerants (the refrigerant 1, the refrigerant 2, the refrigerant 3, the refrigerant 4, and the refrigerant 5 of the present disclosure) that flow to circulate inside the refrigeration apparatus by the compressor with the refrigerants being in an only refrigerant state or a refrigerant composition state or a refrigerating-machine-oil-containing working fluid state.

Although a composition that contains any of the refrigerants of the present disclosure is not limited to certain compositions, the composition is suitable for use in a vapor compression refrigeration cycle. The vapor compression refrigeration cycle is a cycle in which (1) a refrigerant in a gaseous state is compressed by a compressor, (2) the refrigerant is cooled by a condenser and the state of the refrigerant is changed to a liquid state having high pressure, (3) the pressure of the refrigerant is decreased by an expansion valve, and further (4) the refrigerant is vaporized at a low temperature at an evaporator to take away heat by vaporization heat. Based on the method of compressing the refrigerant in the gaseous state, devices can be grouped into turbo (centrifugal type) compressors, reciprocating compressors, twin screw compressors, single screw compressors, scroll compressors, and the like, and can be selected based on heat capacity, compression ratio, and size.

Although a composition that contains any of the refrigerants of the present disclosure is not limited to certain compositions, the composition is suitable as a refrigerant that is used in a large chiller refrigerating machine, in particular, a turbo (centrifugal type) compressor.

The present disclosure includes, for example, the use of the refrigerants (or the compositions that contain any of the refrigerants) of the present disclosure in the refrigeration method, the use of the refrigerants (or the compositions that contain any of the refrigerants) of the present disclosure in the method of operating, for example, the refrigeration apparatus, and the refrigeration apparatus that has any of the refrigerants (or the compositions that contain any of the refrigerants) of the present disclosure.

A composition that contains refrigerant 1 of the present disclosure is used for operating the refrigeration cycle in which the evaporation temperature is −75 to −5° C.

When the composition that contains refrigerant 1 of the present disclosure is used for operating the refrigeration cycle in which the evaporation temperature is −75 to −5° C., a refrigerating capacity that is greater than or equal to the refrigerating capacity of R404A can be realized.

In the refrigeration cycle in which the composition that contains refrigerant 1 of the present disclosure is used, the evaporation temperature is desirably −7.5° C. or less, more desirably, −10° C. or less, and even more desirably, −35° C. or less.

In the refrigeration cycle in which the composition that contains refrigerant 1 of the present disclosure is used, the evaporation temperature is desirably −65° C. or greater, more desirably, −60° C. or greater, even more desirably, −55° C. or greater, and particularly desirably, −50° C. or greater.

From the viewpoint that a refrigerating capacity that is greater than or equal to the refrigerating capacity of R404A is obtained, it is desirable to use a composition that contains refrigerant 2 of the present disclosure for operating the refrigeration cycle in which the evaporation temperature is −75 to 5° C.

In the refrigeration cycle in which the composition that contains refrigerant 2 of the present disclosure is used, the evaporation temperature is desirably 0° C. or less, more desirably, −5° C. or less, even more desirably, −7.5° C. or less, and particularly desirably, −10° C. or less.

In the refrigeration cycle in which the composition that contains refrigerant 2 of the present disclosure is used, the evaporation temperature is desirably −65° C. or greater, more desirably, −60° C. or greater, even more desirably, −55° C. or greater, and particularly desirably, −50° C. or greater.

From the viewpoint that a refrigerating capacity that is greater than or equal to the refrigerating capacity of R134a is obtained, it is desirable to use a composition that contains refrigerant 3 of the present disclosure for operating the refrigeration cycle in which the evaporation temperature is −75 to 15° C.

In the refrigeration cycle in which a composition that contains refrigerant 3 of the present disclosure is used, the evaporation temperature is desirably 15° C. or less, more desirably, 5° C. or less, even more desirably, 0° C. or less, and particularly desirably, −5° C. or less.

In the refrigeration cycle in which the composition that contains refrigerant 3 of the present disclosure is used, the evaporation temperature is desirably −65° C. or greater, more desirably, −60° C. or greater, even more desirably, −55° C. or greater, and particularly desirably, −50° C. or greater.

In the refrigeration cycle in which the composition that contains refrigerant 3 of the present disclosure is used, the evaporation temperature is desirably −65° C. or greater and 15° C. or less, more desirably, −60° C. or greater and 5° C. or less, even more desirably, −55° C. or greater and 0° C. or less, and particularly desirably, −50° C. or greater and −5° C. or less.

From the viewpoint that a refrigerating capacity that is greater than or equal to 140% of the refrigerating capacity of R1234yf is obtained, it is desirable to use a composition that contains refrigerant 4 of the present disclosure for operating the refrigeration cycle in which the evaporation temperature is −75 to 20° C.

In the refrigeration cycle in which the composition that contains refrigerant 4 of the present disclosure is used, from the viewpoint that a refrigerating capacity that is greater than or equal to 140% of the refrigerating capacity of R1234yf is obtained, the evaporation temperature is desirably 20° C. or less, more desirably, 10° C. or less, even more desirably, 0° C. or less, and particularly desirably, −10° C. or less.

In the refrigeration cycle in which the composition that contains refrigerant 4 of the present disclosure is used, from the viewpoint that a refrigerating capacity that is greater than or equal to 140% of the refrigerating capacity of R1234yf is obtained, the evaporation temperature is desirably −75° C. or greater, more desirably, −60° C. or greater, even more desirably, −55° C. or greater, and particularly desirably, −50° C. or greater.

As the refrigeration apparatus to which refrigerant 1, refrigerant 2, refrigerant 3, and refrigerant 4 (or compositions that contain any of these refrigerants) of the present disclosure are applicable, desirable examples include air conditioner, refrigerator, freezer, water cooler, ice-making machine, refrigerated display case, freezing display case, freezing refrigerating unit, refrigerating machine for freezing refrigerating warehouse, vehicle-installed air conditioner, turbo refrigerating machine, and screw refrigerating machine. Among these, vehicle-installed air conditioner is more desirable. Among the vehicle-installed air conditioner, air conditioner for gasoline car, air conditioner for hybrid car, air conditioner for electric car, or air conditioner for hydrogen car are even more desirable. Among the vehicle-installed air conditioner, air conditioner for electric car is particularly desirable.

A composition that contains refrigerant 1 or refrigerant 2 of the present disclosure is suitable for use as an alternative refrigerant to R12, R22, R134a, R404A, R407A, R407C, R407F, R407H, R410A, R413A, R417A, R422A, R422B, R422C, R422D, R423A, R424A, R426A, R427A, R430A, R434A, R437A, R438A, R448A, R449A, R449B, R449C, R452A, R452B, R454A, R454B, R454C, R455A, R465A, R502, R507, or R513A. The composition that contains refrigerant 1 or refrigerant 2 of the present disclosure is more suitable for use as an alternative refrigerant to R22, R404A, R407F, R407H, R448A, R449A, R454C, R455A, or R465A. Further, since the composition that contains refrigerant 1 or refrigerant 2 of the present disclosure has a refrigerating capacity that is equal to the refrigerating capacity of R404A that is currently generally used, and has a sufficiently small GWP, the composition that contains refrigerant 1 or refrigerant 2 of the present disclosure is particularly suitable for use as an alternative refrigerant to R404A.

A composition that contains refrigerant 3 of the present disclosure is suitable for use as an alternative refrigerant to R134a, R1234yf, or $CO_2$. The composition that contains refrigerant 3 of the present disclosure is more suitable for use as an alternative refrigerant to R134a. Further, since the composition that contains refrigerant 3 of the present disclosure has a refrigerating capacity that is greater than or equal to 150% of the refrigerating capacity of R134a that is currently generally used, and has a sufficiently small GWP, the composition that contains refrigerant 3 of the present disclosure is particularly suitable for use as an alternative refrigerant to R134a.

A composition that contains refrigerant 4 of the present disclosure is suitable for use as an alternative refrigerant to R12, R22, R134a, R404A, R407A, R407C, R407F, R407H, R410A, R413A, R417A, R422A, R422B, R422C, R422D, R423A, R424A, R426A, R427A, R430A, R434A, R437A, R438A, R448A, R449A, R449B, R449C, R452A, R452B, R454A, R454B, R454C, R455A, R465A, R502, R507, R513A, R1234yf, or R1234ze. The composition that contains refrigerant 4 of the present disclosure is more suitable for use as an alternative refrigerant to R12, R134a, R404A, R407C, R449C, R454C, R1234yf, or R1234ze. Further, since the composition that contains refrigerant 4 of the present disclosure has a refrigerating capacity that is greater than or equal to 140% of the refrigerating capacity of R1234yf that is currently generally used, and has a sufficiently small GWP, the composition that contains refrigerant 4 of the present disclosure is particularly suitable for use as an alternative refrigerant to R1234yf.

A composition that contains refrigerant 5 of the present disclosure is suitable for use as an alternative refrigerant to R12, R22, R134a, R404A, R407A, R407C, R407F, R407H, R410A, R413A, R417A, R422A, R422B, R422C, R422D, R423A, R424A, R426A, R427A, R430A, R434A, R437A, R438A, R448A, R449A, R449B, R449C, R452A, R452B, R454A, R454B, R454C, R455A, R465A, R502, R507, R513A, R1234yf, or R1234ze. The composition that contains refrigerant 5 of the present disclosure is more suitable for use as an alternative refrigerant to R12, R134a, or R1234yf. Further, since the composition that contains refrigerant 5 of the present disclosure has a refrigerating capacity that is greater than or equal to 140, of the refrigerating capacity of R1234yf that is currently generally used, and has a sufficiently small GWP, the composition that contains refrigerant 5 of the present disclosure is particularly suitable for use as an alternative refrigerant to R1234yf.

It is desirable to use the composition that contains refrigerant 5 of the present disclosure in a vehicle-installed air conditioner. It is desirable that the vehicle-installed air conditioner be an air conditioner for a gasoline car, an air conditioner for a hybrid car, an air conditioner for an electric car, or an air conditioner for a hydrogen car. Among these air conditioners, it is particularly desirable that the vehicle-installed air conditioner be an air conditioner for an electric car. That is, in the present disclosure, it is particularly desirable that the composition that contains refrigerant 5 be used in an electric car.

EXAMPLES

Hereinafter, the refrigerant 1, the refrigerant 2, the refrigerant 3, the refrigerant 4 and the refrigerant 5 will be described with reference to Examples in more detail. It is noted that the present disclosure is not limited to such Examples.

Test Example 1-1

The GWP of each mixed refrigerant represented in Examples 1-1 to 1-13, Comparative Examples 1-1 to 1-2 and Reference Example 1-1 (R404A) was evaluated based on the value in the fourth report of IPCC.

The COP, the refrigerating capacity, the discharge temperature, the saturation pressure at a saturation temperature of 40° C., the condensation pressure and the evaporating pressure of such each mixed refrigerant were determined by performing theoretical refrigeration cycle calculation with respect to such each mixed refrigerant under the following conditions by using National Institute of Science and Technology (NIST) and Reference Fluid Thermodynamic and Transport Properties Database (Refprop 9.0).

Evaporating temperature −50° C.
Condensation temperature 40° C.
Superheating temperature 20 K
Subcooling temperature 0 K
Compressor efficiency 70%

An "evaporating temperature of −50° C." means that the evaporating temperature of such each mixed refrigerant in an evaporator included in a refrigerating apparatus is −50° C. A "condensation temperature of 40° C." means that the condensation temperature of such each mixed refrigerant in a condenser included in a refrigerating apparatus is 40° C.

The results in Test Example 1-1 are shown in Table 101. Table 101 shows Examples and Comparative Examples of the refrigerant 1 of the present disclosure. In Table 101, the "COP ratio" and the "Refrigerating capacity ratio" each represent the proportion (%) relative to that of R404A.

In Table 101, the "Saturation pressure (40° C.)" represents the saturation pressure at a saturation temperature of 40° C. In Table 217, the "Discharge temperature (° C.)" represents the temperature at which the highest temperature in the refrigeration cycle is achieved in theoretical refrigeration cycle calculation with respect to such each mixed refrigerant.

The coefficient of performance (COP) was determined according to the following expression.

COP=(Refrigerating capacity or heating capacity)/Power consumption

The compression ratio was determined by the following expression.

Compression ratio=Condensation pressure (Mpa)/Evaporating pressure (Mpa)

The flammability of such each mixed refrigerant was determined by defining the mixed composition of such each mixed refrigerant as the WCF concentration, and measuring the flame velocity according to ANSI/ASHRAE Standard 34-2013. One having a flame velocity of 0 cm/s to 10 cm/s was rated as "Class 2L (lower flammability)", one having a flame velocity of more than 10 cm/s was rated as "Class 2 (low flammability)", and one causing no flame propagation was rated as "Class 1 (non-flammability)". In Table 217, the "ASHRAE flammability classification" shows each result based on the criteria for determination.

The flame velocity test was performed as follows. First, the mixed refrigerant used had a purity of 99.5% or more, and degassing was made by repeating a cycle of freezing, pumping and thawing until no trace of air was observed on a vacuum gauge. The flame velocity was measured by a closed method. The initial temperature was ambient temperature. Ignition was performed by generating an electric spark between electrodes at the center of a sample cell. The duration of discharge was 1.0 to 9.9 ms, and the ignition energy was typically about 0.1 to 1.0 J. The spread of any flame was visualized using a schlieren photograph. A cylindrical container (inner diameter: 155 mm, length: 198 mm) equipped with two light-transmitting acrylic windows was used as the sample cell, and a xenon lamp was used as a light source. A schlieren image of any flame was recorded by a high-speed digital camera at a frame rate of 600 fps, and stored in a PC.

The flammable range of the mixed refrigerant was measured by using an apparatus (see FIG. 1) based on ASTM E681-09.

Specifically, a spherical glass flask having an internal volume of 12 L was used so that the state of flame could be visually observed, and recorded and imaged, and the glass flask was set so that any gas was released through a lid at the top when an excess pressure was generated due to flame. The ignition method was made by generating ignition due to discharge from an electrode held at a height of ⅓ from the bottom.

<Test Conditions>

Test container: spherical container of 280 mm in diameter (internal volume: 12 L)

Test temperature: 60° C.±3° C.

Pressure: 101.3 kPa±0.7 kPa

Water content: 0.0088 g±0.0005 g per gram of dry air (water content at a humidity of 50% at 23° C.)

Mixing ratio of refrigerant composition/air: ±0.2 vol. % by 1 vol. %

Mixing of refrigerant composition: ±0.1 mass %

Ignition method: AC discharge, voltage 15 kV, current 30 mA, neon transformer

Electrode interval: 6.4 mm (¼ inches)

Spark: 0.4 seconds±0.05 seconds

Criteria for determination:

A case where any flame was spread at more than 90 degrees around the ignition point: flame propagation (flammability)

A case where any flame was spread at 90 degrees or less around the ignition point: no flame propagation (non-flammability)

TABLE 101

| Item | | Unit | Reference Example 1-1 (R404A) | Comparative Example 1-1 | Example 1-1 | Example 1-2 | Example 1-3 | Example 1-4 | Example 1-5 | Example 1-6 |
|---|---|---|---|---|---|---|---|---|---|---|
| Composition proportions | HFO-1132(E) | mass % | 0 | 30.0 | 40.0 | 40.5 | 41.3 | 43.0 | 45.0 | 47.0 |
| | HFO-1234yf | mass % | 0 | 70.0 | 60.0 | 59.5 | 58.7 | 57.0 | 55.0 | 53.0 |
| | HFC-134a | mass % | 4.0 | 0 | 0 | 0 | 0 | 0 | 0 | 0 |
| | HFC-143a | mass % | 52.0 | 0 | 0 | 0 | 0 | 0 | 0 | 0 |
| | HFC-125 | mass % | 44.0 | 0 | 0 | 0 | 0 | 0 | 0 | 0 |
| GWP (AR4) | | — | 3922 | 6 | 6 | 6 | 6 | 7 | 7 | 7 |
| Discharge temperature | | ° C. | 100.6 | 108.6 | 114.7 | 115.0 | 115.5 | 116.5 | 117.6 | 118.8 |
| Saturation pressure (40° C.) | | MPa | 1.822 | 1.592 | 1.745 | 1.752 | 1.764 | 1.788 | 1.817 | 1.844 |
| Evaporating pressure | | MPa | 0.082 | 0.063 | 0.072 | 0.073 | 0.074 | 0.075 | 0.077 | 0.079 |
| Compression ratio | | — | 22.2 | 25.3 | 24.1 | 24.0 | 23.9 | 23.8 | 23.6 | 23.4 |
| COP ratio (relative to that of R404A) | | % | 100 | 106.2 | 106.2 | 106.2 | 106.2 | 106.2 | 106.2 | 106.2 |
| Refrigerating capacity rate (relative to that of R404A) | | % | 100 | 86.2 | 98.5 | 99.1 | 100 | 102.1 | 104.5 | 106.9 |
| ASHRAE flammability classification | | — | Class 1 | Class 2L | Class 2L | Class 2L | Class 2L | Class 2L | Class 2L | Class 2L |

| Item | | Example 1-7 | Example 1-8 | Example 1-9 | Example 1-10 | Example 1-11 | Example 1-12 | Example 1-13 | Comparative Example 1-2 |
|---|---|---|---|---|---|---|---|---|---|
| Composition proportions | HFO-1132(E) | 49.2 | 51.0 | 53.5 | 55.0 | 57.0 | 59.0 | 60.0 | 70.0 |
| | HFO-1234yf | 50.8 | 49.0 | 46.5 | 45.0 | 43.0 | 41.0 | 40.0 | 30.0 |
| | HFC-134a | 0 | 0 | 0 | 0 | 0 | 0 | 0 | 0 |
| | HFC-143a | 0 | 0 | 0 | 0 | 0 | 0 | 0 | 0 |
| | HFC-125 | 0 | 0 | 0 | 0 | 0 | 0 | 0 | 0 |
| GWP (AR4) | | 7 | 7 | 7 | 7 | 7 | 8 | 8 | 8 |
| Discharge temperature | | 120.0 | 121.0 | 122.4 | 123.3 | 124.4 | 125.5 | 126.0 | 131.7 |
| Saturation pressure (40° C.) | | 1.874 | 1.898 | 1.931 | 1.950 | 1.975 | 2.000 | 2.012 | 2.128 |
| Evaporating pressure | | 0.081 | 0.083 | 0.085 | 0.086 | 0.088 | 0.090 | 0.091 | 0.099 |
| Compression ratio | | 23.1 | 23.0 | 22.8 | 22.6 | 22.5 | 22.3 | 22.2 | 21.6 |
| COP ratio (relative to that of R404A) | | 106.2 | 106.3 | 106.3 | 106.3 | 106.3 | 106.4 | 106.4 | 106.7 |
| Refrigerating capacity rate (relative to that of R404A) | | 109.5 | 111.7 | 114.6 | 116.4 | 118.7 | 121 | 122.2 | 133.3 |
| ASHRAE flammability classification | | Class 2L | Class 2L | Class 2L | Class 2 | Class 2 | Class 2 | Class 2 | Class 2 |

Test Example 1-2

The GWP of each mixed refrigerant represented in Examples 1-14 to 1-26, Comparative Examples 1-3 to 1-4 and Reference Example 1-2 (R404A) was evaluated based on the value in the fourth report of IPCC.

The COP, the refrigerating capacity, the discharge temperature, the saturation pressure at a saturation temperature of 40° C., the condensation pressure and the evaporating pressure of such each mixed refrigerant were determined by performing theoretical refrigeration cycle calculation with respect to such each mixed refrigerant under the following conditions by using NIST and Refprop 9.0.

| | |
|---|---|
| Evaporating temperature | −35° C. |
| Condensation temperature | 40° C. |
| Superheating temperature | 20 K |
| Subcooling temperature | 0 K |
| Compressor efficiency | 70% |

The meaning of each of the above terms is the same as in Test Example 1-1.

The results in Test Example 1-2 are shown in Table 102. Table 102 shows Examples and Comparative Examples of the refrigerant 1 of the present disclosure. In Table 102, the meaning of each of the terms is the same as in Test Example 1-1.

The coefficient of performance (COP) and the compression ratio were determined in the same manner as in Test Example 1-1.

The flammability of such each mixed refrigerant was determined in the same manner as in Test Example 1-1. The flame velocity test was performed in the same manner as in Test Example 1-1.

The flammable range of the mixed refrigerant was measured by using a measurement apparatus (see FIG. 1) based on ASTM E681-09, with the same method and test conditions as in Test Example 1-1.

TABLE 102

| Item | | Unit | Reference Example 1-2 (R404A) | Comparative Example 1-3 | Example 1-14 | Example 1-15 | Example 1-16 | Example 1-17 | Example 1-18 | Example 1-19 |
|---|---|---|---|---|---|---|---|---|---|---|
| Composition proportions | HFO-1132(E) | mass % | 0 | 30.0 | 40.0 | 40.5 | 41.3 | 43.0 | 45.0 | 47.0 |
| | HFO-1234yf | mass % | 0 | 70.0 | 60.0 | 59.5 | 58.7 | 57.0 | 55.0 | 53.0 |
| | HFC-134a | mass % | 4.0 | 0 | 0 | 0 | 0 | 0 | 0 | 0 |
| | HFC-143a | mass % | 52.0 | 0 | 0 | 0 | 0 | 0 | 0 | 0 |
| | HFC-125 | mass % | 44.0 | 0 | 0 | 0 | 0 | 0 | 0 | 0 |
| GWP (AR4) | | — | 3922 | 6 | 6 | 6 | 6 | 7 | 7 | 7 |
| Discharge temperature | | ° C. | 89.1 | 95.8 | 100.6 | 100.8 | 101.2 | 102.0 | 102.9 | 103.8 |
| Saturation pressure (40° C.) | | MPa | 1.822 | 1.592 | 1.745 | 1.752 | 1.764 | 1.788 | 1.817 | 1.844 |
| Evaporating pressure | | MPa | 0.165 | 0.131 | 0.148 | 0.149 | 0.151 | 0.154 | 0.157 | 0.160 |
| Compression ratio | | — | 11.0 | 12.2 | 11.8 | 11.7 | 11.7 | 11.6 | 11.6 | 11.5 |
| COP ratio (relative to that of R404A) | | % | 100 | 105.1 | 104.8 | 104.7 | 104.7 | 104.7 | 104.6 | 104.5 |
| Refrigerating capacity rate (relative to that of R404A) | | % | 100 | 87.7 | 98.5 | 99.0 | 99.8 | 101.6 | 103.7 | 105.7 |
| ASHRAE flammability classification | | — | Class 1 | Class 2L | Class 2L | Class 2L | Class 2L | Class 2L | Class 2L | Class 2L |

| Item | | Example 1-20 | Example 1-21 | Example 1-22 | Example 1-23 | Example 1-24 | Example 1-25 | Example 1-26 | Comparative Example 1-4 |
|---|---|---|---|---|---|---|---|---|---|
| Composition proportions | HFO-1132(E) | 49.2 | 51.0 | 53.5 | 55.0 | 57.0 | 59.0 | 60.0 | 70.0 |
| | HFO-1234yf | 50.8 | 49.0 | 46.5 | 45.0 | 43.0 | 41.0 | 40.0 | 30.0 |
| | HFC-134a | 0 | 0 | 0 | 0 | 0 | 0 | 0 | 0 |
| | HFC-143a | 0 | 0 | 0 | 0 | 0 | 0 | 0 | 0 |
| | HFC-125 | 0 | 0 | 0 | 0 | 0 | 0 | 0 | 0 |
| GWP (AR4) | | 7 | 7 | 7 | 7 | 7 | 8 | 8 | 8 |
| Discharge temperature | | 104.7 | 105.5 | 106.6 | 107.3 | 108.1 | 109.0 | 109.5 | 113.9 |
| Saturation pressure (40° C.) | | 1.874 | 1.898 | 1.931 | 1.950 | 1.975 | 2.000 | 2.012 | 2.128 |
| Evaporating pressure | | 0.164 | 0.167 | 0.171 | 0.174 | 0.177 | 0.180 | 0.181 | 0.196 |
| Compression ratio | | 11.4 | 11.4 | 11.3 | 11.2 | 11.2 | 11.1 | 11.1 | 10.8 |
| COP ratio (relative to that of R404A) | | 104.5 | 104.4 | 104.4 | 104.4 | 104.3 | 104.3 | 104.3 | 104.3 |
| Refrigerating capacity rate (relative to that of R404A) | | 108.0 | 109.8 | 112.3 | 113.8 | 115.7 | 117.7 | 118.6 | 128.0 |
| ASHRAE flammability classification | | Class 2L | Class 2L | Class 2L | Class 2 | Class 2 | Class 2 | Class 2 | Class 2 |

Test Example 1-3

The GWP of each mixed refrigerant represented in Examples 1-27 to 1-39, Comparative Examples 1-5 to 1-6 and Reference Example 1-3 (R404A) was evaluated based on the value in the fourth report of IPCC.

The COP, the refrigerating capacity, the discharge temperature, the saturation pressure at a saturation temperature of 40° C., the condensation pressure and the evaporating pressure of such each mixed refrigerant were determined by performing theoretical refrigeration cycle calculation with respect to such each mixed refrigerant under the following conditions by using NIST and Refprop 9.0.

| | |
|---|---|
| Evaporating temperature | −10° C. |
| Condensation temperature | 40° C. |
| Superheating temperature | 20 K |
| Subcooling temperature | 0 K |
| Compressor efficiency | 70% |

The meaning of each of the above terms is the same as in Test Example 1-1.

The results in Test Example 1-3 are shown in Table 103. Table 103 shows Examples and Comparative Examples of the refrigerant 1 of the present disclosure. In Table 103, the meaning of each of the terms is the same as in Test Example 1-1.

The coefficient of performance (COP) and the compression ratio were determined in the same manner as in Test Example 1-1.

The flammability of such each mixed refrigerant was determined in the same manner as in Test Example 1-1. The flame velocity test was performed in the same manner as in Test Example 1-1.

The flammable range of the mixed refrigerant was measured by using a measurement apparatus (see FIG. 1) based on ASTM E681-09, with the same method and test conditions as in Test Example 1-1.

Test Example 1-4

The GWP of each mixed refrigerant represented in Comparative Examples 1-7 to 1-21 and Reference Example 1-4 (R404A) was evaluated based on the value in the fourth report of IPCC.

The COP, the refrigerating capacity, the discharge temperature, the saturation pressure at a saturation temperature of 40° C., the condensation pressure and the evaporating pressure of such each mixed refrigerant were determined by performing theoretical refrigeration cycle calculation with respect to such each mixed refrigerant under the following conditions by using NIST and Refprop 9.0.

| | |
|---|---|
| Evaporating temperature | −80° C. |
| Condensation temperature | 40° C. |
| Superheating temperature | 20 K |
| Subcooling temperature | 0 K |
| Compressor efficiency | 70% |

The meaning of each of the above terms is the same as in Test Example 1-1.

The results in Test Example 1-4 are shown in Table 104. Table 104 shows Comparative Examples of the refrigerant 1 of the present disclosure. In Table 104, the meaning of each of the terms is the same as in Test Example 1-1.

TABLE 103

| Item | | Unit | Reference Example 1-3 (R404A) | Comparative Example 1-5 | Example 1-27 | Example 1-28 | Example 1-29 | Example 1-30 | Example 1-31 | Example 1-32 |
|---|---|---|---|---|---|---|---|---|---|---|
| Composition proportions | HFO-1132(E) | mass % | 0 | 30.0 | 40.0 | 40.5 | 41.3 | 43.0 | 45.0 | 47.0 |
| | HFO-1234yf | mass % | 0 | 70.0 | 60.0 | 59.5 | 58.7 | 57.0 | 55.0 | 53.0 |
| | HFC-134a | mass % | 4.0 | 0 | 0 | 0 | 0 | 0 | 0 | 0 |
| | HFC-143a | mass % | 52.0 | 0 | 0 | 0 | 0 | 0 | 0 | 0 |
| | HFC-125 | mass % | 44.0 | 0 | 0 | 0 | 0 | 0 | 0 | 0 |
| GWP (AR4) | | — | 3922 | 6 | 6 | 6 | 6 | 7 | 7 | 7 |
| Discharge temperature | | ° C. | 75.8 | 80.8 | 83.7 | 83.9 | 84.1 | 84.5 | 85.1 | 85.6 |
| Saturation pressure (40° C.) | | MPa | 1.822 | 1.592 | 1.745 | 1.752 | 1.764 | 1.788 | 1.817 | 1.844 |
| Evaporating pressure | | MPa | 0.434 | 0.357 | 0.399 | 0.401 | 0.404 | 0.411 | 0.419 | 0.427 |
| Compression ratio | | — | 4.2 | 4.5 | 4.4 | 4.4 | 4.4 | 4.3 | 4.3 | 4.3 |
| COP ratio (relative to that of R404A) | | % | 100 | 103.8 | 102.9 | 102.9 | 102.8 | 102.7 | 102.5 | 102.4 |
| Refrigerating capacity ratio (relative to that of R404A) | | % | 100 | 89.8 | 98.7 | 99.1 | 99.8 | 101.2 | 102.8 | 104.5 |
| ASHRAE flammability classification | | — | Class 1 | Class 2L | Class 2L | Class 2L | Class 2L | Class 2L | Class 2L | Class 2L |

| Item | | Example 1-33 | Example 1-34 | Example 1-35 | Example 1-36 | Example 1-37 | Example 1-38 | Example 1-39 | Comparative Example 1-6 |
|---|---|---|---|---|---|---|---|---|---|
| Composition proportions | HFO-1132(E) | 49.2 | 51.0 | 53.5 | 55.0 | 57.0 | 59.0 | 60.0 | 70.0 |
| | HFO-1234yf | 50.8 | 49.0 | 46.5 | 45.0 | 43.0 | 41.0 | 40.0 | 30.0 |
| | HFC-134a | 0 | 0 | 0 | 0 | 0 | 0 | 0 | 0 |
| | HFC-143a | 0 | 0 | 0 | 0 | 0 | 0 | 0 | 0 |
| | HFC-125 | 0 | 0 | 0 | 0 | 0 | 0 | 0 | 0 |
| GWP (AR4) | | 7 | 7 | 7 | 7 | 7 | 8 | 8 | 8 |
| Discharge temperature | | 86.2 | 86.6 | 87.3 | 87.7 | 88.2 | 88.7 | 88.9 | 91.5 |
| Saturation pressure (40° C.) | | 1.874 | 1.898 | 1.931 | 1.950 | 1.975 | 2.000 | 2.012 | 2.128 |
| Evaporating pressure | | 0.436 | 0.443 | 0.452 | 0.457 | 0.465 | 0.472 | 0.475 | 0.509 |
| Compression ratio | | 4.3 | 4.3 | 4.3 | 4.3 | 4.3 | 4.2 | 4.2 | 4.2 |
| COP ratio (relative to that of R404A) | | 102.2 | 102.1 | 102.0 | 101.9 | 101.8 | 101.7 | 101.6 | 101.3 |
| Refrigerating capacity ratio (relative to that of R404A) | | 106.2 | 107.7 | 109.6 | 110.8 | 112.3 | 113.8 | 114.5 | 121.7 |
| ASHRAE flammability classification | | Class 2L | Class 2L | Class 2L | Class 2 | Class 2 | Class 2 | Class 2 | Class 2 |

The coefficient of performance (COP) and the compression ratio were determined in the same manner as in Test Example 1-1.

The flammability of such each mixed refrigerant was determined in the same manner as in Test Example 1-1. The flame velocity test was performed in the same manner as in Test Example 1-1.

The flammable range of the mixed refrigerant was measured by using a measurement apparatus (see FIG. 1) based on ASTM E681-09, with the same method and test conditions as in Test Example 1-1.

| | |
|---|---|
| Evaporating temperature | 10° C. |
| Condensation temperature | 40° C. |
| Superheating temperature | 20 K |
| Subcooling temperature | 0 K |
| Compressor efficiency | 70% |

The meaning of each of the above terms is the same as in Test Example 1-1.

The results in Test Example 1-5 are shown in Table 105. Table 105 shows Comparative Examples of the refrigerant 1

TABLE 104

| Item | | Unit | Reference Example 1-4 (R404A) | Comparative Example 1-7 | Comparative Example 1-8 | Comparative Example 1-9 | Comparative Example 1-10 | Comparative Example 1-11 | Comparative Example 1-12 | Comparative Example 1-13 |
|---|---|---|---|---|---|---|---|---|---|---|
| Composition proportions | HFO-1132(E) | mass % | 0 | 30.0 | 40.0 | 40.5 | 41.3 | 43.0 | 45.0 | 47.0 |
| | HFO-1234yf | mass % | 0 | 70.0 | 60.0 | 59.5 | 58.7 | 57.0 | 55.0 | 53.0 |
| | HFC-134a | mass % | 4.0 | 0 | 0 | 0 | 0 | 0 | 0 | 0 |
| | HFC-143a | mass % | 52.0 | 0 | 0 | 0 | 0 | 0 | 0 | 0 |
| | HFC-125 | mass % | 44.0 | 0 | 0 | 0 | 0 | 0 | 0 | 0 |
| GWP (AR4) | | — | 3922 | 6 | 6 | 6 | 6 | 7 | 7 | 7 |
| Discharge temperature | | ° C. | 136.7 | 146.0 | 157.7 | 158.1 | 158.8 | 160.4 | 162.1 | 163.9 |
| Saturation pressure (40° C.) | | MPa | 1.822 | 1.592 | 1.745 | 1.752 | 1.764 | 1.788 | 1.817 | 1.844 |
| Evaporating pressure | | MPa | 0.014 | 0.011 | 0.012 | 0.012 | 0.012 | 0.012 | 0.013 | 0.013 |
| Compression ratio | | — | 134.6 | 149.1 | 150.8 | 150.2 | 149.3 | 147.2 | 145.0 | 142.8 |
| COP ratio (relative to that of R404A) | | % | 100 | 112.6 | 110.3 | 110.3 | 110.4 | 110.6 | 110.8 | 111.0 |
| Refrigerating capacity ratio (relative to that of R404A) | | % | 100 | 91.7 | 99.3 | 100.2 | 101.5 | 104.4 | 107.8 | 111.3 |
| ASHRAE flammability classification | | — | Class 1 | Class 2L | Class 2L | Class 2L | Class 2L | Class 2L | Class 2L | Class 2L |

| Item | | Comparative Example 1-14 | Comparative Example 1-15 | Comparative Example 1-16 | Comparative Example 1-17 | Comparative Example 1-18 | Comparative Example 1-19 | Comparative Example 1-20 | Comparative Example 1-21 |
|---|---|---|---|---|---|---|---|---|---|
| Composition proportions | HFO-1132(E) | 49.2 | 51.0 | 53.5 | 55.0 | 57.0 | 59.0 | 60.0 | 70.0 |
| | HFO-1234yf | 50.8 | 49.0 | 46.5 | 45.0 | 43.0 | 41.0 | 40.0 | 30.0 |
| | HFC-134a | 0 | 0 | 0 | 0 | 0 | 0 | 0 | 0 |
| | HFC-143a | 0 | 0 | 0 | 0 | 0 | 0 | 0 | 0 |
| | HFC-125 | 0 | 0 | 0 | 0 | 0 | 0 | 0 | 0 |
| GWP (AR4) | | 7 | 7 | 7 | 7 | 7 | 8 | 8 | 8 |
| Discharge temperature | | 165.8 | 167.4 | 169.6 | 170.9 | 172.6 | 174.3 | 175.2 | 184.0 |
| Saturation pressure (40° C.) | | 1.874 | 1.898 | 1.931 | 1.950 | 1.975 | 2.000 | 2.012 | 2.128 |
| Evaporating pressure | | 0.013 | 0.014 | 0.014 | 0.014 | 0.015 | 0.015 | 0.015 | 0.017 |
| Compression ratio | | 140.5 | 138.7 | 136.3 | 134.9 | 133.2 | 131.5 | 130.7 | 123.8 |
| COP ratio (relative to that of R404A) | | 111.3 | 111.4 | 111.7 | 111.9 | 112.1 | 1123 | 112.4 | 113.5 |
| Refrigerating capacity ratio (relative to that of R404A) | | 115.1 | 118.2 | 122.5 | 125.2 | 128.6 | 132.1 | 133.8 | 151.0 |
| ASHRAE flammability classification | | Class 2L | Class 2L | Class 2L | Class 2 | Class 2 | Class 2 | Class 2 | Class 2 |

Test Example 1-5

The GWP of each mixed refrigerant represented in Comparative Examples 1-22 to 1-36 and Reference Example 1-5 (R404A) was evaluated based on the value in the fourth report of IPCC.

The COP, the refrigerating capacity, the discharge temperature, the saturation pressure at a saturation temperature of 40° C., the condensation pressure and the evaporating pressure of such each mixed refrigerant were determined by performing theoretical refrigeration cycle calculation with respect to such each mixed refrigerant under the following conditions by using NIST and Refprop 9.0.

of the present disclosure. In Table 105, the meaning of each of the terms is the same as in Test Example 1-1.

The coefficient of performance (COP) and the compression ratio were determined in the same manner as in Test Example 1-1.

The flammability of such each mixed refrigerant was determined in the same manner as in Test Example 1-1. The flame velocity test was performed in the same manner as in Test Example 1-1.

The flammable range of the mixed refrigerant was measured by using a measurement apparatus (see FIG. 1) based on ASTM E681-09, with the same method and test conditions as in Test Example 1-1.

TABLE 105

| Item | | Unit | Reference Example 1-5 (R404A) | Comparative Example 1-22 | Comparative Example 1-23 | Comparative Example 1-24 | Comparative Example 1-25 | Comparative Example 1-26 | Comparative Example 1-27 | Comparative Example 1-28 |
|---|---|---|---|---|---|---|---|---|---|---|
| Composition proportions | HFO-1132(E) | mass % | 0 | 30.0 | 40.0 | 40.5 | 41.3 | 43.0 | 45.0 | 47.0 |
| | HFO-1234yf | mass % | 0 | 70.0 | 60.0 | 59.5 | 58.7 | 57.0 | 55.0 | 53.0 |
| | HFC-134a | mass % | 4.0 | 0 | 0 | 0 | 0 | 0 | 0 | 0 |
| | HFC-143a | mass % | 52.0 | 0 | 0 | 0 | 0 | 0 | 0 | 0 |
| | HFC-125 | mass % | 44.0 | 0 | 0 | 0 | 0 | 0 | 0 | 0 |
| GWP (AR4) | | — | 3922 | 6 | 6 | 6 | 6 | 7 | 7 | 7 |
| Discharge temperature | | ° C. | 68.5 | 72.4 | 74.0 | 74.1 | 74.2 | 74.4 | 74.7 | 74.9 |
| Saturation pressure (40° C.) | | MPa | 1.822 | 1.592 | 1.745 | 1.752 | 1.764 | 1.788 | 1.817 | 1.844 |
| Evaporating pressure | | MPa | 0.820 | 0.694 | 0.768 | 0.772 | 0.777 | 0.789 | 0.803 | 0.817 |
| Compression ratio | | — | 2.2 | 2.3 | 2.3 | 2.3 | 2.3 | 2.3 | 2.3 | 2.3 |
| COP ratio (relative to that of R404A) | | % | 100.0 | 103.1 | 101.9 | 101.8 | 101.7 | 101.5 | 101.3 | 101.1 |
| Refrigerating capacity ratio (relative to that of R404A) | | % | 100.0 | 91.2 | 98.9 | 99.3 | 99.8 | 101.0 | 102.5 | 103.8 |
| ASHRAE flammability classification | | — | Class 1 | Class 2L | Class 2L | Class 2L | Class 2L | Class 2L | Class 2L | Class 2L |

| Item | | Comparative Example 1-29 | Comparative Example 1-30 | Comparative Example 1-31 | Comparative Example 1-32 | Comparative Example 1-33 | Comparative Example 1-34 | Comparative Example 1-35 | Comparative Example 1-36 |
|---|---|---|---|---|---|---|---|---|---|
| Composition proportions | HFO-1132(E) | 49.2 | 51.0 | 53.5 | 55.0 | 57.0 | 59.0 | 60.0 | 70.0 |
| | HFO-1234yf | 50.8 | 49.0 | 46.5 | 45.0 | 43.0 | 41.0 | 40.0 | 30.0 |
| | HFC-134a | 0 | 0 | 0 | 0 | 0 | 0 | 0 | 0 |
| | HFC-143a | 0 | 0 | 0 | 0 | 0 | 0 | 0 | 0 |
| | HFC-125 | 0 | 0 | 0 | 0 | 0 | 0 | 0 | 0 |
| GWP (AR4) | | 7 | 7 | 7 | 7 | 7 | 8 | 8 | 8 |
| Discharge temperature | | 75.2 | 75.5 | 75.8 | 76.0 | 76.2 | 76.5 | 76.6 | 77.9 |
| Saturation pressure (40° C.) | | 1.874 | 1.898 | 1.931 | 1.950 | 1.975 | 2.000 | 2.012 | 2.128 |
| Evaporating pressure | | 0.832 | 0.844 | 0.860 | 0.870 | 0.882 | 0.895 | 0.901 | 0.959 |
| Compression ratio | | 2.3 | 2.2 | 2.2 | 2.2 | 2.2 | 2.2 | 2.2 | 2.2 |
| COP ratio (relative to that of R404A) | | 100.9 | 100.8 | 100.6 | 100.4 | 100.3 | 100.1 | 100.1 | 99.5 |
| Refrigerating capacity ratio (relative to that of R404A) | | 105.3 | 106.5 | 108.2 | 109.1 | 110.4 | 111.6 | 112.3 | 118.2 |
| ASHRAE flammability classification | | Class 2L | Class 2L | Class 2L | Class 2 | Class 2 | Class 2 | Class 2 | Class 2 |

Test Example 2-1

The GWP of each mixed refrigerant represented in Examples 2-1 to 2-6, Comparative Examples 2-1 to 2-9 and Reference Example 2-1 (R404A) was evaluated based on the value in the fourth report of IPCC.

The COP, the refrigerating capacity, the discharge temperature, the saturation pressure at a saturation temperature of 40° C., the condensation pressure and the evaporating pressure of such each mixed refrigerant were determined by performing theoretical refrigeration cycle calculation with respect to such each mixed refrigerant under the following conditions by using National Institute of Science and Technology (NIST) and Reference Fluid Thermodynamic and Transport Properties Database (Refprop 9.0).

| | |
|---|---|
| Evaporating temperature | −50° C. |
| Condensation temperature | 40° C. |
| Superheating temperature | 20 K |
| Subcooling temperature | 0 K |
| Compressor efficiency | 70% |

An "evaporating temperature of −50° C." means that the evaporating temperature of such each mixed refrigerant in an evaporator included in a refrigerating apparatus is −50° C. A "condensation temperature of 40° C." means that the condensation temperature of such each mixed refrigerant in a condenser included in a refrigerating apparatus is 40° C.

The results in Test Example 2-1 are shown in Table 106. Table 106 shows Examples and Comparative Examples of the refrigerant 2 of the present disclosure. In Table 106, the "COP ratio" and the "Refrigerating capacity ratio" each represent the proportion (%) relative to that of R404A.

In Table 106, the "Saturation pressure (40° C.)" represents the saturation pressure at a saturation temperature of 40° C. In Table 106, the "Discharge temperature (° C.)" represents the temperature at which the highest temperature in the refrigeration cycle is achieved in theoretical refrigeration cycle calculation with respect to such each mixed refrigerant.

The coefficient of performance (COP) was determined according to the following expression.

COP=(Refrigerating capacity or heating capacity)/Power consumption

The compression ratio was determined by the following expression.

Compression ratio=Condensation pressure (Mpa)/Evaporating pressure (Mpa)

The flammability of such each mixed refrigerant was determined by defining the mixed composition of such each mixed refrigerant as the WCF concentration, and measuring the flame velocity according to ANSI/ASHRAE Standard 34-2013. One having a flame velocity of 0 cm/s to 10 cm/s was rated as "Class 2L (lower flammability)", one having a flame velocity of more than 10 cm/s was rated as "Class 2 (low flammability)", and one causing no flame propagation was rated as "Class 1 (non-flammability)". In Table 106, the "ASHRAE flammability classification" shows each result based on the criteria for determination.

The flame velocity test was performed as follows. First, the mixed refrigerant used had a purity of 99.5% or more, and degassing was made by repeating a cycle of freezing, pumping and thawing until no trace of air was observed on a vacuum gauge. The flame velocity was measured by a closed method. The initial temperature was ambient temperature. Ignition was performed by generating an electric spark between electrodes at the center of a sample cell. The duration of discharge was 1.0 to 9.9 ms, and the ignition energy was typically about 0.1 to 1.0 J. The spread of any flame was visualized using a schlieren photograph. A cylindrical container (inner diameter: 155 mm, length: 198 mm) equipped with two light-transmitting acrylic windows was used as the sample cell, and a xenon lamp was used as a light source. A schlieren image of any flame was recorded by a high-speed digital video camera at a frame rate of 600 fps, and stored in a PC.

The flammable range of the mixed refrigerant was measured by using a measurement (see FIG. 1) apparatus based on ASTM E681-09.

Specifically, a spherical glass flask having an internal volume of 12 L was used so that the state of flame could be visually observed, and recorded and imaged, and the glass flask was set so that any gas was released through a lid at the top when an excess pressure was generated due to flame. The ignition method was made by generating ignition due to discharge from an electrode held at a height of ⅓ from the bottom.

<Test Conditions>

Test container: spherical container of 280 mm in diameter (internal volume: 12 L)

Test temperature: 60° C.±3° C.

Pressure: 101.3 kPa±0.7 kPa

Water content: 0.0088 g±0.0005 g per gram of dry air (water content at a relative humidity of 50% at 23° C.)

Mixing ratio of refrigerant composition/air: ±0.2 vol. % by 1 vol. %

Mixing of refrigerant composition: ±0.1 mass %

Ignition method: AC discharge, voltage 15 kV, current 30 mA, neon transformer

Electrode interval: 6.4 mm (¼ inches)

Spark: 0.4 seconds±0.05 seconds

Criteria for determination:

A case where any flame was spread at more than 90 degrees around the ignition point: flame propagation (flammability)

A case where any flame was spread at 90 degrees or less around the ignition point: no flame propagation (non-flammability)

TABLE 106

| Item | | Unit | Reference Example 2-1 (R404A) | Comparative Example 2-1 | Comparative Example 2-2 | Example 2-1 | Example 2-2 | Example 2-3 | Example 2-4 | Example 2-5 |
|---|---|---|---|---|---|---|---|---|---|---|
| Composition proportions | HFO-1132(E) | mass % | 0 | 30.0 | 40.0 | 40.5 | 41.3 | 43.0 | 45.0 | 47.0 |
| | HFO-1234yf | mass % | 0 | 70.0 | 60.0 | 59.5 | 58.7 | 57.0 | 55.0 | 53.0 |
| | HFC-134a | mass % | 4.0 | 0 | 0 | 0 | 0 | 0 | 0 | 0 |
| | HFC-143a | mass % | 52.0 | 0 | 0 | 0 | 0 | 0 | 0 | 0 |
| | HFC-125 | mass % | 44.0 | 0 | 0 | 0 | 0 | 0 | 0 | 0 |
| GWP (AR4) | | — | 3922 | 6 | 6 | 6 | 6 | 7 | 7 | 7 |
| Discharge temperature | | ° C. | 100.6 | 108.6 | 114.7 | 115.0 | 115.5 | 116.5 | 117.6 | 118.8 |
| Saturation pressure (40° C.) | | MPa | 1.822 | 1.592 | 1.745 | 1.752 | 1.764 | 1.788 | 1.817 | 1.844 |
| Evaporating pressure | | MPa | 0.082 | 0.063 | 0.072 | 0.073 | 0.074 | 0.075 | 0.077 | 0.079 |
| Compression ratio | | — | 22.2 | 25.3 | 24.1 | 24.0 | 23.9 | 23.8 | 23.6 | 23.4 |
| COP ratio (relative to that of R404A) | | % | 100 | 106.2 | 106.2 | 106.2 | 106.2 | 106.2 | 106.2 | 106.2 |
| Refrigerating capacity ratio (relative to that of R404A) | | % | 100 | 86.2 | 98.5 | 99.1 | 100 | 102.1 | 104.5 | 106.9 |
| ASHRAE flammability classification | | — | Class 1 | Class 2L | Class 2L | Class 2L | Class 2L | Class 2L | Class 2L | Class 2L |

| Item | | Example 2-6 | Comparative Example 2-3 | Comparative Example 2-4 | Comparative Example 2-5 | Comparative Example 2-6 | Comparative Example 2-7 | Comparative Example 2-8 | Comparative Example 2-9 |
|---|---|---|---|---|---|---|---|---|---|
| Composition proportions | HFO-1132(E) | 49.2 | 51.0 | 53.5 | 55.0 | 57.0 | 59.0 | 60.0 | 70.0 |
| | HFO-1234yf | 59.8 | 49.0 | 46.5 | 45.0 | 43.0 | 41.0 | 40.0 | 30.0 |
| | HFC-134a | 0 | 0 | 0 | 0 | 0 | 0 | 0 | 0 |
| | HFC-143a | 0 | 0 | 0 | 0 | 0 | 0 | 0 | 0 |
| | HFC-125 | 0 | 0 | 0 | 0 | 0 | 0 | 0 | 0 |
| GWP (AR4) | | 7 | 7 | 7 | 7 | 7 | 8 | 8 | 8 |
| Discharge temperature | | 120.0 | 121.0 | 122.4 | 123.3 | 124.4 | 125.5 | 126.0 | 131.7 |
| Saturation pressure (40° C.) | | 1.874 | 1.898 | 1.931 | 1.950 | 1.975 | 2.000 | 2.012 | 2.128 |
| Evaporating pressure | | 0.081 | 0.083 | 0.085 | 0.086 | 0.088 | 0.090 | 0.091 | 0.099 |
| Compression ratio | | 23.1 | 23.0 | 22.8 | 22.6 | 22.5 | 22.3 | 22.2 | 21.6 |
| COP ratio (relative to that of R404A) | | 106.2 | 106.3 | 106.3 | 106.3 | 106.3 | 106.4 | 106.4 | 106.7 |
| Refrigerating capacity ratio (relative to that of R404A) | | 109.5 | 111.7 | 114.6 | 116.4 | 118.7 | 121 | 122.2 | 133.3 |

TABLE 106-continued

| | | | | | | | | |
|---|---|---|---|---|---|---|---|---|
| ASHRAE flammability classification | Class 2L | Class 2L | Class 2L | Class 2 | Class 2 | Class 2 | Class 2 | Class 2 |

Test Example 2-2

The GWP of each mixed refrigerant represented in Examples 2-7 to 2-12, Comparative Examples 2-10 to 2-18 and Reference Example 2-2 (R404A) was evaluated based on the value in the fourth report of IPCC.

The COP, the refrigerating capacity, the discharge temperature, the saturation pressure at a saturation temperature of 40° C., the condensation pressure and the evaporating pressure of such each mixed refrigerant were determined by performing theoretical refrigeration cycle calculation with respect to such each mixed refrigerant under the following conditions by using NIST and Refprop 9.0.

| | |
|---|---|
| Evaporating temperature | −35° C. |
| Condensation temperature | 40° C. |
| Superheating temperature | 20 K |
| Subcooling temperature | 0 K |
| Compressor efficiency | 70% |

The meaning of each of the above terms is the same as in Test Example 2-1.

The results in Test Example 2-2 are shown in Table 107. Table 107 shows Examples and Comparative Examples of the refrigerant 2 of the present disclosure. In Table 107, the meaning of each of the terms is the same as in Test Example 2-1.

The coefficient of performance (COP) and the compression ratio were determined in the same manner as in Test Example 2-1.

The flammability of such each mixed refrigerant was determined in the same manner as in Test Example 2-1. The flame velocity test was performed in the same manner as in Test Example 2-1.

The flammable range of the mixed refrigerant was measured by using a measurement apparatus (see FIG. 1) based on ASTM E681-09, with the same method and test conditions as in Test Example 2-1.

TABLE 107

| Item | | Unit | Reference Example 2-2 (R404A) | Comparative Example 2-10 | Comparative Example 2-11 | Example 2-7 | Example 2-8 | Example 2-9 | Example 2-10 | Example 2-11 |
|---|---|---|---|---|---|---|---|---|---|---|
| Composition proportions | HFO-1132(E) | mass % | 0 | 30.0 | 40.0 | 40.5 | 41.3 | 43.0 | 45.0 | 47.0 |
| | HFO-1234yf | mass % | 0 | 70.0 | 60.0 | 59.5 | 58.7 | 57.0 | 55.0 | 53.0 |
| | HFC-134a | mass % | 4.0 | 0 | 0 | 0 | 0 | 0 | 0 | 0 |
| | HFC-143a | mass % | 52.0 | 0 | 0 | 0 | 0 | 0 | 0 | 0 |
| | HFC-125 | mass % | 44.0 | 0 | 0 | 0 | 0 | 0 | 0 | 0 |
| GWP (AR4) | | — | 3922 | 6 | 6 | 6 | 6 | 7 | 7 | 7 |
| Discharge temperature | | ° C. | 89.1 | 95.8 | 100.6 | 100.8 | 101.2 | 102.0 | 102.9 | 103.8 |
| Saturation pressure (40° C.) | | MPa | 1.822 | 1.592 | 1.745 | 1.752 | 1.764 | 1.788 | 1.817 | 1.844 |
| Evaporating pressure | | MPa | 0.165 | 0.131 | 0.148 | 0.149 | 0.151 | 0.154 | 0.157 | 0.160 |
| Compression ratio | | — | 11.0 | 12.2 | 11.8 | 11.7 | 11.7 | 11.6 | 11.6 | 11.5 |
| COP ratio (relative to that of R404A) | | % | 100 | 105.1 | 104.8 | 104.7 | 104.7 | 104.7 | 104.6 | 104.5 |
| Refrigerating capacity ratio (relative to that of R404A) | | % | 100 | 87.7 | 98.5 | 99.0 | 99.8 | 101.6 | 103.7 | 105.7 |
| ASHRAE flammability classification | | — | Class 1 | Class 2L | Class 2L | Class 2L | Class 2L | Class 2L | Class 2L | Class 2L |

| Item | | Example 2-12 | Comparative Example 2-12 | Comparative Example 2-13 | Comparative Example 2-14 | Comparative Example 2-15 | Comparative Example 2-16 | Comparative Example 2-17 | Comparative Example 2-18 |
|---|---|---|---|---|---|---|---|---|---|
| Composition proportions | HFO-1132(E) | 49.2 | 51.0 | 53.5 | 55.0 | 57.0 | 59.0 | 60.0 | 70.0 |
| | HFO-1234yf | 50.8 | 49.0 | 46.5 | 45.0 | 43.0 | 41.0 | 40.0 | 30.0 |
| | HFC-134a | 0 | 0 | 0 | 0 | 0 | 0 | 0 | 0 |
| | HFC-143a | 0 | 0 | 0 | 0 | 0 | 0 | 0 | 0 |
| | HFC-125 | 0 | 0 | 0 | 0 | 0 | 0 | 0 | 0 |
| GWP (AR4) | | 7 | 7 | 7 | 7 | 7 | 8 | 8 | 8 |
| Discharge temperature | | 104.7 | 105.5 | 106.6 | 107.3 | 108.1 | 109.0 | 109.5 | 113.9 |
| Saturation pressure (40° C.) | | 1.874 | 1.898 | 1.931 | 1.950 | 1.975 | 2.000 | 2.012 | 2.128 |
| Evaporating pressure | | 0.164 | 0.167 | 0.171 | 0.174 | 0.177 | 0.180 | 0.181 | 0.196 |
| Compression ratio | | 11.4 | 11.4 | 11.3 | 11.2 | 11.2 | 11.1 | 11.1 | 10.8 |
| COP ratio (relative to that of R404A) | | 104.5 | 104.4 | 104.4 | 104.4 | 104.3 | 104.3 | 104.3 | 104.3 |

TABLE 107-continued

| | | | | | | | | |
|---|---|---|---|---|---|---|---|---|
| Refrigerating capacity ratio (relative to that of R404A) | 108.0 | 109.8 | 112.3 | 113.8 | 115.7 | 117.7 | 118.6 | 128.0 |
| ASHRAE flammability classification | Class 2L | Class 2L | Class 2L | Class 2 | Class 2 | Class 2 | Class 2 | Class 2 |

Test Example 2-3

The GWP of each mixed refrigerant represented in Examples 2-13 to 2-18, Comparative Examples 2-19 to 2-27 and Reference Example 2-3 (R404A) was evaluated based on the value in the fourth report of IPCC.

The COP, the refrigerating capacity, the discharge temperature, the saturation pressure at a saturation temperature of 40° C., the condensation pressure and the evaporating pressure of such each mixed refrigerant were determined by performing theoretical refrigeration cycle calculation with respect to such each mixed refrigerant under the following conditions by using NIST and Refprop 9.0.

| | |
|---|---|
| Evaporating temperature | −10° C. |
| Condensation temperature | 40° C. |
| Superheating temperature | 20 K |
| Subcooling temperature | 0 K |
| Compressor efficiency | 70% |

The meaning of each of the above terms is the same as in Test Example 2-1.

The results in Test Example 2-3 are shown in Table 108. Table 108 shows Examples and Comparative Examples of the refrigerant 2 of the present disclosure. In Table 108, the meaning of each of the terms is the same as in Test Example 2-1.

The coefficient of performance (COP) and the compression ratio were determined in the same manner as in Test Example 2-1.

The flammability of such each mixed refrigerant was determined in the same manner as in Test Example 2-1. The flame velocity test was performed in the same manner as in Test Example 2-1.

The flammable range of the mixed refrigerant was measured by using a measurement apparatus (see FIG. 1) based on ASTM E681-09, with the same method and test conditions as in Test Example 2-1.

TABLE 108

| Item | | Unit | Reference Example 2-3 (R404A) | Comparative Example 2-19 | Comparative Example 2-20 | Example 2-13 | Example 2-14 | Example 2-15 | Example 2-16 | Example 2-17 |
|---|---|---|---|---|---|---|---|---|---|---|
| Composition proportions | HFO-1132(E) | mass % | 0 | 30.0 | 40.0 | 40.5 | 41.3 | 43.0 | 45.0 | 47.0 |
| | HFO-1234yf | mass % | 0 | 70.0 | 60.0 | 59.5 | 58.7 | 57.0 | 55.0 | 53.0 |
| | HFC-134a | mass % | 4.0 | 0 | 0 | 0 | 0 | 0 | 0 | 0 |
| | HFC-143a | mass % | 52.0 | 0 | 0 | 0 | 0 | 0 | 0 | 0 |
| | HFC-125 | mass % | 44.0 | 0 | 0 | 0 | 0 | 0 | 0 | 0 |
| GWP (AR4) | | — | 3922 | 6 | 6 | 6 | 6 | 7 | 7 | 7 |
| Discharge temperature | | ° C. | 75.8 | 80.8 | 83.7 | 83.9 | 84.1 | 84.5 | 85.1 | 85.6 |
| Saturation pressure (40° C.) | | MPa | 1.822 | 1.592 | 1.745 | 1.752 | 1.764 | 1.788 | 1.817 | 1.844 |
| Evaporating pressure | | MPa | 0.434 | 0.357 | 0.399 | 0.401 | 0.404 | 0.411 | 0.419 | 0.427 |
| Compression ratio | | — | 4.2 | 4.5 | 4.4 | 4.4 | 4.4 | 4.3 | 4.3 | 4.3 |
| COP ratio (relative to that of R404A) | | % | 100 | 103.8 | 102.9 | 102.9 | 102.8 | 102.7 | 102.5 | 102.4 |
| Refrigerating capacity ratio (relative to that of R404A) | | % | 100 | 89.8 | 98.7 | 99.1 | 99.8 | 101.2 | 102.8 | 104.5 |
| ASHRAE flammability classification | | — | Class 1 | Class 2L | Class 2L | Class 2L | Class 2L | Class 2L | Class 2L | Class 2L |

| Item | | Example 2-18 | Comparative Example 2-21 | Comparative Example 2-22 | Comparative Example 2-23 | Comparative Example 2-24 | Comparative Example 2-25 | Comparative Example 2-26 | Comparative Example 2-27 |
|---|---|---|---|---|---|---|---|---|---|
| Composition proportions | HFO-1132(E) | 49.2 | 51.0 | 53.5 | 55.0 | 57.0 | 59.0 | 60.0 | 70.0 |
| | HFO-1234yf | 50.8 | 49.0 | 46.5 | 45.0 | 43.0 | 41.0 | 40.0 | 30.0 |
| | HFC-134a | 0 | 0 | 0 | 0 | 0 | 0 | 0 | 0 |
| | HFC-143a | 0 | 0 | 0 | 0 | 0 | 0 | 0 | 0 |
| | HFC-125 | 0 | 0 | 0 | 0 | 0 | 0 | 0 | 0 |
| GWP (AR4) | | 7 | 7 | 7 | 7 | 7 | 8 | 8 | 8 |
| Discharge temperature | | 86.2 | 86.6 | 87.3 | 87.7 | 88.2 | 88.7 | 88.9 | 91.5 |
| Saturation pressure (40° C.) | | 1.874 | 1.898 | 1.931 | 1.950 | 1.975 | 2.000 | 2.012 | 2.128 |
| Evaporating pressure | | 0.436 | 0.443 | 0.452 | 0.457 | 0.465 | 0.472 | 0.475 | 0.509 |
| Compression ratio | | 4.3 | 4.3 | 4.3 | 4.3 | 4.3 | 4.2 | 4.2 | 4.2 |

TABLE 108-continued

| | | | | | | | | |
|---|---|---|---|---|---|---|---|---|
| COP ratio (relative to that of R404A) | 102.2 | 102.1 | 102.0 | 101.9 | 101.8 | 101.7 | 101.6 | 101.3 |
| Refrigerating capacity ratio (relative to that of R404A) | 106.2 | 107.7 | 109.6 | 110.8 | 112.3 | 113.8 | 114.5 | 121.7 |
| ASHRAE flammability classification | Class 2L | Class 2L | Class 2L | Class 2 | Class 2 | Class 2 | Class 2 | Class 2 |

Test Example 2-4

The GWP of each mixed refrigerant represented in Examples 2-19 to 2-24, Comparative Examples 2-28 to 2-36 and Reference Example 2-4 (R404A) was evaluated based on the value in the fourth report of IPCC.

The COP, the refrigerating capacity, the discharge temperature, the saturation pressure at a saturation temperature of 40° C., the condensation pressure and the evaporating pressure of such each mixed refrigerant were determined by performing theoretical refrigeration cycle calculation with respect to such each mixed refrigerant under the following conditions by using NIST and Refprop 9.0.

| | |
|---|---|
| Evaporating temperature | −80° C. |
| Condensation temperature | 40° C. |
| Superheating temperature | 20 K |
| Subcooling temperature | 0 K |
| Compressor efficiency | 70% |

The meaning of each of the above terms is the same as in Test Example 2-1.

The results in Test Example 2-4 are shown in Table 109. Table 109 shows Examples and Comparative Examples of the refrigerant 2 of the present disclosure. In Table 109, the meaning of each of the terms is the same as in Test Example 2-1.

The coefficient of performance (COP) and the compression ratio were determined in the same manner as in Test Example 2-1.

The flammability of such each mixed refrigerant was determined in the same manner as in Test Example 2-1. The flame velocity test was performed in the same manner as in Test Example 2-1.

The flammable range of the mixed refrigerant was measured by using a measurement apparatus (see FIG. 1) based on ASTM E681-09, with the same method and test conditions as in Test Example 2-1.

TABLE 109

| | | Unit | Reference Example 2-4 (R404A) | Comparative Example 2-28 | Comparative Example 2-29 | Example 2-19 | Example 2-20 | Example 2-21 | Example 2-22 | Example 2-23 |
|---|---|---|---|---|---|---|---|---|---|---|
| Compositon proportions | HFO-1132(E) | mass % | 0 | 30.0 | 40.0 | 40.5 | 41.3 | 43.0 | 45.0 | 47.0 |
| | HFO-1234yf | mass % | 0 | 70.0 | 60.0 | 59.5 | 58.7 | 57.0 | 55.0 | 53.0 |
| | HFC-134a | mass % | 4.0 | 0 | 0 | 0 | 0 | 0 | 0 | 0 |
| | HFC-143a | mass % | 52.0 | 0 | 0 | 0 | 0 | 0 | 0 | 0 |
| | HFC-125 | mass % | 44.0 | 0 | 0 | 0 | 0 | 0 | 0 | 0 |
| GWP (AR4) | | — | 3922 | 6 | 6 | 6 | 6 | 7 | 7 | 7 |
| Discharge temperature | | ° C. | 136.7 | 146.0 | 157.7 | 158.1 | 158.8 | 160.4 | 162.1 | 163.9 |
| Saturation pressure (40° C.) | | MPa | 1.822 | 1.592 | 1.745 | 1.752 | 1.764 | 1.788 | 1.817 | 1.844 |
| Evaporating pressure | | MPa | 0.014 | 0.011 | 0.012 | 0.012 | 0.012 | 0.012 | 0.013 | 0.013 |
| Compression ratio | | — | 134.6 | 149.1 | 150.8 | 150.2 | 149.3 | 147.2 | 145.0 | 142.8 |
| COP ratio (relative to that of R404A) | | % | 100 | 1126 | 110.3 | 110.3 | 110.4 | 110.6 | 110.8 | 111.0 |
| Refrigerating capacity ratio (relative to that of R404A) | | % | 100 | 91.7 | 99.3 | 100.2 | 101.5 | 104.4 | 107.8 | 111.3 |
| ASHRAE flammability classification | | — | Class 1 | Class 2L | Class 2L | Class 2L | Class 2L | Class 2L | Class 2L | Class 2L |

| | | Example 2-24 | Comparative Example 2-30 | Comparative Example 2-31 | Comparative Example 2-32 | Comparative Example 2-33 | Comparative Example 2-34 | Comparative Example 2-35 | Comparative Example 2-36 |
|---|---|---|---|---|---|---|---|---|---|
| Compositon proportions | HFO-1132(E) | 49.2 | 51.0 | 53.5 | 55.0 | 57.0 | 59.0 | 60.0 | 70.0 |
| | HFO-1234yf | 50.8 | 49.0 | 46.5 | 45.0 | 43.0 | 41.0 | 40.0 | 30.0 |
| | HFC-134a | 0 | 0 | 0 | 0 | 0 | 0 | 0 | 0 |
| | HFC-143a | 0 | 0 | 0 | 0 | 0 | 0 | 0 | 0 |
| | HFC-125 | 0 | 0 | 0 | 0 | 0 | 0 | 0 | 0 |
| GWP (AR4) | | 7 | 7 | 7 | 7 | 7 | 8 | 8 | 8 |
| Discharge temperature | | 165.8 | 167.4 | 169.6 | 170.9 | 172.6 | 174.3 | 175.2 | 184.0 |
| Saturation pressure (40° C.) | | 1.874 | 1.898 | 1.931 | 1.959 | 1.975 | 2.000 | 2.012 | 2.128 |

TABLE 109-continued

| | | | | | | | | |
|---|---|---|---|---|---|---|---|---|
| Evaporating pressure | 0.013 | 0.014 | 0.014 | 0.014 | 0.015 | 0.015 | 0.015 | 0.017 |
| Compression ratio | 140.5 | 138.7 | 136.3 | 134.9 | 133.2 | 131.5 | 130.7 | 123.8 |
| COP ratio (relative to that of R404A) | 111.3 | 111.4 | 111.7 | 111.9 | 112.1 | 112.3 | 112.4 | 113.5 |
| Refrigerating capacity ratio (relative to that of R404A) | 115.1 | 118.2 | 122.5 | 125.2 | 128.6 | 132.1 | 133.8 | 151.0 |
| ASHRAE flammability classification | Class 2L | Class 2L | Class 2L | Class 2 | Class 2 | Class 2 | Class 2 | Class 2 |

Test Example 2-5

The GWP of each mixed refrigerant represented in Examples 2-25 to 2-30, Comparative Examples 2-37 to 2-45 and Reference Example 2-5 (R404A) was evaluated based on the value in the fourth report of IPCC.

The COP, the refrigerating capacity, the discharge temperature, the saturation pressure at a saturation temperature of 40° C., the condensation pressure and the evaporating pressure of such each mixed refrigerant were determined by performing theoretical refrigeration cycle calculation with respect to such each mixed refrigerant under the following conditions by using NIST and Refprop 9.0.

| | |
|---|---|
| Evaporating temperature | 10° C. |
| Condensation temperature | 40° C. |
| Superheating temperature | 20 K |
| Subcooling temperature | 0 K |
| Compressor efficiency | 70% |

The meaning of each of the above terms is the same as in Test Example 2-1.

The results in Test Example 2-5 are shown in Table 110. Table 110 shows Examples and Comparative Examples of the refrigerant 2 of the present disclosure. In Table 110, the meaning of each of the terms is the same as in Test Example 2-1.

The coefficient of performance (COP) and the compression ratio were determined in the same manner as in Test Example 2-1.

The flammability of such each mixed refrigerant was determined in the same manner as in Test Example 2-1. The flame velocity test was performed in the same manner as in Test Example 2-1.

The flammable range of the mixed refrigerant was measured by using a measurement apparatus (see FIG. 1) based on ASTM E681-09, with the same method and test conditions as in Test Example 2-1.

TABLE 110

| | | Unit | Reference Example 2-5 (R404A) | Comparative Example 2-37 | Comparative Example 2-38 | Example 2-25 | Example 2-26 | Example 2-27 | Example 2-28 | Example 2-29 |
|---|---|---|---|---|---|---|---|---|---|---|
| Composition proportions | HFO-1132(E) | mass % | 0 | 30.0 | 40.0 | 40.5 | 41.3 | 43.0 | 45.0 | 47.0 |
| | HFO-1234yf | mass % | 0 | 70.0 | 60.0 | 59.5 | 58.7 | 57.0 | 55.0 | 53.0 |
| | HFC-134a | mass % | 4.0 | 0 | 0 | 0 | 0 | 0 | 0 | 0 |
| | HFC-143a | mass % | 52.0 | 0 | 0 | 0 | 0 | 0 | 0 | 0 |
| | HFC-125 | mass % | 44.0 | 0 | 0 | 0 | 0 | 0 | 0 | 0 |
| GWP (AR4) | | — | 3922 | 6 | 6 | 6 | 6 | 7 | 7 | 7 |
| Discharge temperature | | ° C. | 68.5 | 72.4 | 74.0 | 74.1 | 74.2 | 74.4 | 74.7 | 74.9 |
| Saturation pressure (40° C.) | | MPa | 1.822 | 1.592 | 1.745 | 1.752 | 1.764 | 1.788 | 1.817 | 1.844 |
| Evaporating pressure | | MPa | 0.820 | 0.694 | 0.768 | 0.772 | 0.777 | 0.789 | 0.803 | 0.817 |
| Compression ratio | | — | 2.2 | 2.3 | 2.3 | 2.3 | 2.3 | 2.3 | 2.3 | 2.3 |
| COP ratio (relative to that of R404A) | | % | 100.0 | 103.1 | 101.9 | 101.8 | 101.7 | 101.5 | 101.3 | 101.1 |
| Refrigerating capacity ratio (relative to that of R404A) | | % | 100.0 | 91.2 | 98.9 | 99.3 | 99.8 | 101.0 | 102.5 | 103.8 |
| ASHRAE flammability classification | | — | Class 1 | Class 2L | Class 2L | Class 2L | Class 2L | Class 2L | Class 2L | Class 2L |

| | | Example 2-30 | Comparative Example 2-39 | Comparative Example 2-40 | Comparative Example 2-41 | Comparative Example 2-42 | Comparative Example 2-43 | Comparative Example 2-44 | Comparative Example 2-45 |
|---|---|---|---|---|---|---|---|---|---|
| Composition proportions | HFO-1132(E) | 49.2 | 51.0 | 53.5 | 55.0 | 57.0 | 59.0 | 60.0 | 70.0 |
| | HFO-1234yf | 50.8 | 49.0 | 46.5 | 45.0 | 43.0 | 41.0 | 40.0 | 30.0 |
| | HFC-134a | 0 | 0 | 0 | 0 | 0 | 0 | 0 | 0 |
| | HFC-143a | 0 | 0 | 0 | 0 | 0 | 0 | 0 | 0 |
| | HFC-125 | 0 | 0 | 0 | 0 | 0 | 0 | 0 | 0 |
| GWP (AR4) | | 7 | 7 | 7 | 7 | 7 | 8 | 8 | 8 |
| Discharge temperature | | 75.2 | 75.5 | 75.8 | 76.0 | 76.2 | 76.5 | 76.6 | 77.9 |
| Saturation pressure (40° C.) | | 1.874 | 1.898 | 1.931 | 1.950 | 1.975 | 2.000 | 2.012 | 2.128 |
| Evaporating pressure | | 0.832 | 0.844 | 0.860 | 0.870 | 0.882 | 0.895 | 0.901 | 0.959 |
| Compression ratio | | 2.3 | 2.2 | 2.2 | 2.2 | 2.2 | 2.2 | 2.2 | 2.2 |

TABLE 110-continued

| | | | | | | | | |
|---|---|---|---|---|---|---|---|---|
| COP ratio (relative to that of R404A) | 100.9 | 100.8 | 100.6 | 100.4 | 100.3 | 100.1 | 100.1 | 99.5 |
| Refrigerating capacity ratio (relative to that of R404A) | 105.3 | 106.5 | 108.2 | 109.1 | 110.4 | 111.6 | 112.3 | 118.2 |
| ASHRAE flammability classification | Class 2L | Class 2L | Class 2L | Class 2 | Class 2 | Class 2 | Class 2 | Class 2 |

Test Example 3

The GWP of each mixed refrigerant represented in Examples 3-1 to 3-5, Comparative Examples 3-1 to 3-5, Reference Example 3-1 (R134a) and Reference Example 3-2 (R404A) was evaluated based on the value in the fourth report of IPCC.

The COP, the refrigerating capacity, the discharge temperature, the saturation pressure at a saturation temperature of 45° C., the condensation pressure and the evaporating pressure of such each mixed refrigerant were determined by performing theoretical refrigeration cycle calculation with respect to such each mixed refrigerant under the following conditions by using National Institute of Science and Technology (NIST) and Reference Fluid Thermodynamic and Transport Properties Database (Refprop 9.0).

| | |
|---|---|
| Evaporating temperature | −10° C. |
| Condensation temperature | 45° C. |
| Superheating temperature | 20 K |
| Subcooling temperature | 0 K |
| Compressor efficiency | 70% |

An "evaporating temperature of −10° C." means that the evaporating temperature of such each mixed refrigerant in an evaporator included in a refrigerating apparatus is −10° C. A "condensation temperature of 45° C." means that the condensation temperature of such each mixed refrigerant in an evaporator included in a refrigerating apparatus is 45° C.

The results in Test Example 3 are shown in Table 111. Table 111 shows Examples and Comparative Examples of the refrigerant 3 of the present disclosure. In Table 111, the "COP ratio" and the "Refrigerating capacity ratio" each represent the proportion (%) relative to that of R134a. In Table 111, the "Saturation pressure (45° C.)" represents the saturation pressure at a saturation temperature of 45° C. In Table 111, the "Discharge temperature (° C.)" represents the temperature at which the highest temperature in the refrigeration cycle is achieved in theoretical refrigeration cycle calculation with respect to such each mixed refrigerant.

The coefficient of performance (COP) was determined according to the following expression.

COP=(Refrigerating capacity or heating capacity)/Power consumption

The critical temperature was determined by performing calculation by using National Institute of Science and Technology (NIST) and Reference Fluid Thermodynamic and Transport Properties Database (Refprop 9.0).

The flammability of such each mixed refrigerant was determined by defining the mixed composition of such each mixed refrigerant as the WCF concentration, and measuring the flame velocity according to ANSI/ASHRAE Standard 34-2013. One having a flame velocity of 0 cm/s to 10 cm/s was rated as "Class 2L (lower flammability)", one having a flame velocity of more than 10 cm/s was rated as "Class 2 (low flammability)", and one causing no flame propagation was rated as "Class 1 (non-flammability)". In Table 227, the "ASHRAE flammability classification" shows each result based on the criteria for determination.

The flame velocity test was performed as follows. First, the mixed refrigerant used had a purity of 99.5% or more, and degassing was made by repeating a cycle of freezing, pumping and thawing until no trace of air was observed on a vacuum gauge. The flame velocity was measured by a closed method. The initial temperature was ambient temperature. Ignition was performed by generating an electric spark between electrodes at the center of a sample cell. The duration of discharge was 1.0 to 9.9 ms, and the ignition energy was typically about 0.1 to 1.0 J. The spread of any flame was visualized using a schlieren photograph. A cylindrical container (inner diameter: 155 mm, length: 198 mm) equipped with two light-transmitting acrylic windows was used as the sample cell, and a xenon lamp was used as a light source. A schlieren image of any flame was recorded by a high-speed digital video camera at a frame rate of 600 fps, and stored in a PC.

The flammable range of the mixed refrigerant was measured by using a measurement apparatus based on ASTM E681-09.

Specifically, a spherical glass flask having an internal volume of 12 L was used so that the state of flame could be visually observed, and recorded and imaged, and the glass flask was set so that any gas was released through a lid at the top when an excess pressure was generated due to flame. The ignition method was made by generating ignition due to discharge from an electrode held at a height of ⅓ from the bottom.

<Test Conditions>

Test container: spherical container of 280 mm in diameter (internal volume: 12 L)

Test temperature: 60° C.±3° C.

Pressure: 101.3 kPa±0.7 kPa

Water content: 0.0088 g±0.0005 g per gram of dry air (water content at a relative humidity of 50% at 23° C.)

Mixing ratio of refrigerant composition/air: ±0.2 vol. % by 1 vol. %

Mixing of refrigerant composition: ±0.1 mass %

Ignition method: AC discharge, voltage 15 kV, current 30 mA, neon transformer

Electrode interval: 6.4 mm (¼ inches)

Spark: 0.4 seconds±0.05 seconds

Criteria for determination:

- A case where any flame was spread at more than 90 degrees around the ignition point: flame propagation (flammability)
- A case where any flame was spread at 90 degrees or less around the ignition point: no flame propagation (non-flammability)

TABLE 111

| Item | | Unit | Reference Example 3-1 (R134a) | Comparative Example 3-1 | Comparative Example 3-2 | Example 3-1 | Example 3-2 | Example 3-3 |
|---|---|---|---|---|---|---|---|---|
| Composition proportions | HFO-1132(E) | mass % | 0 | 20.0 | 30.0 | 31.1 | 33.0 | 35.0 |
| | HFO-1234yf | mass % | 0 | 80.0 | 70.0 | 68.9 | 67.0 | 65.0 |
| | HFC-134a | mass % | 100.0 | 0 | 0 | 0 | 0 | 0 |
| | HFC-143a | mass % | 0 | 0 | 0 | 0 | 0 | 0 |
| | HFC-125 | mass % | 0 | 0 | 0 | 0 | 0 | 0 |
| GWP (AR4) | | — | 1430 | 5 | 6 | 6 | 6 | 6 |
| Discharge temperature | | ° C. | 86.9 | 86.3 | 86.9 | 87.2 | 87.9 | 88.5 |
| Saturation pressure (45° C.) | | MPa | 1.160 | 1.607 | 1.795 | 1.814 | 1.848 | 1.883 |
| Evaporating pressure | | MPa | 0.201 | 0.311 | 0.355 | 0.360 | 0.368 | 0.376 |
| Critical temperature | | ° C. | 101.1 | 84.6 | 83.0 | 82.7 | 82.2 | 81.7 |
| COP ratio (relative to that of R134a) | | % | 100.0 | 93.6 | 92.7 | 92.6 | 92.4 | 92.2 |
| Refrigerating capacity ratio (relative to that of R134a) | | % | 100.0 | 132.3 | 148.3 | 150.0 | 152.8 | 155.8 |
| ASHRAE flammability classification | | — | Class 1 | Class 2L | Class 2L | Class 2L | Class 2L | Class 2L |

| Item | | Example 3-4 | Example 3-5 | Comparative Example 3-3 | Comparative Example 3-4 | Comparative Example 3-5 | Reference Example 3-2 (R404A) |
|---|---|---|---|---|---|---|---|
| Composition proportions | HFO-1132(E) | 37.9 | 39.8 | 40.0 | 50.0 | 0.0 | 0 |
| | HFO-1234yf | 62.1 | 60.2 | 60.0 | 50.0 | 100.0 | 0 |
| | HFC-134a | 0 | 0 | 0 | 0 | 0 | 4.0 |
| | HFC-143a | 0 | 0 | 0 | 0 | 0 | 52.0 |
| | HFC-125 | 0 | 0 | 0 | 0 | 0 | 44.0 |
| GWP (AR4) | | 6 | 6 | 6 | 7 | 4 | 3922 |
| Discharge temperature | | 89.4 | 90.0 | 90.1 | 93.0 | 72.2 | 81.7 |
| Saturation pressure (45° C.) | | 1.930 | 1.963 | 1.966 | 2.123 | 1.151 | 2.052 |
| Evaporating pressure | | 0.388 | 0.397 | 0.397 | 0.437 | 0.222 | 0.434 |
| Critical temperature | | 81.0 | 80.5 | 80.5 | 78.7 | 94.7 | 72.0 |
| COP ratio (relative to that of R134a) | | 92.0 | 91.8 | 91.8 | 91.0 | 95.7 | 88.6 |
| Refrigerating capacity ratio (relative to that of R134a) | | 159.8 | 162.7 | 162.9 | 176.6 | 96.2 | 164.4 |
| ASHRAE flammability classification | | Class 2L | Class 2L | Class 2L | Class 2L | Class 2L | Class 1 |

Test Example 4

The GWP of each mixed refrigerant represented in Examples 4-1 to 4-7 and Comparative Examples 4-1 to 4-5 was evaluated based on the value in the fourth report of IPCC.

The COP, the refrigerating capacity, the discharge temperature and the saturation pressure at a saturation temperature of −10° C. of such each mixed refrigerant were determined by performing theoretical refrigeration cycle calculation with respect to such each mixed refrigerant under the following conditions by using National Institute of Science and Technology (NIST) and Reference Fluid Thermodynamic and Transport Properties Database (Refprop 9.0).

| | |
|---|---|
| Evaporating temperature | 5° C. |
| Condensation temperature | 45° C. |
| Superheating temperature | 5 K |
| Subcooling temperature | 5 K |
| Compressor efficiency | 70% |

An "evaporating temperature of 5° C." means that the evaporating temperature of such each mixed refrigerant in an evaporator included in a refrigerating apparatus is 5° C. A "condensation temperature of 45° C." means that the condensation temperature of such each mixed refrigerant in a condenser included in a refrigerating apparatus is 45° C.

The results in Test Example 4 are shown in Table 112. Table 112 shows Examples and Comparative Examples of the refrigerant 4 of the present disclosure. In Table 112, the "COP ratio" and the "Refrigerating capacity ratio" each represent the proportion (%) relative to that of R1234yf. In Table 112, the "Saturation pressure (−10° C.)" represents the saturation pressure at a saturation temperature of −10° C., as a representative evaporating temperature value under refrigeration conditions. In Table 112, the "Discharge temperature (° C.)" represents the temperature at which the highest temperature in the refrigeration cycle is achieved in theoretical refrigeration cycle calculation with respect to such each mixed refrigerant.

The coefficient of performance (COP) was determined according to the following expression.

COP=(Refrigerating capacity or heating capacity)/Power consumption

The critical temperature was determined by performing calculation by using National Institute of Science and Technology (NIST) and Reference Fluid Thermodynamic and Transport Properties Database (Refprop 9.0).

The flammability of such each mixed refrigerant was determined by defining the mixed composition of such each mixed refrigerant as the WCF concentration, and measuring the flame velocity according to ANSI/ASHRAE Standard 34-2013. One having a flame velocity of 0 cm/s to 10 cm/s was rated as "Class 2L (lower flammability)", one having a flame velocity of more than 10 cm/s was rated as "Class 2 (low flammability)", and one causing no flame propagation was rated as "Class 1 (non-flammability)". In Table 228, the "ASHRAE flammability classification" shows each result based on the criteria for determination.

The flame velocity test was performed as follows. First, the mixed refrigerant used had a purity of 99.5% or more, and degassing was made by repeating a cycle of freezing, pumping and thawing until no trace of air was observed on a vacuum gauge. The flame velocity was measured by a closed method. The initial temperature was ambient temperature. Ignition was performed by generating an electric spark between electrodes at the center of a sample cell. The duration of discharge was 1.0 to 9.9 ms, and the ignition energy was typically about 0.1 to 1.0 J. The spread of any flame was visualized using a schlieren photograph. A cylindrical container (inner diameter: 155 mm, length: 198 mm) equipped with two light-transmitting acrylic windows was used as the sample cell, and a xenon lamp was used as a light source. A schlieren image of any flame was recorded by a high-speed digital video camera at a frame rate of 600 fps, and stored in a PC.

The flammable range of the mixed refrigerant was measured by using a measurement apparatus based on ASTM E681-09.

Specifically, a spherical glass flask having an internal volume of 12 L was used so that the state of flame could be visually observed, and recorded and imaged, and the glass flask was set so that any gas was released through a lid at the top when an excess pressure was generated due to flame. The ignition method was made by generating ignition due to discharge from an electrode held at a height of ⅓ from the bottom.

<Test Conditions>

Test container: spherical container of 280 mm in diameter (internal volume: 12 L)

Test temperature: 60° C.±3° C.

Pressure: 101.3 kPa±0.7 kPa

Water content: 0.0088 g±0.0005 g per gram of dry air (water content at a relative humidity of 50% at 23° C.)

Mixing ratio of refrigerant composition/air: ±0.2 vol. % by 1 vol. %

Mixing of refrigerant composition: ±0.1 mass %.

Ignition method: AC discharge, voltage 15 kV, current 30 mA, neon transformer

Electrode interval: 6.4 mm (¼ inches)

Spark: 0.4 seconds±0.05 seconds

Criteria for determination:

- A case where any flame was spread at more than 90 degrees around the ignition point: flame propagation (flammability)
- A case where any flame was spread at 90 degrees or less around the ignition point: no flame propagation (non-flammability)

TABLE 112

| Item | | Unit | Comparative Example 4-1 | Comparative Example 4-2 | Example 4-1 | Example 4-2 | Example 4-3 | Example 4-4 |
|---|---|---|---|---|---|---|---|---|
| Composition | HFO-1132(E) | mass % | 0 | 15.0 | 21.0 | 23.6 | 24.3 | 25.1 |
| proportions | HFO-1234yf | mass % | 100.0 | 85.0 | 79.0 | 76.4 | 75.7 | 74.9 |
| GWF (AR4) | | — | 4 | 5 | 5 | 5 | 5 | 6 |
| Discharge temperature | | ° C. | 54.4 | 61.3 | 63.1 | 63.8 | 64.0 | 64.2 |
| Saturation pressure (−10° C.) | | MPa | 0.222 | 0.350 | 0.383 | 0.396 | 0.400 | 0.403 |
| Critical temperature | | ° C. | 94.7 | 88.1 | 85.9 | 85.0 | 84.8 | 84.5 |
| COP ratio (relate to that of R1234yf) | | % | 100.0 | 99.1 | 98.8 | 98.6 | 98.5 | 98.4 |
| Refrigerating capacity ratio (relative to that of R1234yf) | | % | 100.0 | 129.8 | 140.0 | 144.2 | 145.4 | 146.6 |
| ASHRAE flammability classification | | — | Class 2L | Class 2L | Class 2L | Class 2L | Class 2L | Class 2L |

| Item | | Example 4-5 | Example 4-6 | Example 4-7 | Comparative Example 4-3 | Comparative Example 4-4 | Comparative Example 4-5 |
|---|---|---|---|---|---|---|---|
| Composition | HFO-1132(E) | 26.7 | 27.5 | 28.4 | 30.0 | 40.0 | 50.0 |
| proportions | HFO-1234yf | 73.3 | 72.5 | 71.6 | 70.0 | 60.0 | 50.0 |
| GWF (AR4) | | 6 | 6 | 6 | 6 | 6 | 7 |
| Discharge temperature | | 64.6 | 64.8 | 65.0 | 65.4 | 67.5 | 69.4 |
| Saturation pressure (−10° C.) | | 0.411 | 0.414 | 0.418 | 0.425 | 0.461 | 0.492 |
| Critical temperature | | 84.0 | 83.8 | 83.5 | 83.0 | 80.5 | 78.7 |
| COP ratio (relate to that of R1234yf) | | 98.3 | 98.2 | 98.2 | 98.0 | 97.2 | 96.6 |
| Refrigerating capacity ratio (relative to that of R1234yf) | | 149.1 | 150.3 | 151.7 | 154.1 | 168.2 | 181.3 |
| ASHRAE flammability classification | | Class 2L | Class 2L | Class 2L | Class 2L | Class 2L | Class 2L |

Test Example 5

The GWP of each mixed refrigerant represented in Examples 5-1 to 5-13, Comparative Examples 5-1 to 5-3 and Reference Example 5-1 (R134a) was evaluated based on the value in the fourth report of IPCC.

The COP, the refrigerating capacity, the boiling point and the discharge temperature of such each mixed refrigerant were determined by performing theoretical refrigeration cycle calculation with respect to such each mixed refrigerant under the following conditions by using National Institute of Science and Technology (NIST) and Reference Fluid Thermodynamic and Transport Properties Database (Refprop 9.0).

| | |
|---|---|
| Evaporating temperature | −30° C. |
| Condensation temperature | 30° C. |
| Superheating temperature | 5 K |
| Subcooling temperature | 5 K |
| Compressor efficiency | 70% |

An "evaporating temperature of −30° C." means that the evaporating temperature of such each mixed refrigerant in an evaporator included in a refrigerating apparatus is −30° C. A "condensation temperature of 30° C." means that the condensation temperature of such each mixed refrigerant in a condenser included in a refrigerating apparatus is 30° C.

The results in Test Example 5 are shown in Table 113. Table 113 shows Examples and Comparative Examples of the refrigerant 5 of the present disclosure. In Table 113, the "COP ratio" and the "Refrigerating capacity ratio" each represent the proportion (%) relative to that of R1234yf. In Table 113, the "Discharge temperature (° C.)" represents the temperature at which the highest temperature in the refrigeration cycle is achieved in theoretical refrigeration cycle calculation with respect to such each mixed refrigerant. In Table 113, the "Boiling point (° C.)" represents the temperature at which a liquid phase of such each mixed refrigerant is at atmospheric pressure (101.33 kPa). In Table 113, "Power consumption (%) of driving force" represents the electric energy used for traveling an electric car, and is represented by the ratio to the power consumption in the case of HFO-1234yf as the refrigerant. In Table 113, "Heating power consumption (%)" represents the electric energy used for operating heating by an electric car, and is represented by the ratio to the power consumption in the case of HFO-1234yf as the refrigerant. In Table 113, the "Mileage" represents the relative proportion (%) of the mileage in traveling with heating when the mileage in travelling with no heating in an electric car in which a secondary battery having a certain electric capacitance is mounted is 100% (the consumption power in heating is 0).

The coefficient of performance (COP) was determined according to the following expression.

COP=(Refrigerating capacity or heating capacity)/Power consumption

The flammability of such each mixed refrigerant was determined by defining the mixed composition of such each mixed refrigerant as the WCF concentration, and measuring the flame velocity according to ANSI/ASHRAE Standard 34-2013. The flame velocity was measured as follows. First, the mixed refrigerant used had a purity of 99.5% or more, and degassing was made by repeating a cycle of freezing, pumping and thawing until no trace of air was observed on a vacuum gauge. The flame velocity was measured by a closed method. The initial temperature was ambient temperature. Ignition was performed by generating an electric spark between electrodes at the center of a sample cell. The duration of discharge was 1.0 to 9.9 ms, and the ignition energy was typically about 0.1 to 1.0 J. The spread of any flame was visualized using a schlieren photograph. A cylindrical container (inner diameter: 155 mm, length: 198 mm) equipped with two light-transmitting acrylic windows was used as the sample cell, and a xenon lamp was used as a light source. A schlieren image of any flame was recorded by a high-speed digital camera at a frame rate of 600 fps, and stored in a PC.

The heating method included using an electric heater system for heating in the case of any refrigerant having a boiling point of more than −40° C., or using a heat pump system for heating in the case of refrigerant having a boiling point of −40° C. or less.

The power consumption in use of heating was determined by the following expression.

Power consumption in use of heating=Heating capacity/Heating COP

Herein, the heating COP means "heating efficiency".

The heating efficiency means that the heating COP is 1 in the case of an electric heater, and an electrode comparable with a driving force is consumed in heating. In other words, the consumption power in heating is expressed by E=E/(1+COP). On the other hand, the heating COP in the case of a heat pump was determined by performing theoretical refrigeration cycle calculation with respect to such each mixed refrigerant under the following conditions by using National Institute of Science and Technology (NIST) and Reference Fluid Thermodynamic and Transport Properties Database (Refprop 9.0).

Evaporating temperature −30° C.
Condensation temperature 30° C.
Superheating temperature 5 K
Subcooling temperature 5 K
Compressor efficiency 70%

The mileage was determined by the following expression.

Mileage=(Battery capacitance)/(Power consumption of driving force+Heating power consumption)

TABLE 113

| Item | | Unit | Reference Example 5-1 | Comparative Example 5-1 | Comparative Example 5-2 | Example 5-1 | Example 5-2 | Example 5-3 | Example 5-4 | Example 5-5 |
|---|---|---|---|---|---|---|---|---|---|---|
| Composition proportions | HFO-1132(E) | mass % | 0.0 | 0 | 10.0 | 12.1 | 15.0 | 20.0 | 25.0 | 30.0 |
| | HFO-1234yf | mass % | 0.0 | 100.0 | 90.0 | 87.9 | 85.0 | 80.0 | 75.0 | 70.0 |
| | HFC-134a | mass % | 100.0 | 0.0 | 0.0 | 0.0 | 0.0 | 0.0 | 0.0 | 0.0 |
| GWP (AR4) | | — | 1430 | 4 | 5 | 5 | 5 | 5 | 6 | 6 |
| COP rate (relative to that of R1234yf) | | % | 105 | 100 | 100 | 100 | 100 | 100 | 100 | 100 |
| Refrigerating capacity ratio (relative to that of R1234yf) | | % | 99 | 100 | 123 | 128 | 134 | 145 | 155 | 165 |
| Power consumption of driving force | | % | 100 | 100 | 100 | 100 | 100 | 100 | 100 | 100 |
| Heating power consumption | | % | 95 | 100 | 100 | 33 | 33 | 33 | 33 | 33 |
| Mileage (without heating) | | % | 100 | 100 | 100 | 100 | 100 | 100 | 100 | 100 |
| Mileage (with heating) | | % | 50 | 50 | 50 | 84 | 84 | 84 | 84 | 84 |
| Discharge temperature | | ° C. | 66.0 | 48.0 | 54.8 | 56.0 | 57.5 | 59.8 | 61.9 | 63.9 |
| Flame velocity | | cm/s | 0.0 | 1.5 | 1.5 | 1.5 | 15 | 1.5 | 1.5 | 1.5 |
| Boiling point | | ° C. | −26.1 | −29.5 | −38.8 | −40.0 | −41.4 | −43.3 | −44.7 | −45.9 |
| Saturation pressure at-40° C. | | kPaG | −50.1 | −39 | −4.4 | 0.9 | 7.5 | 17.2 | 25.3 | 32.3 |
| Heating method | | System | Electric heater | Electric heater | Electric heater | Heat pump | Heat pump | Heat pump | Heat pump | Heat pump |

TABLE 113-continued

| Item | | Example 5-6 | Example 5-7 | Example 5-8 | Example 5-9 | Example 5-10 | Example 5-11 | Example 5-12 | Example 5-13 | Comparative Example 5-3 |
|---|---|---|---|---|---|---|---|---|---|---|
| Composition proportions | HFO-1132(E) | 35.0 | 400 | 45.0 | 50.0 | 55.0 | 60.0 | 65.0 | 72.0 | 75.0 |
| | HFO-1234yf | 65.0 | 60.0 | 55.0 | 50.0 | 45.0 | 40.0 | 35.0 | 28.0 | 25.0 |
| | HFC-134a | 0.0 | 0.0 | 0.0 | 0.0 | 0.0 | 0.0 | 0.0 | 0.0 | 0.0 |
| GWP (AR4) | | 6 | 6 | 7 | 7 | 7 | 8 | 8 | 8 | 9 |
| COP rate (relative to that of R1234yf) | | 100 | 100 | 100 | 100 | 100 | 100 | 100 | 100 | 100 |
| Refrigerating capacity ratio (relative to that of R1234yf) | | 175 | 185 | 194 | 203 | 212 | 220 | 229 | 240 | 245 |
| Power consumption of driving force | | 100 | 100 | 100 | 100 | 100 | 100 | 100 | 100 | 100 |
| Heating power consumption | | 33 | 33 | 33 | 33 | 33 | 33 | 33 | 33 | 33 |
| Mileage (without heating) | | 100 | 100 | 100 | 100 | 100 | 100 | 100 | 100 | 100 |
| Mileage (with heating) | | 84 | 84 | 84 | 84 | 84 | 84 | 84 | 84 | 84 |
| Discharge temperature | | 65.8 | 67.6 | 69.3 | 70.9 | 72.6 | 74.2 | 75.9 | 78.2 | 79.2 |
| Flame velocity | | 2.0 | 2.6 | 3.4 | 4.3 | 5.3 | 6.5 | 7.8 | 9.9 | 10.9 |
| Boiling point | | −46.9 | −47.7 | −48.4 | −49.1 | −49.6 | −50.2 | −50.5 | −51.2 | −51.4 |
| Saturation pressure at-40° C. | | 38.4 | 43.9 | 48.8 | 53.4 | 57.5 | 61.4 | 65.0 | 69.6 | 71.5 |
| Heating method | | Heat pump | Heat pump | Heat pump | Heat pump | Heat pump | Heat pump | Heat pump | Heat pump | Heat pump |

(2) Refrigerating Oil

A refrigerating oil as technique of second group can improve the lubricity in the refrigeration cycle apparatus and can also achieve efficient cycle performance by performing a refrigeration cycle such as a refrigeration cycle together with a refrigerant composition.

Examples of the refrigerating oil include oxygen-containing synthetic oils (e.g., ester-type refrigerating oils and ether-type refrigerating oils) and hydrocarbon refrigerating oils. In particular, ester-type refrigerating oils and ether-type refrigerating oils are preferred from the viewpoint of miscibility with refrigerants or refrigerant compositions. The refrigerating oils may be used alone or in combination of two or more.

The kinematic viscosity of the refrigerating oil at 40° C. is preferably 1 $mm^2/s$ or more and 750 $mm^2/s$ or less and more preferably 1 $mm^2/s$ or more and 400 $mm^2/s$ or less from at least one of the viewpoints of suppressing the deterioration of the lubricity and the hermeticity of compressors, achieving sufficient miscibility with refrigerants under low-temperature conditions, suppressing the lubrication failure of compressors, and improving the heat exchange efficiency of evaporators. Herein, the kinematic viscosity of the refrigerating oil at 100° C. may be, for example, 1 $mm^2/s$ or more and 100 $mm^2/s$ or less and is more preferably 1 $mm^2/s$ or more and 50 $mm^2/s$ or less.

The refrigerating oil preferably has an aniline point of −100° C. or higher and 0° C. or lower. The term "aniline point" herein refers to a numerical value indicating the solubility of, for example, a hydrocarbon solvent, that is, refers to a temperature at which when equal volumes of a sample (herein, refrigerating oil) and aniline are mixed with each other and cooled, turbidity appears because of their immiscibility (provided in JIS K 2256). Note that this value is a value of the refrigerating oil itself in a state in which the refrigerant is not dissolved. By using a refrigerating oil having such an aniline point, for example, even when bearings constituting resin functional components and insulating materials for electric motors are used at positions in contact with the refrigerating oil, the suitability of the refrigerating oil for the resin functional components can be improved. Specifically, if the aniline point is excessively low, the refrigerating oil readily infiltrates the bearings and the insulating materials, and thus the bearings and the like tend to swell. On the other hand, if the aniline point is excessively high, the refrigerating oil does not readily infiltrate the bearings and the insulating materials, and thus the bearings and the like tend to shrink. Accordingly, the deformation of the bearings and the insulating materials due to swelling or shrinking can be prevented by using the refrigerating oil having an aniline point within the above-described predetermined range (−100° C. or higher and 0° C. or lower). If the bearings deform through swelling, the desired length of a gap at a sliding portion cannot be maintained. This may result in an increase in sliding resistance. If the bearings deform through shrinking, the hardness of the bearings increases, and consequently the bearings may be broken because of vibration of a compressor. In other words, the deformation of the bearings through shrinking may decrease the rigidity of the sliding portion. Furthermore, if the insulating materials (e.g., insulating coating materials and insulating films) of electric motors deform through swelling, the insulating properties of the insulating materials deteriorate. If the insulating materials deform through shrinking, the insulating materials may also be broken as in the case of the bearings, which also deteriorates the insulating properties. In contrast, when the refrigerating oil having an aniline point within the predetermined range is used as described above, the deformation of bearings and insulating materials due to swelling or shrinking can be suppressed, and thus such a problem can be avoided.

The refrigerating oil is used as a working fluid for a refrigerating machine by being mixed with a refrigerant composition. The content of the refrigerating oil relative to the whole amount of working fluid for a refrigerating machine is preferably 5 mass % or more and 60 mass % or less and more preferably 10 mass % or more and 50 mass % or less.

(2-1) Oxygen-Containing Synthetic Oil

An ester-type refrigerating oil or an ether-type refrigerating oil serving as an oxygen-containing synthetic oil is mainly constituted by carbon atoms and oxygen atoms. In the ester-type refrigerating oil or the ether-type refrigerating oil, an excessively low ratio (carbon/oxygen molar ratio) of carbon atoms to oxygen atoms increases the hygroscopicity, and an excessively high ratio of carbon atoms to oxygen atoms deteriorates the miscibility with a refrigerant. Therefore, the molar ratio is preferably 2 or more and 7.5 or less.

(2-1-1) Ester-Type Refrigerating Oil

Examples of base oil components of the ester-type refrigerating oil include dibasic acid ester oils of a dibasic acid and a monohydric alcohol, polyol ester oils of a polyol and a fatty acid, complex ester oils of a polyol, a polybasic acid, and a monohydric alcohol (or a fatty acid), and polyol carbonate oils from the viewpoint of chemical stability.

(Dibasic Acid Ester Oil)

The dibasic acid ester oil is preferably an ester of a dibasic acid such as oxalic acid, malonic acid, succinic acid, glutaric acid, adipic acid, pimelic acid, suberic acid, azelaic acid, sebacic acid, phthalic acid, isophthalic acid, or terephthalic acid, in particular, a dibasic acid having 5 to 10 carbon atoms (e.g., glutaric acid, adipic acid, pimelic acid, suberic acid, azelaic acid, or sebacic acid) and a monohydric alcohol having a linear or branched alkyl group and having 1 to 15 carbon atoms (e.g., methanol, ethanol, propanol, butanol, pentanol, hexanol, heptanol, octanol, nonanol, decanol, undecanol, dodecanol, tridecanol, tetradecanol, or pentadecanol). Specific examples of the dibasic acid ester oil include ditridecyl glutarate, di(2-ethylhexyl) adipate, diisodecyl adipate, ditridecyl adipate, and di(3-ethylhexyl) sebacate.

(Polyol Ester Oil)

The polyol ester oil is an ester synthesized from a polyhydric alcohol and a fatty acid (carboxylic acid), and has a carbon/oxygen molar ratio of 2 or more and 7.5 or less, preferably 3.2 or more and 5.8 or less.

The polyhydric alcohol constituting the polyol ester oil is a diol (e.g., ethylene glycol, 1,3-propanediol, propylene glycol, 1,4-butanediol, 1,2-butanediol, 2-methyl-1,3-propanediol, 1,5-pentanediol, neopentyl glycol, 1,6-hexanediol, 2-ethyl-2-methyl-1,3-propanediol, 1,7-heptanediol, 2-methyl-2-propyl-1,3-propanediol, 2,2-diethyl-1,3-propanediol, 1,8-octanediol, 1,9-nonanediol, 1,10-decanediol, 1,11-undecanediol, or 1,12-dodecanediol) or a polyol having 3 to 20 hydroxyl groups (trimethylolethane, trimethylolpropane, trimethylolbutane, di-(trimethylolpropane), tri-(trimethylolpropane), pentaerythritol, di-(pentaerythritol), tri-(pentaerythritol), glycerol, polyglycerol (glycerol dimer or trimer), 1,3,5-pentanetriol, sorbitol, sorbitan, a sorbitol-glycerol condensate, a polyhydric alcohol such as adonitol, arabitol, xylitol, or mannitol, a saccharide such as xylose, arabinose, ribose, rhamnose, glucose, fructose, galactose, mannose, sorbose, cellobiose, maltose, isomaltose, trehalose, sucrose, raffinose, gentianose, or melezitose, or a partially etherified product of the foregoing). One or two or more polyhydric alcohols may constitute an ester.

For the fatty acid constituting the polyol ester, the number of carbon atoms is not limited, but is normally 1 to 24. A linear fatty acid or a branched fatty acid is preferred. Examples of the linear fatty acid include acetic acid, propionic acid, butanoic acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, eicosanoic acid, oleic acid, linoleic acid, and linolenic acid. The hydrocarbon group that bonds to a carboxy group may have only a saturated hydrocarbon or may have an unsaturated hydrocarbon. Examples of the branched fatty acid include 2-methylpropionic acid, 2-methylbutanoic acid, 3-methylbutanoic acid, 2,2-dimethylpropionic acid, 2-methylpentanoic acid, 3-methylpentanoic acid, 4-methylpentanoic acid, 2,2-dimethylbutanoic acid, 2,3-dimethylbutanoic acid, 3,3-dimethylbutanoic acid, 2-methylhexanoic acid, 3-methylhexanoic acid, 4-methylhexanoic acid, 5-methylhexanoic acid, 2,2-dimethylpentanoic acid, 2,3-dimethylpentanoic acid, 2,4-dimethylpentanoic acid, 3,3-dimethylpentanoic acid, 3,4-dimethylpentanoic acid, 4,4-dimethylpentanoic acid, 2-ethylpentanoic acid, 3-ethylpentanoic acid, 2,2,3-trimethylbutanoic acid, 2,3,3-trimethylbutanoic acid, 2-ethyl-2-methylbutanoic acid, 2-ethyl-3-methylbutanoic acid, 2-methylheptanoic acid, 3-methylheptanoic acid, 4-methylheptanoic acid, 5-methylheptanoic acid, 6-methylheptanoic acid, 2-ethylhexanoic acid, 3-ethylhexanoic acid, 4-ethylhexanoic acid, 2,2-dimethylhexanoic acid, 2,3-dimethylhexanoic acid, 2,4-dimethylhexanoic acid, 2,5-dimethylhexanoic acid, 3,3-dimethylhexanoic acid, 3,4-dimethylhexanoic acid, 3,5-dimethylhexanoic acid, 4,4-dimethylhexanoic acid, 4,5-dimethylhexanoic acid, 5,5-dimethylhexanoic acid, 2-propylpentanoic acid, 2-methyloctanoic acid, 3-methyloctanoic acid, 4-methyloctanoic acid, 5-methyloctanoic acid, 6-methyloctanoic acid, 7-methyloctanoic acid, 2,2-dimethylheptanoic acid, 2,3-dimethylheptanoic acid, 2,4-dimethylheptanoic acid, 2,5-dimethylheptanoic acid, 2,6-dimethylheptanoic acid, 3,3-dimethylheptanoic acid, 3,4-dimethylheptanoic acid, 3,5-dimethylheptanoic acid, 3,6-dimethylheptanoic acid, 4,4-dimethylheptanoic acid, 4,5-dimethylheptanoic acid, 4,6-dimethylheptanoic acid, 5,5-dimethylheptanoic acid, 5,6-dimethylheptanoic acid, 6,6-dimethylheptanoic acid, 2-methyl-2-ethylhexanoic acid, 2-methyl-3-ethylhexanoic acid, 2-methyl-4-ethylhexanoic acid, 3-methyl-2-ethylhexanoic acid, 3-methyl-3-ethylhexanoic acid, 3-methyl-4-ethylhexanoic acid, 4-methyl-2-ethylhexanoic acid, 4-methyl-3-ethylhexanoic acid, 4-methyl-4-ethylhexanoic acid, 5-methyl-2-ethylhexanoic acid, 5-methyl-3-ethylhexanoic acid, 5-methyl-4-ethylhexanoic acid, 2-ethylheptanoic acid, 3-methyloctanoic acid, 3,5,5-trimethylhexanoic acid, 2-ethyl-2,3,3-trimethylbutyric acid, 2,2,4,4-tetramethylpentanoic acid, 2,2,3,3-tetramethylpentanoic acid, 2,2,3,4-tetramethylpentanoic acid, and 2,2-diisopropylpropanoic acid. One or two or more fatty acids selected from the foregoing may constitute an ester.

One polyhydric alcohol may be used to constitute an ester or a mixture of two or more polyhydric alcohols may be used to constitute an ester. The fatty acid constituting an ester may be a single component, or two or more fatty acids may constitute an ester. The fatty acids may be individual fatty acids of the same type or may be two or more types of fatty acids as a mixture. The polyol ester oil may have a free hydroxyl group.

Specifically, the polyol ester oil is more preferably an ester of a hindered alcohol such as neopentyl glycol, trimethylolethane, trimethylolpropane, trimethylolbutane, di-(trimethylolpropane), tri-(trimethylolpropane), pentaerythritol, di-(pentaerythritol), or tri-(pentaerythritol); further preferably an ester of neopentyl glycol, trimethylolethane, trimethylolpropane, trimethylolbutane, pentaerythritol, or di-(pentaerythritol); and preferably an ester of neopentyl glycol, trimethylolpropane, pentaerythritol, di-(pentaerythritol), or the like and a fatty acid having 2 to 20 carbon atoms.

The fatty acid constituting such a polyhydric alcohol fatty acid ester may be only a fatty acid having a linear alkyl group or may be selected from fatty acids having a branched structure. A mixed ester of linear and branched fatty acids may be employed. Furthermore, two or more fatty acids selected from the above fatty acids may be used to constitute an ester.

Specifically, for example, in the case of a mixed ester of linear and branched fatty acids, the molar ratio of a linear fatty acid having 4 to 6 carbon atoms and a branched fatty acid having 7 to 9 carbon atoms is 15:85 to 90:10, preferably 15:85 to 85:15, more preferably 20:80 to 80:20, further preferably 25:75 to 75:25, and most preferably 30:70 to 70:30. The total content of the linear fatty acid having 4 to 6 carbon atoms and the branched fatty acid having 7 to 9 carbon atoms relative to the whole amount of fatty acid constituting the polyhydric alcohol fatty acid ester is preferably 20 mol % or more. The fatty acid preferably has such a composition that both of sufficient miscibility with a refrigerant and viscosity required as a refrigerating oil are achieved. The content of a fatty acid herein refers to a value relative to the whole amount of fatty acid constituting the polyhydric alcohol fatty acid ester contained in the refrigerating oil.

In particular, the refrigerating oil preferably contains an ester (hereafter referred to as a "polyhydric alcohol fatty acid ester (A)") in which the molar ratio of the fatty acid having 4 to 6 carbon atoms and the branched fatty acid having 7 to 9 carbon atoms is 15:85 to 90:10, the fatty acid having 4 to 6 carbon atoms contains 2-methylpropionic acid, and the total content of the fatty acid having 4 to 6 carbon atoms and the branched fatty acid having 7 to 9 carbon atoms relative to the whole amount of fatty acid constituting the above ester is 20 mol % or more.

The polyhydric alcohol fatty acid ester (A) includes a complete ester in which all hydroxyl groups of a polyhydric alcohol are esterified, a partial ester in which some hydroxyl groups of a polyhydric alcohol are left without being esterified, and a mixture of a complete ester and a partial ester. The hydroxyl value of the polyhydric alcohol fatty acid ester (A) is preferably 10 mgKOH/g or less, more preferably 5 mgKOH/g or less, and most preferably 3 mgKOH/g or less.

For the fatty acid constituting the polyhydric alcohol fatty acid ester (A), the molar ratio of the fatty acid having 4 to 6 carbon atoms and the branched fatty acid having 7 to 9 carbon atoms is 15:85 to 90:10, preferably 15:85 to 85:15, more preferably 20:80 to 80:20, further preferably 25:75 to 75:25, and most preferably 30:70 to 70:30. The total content of the fatty acid having 4 to 6 carbon atoms and the branched fatty acid having 7 to 9 carbon atoms relative to the whole amount of fatty acid constituting the polyhydric alcohol fatty acid ester (A) is 20 mol % or more. In the case where the above conditions for the composition of the fatty acid are not satisfied, if difluoromethane is contained in the refrigerant composition, both of sufficient miscibility with the difluoromethane and viscosity required as a refrigerating oil are not easily achieved at high levels. The content of a fatty acid refers to a value relative to the whole amount of fatty acid constituting the polyhydric alcohol fatty acid ester contained in the refrigerating oil.

Specific examples of the fatty acid having 4 to 6 carbon atoms include butanoic acid, 2-methylpropionic acid, pentanoic acid, 2-methylbutanoic acid, 3-methylbutanoic acid, 2,2-dimethylpropionic acid, 2-methylpentanoic acid, 3-methylpentanoic acid, 4-methylpentanoic acid, 2,2-dimethylbutanoic acid, 2,3-dimethylbutanoic acid, 3,3-dimethylbutanoic acid, and hexanoic acid. Among them, a fatty acid having a branched structure at an alkyl skeleton, such as 2-methylpropionic acid, is preferred.

Specific examples of the branched fatty acid having 7 to 9 carbon atoms include 2-methylhexanoic acid, 3-methylhexanoic acid, 4-methylhexanoic acid, 5-methylhexanoic acid, 2,2-dimethylpentanoic acid, 2,3-dimethylpentanoic acid, 2,4-dimethylpentanoic acid, 3,3-dimethylpentanoic acid, 3,4-dimethylpentanoic acid, 4,4-dimethylpentanoic acid, 2-ethylpentanoic acid, 3-ethylpentanoic acid, 1,1,2-trimethylbutanoic acid, 1,2,2-trimethylbutanoic acid, 1-ethyl-1-methylbutanoic acid, 1-ethyl-2-methylbutanoic acid, octanoic acid, 2-ethylhexanoic acid, 3-ethylhexanoic acid, 3,5-dimethylhexanoic acid, 2,4-dimethylhexanoic acid, 3,4-dimethylhexanoic acid, 4,5-dimethylhexanoic acid, 2,2-dimethylhexanoic acid, 2-methylheptanoic acid, 3-methylheptanoic acid, 4-methylheptanoic acid, 5-methylheptanoic acid, 6-methylheptanoic acid, 2-propylpentanoic acid, nonanoic acid, 2,2-dimethylheptanoic acid, 2-methyloctanoic acid, 2-ethylheptanoic acid, 3-methyloctanoic acid, 3,5,5-trimethylhexanoic acid, 2-ethyl-2,3,3-trimethylbutyric acid, 2,2,4,4-tetramethylpentanoic acid, 2,2,3,3-tetramethylpentanoic acid, 2,2,3,4-tetramethylpentanoic acid, and 2,2-diisopropylpropanoic acid.

The polyhydric alcohol fatty acid ester (A) may contain, as an acid constituent component, a fatty acid other than the fatty acid having 4 to 6 carbon atoms and the branched fatty acid having 7 to 9 carbon atoms as long as the molar ratio of the fatty acid having 4 to 6 carbon atoms and the branched fatty acid having 7 to 9 carbon atoms is 15:85 to 90:10 and the fatty acid having 4 to 6 carbon atoms contains 2-methylpropionic acid.

Specific examples of the fatty acid other than the fatty acid having 4 to 6 carbon atoms and the branched fatty acid having 7 to 9 carbon atoms include fatty acids having 2 or 3 carbon atoms, such as acetic acid and propionic acid; linear fatty acids having 7 to 9 carbon atoms, such as heptanoic acid, octanoic acid, and nonanoic acid; and fatty acids having 10 to 20 carbon atoms, such as decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, eicosanoic acid, and oleic acid.

When the fatty acid having 4 to 6 carbon atoms and the branched fatty acid having 7 to 9 carbon atoms are used in combination with fatty acids other than these fatty acids, the total content of the fatty acid having 4 to 6 carbon atoms and the branched fatty acid having 7 to 9 carbon atoms relative to the whole amount of fatty acid constituting the polyhydric alcohol fatty acid ester (A) is preferably 20 mol % or more, more preferably 25 mol % or more, and further preferably 30 mol % or more. When the content is 20 mol % or more, sufficient miscibility with difluoromethane is achieved in the case where the difluoromethane is contained in the refrigerant composition.

A polyhydric alcohol fatty acid ester (A) containing, as acid constituent components, only 2-methylpropionic acid and 3,5,5-trimethylhexanoic acid is particularly preferred from the viewpoint of achieving both necessary viscosity and miscibility with difluoromethane in the case where the difluoromethane is contained in the refrigerant composition.

The polyhydric alcohol fatty acid ester may be a mixture of two or more esters having different molecular structures. In this case, individual molecules do not necessarily satisfy the above conditions as long as the whole fatty acid constituting a pentaerythritol fatty acid ester contained in the refrigerating oil satisfies the above conditions.

As described above, the polyhydric alcohol fatty acid ester (A) contains the fatty acid having 4 to 6 carbon atoms and the branched fatty acid having 7 to 9 carbon atoms as essential acid components constituting the ester and may optionally contain other fatty acids as constituent components. In other words, the polyhydric alcohol fatty acid ester (A) may contain only two fatty acids as acid constituent components or three or more fatty acids having different structures as acid constituent components, but the polyhydric alcohol fatty acid ester preferably contains, as an acid constituent component, only a fatty acid whose carbon atom (α-position carbon atom) adjacent to carbonyl carbon is not quaternary carbon. If the fatty acid constituting the polyhydric alcohol fatty acid ester contains a fatty acid whose α-position carbon atom is quaternary carbon, the lubricity in the presence of difluoromethane in the case where the difluoromethane is contained in the refrigerant composition tends to be insufficient.

The polyhydric alcohol constituting the polyol ester according to this embodiment is preferably a polyhydric alcohol having 2 to 6 hydroxyl groups.

Specific examples of the dihydric alcohol (diol) include ethylene glycol, 1,3-propanediol, propylene glycol, 1,4-butanediol, 1,2-butanediol, 2-methyl-1,3-propanediol, 1,5-pentanediol, neopentyl glycol, 1,6-hexanediol, 2-ethyl-2-methyl-1,3-propanediol, 1,7-heptanediol, 2-methyl-2-propyl-1,3-propanediol, 2,2-diethyl-1,3-propanediol, 1,8-octanediol, 1,9-nonanediol, 1,10-decanediol, 1,11-undecanediol, and 1,12-dodecanediol. Specific examples of the trihydric or higher alcohol include polyhydric alcohols such as trimethylolethane, trimethylolpropane, trimethylolbutane, di-(trimethylolpropane), tri-(trimethylolpropane), pentaerythritol, di-(pentaerythritol), tri-(pentaerythritol), glycerol, polyglycerol (glycerol dimer or trimer), 1,3,5-pentanetriol, sorbitol, sorbitan, sorbitol glycerol condensates, adonitol, arabitol, xylitol, and mannitol; saccharides such as xylose, arabinose, ribose, rhamnose, glucose, fructose, galactose, mannose, sorbose, and cellobiose; and partially etherified products of the foregoing. Among them, in terms of better hydrolysis stability, an ester of a hindered alcohol such as neopentyl glycol, trimethylolethane, trimethylolpropane, trimethylolbutane, di-(trimethylolpropane), tri-(trimethylolpropane), pentaerythritol, di-(pentaerythritol), or tri-(pentaerythritol) is preferably used; an ester of neopentyl glycol, trimethylolethane, trimethylolpropane, trimethylolbutane, pentaerythritol, or di-(pentaerythritol) is more preferably used; and neopentyl glycol, trimethylolpropane, pentaerythritol, or di-(pentaerythritol) is further preferably used. In terms of excellent miscibility with a refrigerant and excellent hydrolysis stability, a mixed ester of pentaerythritol, di-(pentaerythritol), or pentaerythritol and di-(pentaerythritol) is most preferably used.

Preferred examples of the acid constituent component constituting the polyhydric alcohol fatty acid ester (A) are as follows:

(i) a combination of 1 to 13 acids selected from butanoic acid, 2-methylpropionic acid, pentanoic acid, 2-methylbutanoic acid, 3-methylbutanoic acid, 2,2-dimethylpropionic acid, 2-methylpentanoic acid, 3-methylpentanoic acid, 4-methylpentanoic acid, 2,2-dimethylbutanoic acid, 2,3-dimethylbutanoic acid, 3,3-dimethylbutanoic acid, and hexanoic acid and 1 to 13 acids selected from 2-methylhexanoic acid, 3-methylhexanoic acid, 4-methylhexanoic acid, 5-methylhexanoic acid, 2,2-dimethylpentanoic acid, 2,3-dimethylpentanoic acid, 2,4-dimethylpentanoic acid, 3,3-dimethylpentanoic acid, 3,4-dimethylpentanoic acid, 4,4-dimethylpentanoic acid, 2-ethylpentanoic acid, 3-ethylpentanoic acid, and 2-ethyl-3-methylbutanoic acid;

(ii) a combination of 1 to 13 acids selected from butanoic acid, 2-methylpropionic acid, pentanoic acid, 2-methylbutanoic acid, 3-methylbutanoic acid, 2,2-dimethylpropionic acid, 2-methylpentanoic acid, 3-methylpentanoic acid, 4-methylpentanoic acid, 2,2-dimethylbutanoic acid, 2,3-dimethylbutanoic acid, 3,3-dimethylbutanoic acid, and hexanoic acid and 1 to 25 acids selected from 2-methylheptanoic acid, 3-methylheptanoic acid, 4-methylheptanoic acid, 5-methylheptanoic acid, 6-methylheptanoic acid, 2,2-dimethylhexanoic acid, 3,3-dimethylhexanoic acid, 4,4-dimethylhexanoic acid, 5,5-dimethylhexanoic acid, 2,3-dimethylhexanoic acid, 2,4-dimethylhexanoic acid, 2,5-dimethylhexanoic acid, 3,4-dimethylhexanoic acid, 3,5-dimethylhexanoic acid, 4,5-dimethylhexanoic acid, 2,2,3-trimethylpentanoic acid, 2,3,3-trimethylpentanoic acid, 2,4,4-trimethylpentanoic acid, 3,4,4-trimethylpentanoic acid, 2-ethylhexanoic acid, 3-ethylhexanoic acid, 2-propylpentanoic acid, 2-methyl-2-ethylpentanoic acid, 2-methyl-3-ethylpentanoic acid, and 3-methyl-3-ethylpentanoic acid; and (iii) a combination of 1 to 13 acids selected from butanoic acid, 2-methylpropionic acid, pentanoic acid, 2-methylbutanoic acid, 3-methylbutanoic acid, 2,2-dimethylpropionic acid, 2-methylpentanoic acid, 3-methylpentanoic acid, 4-methylpentanoic acid, 2,2-dimethylbutanoic acid, 2,3-dimethylbutanoic acid, 3,3-dimethylbutanoic acid, and hexanoic acid and 1 to 50 acids selected from 2-methyloctanoic acid, 3-methyloctanoic acid, 4-methyloctanoic acid, 5-methyloctanoic acid, 6-methyloctanoic acid, 7-methyloctanoic acid, 8-methyloctanoic acid, 2,2-dimethylheptanoic acid, 3,3-dimethylheptanoic acid, 4,4-dimethylheptanoic acid, 5,5-dimethylheptanoic acid, 6,6-dimethylheptanoic acid, 2,3-dimethylheptanoic acid, 2,4-dimethylheptanoic acid, 2,5-dimethylheptanoic acid, 2,6-dimethylheptanoic acid, 3,4-dimethylheptanoic acid, 3,5-dimethylheptanoic acid, 3,6-dimethylheptanoic acid, 4,5-dimethylheptanoic acid, 4,6-dimethylheptanoic acid, 2-ethylheptanoic acid, 3-ethylheptanoic acid, 4-ethylheptanoic acid, 5-ethylheptanoic acid, 2-propylhexanoic acid, 3-propylhexanoic acid, 2-butylpentanoic acid, 2,2,3-trimethylhexanoic acid, 2,2,3-trimethylhexanoic acid, 2,2,4-trimethylhexanoic acid, 2,2,5-trimethylhexanoic acid, 2,3,4-trimethylhexanoic acid, 2,3,5-trimethylhexanoic acid, 3,3,4-trimethylhexanoic acid, 3,3,5-trimethylhexanoic acid, 3,5,5-trimethylhexanoic acid, 4,4,5-trimethylhexanoic acid, 4,5,5-trimethylhexanoic acid, 2,2,3,3-tetramethylpentanoic acid, 2,2,3,4-tetramethylpentanoic acid, 2,2,4,4-tetramethylpentanoic acid, 2,3,4,4-tetramethylpentanoic acid, 3,3,4,4-tetramethylpentanoic acid, 2,2-diethylpentanoic acid, 2,3-diethylpentanoic acid, 3,3-diethylpentanoic acid, 2-ethyl-2,3,3-trimethylbutyric acid, 3-ethyl-2,2,3-trimethylbutyric acid, and 2,2-diisopropylpropionic acid.

Further preferred examples of the acid constituent component constituting the polyhydric alcohol fatty acid ester are as follows:

(i) a combination of 2-methylpropionic acid and 1 to 13 acids selected from 2-methylhexanoic acid, 3-methylhexanoic acid, 4-methylhexanoic acid, 5-methylhexanoic acid, 2,2-dimethylpentanoic acid, 2,3-dimethylpentanoic acid, 2,4-dimethylpentanoic acid, 3,3-dimethylpentanoic acid, 3,4-dimethylpentanoic acid, 4,4-dimethylpentanoic acid, 2-ethylpentanoic acid, 3-ethylpentanoic acid, and 2-ethyl-3-methylbutanoic acid;

(ii) a combination of 2-methylpropionic acid and 1 to 25 acids selected from 2-methylheptanoic acid, 3-methylheptanoic acid, 4-methylheptanoic acid, 5-methylheptanoic acid, 6-methylheptanoic acid, 2,2-dimethylhexanoic acid, 3,3-dimethylhexanoic acid, 4,4-dimethylhexanoic acid, 5,5-dimethylhexanoic acid, 2,3-dimethylhexanoic acid, 2,4-dimethylhexanoic acid, 2,5-dimethylhexanoic acid, 3,4-dimethylhexanoic acid, 3,5-dimethylhexanoic acid, 4,5-dimethylhexanoic acid, 2,2,3-trimethylpentanoic acid, 2,3,3-trimethylpentanoic acid, 2,4,4-trimethylpentanoic acid, 3,4,4-trimethylpentanoic acid, 2-ethylhexanoic acid, 3-ethylhexanoic acid, 2-propylpentanoic acid, 2-methyl-2-ethylpentanoic acid, 2-methyl-3-ethylpentanoic acid, and 3-methyl-3-ethylpentanoic acid; and (iii) a combination of 2-methylpropionic acid and 1 to 50 acids selected from 2-methyloctanoic acid, 3-methyloctanoic acid, 4-methyloctanoic acid, 5-methyloctanoic acid, 6-methyloctanoic acid, 7-methyloctanoic acid, 8-methyloctanoic acid, 2,2-dimethylheptanoic acid, 3,3-dimethylheptanoic acid, 4,4-dimethylheptanoic acid, 5,5-dimethylheptanoic acid, 6,6-dimethylheptanoic acid, 2,3-dimethylheptanoic acid, 2,4-dimethylheptanoic acid, 2,5-dimethylheptanoic acid, 2,6-dimethylheptanoic acid, 3,4-dimethylheptanoic acid, 3,5-dimethylheptanoic acid, 3,6-dimethylheptanoic acid, 4,5-dimethylheptanoic acid, 4,6-dimethylheptanoic acid, 2-ethylheptanoic acid, 3-ethylheptanoic acid, 4-ethylheptanoic acid, 5-ethylheptanoic acid, 2-propylhexanoic acid, 3-propylhexanoic acid, 2-butylpentanoic acid, 2,2,3-trimethylhexanoic acid, 2,2,3-trimethylhexanoic acid, 2,2,4-trimethylhexanoic acid, 2,2,5-trimethylhexanoic acid, 2,3,4-trimethylhexanoic acid, 2,3,5-trimethylhexanoic acid, 3,3,4-trimethylhexanoic acid, 3,3,5-trimethylhexanoic acid, 3,5,5-trimethylhexanoic acid, 4,4,5-trimethylhexanoic acid, 4,5,5-trimethylhexanoic acid, 2,2,3,3-tetramethylpentanoic acid, 2,2,3,4-tetramethylpentanoic acid, 2,2,4,4-tetramethylpentanoic acid, 2,3,4,4-tetramethylpentanoic acid, 3,3,4,4-tetramethylpentanoic acid, 2,2-diethylpentanoic acid, 2,3-diethylpentanoic acid, 3,3-diethylpentanoic acid, 2-ethyl-2,3,3-trimethylbutyric acid, 3-ethyl-2,2,3-trimethylbutyric acid, and 2,2-diisopropylpropionic acid.

The content of the polyhydric alcohol fatty acid ester (A) is 50 mass % or more, preferably 60 mass % or more, more preferably 70 mass % or more, and further preferably 75 mass % or more relative to the whole amount of the refrigerating oil. The refrigerating oil according to this embodiment may contain a lubricating base oil other than the polyhydric alcohol fatty acid ester (A) and additives as described later. However, if the content of the polyhydric alcohol fatty acid ester (A) is less than 50 mass %, necessary viscosity and miscibility cannot be achieved at high levels.

In the refrigerating oil according to this embodiment, the polyhydric alcohol fatty acid ester (A) is mainly used as a base oil. The base oil of the refrigerating oil according to this embodiment may be a polyhydric alcohol fatty acid ester (A) alone (i.e., the content of the polyhydric alcohol fatty acid ester (A) is 100 mass %). However, in addition to the polyhydric alcohol fatty acid ester (A), a base oil other than the polyhydric alcohol fatty acid ester (A) may be further contained to the degree that the excellent performance of the polyhydric alcohol fatty acid ester (A) is not impaired. Examples of the base oil other than the polyhydric alcohol fatty acid ester (A) include hydrocarbon oils such as mineral oils, olefin polymers, alkyldiphenylalkanes, alkylnaphthalenes, and alkylbenzenes; and esters other than the polyhydric alcohol fatty acid ester (A), such as polyol esters, complex esters, and alicyclic dicarboxylic acid esters, and oxygen-containing synthetic oils (hereafter, may be referred to as "other oxygen-containing synthetic oils") such as polyglycols, polyvinyl ethers, ketones, polyphenyl ethers, silicones, polysiloxanes, and perfluoroethers.

Among them, the oxygen-containing synthetic oil is preferably an ester other than the polyhydric alcohol fatty acid ester (A), a polyglycol, or a polyvinyl ether and particularly preferably a polyol ester other than the polyhydric alcohol fatty acid ester (A). The polyol ester other than the polyhydric alcohol fatty acid ester (A) is an ester of a fatty acid and a polyhydric alcohol such as neopentyl glycol, trimethylolethane, trimethylolpropane, trimethylolbutane, pentaerythritol, or dipentaerythritol and is particularly preferably an ester of neopentyl glycol and a fatty acid, an ester of pentaerythritol and a fatty acid, or an ester of dipentaerythritol and a fatty acid.

The neopentyl glycol ester is preferably an ester of neopentyl glycol and a fatty acid having 5 to 9 carbon atoms. Specific examples of the neopentyl glycol ester include neopentyl glycol di(3,5,5-trimethylhexanoate), neopentyl glycol di(2-ethylhexanoate), neopentyl glycol di(2-methylhexanoate), neopentyl glycol di(2-ethylpentanoate), an ester of neopentyl glycol and 2-methylhexanoic acid-2-ethylpentanoic acid, an ester of neopentyl glycol and 3-methylhexanoic acid-5-methylhexanoic acid, an ester of neopentyl glycol and 2-methylhexanoic acid-2-ethylhexanoic acid, an ester of neopentyl glycol and 3,5-dimethylhexanoic acid-4,5-dimethylhexanoic acid-3,4-dimethylhexanoic acid, neopentyl glycol dipentanoate, neopentyl glycol di(2-ethylbutanoate), neopentyl glycol di(2-methylpentanoate), neopentyl glycol di(2-methylbutanoate), and neopentyl glycol di(3-methylbutanoate).

The pentaerythritol ester is preferably an ester of pentaerythritol and a fatty acid having 5 to 9 carbon atoms. The pentaerythritol ester is, specifically, an ester of pentaerythritol and at least one fatty acid selected from pentanoic acid, 2-methylbutanoic acid, 3-methylbutanoic acid, hexanoic acid, 2-methylpentanoic acid, 2-ethylbutanoic acid, 2-ethylpentanoic acid, 2-methylhexanoic acid, 3,5,5-trimethylhexanoic acid, and 2-ethylhexanoic acid.

The dipentaerythritol ester is preferably an ester of dipentaerythritol and a fatty acid having 5 to 9 carbon atoms. The dipentaerythritol ester is, specifically, an ester of dipentaerythritol and at least one fatty acid selected from pentanoic acid, 2-methylbutanoic acid, 3-methylbutanoic acid, hexanoic acid, 2-methylpentanoic acid, 2-ethylbutanoic acid, 2-ethylpentanoic acid, 2-methylhexanoic acid, 3,5,5-trimethylhexanoic acid, and 2-ethylhexanoic acid.

When the refrigerating oil according to this embodiment contains an oxygen-containing synthetic oil other than the polyhydric alcohol fatty acid ester (A), the content of the oxygen-containing synthetic oil other than the polyhydric alcohol fatty acid ester (A) is not limited as long as excellent lubricity and miscibility of the refrigerating oil according to this embodiment are not impaired. When a polyol ester other than the polyhydric alcohol fatty acid ester (A) is contained, the content of the polyol ester is preferably less than 50 mass %, more preferably 45 mass % or less, still more preferably 40 mass % or less, even more preferably 35 mass % or less, further preferably 30 mass % or less, and most preferably 25 mass % or less relative to the whole amount of the refrigerating oil. When an oxygen-containing synthetic oil other than the polyol ester is contained, the content of the oxygen-containing synthetic oil is preferably less than 50 mass %, more preferably 40 mass % or less, and further preferably 30 mass % or less relative to the whole amount of the refrigerating oil. If the content of the polyol ester other than the pentaerythritol fatty acid ester or the oxygen-containing synthetic oil is excessively high, the above-described effects are not sufficiently produced.

The polyol ester other than the polyhydric alcohol fatty acid ester (A) may be a partial ester in which some hydroxyl groups of a polyhydric alcohol are left without being esterified, a complete ester in which all hydroxyl groups are esterified, or a mixture of a partial ester and a complete ester. The hydroxyl value is preferably 10 mgKOH/g or less, more preferably 5 mgKOH/g or less, and most preferably 3 mgKOH/g or less.

When the refrigerating oil and the working fluid for a refrigerating machine according to this embodiment contain a polyol ester other than the polyhydric alcohol fatty acid ester (A), the polyol ester may contain one polyol ester having a single structure or a mixture of two or more polyol esters having different structures.

The polyol ester other than the polyhydric alcohol fatty acid ester (A) may be any of an ester of one fatty acid and one polyhydric alcohol, an ester of two or more fatty acids and one polyhydric alcohol, an ester of one fatty acid and two or more polyhydric alcohols, and an ester of two or more fatty acids and two or more polyhydric alcohols.

The refrigerating oil according to this embodiment may be constituted by only the polyhydric alcohol fatty acid ester (A) or by the polyhydric alcohol fatty acid ester (A) and other base oils. The refrigerating oil may further contain various additives described later. The working fluid for a refrigerating machine according to this embodiment may also further contain various additives. In the following description, the content of additives is expressed relative to the whole amount of the refrigerating oil, but the content of these components in the working fluid for a refrigerating machine is desirably determined so that the content is within the preferred range described later when expressed relative to the whole amount of the refrigerating oil.

To further improve the abrasion resistance and load resistance of the refrigerating oil and the working fluid for a refrigerating machine according to this embodiment, at least one phosphorus compound selected from the group consisting of phosphoric acid esters, acidic phosphoric acid esters, thiophosphoric acid esters, amine salts of acidic phosphoric acid esters, chlorinated phosphoric acid esters, and phosphorous acid esters can be added. These phosphorus compounds are esters of phosphoric acid or phosphorous acid and alkanol or polyether-type alcohol, or derivatives thereof.

Specific examples of the phosphoric acid ester include tributyl phosphate, tripentyl phosphate, trihexyl phosphate, triheptyl phosphate, trioctyl phosphate, trinonyl phosphate, tridecyl phosphate, triundecyl phosphate, tridodecyl phosphate, tritridecyl phosphate, tritetradecyl phosphate, tripentadecyl phosphate, trihexadecyl phosphate, triheptadecyl phosphate, trioctadecyl phosphate, trioleyl phosphate, triphenyl phosphate, tricresyl phosphate, trixylenyl phosphate, cresyldiphenyl phosphate, and xylenyldiphenyl phosphate.

Examples of the acidic phosphoric acid ester include monobutyl acid phosphate, monopentyl acid phosphate, monohexyl acid phosphate, monoheptyl acid phosphate, monooctyl acid phosphate, monononyl acid phosphate, monodecyl acid phosphate, monoundecyl acid phosphate, monododecyl acid phosphate, monotridecyl acid phosphate, monotetradecyl acid phosphate, monopentadecyl acid phosphate, monohexadecyl acid phosphate, monoheptadecyl acid phosphate, monooctadecyl acid phosphate, monooleyl acid phosphate, dibutyl acid phosphate, dipentyl acid phosphate, dihexyl acid phosphate, diheptyl acid phosphate, dioctyl acid phosphate, dinonyl acid phosphate, didecyl acid phosphate, diundecyl acid phosphate, didodecyl acid phosphate, ditridecyl acid phosphate, ditetradecyl acid phosphate, dipentadecyl acid phosphate, dihexadecyl acid phosphate, diheptadecyl acid phosphate, dioctadecyl acid phosphate, and dioleyl acid phosphate.

Examples of the thiophosphoric acid ester include tributyl phosphorothionate, tripentyl phosphorothionate, trihexyl phosphorothionate, triheptyl phosphorothionate, trioctyl phosphorothionate, trinonyl phosphorothionate, tridecyl phosphorothionate, triundecyl phosphorothionate, tridodecyl phosphorothionate, tritridecyl phosphorothionate, tritetradecyl phosphorothionate, tripentadecyl phosphorothionate, trihexadecyl phosphorothionate, triheptadecyl phosphorothionate, trioctadecyl phosphorothionate, trioleyl phosphorothionate, triphenyl phosphorothionate, tricresyl phosphorothionate, trixylenyl phosphorothionate, cresyldiphenyl phosphorothionate, and xylenyldiphenyl phosphorothionate.

The amine salt of an acidic phosphoric acid ester is an amine salt of an acidic phosphoric acid ester and a primary, secondary, or tertiary amine that has a linear or branched alkyl group and that has 1 to 24 carbon atoms, preferably 5 to 18 carbon atoms.

For the amine constituting the amine salt of an acidic phosphoric acid ester, the amine salt is a salt of an amine such as a linear or branched methylamine, ethylamine, propylamine, butylamine, pentylamine, hexylamine, heptylamine, octylamine, nonylamine, decylamine, undecylamine, dodecylamine, tridecylamine, tetradecylammne, pentadecylamine, hexadecylamine, heptadecylamine, octadecylamnne, oleylamine, tetracosylamine, dimethylamine, diethylamine, dipropylanune, dibutylamine, dipentylamine, dihexylamine, diheptylamine, dioctylamine, dinonylamine, didecylamine, diundecylamine, didodecylamine, ditridecylamine, ditetradecylamine, dipentadecylamine, dihexadecylamine, diheptadecylamine, dioctadecylamine, dioleylamine, ditetracosylamine, trimethylamine, triethylamine, tripropylamine, tributylamine, tripentylamine, trihexylamine, triheptylamine, trioctylamine, trinonylamine, tridecylamine, triundecylamine, tridodecylamine, tritridecylamine, tritetradecylamine, tripentadecylamine, tnhexadecylamine, tnheptadecylamine, tioctadecylamine, trioleylamine, or tritetracosylamine. The amine may be a single compound or a mixture of two or more compounds.

Examples of the chlorinated phosphoric acid ester include tris(dichloropropyl) phosphate, tris(chloroethyl) phosphate, tris(chlorophenyl) phosphate, and polyoxyalkylene-bis[di (chloroaklyl)]phosphate. Examples of the phosphorous acid ester include dibutyl phosphite, dipentyl phosphite, dihexyl phosphite, diheptyl phosphite, dioctyl phosphite, dinonyl phosphite, didecyl phosphite, diundecyl phosphite, didodecyl phosphite, dioleyl phosphite, diphenyl phosphite, dicresyl phosphite, tributyl phosphite, tripentyl phosphite, trihexyl phosphite, triheptyl phosphite, trioctyl phosphite, trinonyl phosphite, tridecyl phosphite, triundecyl phosphite, tridodecyl phosphite, trioleyl phosphite, triphenyl phosphite, and tricresyl phosphite. Mixtures of these compounds can also be used.

When the refrigerating oil and the working fluid for a refrigerating machine according to this embodiment contain the above-described phosphorus compound, the content of the phosphorus compound is not limited, but is preferably 0.01 to 5.0 mass % and more preferably 0.02 to 3.0 mass % relative to the whole amount of the refrigerating oil (relative to the total amount of the base oil and all the additives). The above-described phosphorus compounds may be used alone or in combination of two or more.

The refrigerating oil and the working fluid for a refrigerating machine according to this embodiment may contain a terpene compound to further improve the thermal and chemical stability. The "terpene compound" in the present invention refers to a compound obtained by polymerizing isoprene and a derivative thereof, and a dimer to an octamer of isoprene are preferably used. Specific examples of the terpene compound include monoterpenes such as geraniol, nerol, linalool, citral (including geranial), citronellol, menthol, limonene, terpinerol, carvone, ionone, thujone, camphor, and borneol; sesquiterpenes such as farnesene, farnesol, nerolidol, juvenile hormone, humulene, caryophyllene, elemene, cadinol, cadinene, and tutin; diterpenes such as geranylgeraniol, phytol, abietic acid, pimaragen, daphnetoxin, taxol, and pimaric acid; sesterterpenes such as geranylfarnesene; triterpenes such as squalene, limonin, camelliagenin, hopane, and lanosterol; and tetraterpenes such as carotenoid.

Among these terpene compounds, the terpene compound is preferably monoterpene, sesquiterpene, or diterpene, more preferably sesquiterpene, and particularly preferably α-farnesene (3,7,11-trimethyldodeca-1,3,6,10-tetraene) and/or β-farnesene (7,11-dimethyl-3-methylidenedodeca-1,6,10-triene). In the present invention, the terpene compounds may be used alone or in combination of two or more.

The content of the terpene compound in the refrigerating oil according to this embodiment is not limited, but is preferably 0.001 to 10 mass %, more preferably 0.01 to 5 mass %, and further preferably 0.05 to 3 mass % relative to the whole amount of the refrigerating oil. If the content of the terpene compound is less than 0.001 mass %, an effect of improving the thermal and chemical stability tends to be insufficient. If the content is more than 10 mass %, the lubricity tends to be insufficient. The content of the terpene compound in the working fluid for a refrigerating machine according to this embodiment is desirably determined so that the content is within the above preferred range when expressed relative to the whole amount of the refrigerating oil.

The refrigerating oil and the working fluid for a refrigerating machine according to this embodiment may contain at least one epoxy compound selected from phenyl glycidyl ether-type epoxy compounds, alkyl glycidyl ether-type epoxy compounds, glycidyl ester-type epoxy compounds, allyloxirane compounds, alkyloxirane compounds, alicyclic epoxy compounds, epoxidized fatty acid monoesters, and epoxidized vegetable oils to further improve the thermal and chemical stability.

Specific examples of the phenyl glycidyl ether-type epoxy compound include phenyl glycidyl ether and alkylphenyl glycidyl ethers. The alkylphenyl glycidyl ether herein is an alkylphenyl glycidyl ether having 1 to 3 alkyl groups with 1 to 13 carbon atoms. In particular, the alkylphenyl glycidyl ether is preferably an alkylphenyl glycidyl ether having one alkyl group with 4 to 10 carbon atoms, such as n-butylphenyl glycidyl ether, i-butylphenyl glycidyl ether, sec-butylphenyl glycidyl ether, tert-butylphenyl glycidyl ether, pentylphenyl glycidyl ether, hexylphenyl glycidyl ether, heptylphenyl glycidyl ether, octylphenyl glycidyl ether, nonylphenyl glycidyl ether, or decylphenyl glycidyl ether.

Specific examples of the alkyl glycidyl ether-type epoxy compound include decyl glycidyl ether, undecyl glycidyl ether, dodecyl glycidyl ether, tridecyl glycidyl ether, tetradecyl glycidyl ether, 2-ethylhexyl glycidyl ether, neopentyl glycol diglycidyl ether, trimethylolpropane triglycidyl ether, pentaerythritol tetraglycidyl ether, 1,6-hexanediol diglycidyl ether, sorbitol polyglycidyl ether, polyalkylene glycol monoglycidyl ether, and polyalkylene glycol diglycidyl ether.

Specific examples of the glycidyl ester-type epoxy compound include phenyl glycidyl ester, alkyl glycidyl esters, and alkenyl glycidyl esters. Preferred examples of the glycidyl ester-type epoxy compound include glycidyl-2,2-dimethyloctanoate, glycidyl benzoate, glycidyl acrylate, and glycidyl methacrylate.

Specific examples of the allyloxirane compound include 1,2-epoxystyrene and alkyl-1,2-epoxystyrenes.

Specific examples of the alkyloxirane compound include 1,2-epoxybutane, 1,2-epoxypentane, 1,2-epoxyhexane, 1,2-epoxyheptane, 1,2-epoxyoctane, 1,2-epoxynonane, 1,2-epoxydecane, 1,2-epoxyundecane, 1,2-epoxydodecane, 1,2-epoxytridecane, 1,2-epoxytetradecane, 1,2-epoxypentadecane, 1,2-epoxyhexadecane, 1,2-epoxyheptadecane, 1,1,2-epoxyoctadecane, 2-epoxynonadecane, and 1,2-epoxyeicosane.

Specific examples of the alicyclic epoxy compound include 1,2-epoxycyclohexane, 1,2-epoxycyclopentane, 3,4-epoxycyclohexylmethyl-3,4-epoxycyclohexane carboxylate, bis(3,4-epoxycyclohexylmethyl) adipate, exo-2,3-epoxynorbornane, bis(3,4-epoxy-6-methylcyclohexylmethyl) adipate, 2-(7-oxabicyclo[4.1.0]hept-3-yl)-spiro(1,3-dioxane-5,3'-[7]oxabicyclo[4.1.0]heptane, 4-(1'-methylepoxyethyl)-1,2-epoxy-2-methylcyclohexane, and 4-epoxyethyl-1,2-epoxycyclohexane.

Specific examples of the epoxidized fatty acid monoester include esters of an epoxidized fatty acid having 12 to 20 carbon atoms and an alcohol having 1 to 8 carbon atoms, phenol, or an alkylphenol. In particular, butyl, hexyl, benzyl, cyclohexyl, methoxyethyl, octyl, phenyl, and butyl phenyl esters of epoxystearic acid are preferably used.

Specific examples of the epoxidized vegetable oil include epoxy compounds of vegetable oils such as soybean oil, linseed oil, and cottonseed oil.

Among these epoxy compounds, phenyl glycidyl ether-type epoxy compounds, alkyl glycidyl ether-type epoxy compounds, glycidyl ester-type epoxy compounds, and alicyclic epoxy compounds are preferred.

When the refrigerating oil and the working fluid for a refrigerating machine according to this embodiment contain the above-described epoxy compound, the content of the epoxy compound is not limited, but is preferably 0.01 to 5.0 mass % and more preferably 0.1 to 3.0 mass % relative to the whole amount of the refrigerating oil. The above-described epoxy compounds may be used alone or in combination of two or more.

The kinematic viscosity of the refrigerating oil containing the polyhydric alcohol fatty acid ester (A) at 40° C. is preferably 20 to 80 $mm^2/s$, more preferably 25 to 75 $mm^2/s$, and most preferably 30 to 70 $mm^2/s$. The kinematic viscosity at 100° C. is preferably 2 to 20 $mm^2/s$ and more preferably 3 to 10 $mm^2/s$. When the kinematic viscosity is more than or equal to the lower limit, the viscosity required as a refrigerating oil is easily achieved. On the other hand, when the kinematic viscosity is less than or equal to the upper limit, sufficient miscibility with difluoromethane in the case where the difluoromethane is contained as a refrigerant composition can be achieved.

The volume resistivity of the refrigerating oil containing the polyhydric alcohol fatty acid ester (A) is not limited, but is preferably $1.0\times10^{12}$ Ω·cm or more, more preferably $1.0\times10^{13}$ Ω·cm or more, and most preferably $1.0\times10^{14}$ Ω·cm or more. In particular, when the refrigerating oil is used for sealed refrigerating machines, high electric insulation tends to be required. The volume resistivity refers to a value measured at 25° C. in conformity with JIS C 2101 "Testing methods of electrical insulating oils".

The water content of the refrigerating oil containing the polyhydric alcohol fatty acid ester (A) is not limited, but is preferably 200 ppm or less, more preferably 100 ppm or less, and most preferably 50 ppm or less relative to the whole amount of the refrigerating oil. In particular, when the refrigerating oil is used for sealed refrigerating machines, the water content needs to be low from the viewpoints of the thermal and chemical stability of the refrigerating oil and the influence on electric insulation.

The acid number of the refrigerating oil containing the polyhydric alcohol fatty acid ester (A) is not limited, but is preferably 0.1 mgKOH/g or less and more preferably 0.05 mgKOH/g or less to prevent corrosion of metals used for refrigerating machines or pipes. In the present invention, the acid number refers to an acid number measured in conformity with JIS K 2501 "Petroleum products and lubricants—Determination of neutralization number".

The ash content of the refrigerating oil containing the polyhydric alcohol fatty acid ester (A) is not limited, but is preferably 100 ppm or less and more preferably 50 ppm or less to improve the thermal and chemical stability of the refrigerating oil and suppress the generation of sludge and the like. The ash content refers to an ash content measured in conformity with JIS K 2272 "Crude oil and petroleum products—Determination of ash and sulfated ash".

(Complex Ester Oil)

The complex ester oil is an ester of a fatty acid and a dibasic acid, and a monohydric alcohol and a polyol. The above-described fatty acid, dibasic acid, monohydric alcohol, and polyol can be used.

Examples of the fatty acid include the fatty acids mentioned m the polyol ester.

Examples of the dibasic acid include oxalic acid, malonic acid, succinic acid, glutaric acid, adipic acid, pimelic acid, suberic acid, azelaic acid, sebacic acid, phthalic acid, isophthalic acid, and terephthalic acid.

Examples of the polyol include the polyhydric alcohols in the polyol ester. The complex ester is an ester of such a fatty acid, dibasic acid, and polyol, each of which may be constituted by a single component or a plurality of components.

(Polyol Carbonate Oil)

The polyol carbonate oil is an ester of a carbonic acid and a polyol.

Examples of the polyol include the above-described diols and polyols.

The polyol carbonate oil may be a ring-opened polymer of a cyclic alkylene carbonate.

(2-1-2) Ether-Type Refrigerating Oil

The ether-type refrigerating oil is, for example, a polyvinyl ether oil or a polyoxyalkylene oil.

(Polyvinyl Ether Oil)

Examples of the polyvinyl ether oil include polymers of a vinyl ether monomer, copolymers of a vinyl ether monomer and a hydrocarbon monomer having an olefinic double bond, and copolymers of a monomer having an olefinic double bond and a polyoxyalkylene chain and a vinyl ether monomer.

The carbon/oxygen molar ratio of the polyvinyl ether oil is preferably 2 or more and 7.5 or less and more preferably 2.5 or more and 5.8 or less. If the carbon/oxygen molar ratio is smaller than the above range, the hygroscopicity increases. If the carbon/oxygen molar ratio is larger than the above range, the miscibility deteriorates. The weight-average molecular weight of the polyvinyl ether is preferably 200 or more and 3000 or less and more preferably 500 or more and 1500 or less.

The pour point of the polyvinyl ether oil is preferably −30° C. or lower. The surface tension of the polyvinyl ether oil at 20° C. is preferably 0.02 N/m or more and 0.04 N/m or less. The density of the polyvinyl ether oil at 15° C. is preferably 0.8 g/cm$^3$ or more and 1.8 g/cm$^3$ or less. The saturated water content of the polyvinyl ether oil at a temperature of 30° C. and a relative humidity of 90% is preferably 2000 ppm or more.

The refrigerating oil may contain polyvinyl ether as a main component. In the case where HFO-1234yf is contained as a refrigerant, the polyvinyl ether serving as a main component of the refrigerating oil has miscibility with HFO-1234yf. When the refrigerating oil has a kinematic viscosity at 40° C. of 400 mm$^2$/s or less, HFO-1234yf is dissolved in the refrigerating oil to some extent. When the refrigerating oil has a pour point of −30° C. or lower, the flowability of the refrigerating oil is easily ensured even at positions at which the temperature of the refrigerant composition and the refrigerating oil is low in the refrigerant circuit. When the refrigerating oil has a surface tension at 20° C. of 0.04 N/m or less, the refrigerating oil discharged from a compressor does not readily form large droplets of oil that are not easily carried away by a refrigerant composition. Therefore, the refrigerating oil discharged from the compressor is dissolved in HFO-1234yf and is easily returned to the compressor together with HFO-1234yf.

When the refrigerating oil has a kinematic viscosity at 40° C. of 30 mm$^2$/s or more, an insufficient oil film strength due to excessively low kinematic viscosity is suppressed, and thus good lubricity is easily achieved. When the refrigerating oil has a surface tension at 20° C. of 0.02 N/m or more, the refrigerating oil does not readily form small droplets of oil in a gas refrigerant inside the compressor, which can suppress discharge of a large amount of refrigerating oil from the compressor. Therefore, a sufficient amount of refrigerating oil is easily stored in the compressor.

When the refrigerating oil has a saturated water content at 30° C./90% RH of 2000 ppm or more, a relatively high hygroscopicity of the refrigerating oil can be achieved. Thus, when HFO-1234yf is contained as a refrigerant, water in HFO-1234yf can be captured by the refrigerating oil to some extent. HFO-1234yf has a molecular structure that is easily altered or deteriorated because of the influence of water contained. Therefore, the hydroscopic effects of the refrigerating oil can suppress such deterioration.

Furthermore, when a particular resin functional component is disposed in the sealing portion or sliding portion that is in contact with a refrigerant flowing through the refrigerant circuit and the resin functional component is formed of any of polytetrafluoroethylene, polyphenylene sulfide, phenolic resin, polyamide resin, chloroprene rubber, silicon rubber, hydrogenated nitrile rubber, fluororubber, and hydrin rubber, the aniline point of the refrigerating oil is preferably set within a particular range in consideration of the adaptability with the resin functional component. By setting the aniline point in such a manner, for example, the adaptability of bearings constituting the resin functional component with the refrigerating oil is improved. Specifically, if the aniline point is excessively low, the refrigerating oil readily infiltrates bearings or the like, and the bearings or the like readily swell. On the other hand, if the aniline point is excessively high, the refrigerating oil does not readily infiltrate bearings or the like, and the bearings or the like readily shrink. Therefore, by setting the aniline point of the refrigerating oil within a particular range, the swelling or shrinking of the bearings or the like can be prevented. Herein, for example, if each of the bearings or the like deforms through swelling or shrinking, the desired length of a gap at a sliding portion cannot be maintained. This may increase the sliding resistance or decrease the rigidity of the sliding portion. However, when the aniline point of the refrigerating oil is set within a particular range as described above, the deformation of the bearings or the like through swelling or shrinking is suppressed, and thus such a problem can be avoided.

The vinyl ether monomers may be used alone or in combination of two or more. Examples of the hydrocarbon monomer having an olefinic double bond include ethylene, propylene, various butenes, various pentenes, various hexenes, various heptenes, various octenes, diisobutylene, triisobutylene, styrene, α-methylstyrene, and various alkyl-substituted styrenes. The hydrocarbon monomers having an olefinic double bond may be used alone or in combination of two or more.

The polyvinyl ether copolymer may be a block copolymer or a random copolymer. The polyvinyl ether oils may be used alone or in combination of two or more.

A polyvinyl ether oil preferably used has a structural unit represented by general formula (1) below.

[Chem. 1]

(1)

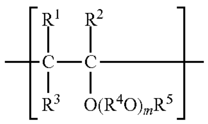

(In the formula, $R^1$, $R^2$, and $R^3$ may be the same or different and each represent a hydrogen atom or a hydrocarbon group having 1 to 8 carbon atoms, $R^4$ represents a divalent hydrocarbon group having 1 to 10 carbon atoms or an ether bond oxygen-containing divalent hydrocarbon group having 2 to 20 carbon atoms, $R^5$ represents a hydrocarbon group having 1 to 20 carbon atoms, m represents a number at which the average of m in the polyvinyl ether is 0 to 10, $R^1$ to $R^5$ may be the same or different in each of structural units, and when m represents 2 or more in one structural unit, a plurality of $R^4O$ may be the same or different.)

At least one of $R^1$, $R^2$, and $R^3$ in the general formula (1) preferably represents a hydrogen atom. In particular, all of $R^1$, $R^2$, and $R^3$ preferably represent a hydrogen atom. In the general formula (1), m preferably represents 0 or more and 10 or less, particularly preferably 0 or more and 5 or less, further preferably 0. $R^5$ in the general formula (1) represents a hydrocarbon group having 1 to 20 carbon atoms. Specific examples of the hydrocarbon group include alkyl groups such as a methyl group, an ethyl group, a n-propyl group, an isopropyl group, a n-butyl group, an isobutyl group, a sec-butyl group, a tert-butyl group, various pentyl groups, various hexyl groups, various heptyl groups, and various octyl groups; cycloalkyl groups such as a cyclopentyl group, a cyclohexyl group, various methylcyclohexyl groups, various ethylcyclohexyl groups, and various dimethylcyclohexyl groups; aryl groups such as a phenyl group, various methylphenyl groups, various ethylphenyl groups, and various dimethylphenyl groups; and arylalkyl groups such as a benzyl group, various phenylethyl groups, and various methylbenzyl groups. Among the alkyl groups, the cycloalkyl groups, the phenyl group, the aryl groups, and the arylalkyl groups, alkyl groups, in particular, alkyl groups having 1 to 5 carbon atoms are preferred. For the polyvinyl ether oil contained, the ratio of a polyvinyl ether oil with $R^5$ representing an alkyl group having 1 or 2 carbon atoms and a polyvinyl ether oil with $R^5$ representing an alkyl group having 3 or 4 carbon atoms is preferably 40%:60% to 100%:0%.

The polyvinyl ether oil according to this embodiment may be a homopolymer constituted by the same structural unit represented by the general formula (1) or a copolymer constituted by two or more structural units. The copolymer may be a block copolymer or a random copolymer.

The polyvinyl ether oil according to this embodiment may be constituted by only the structural unit represented by the general formula (1) or may be a copolymer further including a structural unit represented by general formula (2) below. In this case, the copolymer may be a block copolymer or a random copolymer.

[Chem. 2]

(2)

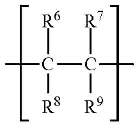

(In the formula, $R^6$ to $R^9$ may be the same or different and each represent a hydrogen atom or a hydrocarbon group having 1 to 20 carbon atoms.)

The vinyl ether monomer is, for example, a compound represented by general formula (3) below.

[Chem. 3]

(3)

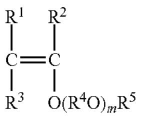

(In the formula, $R^1$, $R^2$, $R^3$, $R^4$, $R^5$, and m have the same meaning as $R^1$, $R^2$, $R^3$, $R^4$, $R^5$, and m in the general formula (1), respectively.)

Examples of various polyvinyl ether compounds corresponding to the above polyvinyl ether compound include vinyl methyl ether; vinyl ethyl ether; vinyl-n-propyl ether; vinyl-isopropyl ether; vinyl-n-butyl ether; vinyl-isobutyl ether; vinyl-sec-butyl ether; vinyl-tert-butyl ether; vinyl-n-pentyl ether; vinyl-n-hexyl ether; vinyl-2-methoxyethyl ether; vinyl-2-ethoxyethyl ether; vinyl-2-methoxy-1-methylethyl ether; vinyl-2-methoxy-propyl ether; vinyl-3,6-dioxaheptyl ether; vinyl-3,6,9-trioxadecyl ether; vinyl-1,4-dimethyl-3,6-dioxaheptyl ether; vinyl-1,4,7-trimethyl-3,6,9-trioxadecyl ether; vinyl-2,6-dioxa-4-heptyl ether; vinyl-2,6, 9-trioxa-4-decyl ether; 1-methoxypropene; 1-ethoxypropene; 1-n-propoxypropene; 1-isopropoxypropene; 1-n-butoxypropene; 1-isobutoxypropene; 1-sec-butoxypropene; 1-tert-butoxypropene; 2-methoxypropene; 2-ethoxypropene; 2-n-propoxypropene; 2-isopropoxypropene; 2-n-butoxypropene; 2-isobutoxypropene; 2-sec-butoxypropene; 2-tert-butoxypropene; 1-methoxy-1-butene; 1-ethoxy-1-butene; 1-n-propoxy-1-butene; 1-isopropoxy-1-butene; 1-n-butoxy-1-butene; 1-isobutoxy-1-butene; 1-sec-butoxy-1-butene; 1-tert-butoxy-1-butene; 2-methoxy-1-butene; 2-ethoxy-1-butene; 2-n-propoxy-1-butene; 2-isopropoxy-1-butene; 2-n-butoxy-1-butene; 2-isobutoxy-1-butene; 2-sec-butoxy-1-butene; 2-tert-butoxy-1-butene; 2-methoxy-2-butene; 2-ethoxy-2-butene; 2-n-propoxy-2-butene; 2-isopropoxy-2-butene; 2-n-butoxy-2-butene; 2-isobutoxy-2-butene; 2-sec-butoxy-2-butene; and 2-tert-butoxy-2-butene. These vinyl ether monomers can be produced by a publicly known method.

The end of the polyvinyl ether compound having the structural unit represented by the general formula (1) can be converted into a desired structure by a method described in the present disclosure and a publicly known method. Examples of the group introduced by conversion include saturated hydrocarbons, ethers, alcohols, ketones, amides, and nitriles.

The polyvinyl ether compound preferably has the following end structures.

[Chem. 4]

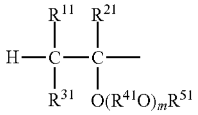

(4)

(In the formula, $R^{11}$, $R^{21}$, and $R^{31}$ may be the same or different and each represent a hydrogen atom or a hydrocarbon group having 1 to 8 carbon atoms, $R^{41}$ represents a divalent hydrocarbon group having 1 to 10 carbon atoms or an ether bond oxygen-containing divalent hydrocarbon group having 2 to 20 carbon atoms, $R^{51}$ represents a hydrocarbon group having 1 to 20 carbon atoms, m represents a number at which the average of m in the polyvinyl ether is 0 to 10, and when m represents 2 or more, a plurality of $R^{41}O$ may be the same or different.)

[Chem. 5]

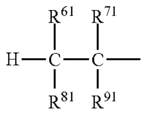

(5)

(In the formula, $R^{61}$, $R^{71}$, $R^{81}$, and $R^{91}$ may be the same or different and each represent a hydrogen atom or a hydrocarbon group having 1 to 20 carbon atoms.)

[Chem. 6]

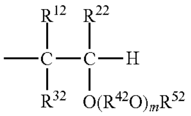

(6)

(In the formula, $R^{12}$, $R^{22}$, and $R^{32}$ may be the same or different and each represent a hydrogen atom or a hydrocarbon group having 1 to 8 carbon atoms, $R^{42}$ represents a divalent hydrocarbon group having 1 to 10 carbon atoms or an ether bond oxygen-containing divalent hydrocarbon group having 2 to 20 carbon atoms, $R^{52}$ represents a hydrocarbon group having 1 to 20 carbon atoms, m represents a number at which the average of m in the polyvinyl ether is 0 to 10, and when m represents 2 or more, a plurality of $R^{42}O$ may be the same or different.)

[Chem. 7]

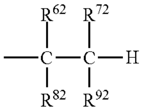

(7)

(In the formula, $R^{62}$, $R^{72}$, $R^{82}$, and $R^{92}$ may be the same or different and each represent a hydrogen atom or a hydrocarbon group having 1 to 20 carbon atoms.)

[Chem. 8]

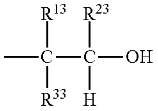

(8)

(In the formula, $R^{13}$, $R^{23}$, and $R^{33}$ may be the same or different and each represent a hydrogen atom or a hydrocarbon group having 1 to 8 carbon atoms.)

The polyvinyl ether oil according to this embodiment can be produced by polymerizing the above-described monomer through, for example, radical polymerization, cationic polymerization, or radiation-induced polymerization. After completion of the polymerization reaction, a typical separation/purification method is performed when necessary to obtain a desired polyvinyl ether compound having a structural unit represented by the general formula (1).

(Polyoxyalkylene Oil)

The polyoxyalkylene oil is a polyoxyalkylene compound obtained by, for example, polymerizing an alkylene oxide having 2 to 4 carbon atoms (e.g., ethylene oxide or propylene oxide) using water or a hydroxyl group-containing compound as an initiator. The hydroxyl group of the polyoxyalkylene compound may be etherified or esterified. The polyoxyalkylene oil may contain an oxyalkylene unit of the same type or two or more oxyalkylene units in one molecule. The polyoxyalkylene oil preferably contains at least an oxypropylene unit in one molecule.

Specifically, the polyoxyalkylene oil is, for example, a compound represented by general formula (9) below.

$$R^{101}—[(OR^{102})_k—OR^{103}]_l \quad (9)$$

(In the formula, $R^{101}$ represents a hydrogen atom, an alkyl group having 1 to 10 carbon atoms, an acyl group having 2 to 10 carbon atoms, or an aliphatic hydrocarbon group having 2 to 6 bonding sites and 1 to 10 carbon atoms, $R^{102}$ represents an alkylene group having 2 to 4 carbon atoms, $R^{103}$ represents a hydrogen atom, an alkyl group having 1 to 10 carbon atoms, or an acyl group having 2 to 10 carbon atoms, 1 represents an integer of 1 to 6, and k represents a number at which the average of k×1 is 6 to 80.)

In the general formula (9), the alkyl group represented by $R^{101}$ and $R^{103}$ may be a linear, branched, or cyclic alkyl group. Specific examples of the alkyl group include a methyl group, an ethyl group, a n-propyl group, an isopropyl group, various butyl groups, various pentyl groups, various hexyl groups, various heptyl groups, various octyl groups, various nonyl groups, various decyl groups, a cyclopentyl group, and a cyclohexyl group. If the number of carbon atoms of the alkyl group exceeds 10, the miscibility with a refrigerant deteriorates, which may cause phase separation. The number of carbon atoms of the alkyl group is preferably 1 to 6.

The acyl group represented by $R^{101}$ and $R^{103}$ may have a linear, branched, or cyclic alkyl group moiety. Specific examples of the alkyl group moiety of the acyl group include various groups having 1 to 9 carbon atoms that are mentioned as specific examples of the alkyl group. If the number of carbon atoms of the acyl group exceeds 10, the miscibility with a refrigerant deteriorates, which may cause phase separation. The number of carbon atoms of the acyl group is preferably 2 to 6.

When $R^{101}$ and $R^{103}$ each represent an alkyl group or an acyl group, $R^{101}$ and $R^{103}$ may be the same or different.

Furthermore, when 1 represents 2 or more, a plurality of $R^{103}$ in one molecule may be the same or different.

When $R^{101}$ represents an aliphatic hydrocarbon group having 2 to 6 bonding sites and 1 to 10 carbon atoms, the aliphatic hydrocarbon group may be a linear group or a cyclic group. Examples of the aliphatic hydrocarbon group having two bonding sites include an ethylene group, a propylene group, a butylene group, a pentylene group, a hexylene group, a heptylene group, an octylene group, a nonylene group, a decylene group, a cyclopentylene group, and a cyclohexylene group. Examples of the aliphatic hydrocarbon group having 3 to 6 bonding sites include residual groups obtained by removing hydroxyl groups from polyhydric alcohols such as trimethylolpropane, glycerol, pentaerythritol, sorbitol, 1,2,3-trihydroxycyclohexane, and 1,3,5-trihydroxycyclohexane.

If the number of carbon atoms of the aliphatic hydrocarbon group exceeds 10, the miscibility with a refrigerant deteriorates, which may cause phase separation. The number of carbon atoms is preferably 2 to 6.

$R^{102}$ in the general formula (9) represents an alkylene group having 2 to 4 carbon atoms. Examples of the oxyalkylene group serving as a repeating unit include an oxyethylene group, an oxypropylene group, and an oxybutylene group. The polyoxyalkylene oil may contain an oxyalkylene group of the same type or two or more oxyalkylene groups in one molecule, but preferably contains at least an oxypropylene unit in one molecule. In particular, the content of the oxypropylene unit in the oxyalkylene unit is suitably 50 mol % or more.

In the general formula (9), 1 represents an integer of 1 to 6, which can be determined in accordance with the number of bonding sites of $R^{101}$. For example, when $R^{101}$ represents an alkyl group or an acyl group, 1 represents 1. When $R^{101}$ represents an aliphatic hydrocarbon group having 2, 3, 4, 5, and 6 bonding sites, 1 represents 2, 3, 4, 5, and 6, respectively. Preferably, 1 represents 1 or 2. Furthermore, k preferably represents a number at which the average of k×1 is 6 to 80.

For the structure of the polyoxyalkylene oil, a polyoxypropylene diol dimethyl ether represented by general formula (10) below and a poly(oxyethylene/oxypropylene) diol dimethyl ether represented by general formula (11) below are suitable from the viewpoints of economy and the above-described effects. Furthermore, a polyoxypropylene diol monobutyl ether represented by general formula (12) below, a polyoxypropylene diol monomethyl ether represented by general formula (13) below, a poly(oxyethylene/oxypropylene) diol monomethyl ether represented by general formula (14) below, a poly(oxyethylene/oxypropylene) diol monobutyl ether represented by general formula (15) below, and a polyoxypropylene diol diacetate represented by general formula (16) below are suitable from the viewpoint of economy and the like.

$$CH_3O—(C_3H_6O)_h—CH_3 \quad (10)$$

(In the formula, h represents 6 to 80.)

$$CH_3O—(C_2H_4O)_i—(C_3H_6O)_j—CH_3 \quad (11)$$

(In the formula, i and j each represent 1 or more and the sum of i and j is 6 to 80.)

$$C_4H_9O—(C_3H_6O)_h—H \quad (12)$$

(In the formula, h represents 6 to 80.)

$$CH_3O—(C_3H_6O)_h—H \quad (13)$$

(In the formula, h represents 6 to 80.)

$$CH_3O—(C_2H_4O)_i—(C_3H_6O)_j—H \quad (14)$$

(In the formula, i and j each represent 1 or more and the sum of i and j is 6 to 80.)

$$C_4H_9O—(C_2H_4O)_i—(C_3H_6O)_j—H \quad (15)$$

(In the formula, i and j each represent 1 or more and the sum of i and j is 6 to 80.)

$$CH_3COO—(C_3H_6O)_h—COCH_3 \quad (16)$$

(In the formula, h represents 6 to 80.)

The polyoxyalkylene oils may be used alone or in combination of two or more.

(2-2) Hydrocarbon Refrigerating Oil

The hydrocarbon refrigerating oil that can be used is, for example, an alkylbenzene.

The alkylbenzene that can be used is a branched alkylbenzene synthesized from propylene polymer and benzene serving as raw materials using a catalyst such as hydrogen fluoride or a linear alkylbenzene synthesized from normal paraffin and benzene serving as raw materials using the same catalyst. The number of carbon atoms of the alkyl group is preferably 1 to 30 and more preferably 4 to 20 from the viewpoint of achieving a viscosity appropriate as a lubricating base oil. The number of alkyl groups in one molecule of the alkylbenzene is dependent on the number of carbon atoms of the alkyl group, but is preferably 1 to 4 and more preferably 1 to 3 to control the viscosity within the predetermined range.

The hydrocarbon refrigerating oil preferably circulates through a refrigeration cycle system together with a refrigerant. Although it is most preferable that the refrigerating oil is soluble with a refrigerant, for example, a refrigerating oil (e.g., a refrigerating oil disclosed in Japanese Patent No. 2803451) having low solubility can also be used as long as the refrigerating oil is capable of circulating through a refrigeration cycle system together with a refrigerant. To allow the refrigerating oil to circulate through a refrigeration cycle system, the refrigerating oil is required to have a low kinematic viscosity. The kinematic viscosity of the hydrocarbon refrigerating oil at 40° C. is preferably 1 $mm^2/s$ or more and 50 $mm^2/s$ or less and more preferably 1 $mm^2/s$ or more and 25 $mm^2/s$ or less.

These refrigerating oils may be used alone or in combination of two or more.

The content of the hydrocarbon refrigerating oil in the working fluid for a refrigerating machine may be, for example, 10 parts by mass or more and 100 parts by mass or less and is more preferably 20 parts by mass or more and 50 parts by mass or less relative to 100 parts by mass of the refrigerant composition.

(2-3) Additive

The refrigerating oil may contain one or two or more additives.

Examples of the additives include an acid scavenger, an extreme pressure agent, an antioxidant, an antifoaming agent, an oiliness improver, a metal deactivator such as a copper deactivator, an anti-wear agent, and a compatibilizer.

Examples of the acid scavenger that can be used include epoxy compounds such as phenyl glycidyl ether, alkyl glycidyl ether, alkylene glycol glycidyl ether, cyclohexene oxide, α-olefin oxide, and epoxidized soybean oil; and carbodiimides. Among them, phenyl glycidyl ether, alkyl glycidyl ether, alkylene glycol glycidyl ether, cyclohexene oxide, and α-olefin oxide are preferred from the viewpoint of miscibility. The alkyl group of the alkyl glycidyl ether and the alkylene group of the alkylene glycol glycidyl ether may have a branched structure. The number of carbon atoms may be 3 or more and 30 or less, and is more preferably 4 or more and 24 or less and further preferably 6 or more and 16 or less. The total number of carbon atoms of the α-olefin oxide may be 4 or more and 50 or less, and is more preferably 4 or more and 24 or less and further preferably 6 or more and 16 or less. The acid scavengers may be used alone or in combination of two or more.

The extreme pressure agent may contain, for example, a phosphoric acid ester. Examples of the phosphoric acid ester that can be used include phosphoric acid esters, phosphorous acid esters, acidic phosphoric acid esters, and acidic phosphorous acid esters. The extreme pressure agent may contain an amine salt of a phosphoric acid ester, a phosphorous acid ester, an acidic phosphoric acid ester, or an acidic phosphorous acid ester.

Examples of the phosphoric acid ester include triaryl phosphates, trialkyl phosphates, trialkylaryl phosphates, triarylalkyl phosphates, and trialkenyl phosphates. Specific examples of the phosphoric acid ester include triphenyl phosphate, tricresyl phosphate, benzyl diphenyl phosphate, ethyl diphenyl phosphate, tributyl phosphate, ethyl dibutyl phosphate, cresyl diphenyl phosphate, dicresyl phenyl phosphate, ethylphenyl diphenyl phosphate, diethylphenyl phenyl phosphate, propylphenyl diphenyl phosphate, dipropylphenyl phenyl phosphate, triethylphenyl phosphate, tripropylphenyl phosphate, butylphenyl diphenyl phosphate, dibutylphenyl phenyl phosphate, tributylphenyl phosphate, trihexyl phosphate, tri(2-ethylhexyl) phosphate, tridecyl phosphate, trilauryl phosphate, trimyristyl phosphate, tripalmityl phosphate, tristearyl phosphate, and trioleyl phosphate.

Specific examples of the phosphorous acid ester include triethyl phosphite, tributyl phosphite, triphenyl phosphite, tricresyl phosphite, tri(nonylphenyl) phosphite, tri(2-ethylhexyl) phosphite, tridecyl phosphite, trilauryl phosphite, triisooctyl phosphite, diphenylisodecyl phosphite, tristearyl phosphite, and trioleyl phosphite.

Specific examples of the acidic phosphoric acid ester include 2-ethylhexyl acid phosphate, ethyl acid phosphate, butyl acid phosphate, oleyl acid phosphate, tetracosyl acid phosphate, isodecyl acid phosphate, lauryl acid phosphate, tridecyl acid phosphate, stearyl acid phosphate, and isostearyl acid phosphate.

Specific examples of the acidic phosphorous acid ester include dibutyl hydrogen phosphite, dilauryl hydrogen phosphite, dioleyl hydrogen phosphite, distearyl hydrogen phosphite, and diphenyl hydrogen phosphite. Among the phosphoric acid esters, oleyl acid phosphate and stearyl acid phosphate are suitably used.

Among amines used for amine salts of phosphoric acid esters, phosphorous acid esters, acidic phosphoric acid esters, or acidic phosphorous acid esters, specific examples of mono-substituted amines include butylamine, pentylamine, hexylamine, cyclohexylamine, octylamine, laurylamine, stearylamine, oleylamine, and benzylamine. Specific examples of di-substituted amines include dibutylamine, dipentylamine, dihexylamine, dicyclohexylamine, dioctylamine, dilaurylamine, distearylamine, dioleylamine, dibenzylamine, stearyl-monoethanolamine, decyl-monoethanolamine, hexyl-monopropanolamine, benzyl-monoethanolamine, phenyl-monoethanolamine, and tolyl-monopropanolamine. Specific examples of tri-substituted amines include tributylamine, tripentylamine, trihexylamine, tricyclohexylamine, trioctylamine, trilaurylamine, tristearylamine, trioleylamine, tribenzylamine, dioleyl-monoethanolamine, dilauryl-monopropanolamine, dioctyl-monoethanolamine, dihexyl-monopropanolamine, dibutyl-monopropanolamine, oleyl-diethanolamine, stearyl-dipropanolamine, lauryl-diethanolamine, octyl-dipropanolamine, butyl-diethanolamine, benzyl-diethanolamine, phenyl-diethanolamine, tolyl-dipropanolamine, xylyl-diethanolamine, triethanolamine, and tripropanolamine.

Examples of extreme pressure agents other than the above-described extreme pressure agents include extreme pressure agents based on organosulfur compounds such as monosulfides, polysulfides, sulfoxides, sulfones, thiosulfinates, sulfurized fats and oils, thiocarbonates, thiophenes, thiazoles, and methanesulfonates; extreme pressure agents based on thiophosphoric acid esters such as thiophosphoric acid triesters; extreme pressure agents based on esters such as higher fatty acids, hydroxyaryl fatty acids, polyhydric alcohol esters, and acrylic acid esters; extreme pressure agents based on organochlorine compounds such as chlorinated hydrocarbons, e.g., chlorinated paraffin and chlorinated carboxylic acid derivatives; extreme pressure agents based on fluoroorganic compounds such as fluorinated aliphatic carboxylic acids, fluorinated ethylene resins, fluorinated alkylpolysiloxanes, and fluorinated graphites; extreme pressure agents based on alcohols such as higher alcohols; and extreme pressure agents based on metal compounds such as naphthenic acid salts (e.g., lead naphthenate), fatty acid salts (e.g., lead fatty acid), thiophosphoric acid salts (e.g., zinc dialkyldithiophosphate), thiocarbamic acid salts, organomolybdenum compounds, organotin compounds, organogermanium compounds, and boric acid esters.

The antioxidant that can be used is, for example, a phenol-based antioxidant or an amine-based antioxidant. Examples of the phenol-based antioxidant include 2,6-di-tert-butyl-4-methylphenol (DBPC), 2,6-di-tert-butyl-4-ethylphenol, 2,2'-methylenebis(4-methyl-6-tert-butylphenol), 2,4-dimethyl-6-tert-butylphenol, 2,6-di-tert-butylphenol, di-tert-butyl-p-cresol, and bisphenol A. Examples of the amine-based antioxidant include N,N'-diisopropyl-p-phenylenediamine, N,N'-di-sec-butyl-p-phenylenediamine, phenyl-α-naphthylamine, N,N'-di-phenyl-p-phenylenediamine, and N,N-di(2-naphthyl)-p-phenylenediamine. An oxygen scavenger that captures oxygen can also be used as the antioxidant.

The antifoaming agent that can be used is, for example, a silicon compound.

The oiliness improver that can be used is, for example, a higher alcohol or a fatty acid.

The metal deactivator such as a copper deactivator that can be used is, for example, benzotriazole or a derivative thereof.

The anti-wear agent that can be used is, for example, zinc dithiophosphate.

The compatibilizer is not limited, and can be appropriately selected from commonly used compatibilizers. The compatibilizers may be used alone or in combination of two or more. Examples of the compatibilizer include polyoxyalkylene glycol ethers, amides, nitriles, ketones, chlorocarbons, esters, lactones, aryl ethers, fluoroethers, and 1,1,1-trifluoroalkanes. The compatibilizer is particularly preferably a polyoxyalkylene glycol ether.

The refrigerating oil may optionally contain, for example, a load-bearing additive, a chlorine scavenger, a detergent dispersant, a viscosity index improver, a heat resistance improver, a stabilizer, a corrosion inhibitor, a pour-point depressant, and an anticorrosive.

The content of each additive in the refrigerating oil may be 0.01 mass % or more and 5 mass % or less and is preferably 0.05 mass % or more and 3 mass % or less. The content of the additive in the working fluid for a refrigerating machine constituted by the refrigerant composition and the refrigerating oil is preferably 5 mass % or less and more preferably 3 mass % or less.

The refrigerating oil preferably has a chlorine concentration of 50 ppm or less and preferably has a sulfur concentration of 50 ppm or less.

(3) Inside Air-Conditioning Device

An inside air-conditioning device that uses any one of the refrigerant 11, the refrigerant 12, the refrigerant 1, refrigerant 2, the refrigerant 3, the refrigerant 4, and the refrigerant 5 above, and refrigerating-machine oil is described below.

(3-1) Configuration

Figure 2:
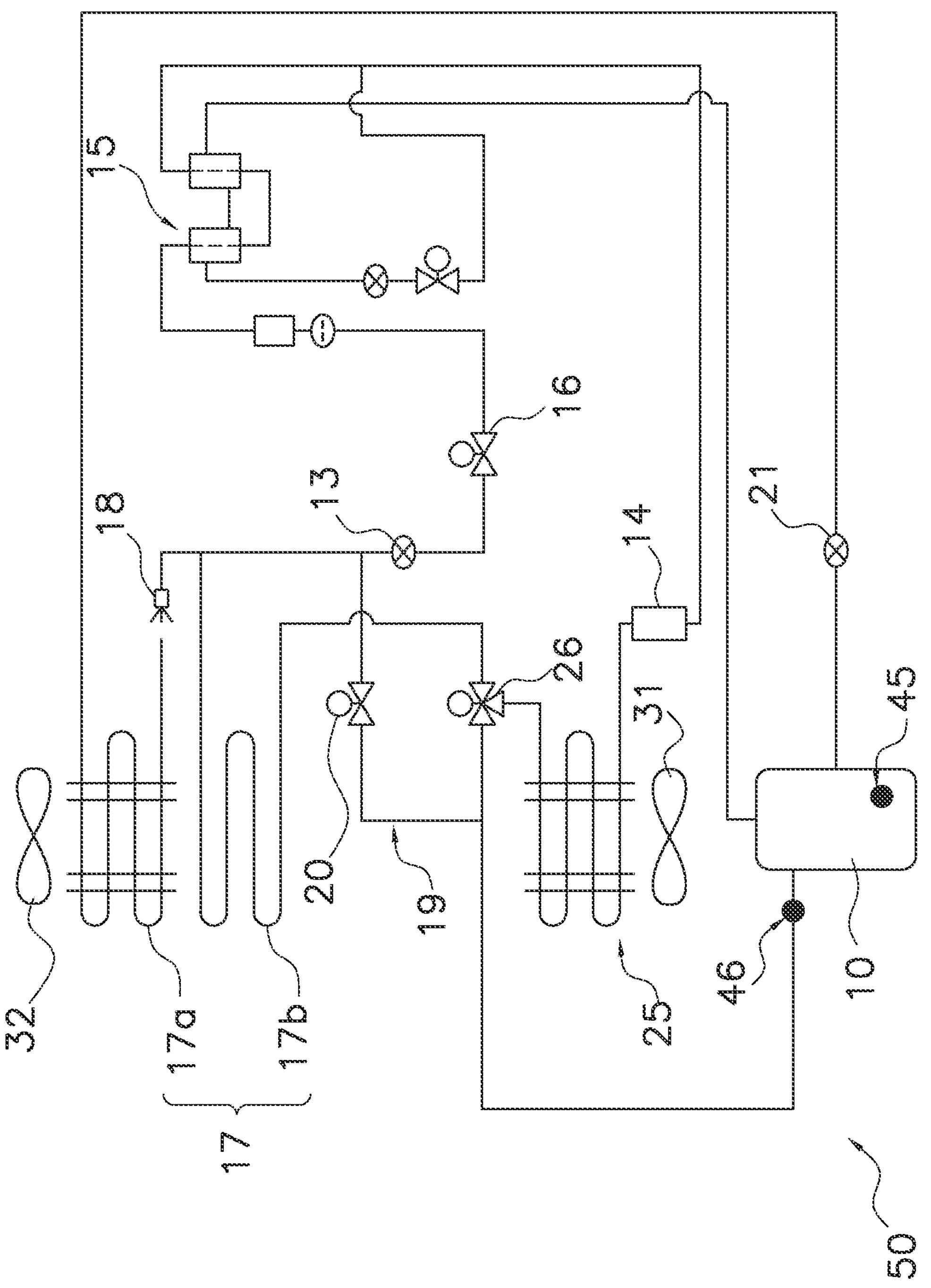
FIG. 2 is a schematic view of an inside air-conditioning device.

FIG. 2 is a schematic view of an inside air-conditioning device.

Figure 3:
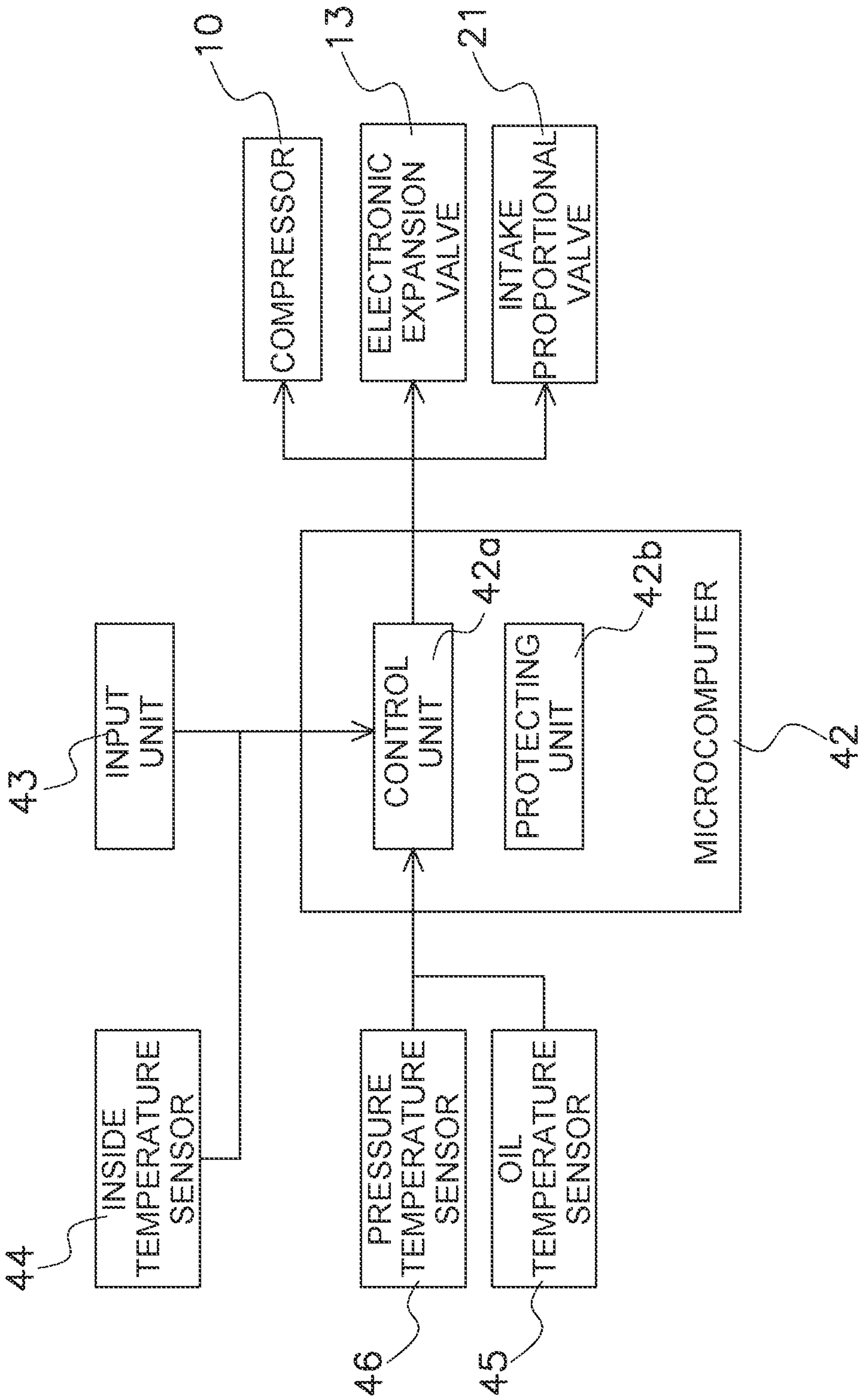
FIG. 3 is a control block diagram of the inside air-conditioning device.

The inside air-conditioning device includes a refrigerant circuit 50, and, as further shown in FIG. 3, includes a microcomputer 42, an input unit 43, and an inside temperature sensor 44.

The refrigerant circuit 50 primarily includes a compressor 10, a condenser 25, an electronic expansion valve 13, an evaporator 17, and an intake proportional valve 21, which are successively connected to each other by a pipe.

The compressor 10 is a scroll compressor that incorporates a constant-speed motor, and compresses a refrigerant in a gaseous state. An oil temperature sensor 45 is provided inside the compressor 10, and a pressure temperature sensor 46 is provided on a discharge side of the compressor 10. The oil temperature sensor 45 is a sensor that detects the oil temperature of lubricating oil (refrigerating-machine oil) of the compressor 10.

The condenser 25 takes away heat from a refrigerant, and dissipates the heat that it has taken away. The condenser 25 is connected to the discharge side of the compressor 10 via a three-way switching valve 26. A condenser fan 31 is disposed near the condenser 25.

The electronic expansion valve 13 expands a refrigerant that passes therethrough and reduces the pressure and the temperature of the refrigerant. The electronic expansion valve 13 is provided on an outlet side of the condenser 25. For example, a receiver 14, an auxiliary heat exchanger 15, and an on-off valve 16 are provided between the condenser 25 and the electronic expansion valve 13.

The evaporator 17 absorbs heat from the inside of the inside air-conditioning device and applies the heat to a refrigerant, and is provided on an outlet side of the electronic expansion valve 13. A flow divider 18 is provided between the evaporator 17 and the electronic expansion valve 13. The evaporator 17 includes a main evaporator **17*a* and a sub-evaporator 17*b*. The sub-evaporator 17*b* is provided between the electronic expansion valve 13 and the condenser 25. An evaporator fan 32 is disposed near the evaporator 17**.

A bypass circuit 19 is provided between the discharge side of the compressor 10 and the evaporator 17. A bypass valve 20 is provided in the bypass circuit 19.

The intake proportional valve 21 adjusts the circulation amount of a refrigerant, and is provided on an intake side of the compressor 10.

FIG. 3 is a control block diagram of the inside air-conditioning device.

The inside air-conditioning device includes the microcomputer 42. The microcomputer 42 functions as a control unit **42*a* and a protecting unit 42*b*. The control unit 42*a* is a functional unit that controls the inside air-conditioning device, and the protecting unit 42*b* is a functional unit that protects the compressor 10 so as to prevent damage to the compressor 10. The input unit 43 that, for example, sets the inside temperature of the inside air-conditioning device, the inside temperature sensor 44 that detects the inside temperature of the inside air-conditioning device, the oil temperature sensor 45, and the pressure temperature sensor 46 are connected to the control unit 42*a*. The compressor 10, the electronic expansion valve 13, and the intake proportional valve 21 are connected to the control unit 42*a***.

(3-2) Operation

The inside temperature of the inside air-conditioning device is controlled by the control unit **42*a***. First, cooling of the inside air-conditioning device is described.

(3-2-1) Refrigeration Operation

The inside air-conditioning device is a device in which, by circulating a refrigerant in the refrigerant circuit 50, inside heat is taken away and is discharged to the outside. The circulation of the refrigerant in the refrigerant circuit 50 is described below.

First, the refrigerant absorbs the inside heat by using the evaporator 17. The refrigerant that has absorbed the heat is guided to the compressor 10 via the intake proportional valve 21. In the compressor 10, the refrigerant is compressed into gas having a high temperature and a high pressure. The refrigerant that has been sent to the condenser 25 from the compressor 10 dissipates the heat to the outside and has its temperature reduced at the condenser 25. Therefore, at the condenser 25, the refrigerant dissipates the heat that has been absorbed by the evaporator 17. Further, the refrigerant is sent to the electronic expansion valve 13 from the condenser 25, is expanded, and is returned to the evaporator 17.

The control unit 42*a* controls the compressor 10, the electronic expansion valve 13, and the intake proportional valve 21 to thereby control, for example, the circulation amount of the refrigerant in the refrigerant circuit 50 and control the inside temperature. When the refrigeration operation is performed, the circulation amount of the refrigerant is made large to discharge the inside heat to the outside so that the inside temperature becomes a set temperature in the input unit 43. When the inside temperature becomes the set temperature, the compressor 10 is stopped.

In the refrigeration operation, the temperature of air that is blown into the inside by the evaporator fan 132 via the evaporator 17 is −10° C. to −35° C.

(3-2-2) Chilling Operation

On the other hand, when a chilling operation is performed, since the inside temperature is caused to be higher than 0° C., the operation is performed with the refrigerating capacity of the inside air-conditioning device being reduced. A method of reducing the refrigerating capacity is described below.

In order to reduce the refrigerating capacity, first, the intake proportional valve 21 is throttled. Therefore, a refrigerant in a wet-saturated state can be accumulated in, for example, a pipe up to the intake proportional valve 21, and the amount of refrigerant that circulates in the refrigerant circuit 50 can be reduced. Further, in this state, the electronic expansion valve 13 is opened and adjusted to cause the refrigerant to be in the wet-saturated state even at an outlet of the evaporator 17. Therefore, since the refrigerant in the wet-saturated state can be accumulated in a pipe up to the intake proportional valve 21 from the outlet of the evaporator 17, the amount of refrigerant that circulates in the refrigerant circuit 50 can be sufficiently reduced. Consequently, the refrigerating capacity is reduced and the chilling operation is suitably performed.

By further opening the electronic expansion valve 13, it is possible to accumulate the refrigerant in the wet-saturated state entirely in the inside of the evaporator 17. At this time, since the pressure of the refrigerant in the inside of the evaporator 17 is constant, the temperature of the refrigerant in the wet-saturated state that is accumulated in the evaporator 17 becomes constant. Since the temperature of the refrigerant is constant, the heat from the inside at the evaporator is uniformly absorbed. Therefore, temperature irregularity in the inside is reduced.

In the chilling operation, the temperature of air that is blown into the inside by the evaporator fan 32 via the evaporator 17 is greater than −10° C.

(3-2-3) Protection of Compressor at the Time of Chilling Operation

The state of a refrigerant at an inlet port of the compressor when the refrigeration operation is being performed is a superheated vapor state.

However, when the chilling operation is performed with the refrigerating capacity being reduced, the state of the refrigerant at the inlet port of the compressor may be a wet-saturated state. The refrigerant in the wet-saturated state includes a refrigerant in a liquid state. Since, unlike gas, liquid is incompressible, the existence of a large amount of refrigerant in the liquid state when the compressor 10 compresses the refrigerant may result in a high pressure that is greater than or equal to the pressure resistance inside the compressor 10, and damage the compressor 10. Further, the refrigerant in the liquid state may transport lubricating oil of the compressor 10 to the outside. This may cause the amount of lubricating oil to be reduced and cause seizure of the compressor 10.

Therefore, it is necessary to control the electronic expansion valve 13 and the intake proportional valve 21 so that the state of the refrigerant at the inlet port of the compressor 10 is caused to become a superheated vapor state by the control unit 42*a*. Consequently, it is necessary to know the state of the refrigerant at the inlet port of the compressor 10. The state of the refrigerant at the inlet port of the compressor 10 can be known from the pressure and the temperature of the refrigerant.

However, when the circulation amount of the refrigerant is small, the pressure at the inlet port of the compressor 10 is very low, as a result of which the pressure is imprecisely detected when an ordinary pressure sensor is used, and the state is imprecisely known.

Accordingly, the protecting unit 42*b* estimates the pressure and the temperature at the inlet port of the compressor 10 from the results of detection of the oil temperature sensor 45 and the pressure temperature sensor 46. The degree of superheating of the refrigerant at the discharge side of the compressor is made clearly known by the pressure temperature sensor 46. The degree of superheating makes it possible to know the wetness of the refrigerant at the inlet port of the compressor 10. Further, since the wetness of the refrigerant can be estimated by the result of the oil temperature sensor 45, it is possible to more precisely determine the wetness. Therefore, it is possible to, by the control unit 42*a*, control the refrigerating capacity so as to prevent damage to the compressor 10.

(3-2-4) Defrosting Operation

When the evaporator 17 is frosted as a result of being operated for a long time, a defrosting operation for melting the frost is performed. In the defrosting operation, the bypass valve 20 is opened and the three-way switching valve 26 is switched, and hot gas discharged from the compressor 10 is caused to flow to the evaporator 17 to melt the frost on the evaporator 17.

(3-3) Modification A of Inside Air-Conditioning Device

Figure 4:
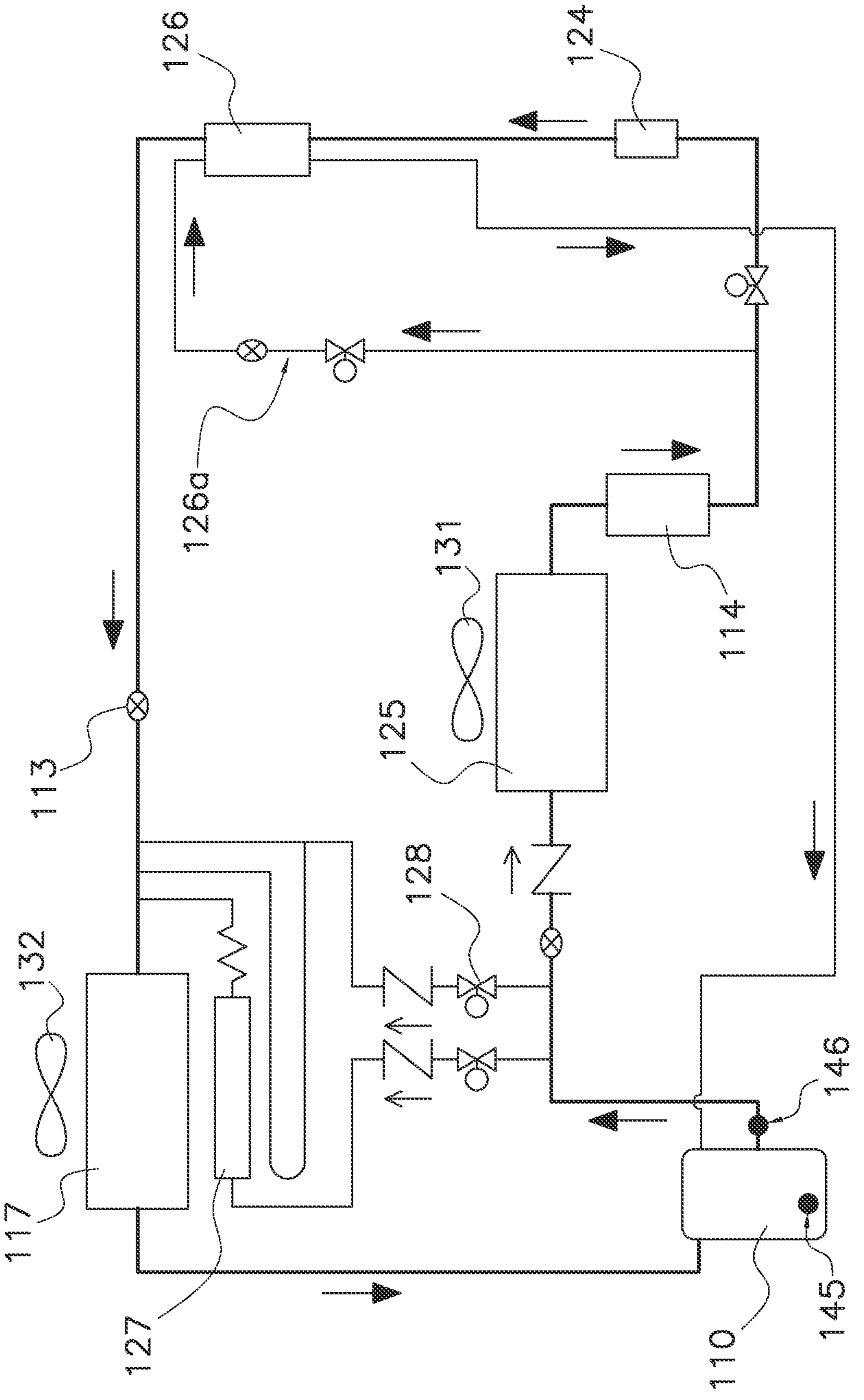
FIG. 4 is a schematic view of an inside air-conditioning device of Modification A.

In place of the refrigerant circuit 50 shown in FIG. 2 above, a refrigerant circuit shown in FIG. 4 may be used. The refrigerant circuit primarily includes a compressor 110, a condenser 125, a receiver 114, a dryer 124, an economizer heat exchanger 126, an electronic expansion valve 113, and an evaporator 117, which are successively connected to each other by a pipe. In the refrigerant circuit in FIG. 4, an intake proportional valve is not used. The refrigerant circuit shown in FIG. 4 also includes a reheating coil 127.

The compressor 110 is a compressor whose capacity changes due to inverter control. An oil temperature sensor

145 is provided inside the compressor 110, and a pressure temperature sensor 146 is provided on a discharge side of the compressor 110. The oil temperature sensor 145 is a sensor that detects the oil temperature of lubricating oil (refrigerating-machine oil) of the compressor 110.

The condenser 125 takes away heat from a refrigerant, and dissipates the heat that it has taken away. A condenser fan 131 is disposed near the condenser 125.

The evaporator 117 absorbs heat from the inside of the inside air-conditioning device and applies the heat to a refrigerant, and is provided on an outlet side of the electronic expansion valve 113. An evaporator fan 132 is disposed near the evaporator 117.

An intermediate-pressure refrigerant that flows into the compressor 110 by an intermediate injection circuit 126*a* that passes through the economizer heat exchanger 126 cools a refrigerant that is being compressed at a compression chamber of the compressor 110.

At the time of the defrosting operation, a valve 128 opens and hot gas discharged from the compressor 110 flows to the evaporator 117.

(3-4) Modification B of Inside Air-Conditioning Device

Figure 5:
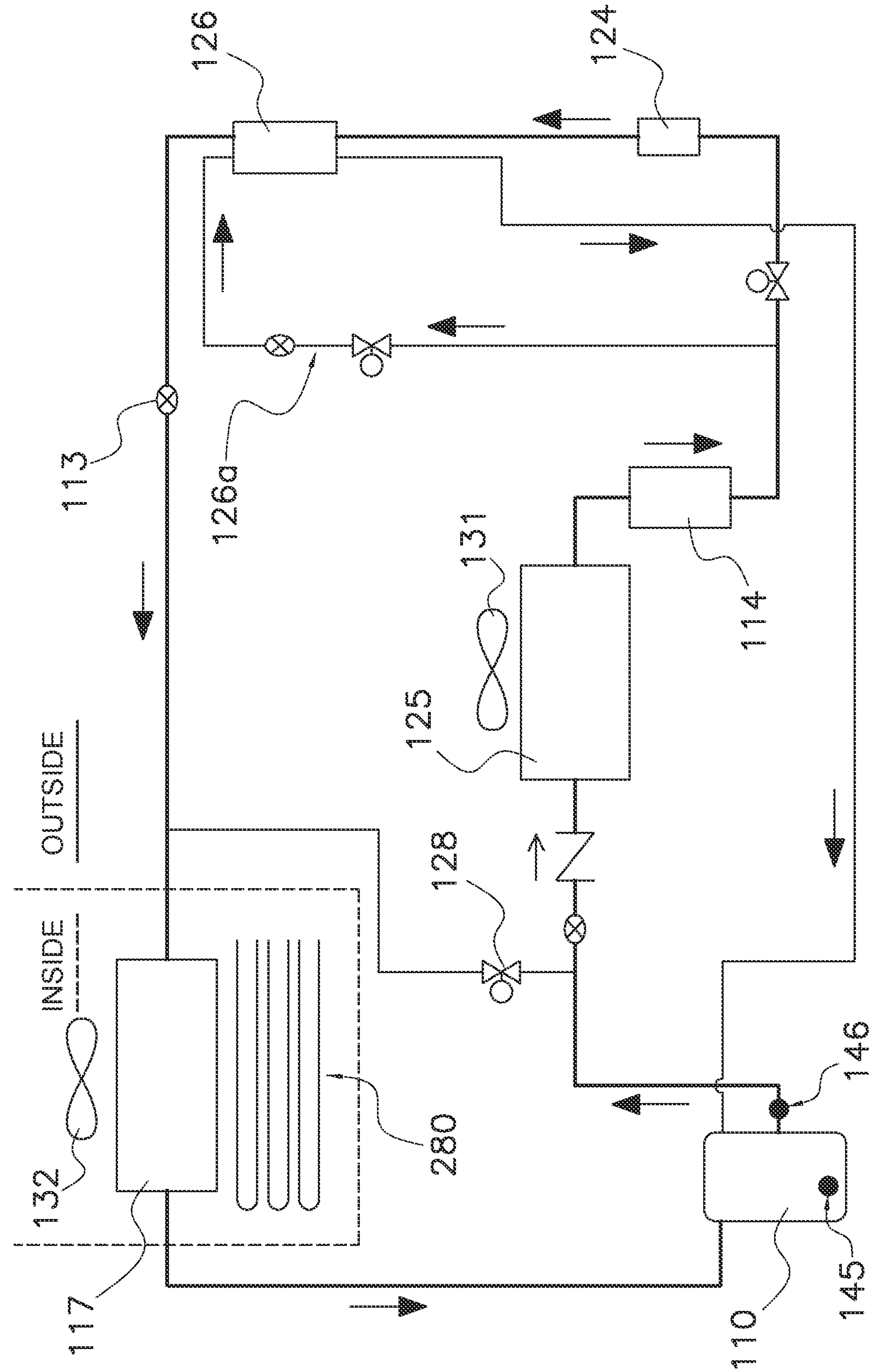
FIG. 5 is a schematic view of an inside air-conditioning device of Modification B.

In the refrigerant circuit shown in FIG. 4 of Modification A above, the structure in which frost on the evaporator 17 is melted by causing hot gas discharged from the compressor 110 to flow to the evaporator 117 is used. However, in addition to this structure or in place of this structure, as shown in FIG. 5, an electric heater 280 may be disposed near the evaporator 17.

This makes it possible to quickly end the melting of the frost on the evaporator 17. Alternatively, it is possible to melt the frost on the evaporator 117 without causing hot gas to flow through the evaporator 117.

(3-5) Modification C of Inside Air-Conditioning Device

In the inside air-conditioning device of the modifications above, an inverter compressor is used as the compressor. However, in place of an inverter compressor, a digital capacity control compressor may be used. In this case, an inverter substrate is not required.

Other types of compressors, such as a reciprocating inverter compressor, may be used.

(3-6) Modification D of Inside Air-Conditioning Device

In the inside air-conditioning devices of the modifications above, an electronic expansion valve is used. However, in place of an electronic expansion valve, a temperature-sensitive expansion valve may be used.

(4) Inside Air-Conditioning Device that is Mounted on Container

Figure 6:
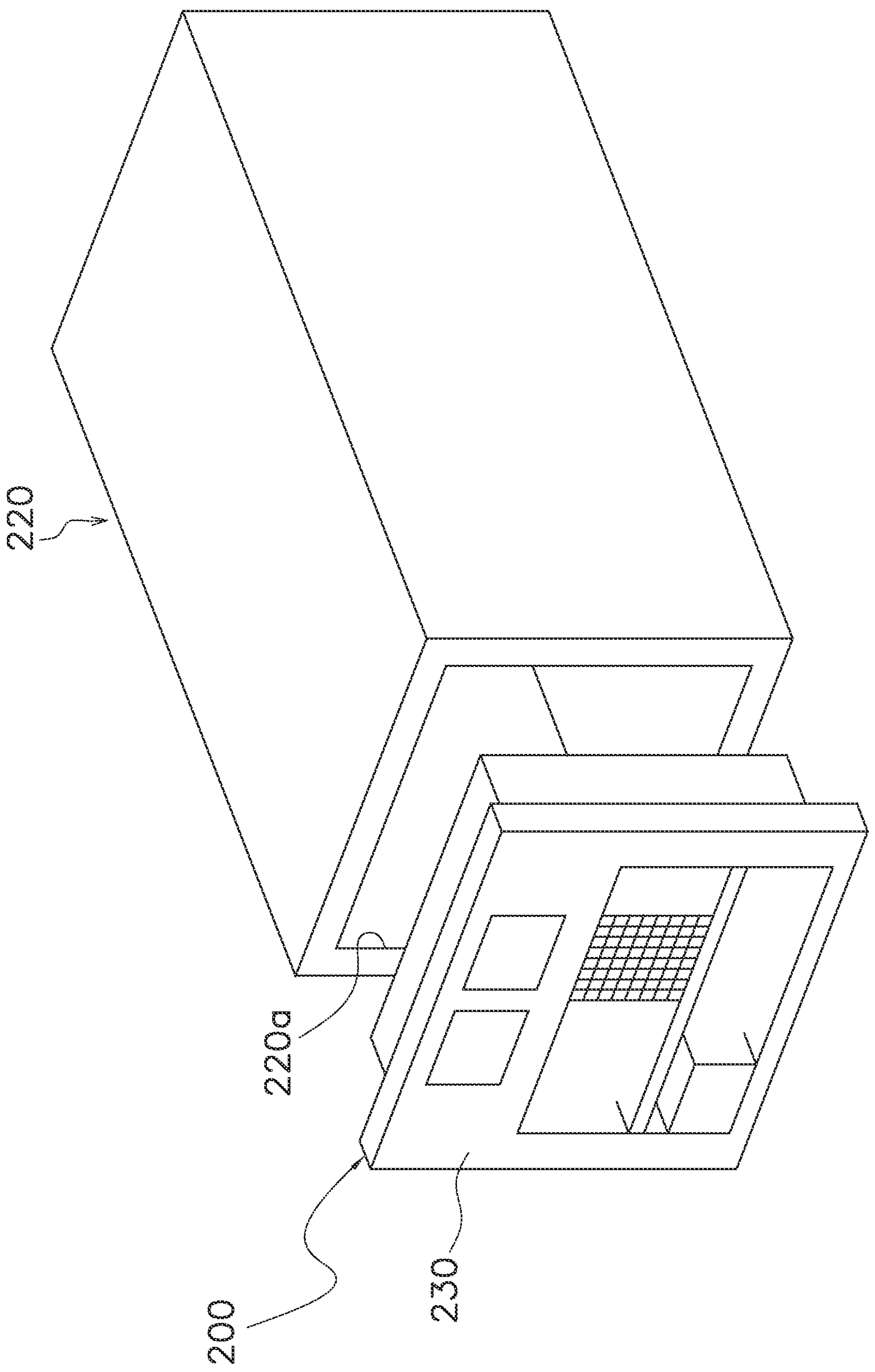
FIG. 6 is an external exploded perspective view of a container on which an inside air-conditioning device is mounted.
Figure 7:
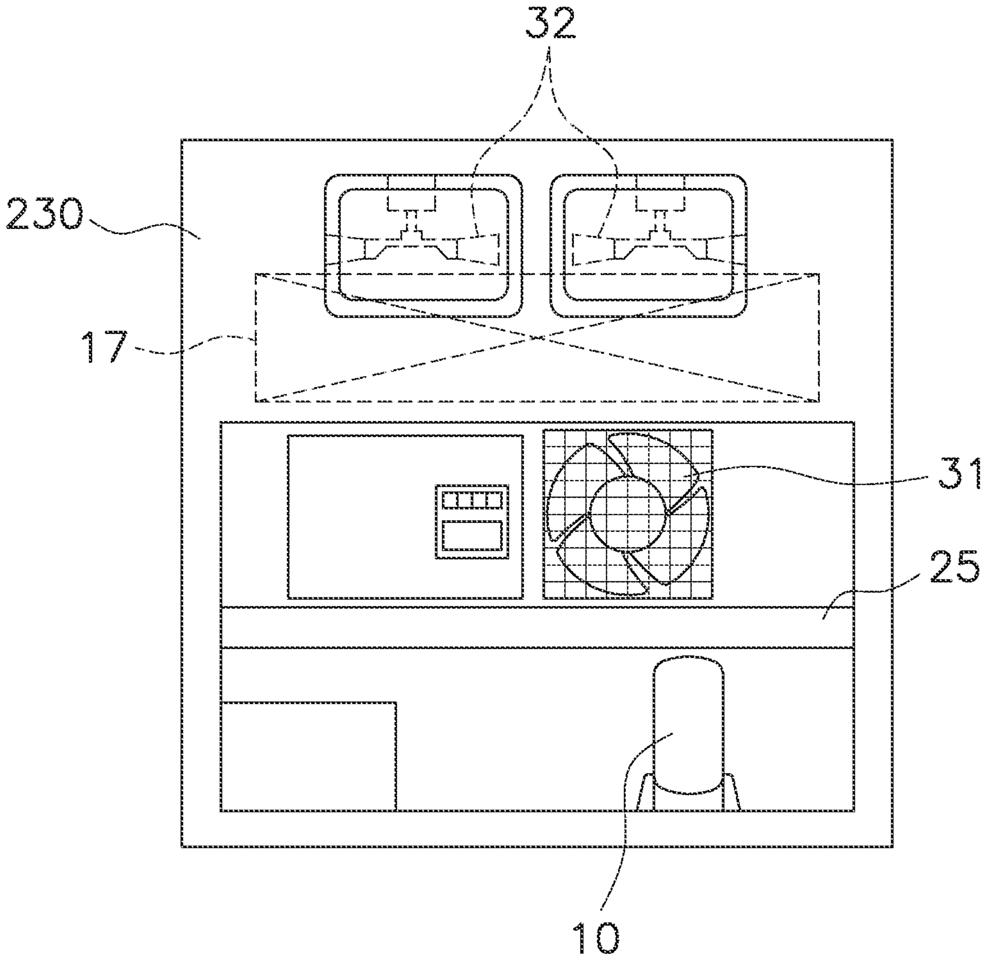
FIG. 7 is a schematic front view of the inside air-conditioning device that is mounted on the container.
Figure 8:
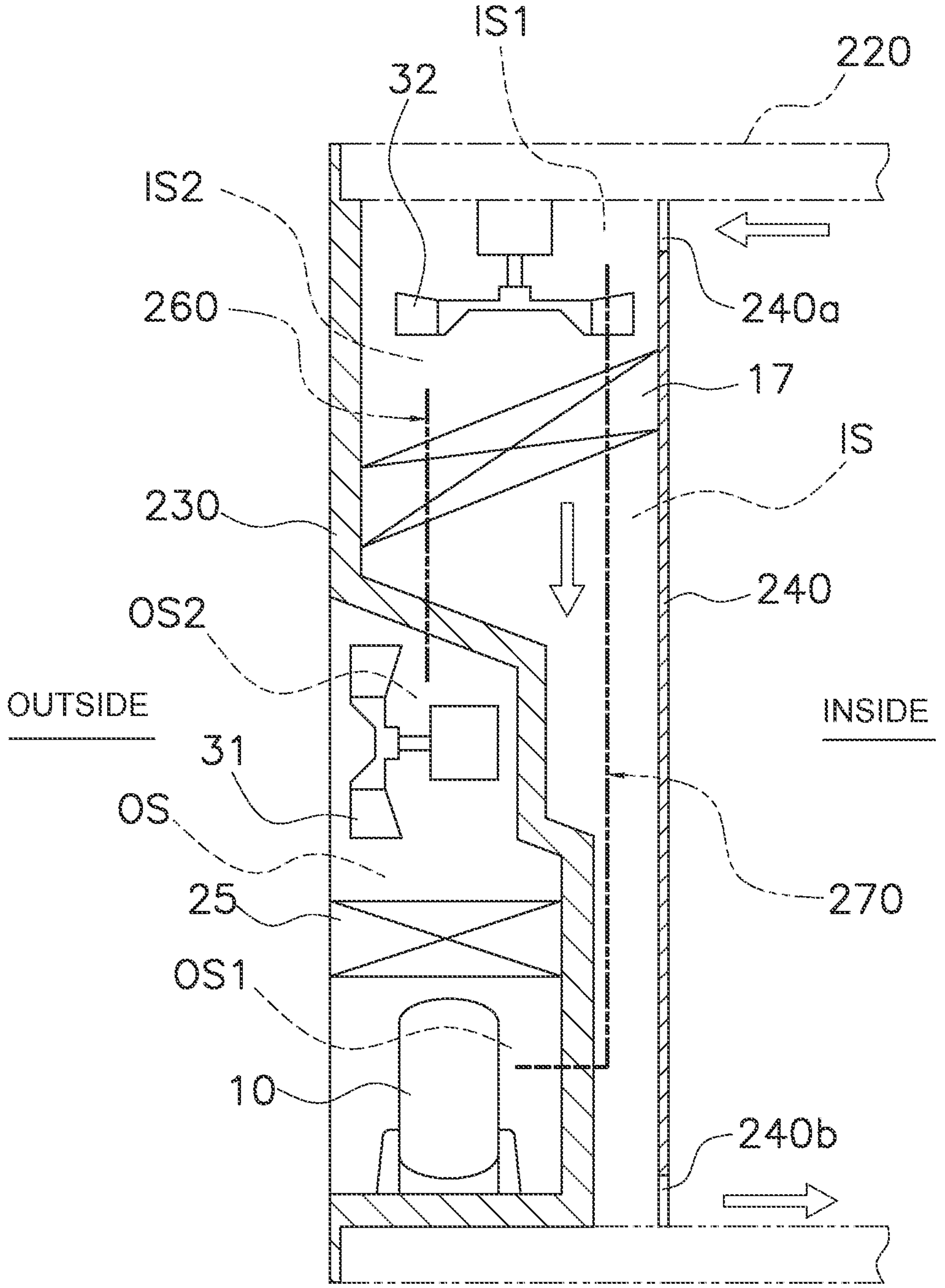
FIG. 8 is a schematic side view of the inside air-conditioning device that is mounted on the container.
Figure 9:
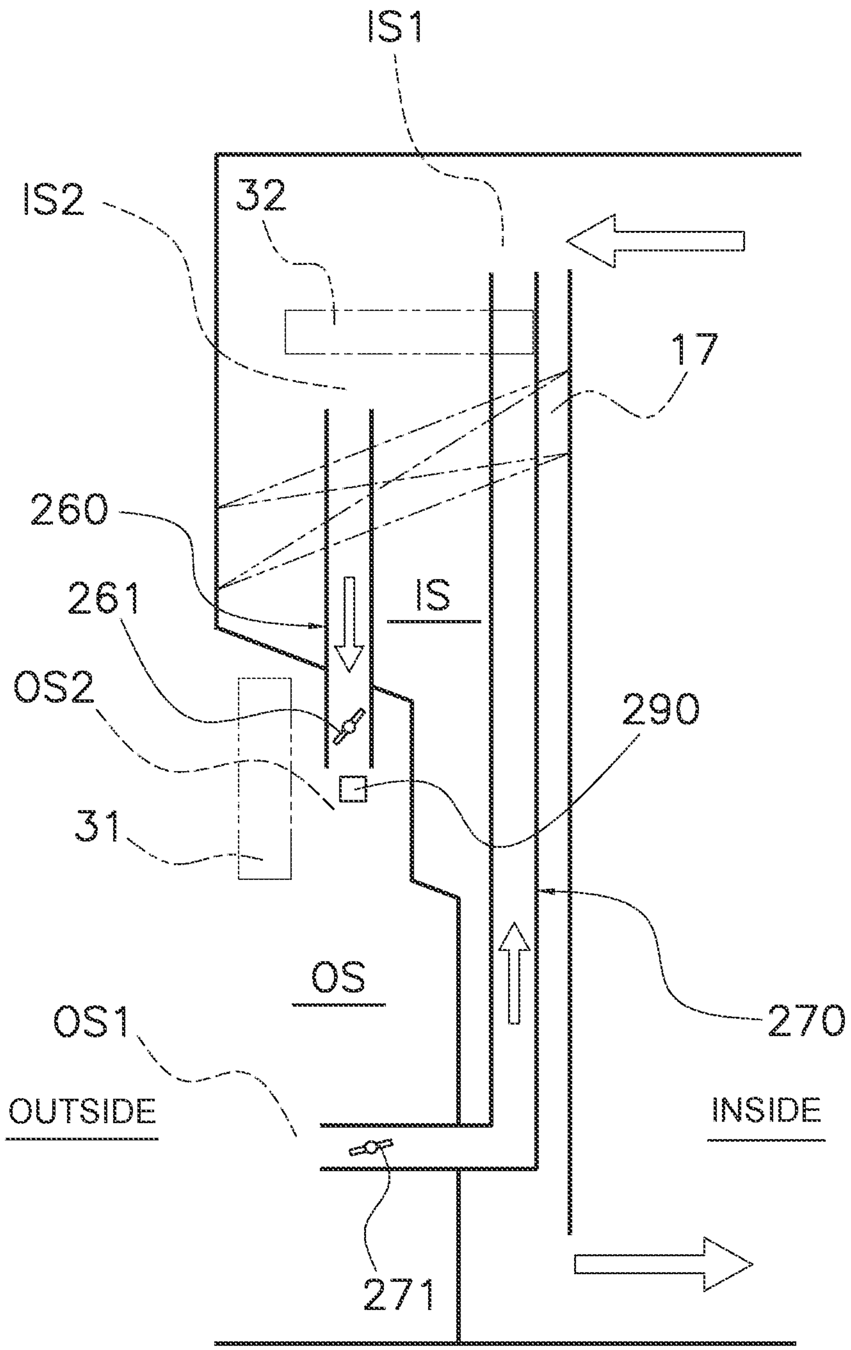
FIG. 9 is a schematic view of a ventilation section of the inside air-conditioning device that is mounted on the container.

FIGS. 6 to 9 illustrate any of the inside air-conditioning devices above that is mounted on a container 220. FIG. 6 is an external exploded perspective view of the container 220 on which an inside air-conditioning device 200 is mounted. FIG. 7 is a schematic front view thereof. FIG. 8 is a schematic side view thereof. FIG. 9 is a side view illustrating an air flow path for ventilating the inside.

The inside air-conditioning device 200 is mounted at an opening surface 220*a* of the container 220 that is handled as a marine container or a land container, and is a device that cools the inside of the container 220 by performing a vapor-compression refrigeration-cycle operation. The inside air-conditioning device 200 that is mounted on the container includes a frame 230 that covers the opening surface 220*a* of the container 220, in addition to the refrigerant circuit 50 above and other components.

The frame 230 has a shape in which its lower portion protrudes toward the inside of the container 220 (see FIG. 8). An outside-side space OS in which, for example, the condenser fan 31, and the compressor 10 and the condenser 25 that constitute the refrigerant circuit 50 are disposed is formed in the lower portion on the side of the outside of the frame 230. A partition plate 240 is disposed on the side of the inside of the frame 230 so as to be spaced apart from the frame 230. The partition plate 240 is mounted on the frame 230 via a support (not shown). An inside-side space IS in which, for example, the evaporator fan 32 and the evaporator 17 that constitutes the refrigerant circuit 50 are disposed is formed between the frame 230 and the partition plate 240. An suction port 240*a* for sucking air inside the container 220 into the inside-side space IS is formed in an upper portion of the partition plate 240, and a blow-out port 240*b* for blowing out air in the inside-side space IS into the inside of the container is formed in a lower portion of the partition plate 240.

As indicated by empty arrows in FIG. 8, inside air is sucked into an upper portion of the inside-side space IS from the suction port 240*a* and is caused to flow downward by the evaporator fan 32. Air that has been cooled when passing through the evaporator 17 is blown out into the inside of the container via the blow-out port 240*b* from a lower portion of the inside-side space IS.

As shown in FIGS. 8 and 9, the inside air-conditioning device 200 further includes a ventilation section. The ventilation section includes an exhaust air flow path 260 and an air-supply air flow path 270. An upper end of the exhaust air flow path 260 is positioned in a positive pressure space IS2 in the inside-side space IS on a downstream side of the evaporator fan 32. The positive pressure space IS2 has a pressure that is higher than atmospheric pressure due to the evaporator fan 32. A lower end of the exhaust air flow path 260 is positioned in a negative pressure space OS2 in the outside-side space OS on an upstream side of the condenser fan 31. The negative pressure space OS2 has a pressure that is lower than atmospheric pressure due to the condenser fan 31. An exhaust damper 261 for adjusting the flow path area is provided inside the exhaust air flow path 260. An upper end of the air-supply air flow path 270 is positioned in a negative pressure space IS1 in the inside-side space IS on an upstream side of the evaporator fan 32. The negative pressure space IS1 has a pressure that is lower than atmospheric pressure due to the evaporator fan 32. A lower end of the air-supply air flow path 270 is positioned in an atmospheric pressure space OS1 in a lower portion of the outside-side space OS. The atmospheric pressure space OS1 has a pressure that is generally the same as the outside atmospheric pressure. An air-supply damper 271 for adjusting the flow path area is provided inside the air-supply air flow path 270. As indicated by the empty arrows shown in the exhaust air flow path 260 and the air-supply air flow path 270 in FIG. 9, air flows in the exhaust air flow path 260 and in the air-supply air flow path 270. Air is discharged via the exhaust air flow path 260 to the outside from the inside-side space IS that communicates with the inside. Outside air at the outside is supplied into the inside-side space IS via the air-supply air flow path 270. The air is discharged and supplied to ventilate the inside. The exhaust amount and the air supply amount can be changed by adjusting the opening degree of the exhaust damper 261 and the opening degree of the air-supply damper 271.

Further, as shown in FIG. 9, the inside air-conditioning device 200 includes a refrigerant leakage detection sensor 290. When a refrigerant has leaked from, for example, the evaporator 17 in the inside-side space IS that communicates with the inside, in order to reduce the refrigerant from filling the inside, it is desirable that strong ventilation be forcibly performed by the exhaust air flow path 260. Accordingly, in the inside air-conditioning device 200, the refrigerant leakage detection sensor 290 is installed. The refrigerant leakage detection sensor 290 is installed near an outlet at the lower end of the exhaust air flow path 260, and, when a refrigerant leaks at the inside-side space IS, the refrigerant leakage detection sensor 290 detects the existence of the refrigerant that flows through the exhaust air flow path 260. When the refrigerant leakage detection sensor 290 has detected leakage of a refrigerant, strong ventilation is performed with the exhaust damper 261 and the air-supply damper 271 in a fully open state instead of at the opening degree of the exhaust damper 261 and at the opening degree of the air-supply damper 271 at the time of ordinary ventilation. Note that, when leakage of a refrigerant is detected, it is desirable to perform control to stop the compressor 10 with the electronic expansion valve 13 being closed and the refrigerant being moved to the compressor 10 or the condenser 25 from the evaporator 17.

(5)

Although each embodiment is described above, it is to be understood that various changes may be made in the forms and details without departing from the spirit and the scope of the present disclosure described in the claims.

REFERENCE SIGNS LIST

10 compressor
13 electronic expansion valve (decompressor)
17 evaporator
25 condenser
50 refrigerant circuit
200 inside air-conditioning device

CITATION LIST

Patent Literature

PTL 1: International Publication No. 2005/105947
PTL 2: Japanese Unexamined Patent Application Publication No. 2018-184597

The invention claimed is:

1. An inside air-conditioning device comprising:
a refrigerant circuit comprising a compressor, a condenser, a decompressor, and an evaporator; and
a refrigerant that is sealed in the refrigerant circuit, wherein the refrigerant contains trans-1,2-difluoroethylene (HFO-1132(E)) and 2,3,3,3-tetrafluoropropene (HFO-1234yf) in such amounts that the sum of HFO-1132(E) and HFO-1234yf is 99.5 mass % or more, wherein
the refrigerant contains 35.0 to 65.0 mass % of HFO-1132(E) and 65.0 to 35.0 mass % of HFO-1234yf, based on a total mass of HFO-1132(E) and HFO-1234yf, and
the refrigerant is used for operating a refrigeration cycle in which an evaporating temperature is −75 to −5° C.

2. The inside air-conditioning device according to claim 1, wherein the refrigerant contains 41.3 to 53.5 mass % of HFO-1132(E) and 58.7 to 46.5 mass % of HFO-1234yf, based on a total mass of HFO-1132(E) and HFO-1234yf.

3. The inside air-conditioning device according to claim 1, wherein the refrigerant consists of HFO-1132(E) and HFO-1234yf.

4. An inside air-conditioning device comprising:
a refrigerant circuit comprising a compressor, a condenser, a decompressor, and an evaporator; and
a refrigerant that is sealed in the refrigerant circuit, wherein the refrigerant contains trans-1,2-difluoroethylene (HFO-1132(E)) and 2,3,3,3-tetrafluoropropene (HFO-1234yf) in such amounts that the sum of HFO-1132(E) and HFO-1234yf is 99.5 mass % or more, wherein
the refrigerant contains 40.5 to 49.2 mass % of HFO-1132(E) and 59.5 to 50.8 mass % of HFO-1234yf, based on a total mass of HFO-1132(E) and HFO-1234yf.

5. The inside air-conditioning device according to claim 4, wherein the refrigerant consists of HFO-1132(E) and HFO-1234yf.

6. The inside air-conditioning device according to claim 4, wherein the refrigerant is used for operating a refrigeration cycle in which an evaporating temperature is −75 to 15° C.

7. The inside air-conditioning device according to claim 1, wherein the refrigerant is used as an alternative refrigerant to R12, R22, R134a, R404A, R407A, R407C, R407F, R407H, R410A, R413A, R417A, R422A, R422B, R422C, R422D, R423A, R424A, R426A, R427A, R430A, R434A, R437A, R438A, R448A, R449A, R449B, R449C, R452A, R452B, R454A, R454B, R454C, R455A, R465A, R502, R507 or R513A.

8. An inside air-conditioning device comprising:
a refrigerant circuit comprising a compressor, a condenser, a decompressor, and an evaporator; and
a refrigerant that is sealed in the refrigerant circuit, wherein the refrigerant contains trans-1,2-difluoroethylene (HFO-1132(E)) and 2,3,3,3-tetrafluoropropene (HFO-1234yf) in such amounts that the sum of HFO-1132(E) and HFO-1234yf is 99.5 mass % or more, wherein
the refrigerant contains 31.1 to 39.8 mass % of HFO-1132(E) and 68.9 to 60.2 mass % of HFO-1234yf, based on a total mass of HFO-1132(E) and HFO-1234yf.

9. The inside air-conditioning device according to claim 8, wherein the refrigerant contains 31.1 to 37.9 mass % of HFO-1132(E) and 68.9 to 62.1 mass % of HFO-1234yf, based on a total mass of HFO-1132(E) and HFO-1234yf.

10. The inside air-conditioning device according to claim 8, wherein the refrigerant consists of HFO-1132(E) and HFO-1234yf.

11. The inside air-conditioning device according to claim 8, wherein the refrigerant is used for operating a refrigeration cycle in which an evaporating temperature is −75 to 15° C.

12. The inside air-conditioning device according to claim 8, wherein the refrigerant is used as an alternative refrigerant to R134a, R1234yf or $CO_2$.

13. An inside air-conditioning device comprising:

a refrigerant circuit comprising a compressor, a condenser, a decompressor, and an evaporator; and a refrigerant that is sealed in the refrigerant circuit, wherein the refrigerant contains trans-1,2-difluoroethylene (HFO-1132(E)) and 2,3,3,3-tetrafluoropropene (HFO-1234yf) in such amounts that the sum of HFO-1132(E) and HFO-1234yf is 99.5 mass % or more, wherein the refrigerant contains 21.0 to 28.4 mass % of HFO-1132(E) and 79.0 to 71.6 mass % of HFO-1234yf, based on a total mass of HFO-1132(E) and HFO-1234yf.

14. The inside air-conditioning device according to claim 13, wherein the refrigerant consists of HFO-1132(E) and HFO-1234yf.

15. The inside air-conditioning device according to claim 13, wherein the refrigerant is used as an alternative refrigerant to R12, R22, R134a, R404A, R407A, R407C, R407F, R407H, R410A, R413A, R417A, R422A, R422B, R422C, R422D, R423A, R424A, R426A, R427A, R430A, R434A, R437A, R438A, R448A, R449A, R449B, R449C, R452A, R452B, R454A, R454B, R454C, R455A, R465A, R502, R507, R513A, R1234yf or R1234ze.

16. An inside air-conditioning device comprising:

a refrigerant circuit comprising a compressor, a condenser, a decompressor, and an evaporator; and a refrigerant that is sealed in the refrigerant circuit, wherein the refrigerant contains trans-1,2-difluoroethylene (HFO-1132(E)) and 2,3,3,3-tetrafluoropropene (HFO-1234yf) in such amounts that the sum of HFO-1132(E) and HFO-1234yf is 99.7 mass % or more, wherein the refrigerant contains 12.1 to 45.0 mass % of HFO-1132(E) and 87.9 to 55.0 mass % of HFO-1234yf, based on a total mass of HFO-1132(E) and HFO-1234yf.

17. The inside air-conditioning device according to claim 16, wherein the refrigerant consists of HFO-1132(E) and HFO-1234yf.

18. The inside air-conditioning device according to claim 16, wherein the refrigerant is used as an alternative refrigerant to R12, R134a or R1234yf.

19. The inside air-conditioning device according to claim 1, wherein the refrigerant further contains at least one substance selected from the group consisting of water, a tracer, an ultraviolet fluorescent dye, a stabilizer, and a polymerization inhibitor.

20. The inside air-conditioning device according to claim 1, wherein the refrigerant further contains a refrigerator oil and is used as a working fluid for a refrigeration apparatus.

21. The inside air-conditioning device according to claim 20, wherein the refrigerator oil contains at least one polymer selected from the group consisting of a polyalkylene glycol (PAG), a polyol ester (POE), and a polyvinyl ether (PVE).

* * * * *